US012613857B2

(12) United States Patent (10) Patent No.: US 12,613,857 B2
Vaishnav et al. (45) Date of Patent: Apr. 28, 2026

(54) DATABASE SERVER AGENT

(71) Applicant: Nutanix, Inc., San Jose, CA (US)

(72) Inventors: Nilesh Vaishnav, Bangalore (IN);
Shurya Kumar N S, Bangalore (IN);
Akshay Chandak, Bangalore (IN);
Vaibhaw Pandey, Bangalore (IN)

(73) Assignee: Nutanix, Inc., San Jose, CA (US)

( * ) Notice: Subject to any disclaimer, the term of this
patent is extended or adjusted under 35
U.S.C. 154(b) by 416 days.

(21) Appl. No.: 18/322,810

(22) Filed: May 24, 2023

(65) Prior Publication Data

US 2023/0418639 A1 Dec. 28, 2023

(30) Foreign Application Priority Data

Jun. 22, 2022 (IN) .............................. 202241035876

(51) Int. Cl.
*G06F 9/455* (2018.01)
*G06F 9/48* (2006.01)
(Continued)

(52) U.S. Cl.
CPC ........ *G06F 16/235* (2019.01); *G06F 9/45533*
(2013.01); *G06F 9/4887* (2013.01);
(Continued)

(58) Field of Classification Search
CPC .................................................. G06F 16/235
(Continued)

(56) References Cited

U.S. PATENT DOCUMENTS 625,315 A 5/1899 Semple
749,117 A 1/1904 Wagner
(Continued)

FOREIGN PATENT DOCUMENTS

CN 104408071 A 3/2015
CN 105446828 A 3/2016
(Continued)

OTHER PUBLICATIONS

BackupAssist, "https://secure.backupassist.com/support/en/backupassist/
manage/calendar.htm"; "https://secure.backupassist.com/ support/
en/references/backup-schedules.htm", Jul. 1, 2017 (Year: 2017).
(Continued)

*Primary Examiner* — Mehran Kamran
(74) *Attorney, Agent, or Firm* — Foley & Lardner LLP

(57) ABSTRACT

Aspects of the present disclosure are directed to a system
comprising a memory having computer-readable instruc-
tions stored thereon, and a processor of a database server, the
processor executing the computer-readable instructions to
generate a request to a control plane for an operation to be
performed on the database server, wherein the control plane
is configured to communicate with a plurality of database
servers having a plurality of agents running thereon, and
wherein each of the plurality of agents has a dedicated
communication connection with the control plane, publish
the request on the dedicated communication connection
associated with the agent to send the request to the control
plane, receive, on the dedicated communication connection,
a response from the control plane, the response comprising
a response to the request from a service of the control plane,
and execute the operation on the database server based on
the response.

30 Claims, 41 Drawing Sheets

(51) Int. Cl.

| | |
|---|---|
| *G06F 16/23* | (2019.01) |
| *G06F 16/25* | (2019.01) |
| *G06F 16/27* | (2019.01) |
| *G06F 21/62* | (2013.01) |
| *H04L 67/60* | (2022.01) |

(52) U.S. Cl.
CPC ........ *G06F 16/2365* (2019.01); *G06F 16/252* (2019.01); *G06F 16/258* (2019.01); *G06F 16/27* (2019.01); *G06F 21/6218* (2013.01); *H04L 67/60* (2022.05)

(58) Field of Classification Search
USPC ............................................................ 718/1
See application file for complete search history.

(56) References Cited

U.S. PATENT DOCUMENTS

| | | | |
|---|---|---|---|
| 4,742,482 | A | 5/1988 | Inskeep et al. |
| 5,594,859 | A | 1/1997 | Palmer et al. |
| 6,064,975 | A | 5/2000 | Moon et al. |
| 6,243,715 | B1 | 6/2001 | Bogantz et al. |
| 6,542,893 | B1 | 4/2003 | Quernemoen |
| 6,766,477 | B2 | 7/2004 | Grucci et al. |
| D508,248 | S | 8/2005 | Ording |
| D521,521 | S | 5/2006 | Jewitt et al. |
| 7,046,134 | B2 | 5/2006 | Hansen |
| 7,136,865 | B1 | 11/2006 | Ra et al. |
| 7,225,189 | B1 | 5/2007 | McCormack et al. |
| 7,331,000 | B2 | 2/2008 | Ohno et al. |
| 7,389,300 | B1 | 6/2008 | Shah et al. |
| 7,634,679 | B2 | 12/2009 | Quintiliano |
| 7,725,671 | B2 | 5/2010 | Prahlad et al. |
| D625,315 | S | 10/2010 | Jewitt et al. |
| 7,814,057 | B2 | 10/2010 | Kathuria et al. |
| 7,840,533 | B2 | 11/2010 | Prahlad et al. |
| 7,873,610 | B2 | 1/2011 | Poulsen |
| 7,873,684 | B2 | 1/2011 | Souder et al. |
| 7,941,470 | B2 | 5/2011 | Le et al. |
| 7,953,764 | B2 | 5/2011 | Baffier et al. |
| 7,971,094 | B1 | 6/2011 | Benn et al. |
| 7,974,942 | B2 | 7/2011 | Pomroy et al. |
| 8,117,165 | B1 | 2/2012 | Winckelmann et al. |
| 8,146,080 | B2 | 3/2012 | Carter et al. |
| D656,948 | S | 4/2012 | Kundsen et al. |
| 8,150,808 | B2 | 4/2012 | Zha et al. |
| 8,250,033 | B1 | 8/2012 | De Souter et al. |
| 8,291,409 | B2 | 10/2012 | Winner et al. |
| 8,335,765 | B2 | 12/2012 | Sivasubramanian et al. |
| 8,364,648 | B1 | 1/2013 | Sim-Tang |
| 8,429,630 | B2 | 4/2013 | Nickolov et al. |
| 8,447,728 | B2 | 5/2013 | Prahlad et al. |
| 8,448,170 | B2 | 5/2013 | Wipfel et al. |
| D684,160 | S | 6/2013 | Truelove et al. |
| D684,161 | S | 6/2013 | Truelove et al. |
| 8,468,174 | B1 | 6/2013 | Yueh et al. |
| 8,549,518 | B1 | 10/2013 | Aron et al. |
| 8,572,031 | B2 | 10/2013 | Merriman et al. |
| 8,601,473 | B1 | 12/2013 | Aron et al. |
| 8,612,396 | B1 | 12/2013 | Mcalister et al. |
| 8,635,421 | B2 | 1/2014 | Gupta et al. |
| 8,656,123 | B2 | 2/2014 | Lee |
| 8,656,303 | B2 | 2/2014 | Hughes |
| 8,677,085 | B2 | 3/2014 | Vaghani et al. |
| 8,713,060 | B2 | 4/2014 | Sivasubramanian et al. |
| 8,762,335 | B2 | 6/2014 | Prahlad et al. |
| 8,769,537 | B1 | 7/2014 | Ruggiero et al. |
| 8,775,438 | B1 | 7/2014 | Brooker et al. |
| 8,832,028 | B2 | 9/2014 | Susairaj et al. |
| 8,843,441 | B1 | 9/2014 | Rath et al. |
| 8,849,850 | B2 | 9/2014 | Baffier et al. |
| 8,850,130 | B1 | 9/2014 | Aron et al. |
| 8,856,189 | B1 | 10/2014 | Bull et al. |
| 8,863,124 | B1 | 10/2014 | Aron |
| 8,874,749 | B1 | 10/2014 | Vittal et al. |
| 8,914,567 | B2 | 12/2014 | Miroshnichenko et al. |
| 8,924,974 | B1 | 12/2014 | Ruggiero et al. |
| 8,972,347 | B1 | 3/2015 | Sim-Tang |
| 9,009,106 | B1 | 4/2015 | Aron et al. |
| 9,069,708 | B2 | 6/2015 | Gill et al. |
| D733,745 | S | 7/2015 | Huang |
| 9,116,737 | B2 | 8/2015 | Aswathanarayana et al. |
| 9,116,803 | B1 | 8/2015 | Agrawal et al. |
| 9,116,862 | B1 | 8/2015 | Rath et al. |
| 9,213,727 | B1 | 12/2015 | Esposito |
| 9,244,717 | B2 | 1/2016 | Pissay et al. |
| D749,117 | S | 2/2016 | Huang |
| 9,256,383 | B2 | 2/2016 | De Spiegeleer et al. |
| 9,268,610 | B2 | 2/2016 | Hegdal et al. |
| D753,135 | S | 4/2016 | Vazquez |
| D753,140 | S | 4/2016 | Kouvas et al. |
| 9,305,068 | B1 | 4/2016 | Esposito |
| 9,311,330 | B1 | 4/2016 | Chockalingam et al. |
| 9,336,060 | B2 | 5/2016 | Nori et al. |
| 9,336,132 | B1 | 5/2016 | Aron et al. |
| 9,372,758 | B2 | 6/2016 | Ashutosh et al. |
| D761,288 | S | 7/2016 | Cianflone et al. |
| 9,384,254 | B2 | 7/2016 | Tekade et al. |
| 9,389,962 | B1 | 7/2016 | Yueh et al. |
| D763,890 | S | 8/2016 | Pan |
| 9,405,634 | B1 | 8/2016 | Ambastha et al. |
| 9,413,810 | B2 | 8/2016 | Rezvani et al. |
| 9,436,556 | B2 | 9/2016 | Siden et al. |
| D771,102 | S | 11/2016 | Protzman et al. |
| 9,495,435 | B2 | 11/2016 | Zhang et al. |
| 9,507,579 | B2 | 11/2016 | Gambardella et al. |
| 9,529,551 | B2 | 12/2016 | Kesavan et al. |
| 9,529,808 | B1 | 12/2016 | Sudarsanam et al. |
| D777,747 | S | 1/2017 | Derby et al. |
| D778,296 | S | 2/2017 | Belkin et al. |
| D779,514 | S | 2/2017 | Baris et al. |
| 9,582,297 | B2 | 2/2017 | Jin et al. |
| D781,887 | S | 3/2017 | Dziuba et al. |
| 9,600,193 | B2 | 3/2017 | Ahrens et al. |
| 9,621,680 | B2 | 4/2017 | D'Costa et al. |
| 9,639,429 | B2 | 5/2017 | Stewart et al. |
| 9,652,265 | B1 | 5/2017 | Narayanasamy et al. |
| 9,659,080 | B1 | 5/2017 | Drobychev et al. |
| 9,665,437 | B2 | 5/2017 | Bhargava et al. |
| D794,666 | S | 8/2017 | Havaldar et al. |
| D794,667 | S | 8/2017 | Havaldar et al. |
| 9,733,958 | B2 | 8/2017 | Cui et al. |
| 9,740,472 | B1 | 8/2017 | Sohi et al. |
| 9,740,723 | B2 | 8/2017 | Prahlad et al. |
| 9,747,287 | B1 | 8/2017 | Bhardwaj et al. |
| D797,116 | S | 9/2017 | Chapman et al. |
| 9,753,713 | B2 | 9/2017 | Mani et al. |
| 9,760,396 | B2 | 9/2017 | Apte et al. |
| 9,772,866 | B1 | 9/2017 | Aron et al. |
| 9,778,992 | B1 | 10/2017 | Yueh et al. |
| D802,608 | S | 11/2017 | Hicks et al. |
| D803,231 | S | 11/2017 | Guinness et al. |
| 9,830,082 | B1 | 11/2017 | Srinivasan et al. |
| D807,902 | S | 1/2018 | Cong et al. |
| 9,858,155 | B2 | 1/2018 | Ashutosh et al. |
| 9,881,168 | B2 | 1/2018 | Chari et al. |
| D809,530 | S | 2/2018 | Matheson et al. |
| D815,652 | S | 4/2018 | Protzman et al. |
| 9,934,107 | B1 | 4/2018 | Chikkanayakanahally et al. |
| D817,976 | S | 5/2018 | Shilwant et al. |
| 9,960,963 | B2 | 5/2018 | Selvaraj et al. |
| 10,013,313 | B2 | 7/2018 | Zhang et al. |
| 10,033,833 | B2 | 7/2018 | Fu et al. |
| 10,055,300 | B2 | 8/2018 | Zhang et al. |
| 10,057,279 | B1 | 8/2018 | Balduzzi et al. |
| 10,061,852 | B1 * | 8/2018 | Plenderleith .......... H04L 67/568 |
| 10,078,465 | B1 | 9/2018 | Wu et al. |
| 10,108,496 | B2 | 10/2018 | Hoobler et al. |
| 10,108,685 | B2 | 10/2018 | Amdur et al. |
| 10,146,848 | B2 | 12/2018 | Narayanan et al. |
| 10,162,715 | B1 | 12/2018 | Mcalister et al. |
| D838,288 | S | 1/2019 | Sunshine et al. |
| 10,185,627 | B2 | 1/2019 | Wong et al. |
| D839,913 | S | 2/2019 | Chen et al. |

(56)                  References Cited

U.S. PATENT DOCUMENTS

| | | |
|---|---|---|
| 10,206,092 B1 | 2/2019 | Mellquist et al. |
| 10,210,048 B2 | 2/2019 | Sancheti |
| 10,212,195 B2 | 2/2019 | Maskalik et al. |
| D843,388 S | 3/2019 | Protzman et al. |
| 10,235,250 B1 | 3/2019 | Ambastha et al. |
| 10,248,657 B2 | 4/2019 | Prahlad et al. |
| 10,268,551 B1 | 4/2019 | Wong |
| 10,275,267 B1 | 4/2019 | De Kadt et al. |
| 10,282,201 B2 | 5/2019 | Tekade et al. |
| 10,339,110 B2 | 7/2019 | Marinov et al. |
| 10,346,431 B1 | 7/2019 | Broda et al. |
| 10,372,329 B1 | 8/2019 | Ahrens et al. |
| 10,379,957 B2 | 8/2019 | Ngo |
| 10,379,963 B2 | 8/2019 | Bhargava et al. |
| D862,512 S | 10/2019 | Schubart |
| 10,445,298 B2 | 10/2019 | Ramu et al. |
| 10,447,806 B1 | 10/2019 | Sahay et al. |
| 10,476,955 B2 | 11/2019 | Mutalik et al. |
| D870,762 S | 12/2019 | Mendoza Corominas et al. |
| 10,496,302 B1 | 12/2019 | Gaurav et al. |
| 10,503,612 B1 | 12/2019 | Wang et al. |
| 10,509,798 B2 | 12/2019 | Chow et al. |
| D875,108 S | 2/2020 | Chitalia et al. |
| 10,572,292 B2 | 2/2020 | Bhandari et al. |
| D877,753 S | 3/2020 | Chitalia et al. |
| 10,579,364 B2 | 3/2020 | Doshi et al. |
| 10,599,423 B2 | 3/2020 | Coleman et al. |
| 10,606,578 B2 | 3/2020 | Kruglikov et al. |
| 10,613,938 B2 | 4/2020 | Blumenau et al. |
| 10,637,914 B2 | 4/2020 | Basavaiah et al. |
| 10,700,991 B2 | 6/2020 | Khinvasara et al. |
| 10,705,755 B2 | 7/2020 | Wang et al. |
| 10,719,407 B1 | 7/2020 | Chockalingam et al. |
| 10,725,866 B1 | 7/2020 | Palaiah et al. |
| 10,728,255 B2 | 7/2020 | Jindal et al. |
| 10,757,036 B2 | 8/2020 | Tung et al. |
| 10,776,329 B2 | 9/2020 | Ramohalli Gopala Rao et al. |
| 10,778,750 B2 | 9/2020 | Ringdahl |
| 10,785,029 B2 | 9/2020 | Gupta et al. |
| 10,785,255 B1 | 9/2020 | Otvagin et al. |
| 10,812,582 B2 | 10/2020 | Spillane et al. |
| 10,817,157 B2 | 10/2020 | Kuchibhotla et al. |
| 10,824,522 B2 | 11/2020 | Sadavarte et al. |
| 10,824,956 B1 | 11/2020 | Natanzon et al. |
| 10,855,554 B2 | 12/2020 | Freeman et al. |
| D911,356 S | 2/2021 | Varghese et al. |
| 10,922,957 B2 | 2/2021 | Rhoads et al. |
| 10,938,924 B1 | 3/2021 | Jensen et al. |
| 10,949,309 B2 | 3/2021 | Hajare et al. |
| 10,951,496 B2 | 3/2021 | Baker et al. |
| 10,959,098 B2 | 3/2021 | Cidon et al. |
| 10,965,737 B1* | 3/2021 | Parulkar .................. H04L 67/52 |
| 10,984,041 B2 | 4/2021 | Bedadala et al. |
| 10,999,165 B2 | 5/2021 | Cidon et al. |
| 11,010,336 B2 | 5/2021 | Kuchibhotla et al. |
| 11,010,487 B2 | 5/2021 | Noe et al. |
| 11,036,696 B2 | 6/2021 | Higginson et al. |
| D926,200 S | 7/2021 | Murphy et al. |
| 11,055,352 B1 | 7/2021 | Beitchman et al. |
| 11,061,709 B2 | 7/2021 | Cao et al. |
| D927,507 S | 8/2021 | Norman |
| 11,099,956 B1 | 8/2021 | Polimera et al. |
| 11,100,020 B2* | 8/2021 | Shah ...................... H04L 45/70 |
| 11,108,629 B1 | 8/2021 | Cahyadi et al. |
| 11,120,011 B2 | 9/2021 | Priebe et al. |
| 11,126,426 B2 | 9/2021 | Zhu et al. |
| 11,169,887 B2 | 11/2021 | Bajaj et al. |
| 11,182,372 B1 | 11/2021 | Jain et al. |
| 11,243,703 B2 | 2/2022 | Watkins |
| 11,243,971 B2 | 2/2022 | Geigel |
| D947,216 S | 3/2022 | Leininger |
| D947,239 S | 3/2022 | Rubin et al. |
| D947,240 S | 3/2022 | Rubin et al. |
| 11,275,573 B1 | 3/2022 | Javadekar |
| 11,308,114 B1 | 4/2022 | Moghe |
| 11,372,820 B1 | 6/2022 | Harjono et al. |
| 11,386,058 B2 | 7/2022 | Hung et al. |
| 11,561,864 B1 | 1/2023 | Brahmadesam et al. |
| 11,604,705 B2 | 3/2023 | Mehta et al. |
| 11,604,806 B2 | 3/2023 | Mankad et al. |
| 11,609,828 B2 | 3/2023 | Khandkar et al. |
| 11,640,340 B2 | 5/2023 | Sontakke et al. |
| 11,741,380 B2 | 8/2023 | Khawas et al. |
| 11,816,066 B2 | 11/2023 | Kuchibhotla et al. |
| 11,860,818 B2 | 1/2024 | Kuchibhotla et al. |
| 11,892,918 B2 | 2/2024 | Rayaraddi et al. |
| 11,899,685 B1* | 2/2024 | Pandis .................. G06F 16/27 |
| 12,010,227 B1 | 6/2024 | Chhabra et al. |
| 12,019,523 B2 | 6/2024 | Mehta et al. |
| 12,081,604 B1* | 9/2024 | Hinds .................... H04L 65/80 |
| 12,093,715 B2 | 9/2024 | Zhao et al. |
| 12,321,244 B1* | 6/2025 | Rather ............... G06F 11/1471 |
| 2001/0014867 A1 | 8/2001 | Conmy |
| 2002/0019920 A1 | 2/2002 | Reuter et al. |
| 2002/0038554 A1 | 4/2002 | Monk et al. |
| 2002/0073089 A1 | 6/2002 | Schwartz et al. |
| 2002/0082858 A1 | 6/2002 | Heddaya et al. |
| 2002/0104376 A1 | 8/2002 | Danyluk et al. |
| 2002/0174098 A1 | 11/2002 | Wu et al. |
| 2003/0046353 A1 | 3/2003 | Chung et al. |
| 2003/0147309 A1 | 8/2003 | Weisberg |
| 2004/0059878 A1 | 3/2004 | Madany |
| 2005/0027661 A1 | 2/2005 | Lober et al. |
| 2005/0149757 A1 | 7/2005 | Corbett et al. |
| 2006/0029096 A1 | 2/2006 | Babbar et al. |
| 2006/0107006 A1 | 5/2006 | Green et al. |
| 2006/0143412 A1 | 6/2006 | Armangau |
| 2006/0161444 A1 | 7/2006 | Lubrecht et al. |
| 2006/0161462 A1 | 7/2006 | Sharma |
| 2006/0161879 A1 | 7/2006 | Lubrecht et al. |
| 2006/0242189 A1 | 10/2006 | Leetaru et al. |
| 2006/0253472 A1 | 11/2006 | Wasserman et al. |
| 2007/0022065 A1 | 1/2007 | Hatano et al. |
| 2007/0100793 A1 | 5/2007 | Brown et al. |
| 2007/0183224 A1 | 8/2007 | Erofeev |
| 2007/0185852 A1 | 8/2007 | Erofeev |
| 2007/0185922 A1 | 8/2007 | Kapoor et al. |
| 2007/0185937 A1 | 8/2007 | Prahlad et al. |
| 2007/0234115 A1 | 10/2007 | Saika |
| 2007/0300221 A1 | 12/2007 | Hartz et al. |
| 2008/0059894 A1 | 3/2008 | Cisler et al. |
| 2008/0126945 A1 | 5/2008 | Munkvold et al. |
| 2008/0239985 A1 | 10/2008 | Karve et al. |
| 2008/0256311 A1 | 10/2008 | Lee |
| 2009/0022285 A1 | 1/2009 | Swanburg et al. |
| 2009/0028082 A1 | 1/2009 | Wynn et al. |
| 2009/0037914 A1 | 2/2009 | Chagoly et al. |
| 2009/0112881 A1 | 4/2009 | Kodama |
| 2009/0125858 A1 | 5/2009 | Vishweshwara et al. |
| 2009/0132543 A1 | 5/2009 | Chatley et al. |
| 2009/0161547 A1* | 6/2009 | Riddle .................... G06F 9/526 |
| | | 370/395.7 |
| 2009/0228669 A1 | 9/2009 | Slesarev et al. |
| 2009/0276771 A1 | 11/2009 | Nickolov et al. |
| 2009/0276833 A1 | 11/2009 | Paul et al. |
| 2009/0319582 A1 | 12/2009 | Simek et al. |
| 2010/0017801 A1 | 1/2010 | Kundapur |
| 2010/0023564 A1 | 1/2010 | Yerneni et al. |
| 2010/0251242 A1 | 9/2010 | Sivasubramanian et al. |
| 2011/0004586 A1 | 1/2011 | Cherryholmes et al. |
| 2011/0022882 A1 | 1/2011 | Jaehde et al. |
| 2011/0071981 A1 | 3/2011 | Ghosh et al. |
| 2011/0093435 A1 | 4/2011 | Zha et al. |
| 2011/0099420 A1 | 4/2011 | Macdonald Mcalister et al. |
| 2011/0138383 A1 | 6/2011 | Le |
| 2011/0252420 A1 | 10/2011 | Tung et al. |
| 2012/0011378 A1 | 1/2012 | Dalton et al. |
| 2012/0084260 A1 | 4/2012 | Cherkauer et al. |
| 2012/0123999 A1 | 5/2012 | Ashutosh et al. |
| 2012/0271797 A1 | 10/2012 | Patil |
| 2012/0290714 A1 | 11/2012 | Cohen |
| 2013/0019015 A1 | 1/2013 | Devarakonda et al. |
| 2013/0031136 A1 | 1/2013 | Shah |
| 2013/0091285 A1 | 4/2013 | Devarakonda et al. |

(56) References Cited

U.S. PATENT DOCUMENTS

| | | |
|---|---|---|
| 2013/0110779 A1 | 5/2013 | Taylor et al. |
| 2013/0117441 A1 | 5/2013 | Kuchibhotla et al. |
| 2013/0232470 A1 | 9/2013 | Yung |
| 2013/0232497 A1 | 9/2013 | Jalagam et al. |
| 2013/0238331 A1 | 9/2013 | Mikan et al. |
| 2013/0263119 A1 | 10/2013 | Pissay et al. |
| 2013/0290180 A1 | 10/2013 | Baffier et al. |
| 2013/0332251 A1 | 12/2013 | Ioannidis et al. |
| 2014/0006350 A1 | 1/2014 | Fukui et al. |
| 2014/0018947 A1 | 1/2014 | Ales |
| 2014/0059226 A1* | 2/2014 | Messerli ................ H04L 67/51 |
| | | 709/226 |
| 2014/0101117 A1 | 4/2014 | Uzzaman |
| 2014/0108339 A1 | 4/2014 | Marsden |
| 2014/0108352 A1 | 4/2014 | Ahrens et al. |
| 2014/0189685 A1 | 7/2014 | Kripalani |
| 2014/0201171 A1 | 7/2014 | Vijayan et al. |
| 2014/0229504 A1* | 8/2014 | Kim .................... G06F 16/2471 |
| | | 707/770 |
| 2014/0229698 A1 | 8/2014 | Sivasubramanian et al. |
| 2014/0250081 A1 | 9/2014 | Stewart et al. |
| 2014/0282256 A1 | 9/2014 | Fish et al. |
| 2014/0337844 A1 | 11/2014 | Jin et al. |
| 2014/0359058 A1 | 12/2014 | Karnawat et al. |
| 2015/0019495 A1 | 1/2015 | Siden et al. |
| 2015/0039837 A1 | 2/2015 | Quan et al. |
| 2015/0052108 A1 | 2/2015 | Volk et al. |
| 2015/0074054 A1 | 3/2015 | Antony |
| 2015/0121453 A1 | 4/2015 | Gupta |
| 2015/0127611 A1 | 5/2015 | Westerman et al. |
| 2015/0142610 A1 | 5/2015 | Manoharan et al. |
| 2015/0143064 A1 | 5/2015 | Bhargava et al. |
| 2015/0188775 A1 | 7/2015 | Van Der Walt |
| 2015/0188789 A1 | 7/2015 | Jayaprakash |
| 2015/0195347 A1 | 7/2015 | Luft |
| 2015/0207682 A1 | 7/2015 | Moraes Nichele et al. |
| 2015/0207683 A1 | 7/2015 | Adogla |
| 2015/0207703 A1 | 7/2015 | Gallagher et al. |
| 2015/0227435 A1 | 8/2015 | Ashutosh et al. |
| 2015/0227602 A1 | 8/2015 | Ramu et al. |
| 2015/0254141 A1 | 9/2015 | Wertheimer et al. |
| 2015/0301814 A1 | 10/2015 | Chen et al. |
| 2015/0331923 A1 | 11/2015 | Kim |
| 2015/0339941 A1 | 11/2015 | Lu |
| 2015/0347987 A1 | 12/2015 | Ali |
| 2015/0358417 A1 | 12/2015 | Patil et al. |
| 2015/0370641 A1 | 12/2015 | Susairaj et al. |
| 2016/0041997 A1 | 2/2016 | Gokhale et al. |
| 2016/0048408 A1 | 2/2016 | Madhu et al. |
| 2016/0057077 A1 | 2/2016 | Gomatam et al. |
| 2016/0066201 A1 | 3/2016 | Kerpez et al. |
| 2016/0077923 A1 | 3/2016 | Zhang et al. |
| 2016/0077925 A1 | 3/2016 | Tekade et al. |
| 2016/0078104 A1 | 3/2016 | Clifford et al. |
| 2016/0092535 A1 | 3/2016 | Kuchibhotla et al. |
| 2016/0094401 A1 | 3/2016 | Anwar et al. |
| 2016/0094410 A1 | 3/2016 | Anwar et al. |
| 2016/0094647 A1 | 3/2016 | Mordani et al. |
| 2016/0125059 A1 | 5/2016 | Jain et al. |
| 2016/0127307 A1 | 5/2016 | Jain et al. |
| 2016/0162845 A1 | 6/2016 | Carroll et al. |
| 2016/0182328 A1 | 6/2016 | Bhasin et al. |
| 2016/0188421 A1 | 6/2016 | Karinta et al. |
| 2016/0191348 A1* | 6/2016 | Lee ...................... H04L 43/028 |
| | | 709/224 |
| 2016/0197835 A1 | 7/2016 | Luft |
| 2016/0224259 A1 | 8/2016 | Ahrens et al. |
| 2016/0239637 A1 | 8/2016 | Miller et al. |
| 2016/0246503 A1 | 8/2016 | Phelan et al. |
| 2016/0248629 A1 | 8/2016 | Erdmann et al. |
| 2016/0266913 A1 | 9/2016 | Achillopoulos |
| 2016/0267105 A1 | 9/2016 | Sun et al. |
| 2016/0274981 A1 | 9/2016 | Wilkinson |
| 2016/0292358 A1 | 10/2016 | Heger |
| 2016/0306840 A1 | 10/2016 | Deshmukh et al. |
| 2016/0321339 A1 | 11/2016 | Tekade et al. |
| 2016/0335369 A1 | 11/2016 | Picard et al. |
| 2016/0337473 A1 | 11/2016 | Rao |
| 2016/0344582 A1 | 11/2016 | Shivanna et al. |
| 2016/0378361 A1 | 12/2016 | Uriel |
| 2016/0378622 A1 | 12/2016 | Ren et al. |
| 2016/0380809 A1 | 12/2016 | Hou et al. |
| 2017/0031775 A1 | 2/2017 | Arumugham et al. |
| 2017/0039236 A1 | 2/2017 | Li et al. |
| 2017/0060699 A1 | 3/2017 | Hohl et al. |
| 2017/0068469 A1 | 3/2017 | Shankar et al. |
| 2017/0091231 A1 | 3/2017 | Difranco et al. |
| 2017/0115978 A1 | 4/2017 | Modi et al. |
| 2017/0199753 A1 | 7/2017 | Gong |
| 2017/0220777 A1 | 8/2017 | Wang et al. |
| 2017/0228227 A1 | 8/2017 | Winterfeldt et al. |
| 2017/0235563 A1 | 8/2017 | Bafna et al. |
| 2017/0235758 A1 | 8/2017 | Gopalapura Venkatesh et al. |
| 2017/0235950 A1 | 8/2017 | Gopalapura Venkatesh et al. |
| 2017/0243275 A1 | 8/2017 | Goens et al. |
| 2017/0262232 A1 | 9/2017 | Zhao et al. |
| 2017/0264684 A1 | 9/2017 | Spillane et al. |
| 2017/0272359 A1 | 9/2017 | Behringer et al. |
| 2017/0286517 A1 | 10/2017 | Horowitz et al. |
| 2017/0286518 A1 | 10/2017 | Horowitz et al. |
| 2017/0315877 A1 | 11/2017 | Kaplingat et al. |
| 2017/0322827 A1 | 11/2017 | Little et al. |
| 2017/0344618 A1 | 11/2017 | Horowitz et al. |
| 2017/0351584 A1 | 12/2017 | Griffith et al. |
| 2017/0351716 A1 | 12/2017 | Higginson et al. |
| 2017/0357667 A1 | 12/2017 | Auch et al. |
| 2017/0371547 A1 | 12/2017 | Fruchtman et al. |
| 2017/0374136 A1 | 12/2017 | Ringdahl |
| 2018/0025007 A1 | 1/2018 | Dai |
| 2018/0060119 A1 | 3/2018 | Zamir |
| 2018/0063088 A1 | 3/2018 | Hardy |
| 2018/0113622 A1 | 4/2018 | Sancheti |
| 2018/0121239 A1 | 5/2018 | Sawhney et al. |
| 2018/0121494 A1 | 5/2018 | Antonopoulos et al. |
| 2018/0121521 A1 | 5/2018 | Bivol |
| 2018/0157561 A1 | 6/2018 | Venkatesh et al. |
| 2018/0173452 A1 | 6/2018 | Hu et al. |
| 2018/0181469 A1 | 6/2018 | Yueh et al. |
| 2018/0203771 A1 | 7/2018 | Heidel et al. |
| 2018/0232142 A1 | 8/2018 | Shekar et al. |
| 2018/0253676 A1 | 9/2018 | Sheth et al. |
| 2018/0270219 A1 | 9/2018 | Li |
| 2018/0275881 A1 | 9/2018 | Ashraf et al. |
| 2018/0285201 A1 | 10/2018 | Bangalore et al. |
| 2018/0285353 A1 | 10/2018 | Ramohalli Gopala Rao et al. |
| 2018/0293397 A1 | 10/2018 | Demember et al. |
| 2018/0300203 A1 | 10/2018 | Kathpal et al. |
| 2018/0307728 A1 | 10/2018 | Crupi et al. |
| 2018/0324279 A1 | 11/2018 | Barton et al. |
| 2019/0005407 A1 | 1/2019 | Harris et al. |
| 2019/0018738 A1 | 1/2019 | Chen |
| 2019/0034240 A1 | 1/2019 | Nabi et al. |
| 2019/0065322 A1 | 2/2019 | Chakankar et al. |
| 2019/0075031 A1 | 3/2019 | Skelton et al. |
| 2019/0087279 A1 | 3/2019 | Kumar et al. |
| 2019/0089597 A1 | 3/2019 | Pathak et al. |
| 2019/0102257 A1 | 4/2019 | Zhou et al. |
| 2019/0102411 A1 | 4/2019 | Hung et al. |
| 2019/0116237 A1 | 4/2019 | Gibson |
| 2019/0121671 A1 | 4/2019 | Guim Bernat |
| 2019/0125828 A1 | 5/2019 | Bortz |
| 2019/0129799 A1 | 5/2019 | Kumarasamy |
| 2019/0138631 A1 | 5/2019 | Crane |
| 2019/0155699 A1 | 5/2019 | Luo et al. |
| 2019/0155936 A1 | 5/2019 | Du et al. |
| 2019/0158605 A1 | 5/2019 | Markuze et al. |
| 2019/0179711 A1 | 6/2019 | Luo et al. |
| 2019/0182213 A1 | 6/2019 | Saavedra et al. |
| 2019/0230156 A1 | 7/2019 | Mclarty et al. |
| 2019/0235904 A1 | 8/2019 | Epping et al. |
| 2019/0238412 A1 | 8/2019 | Vohra et al. |
| 2019/0238520 A1 | 8/2019 | Espinosa et al. |
| 2019/0245704 A1 | 8/2019 | Pala |
| 2019/0266268 A1 | 8/2019 | Polinati |

(56) References Cited

U.S. PATENT DOCUMENTS

| | | |
|---|---|---|
| 2019/0310926 A1 | 10/2019 | Hashimoto et al. |
| 2019/0324865 A1 | 10/2019 | Weissman et al. |
| 2019/0332582 A1 | 10/2019 | Kumar et al. |
| 2019/0339870 A1 | 11/2019 | Meiri et al. |
| 2019/0340091 A1 | 11/2019 | Chandrasekaran et al. |
| 2019/0349194 A1 | 11/2019 | Fan |
| 2019/0361412 A1* | 11/2019 | Park ...................... G06F 16/288 |
| 2019/0361748 A1* | 11/2019 | Walters ................... H04L 67/10 |
| 2019/0362004 A1* | 11/2019 | Oks ........................ G06F 9/5005 |
| 2019/0370146 A1 | 12/2019 | Babu et al. |
| 2019/0384496 A1 | 12/2019 | Abdul Rasheed et al. |
| 2019/0391880 A1 | 12/2019 | Wang et al. |
| 2019/0394093 A1 | 12/2019 | Kulkarni et al. |
| 2020/0028932 A1 | 1/2020 | Yang et al. |
| 2020/0034178 A1 | 1/2020 | Gupta et al. |
| 2020/0034245 A1 | 1/2020 | Kohler |
| 2020/0042293 A1 | 2/2020 | Elango et al. |
| 2020/0050522 A1 | 2/2020 | Coleman et al. |
| 2020/0059411 A1 | 2/2020 | Olmsted-Thompson et al. |
| 2020/0081704 A1 | 3/2020 | Bafna et al. |
| 2020/0097177 A1 | 3/2020 | Ashokkumar et al. |
| 2020/0097325 A1* | 3/2020 | Vadapandeshwara ........................ G06F 3/0683 |
| 2020/0099692 A1 | 3/2020 | Jindal et al. |
| 2020/0104375 A1 | 4/2020 | Earnesty et al. |
| 2020/0104376 A1 | 4/2020 | Earnesty et al. |
| 2020/0104377 A1 | 4/2020 | Earnesty et al. |
| 2020/0106737 A1 | 4/2020 | Beedu et al. |
| 2020/0110675 A1 | 4/2020 | Wang et al. |
| 2020/0137157 A1 | 4/2020 | Joseph et al. |
| 2020/0153898 A1 | 5/2020 | Sabath et al. |
| 2020/0162380 A1* | 5/2020 | Pilkington ............. H04L 45/306 |
| 2020/0193388 A1 | 6/2020 | Tran-Kiem et al. |
| 2020/0201526 A1* | 6/2020 | Kuchibhotla ....... G06F 16/2358 |
| 2020/0210378 A1 | 7/2020 | Kuchibhotla et al. |
| 2020/0210379 A1 | 7/2020 | Kuchibhotla et al. |
| 2020/0250046 A1 | 8/2020 | Wong et al. |
| 2020/0250059 A1 | 8/2020 | Bothello et al. |
| 2020/0285608 A1 | 9/2020 | Chakankar et al. |
| 2020/0285652 A1 | 9/2020 | Wang et al. |
| 2020/0314173 A1 | 10/2020 | Pahwa et al. |
| 2020/0349018 A1 | 11/2020 | Meadowcroft et al. |
| 2020/0351332 A1* | 11/2020 | Palladino ................ H04L 67/10 |
| 2020/0366661 A1 | 11/2020 | Mehta et al. |
| 2020/0379793 A1 | 12/2020 | Parihar et al. |
| 2021/0005330 A1* | 1/2021 | Patil ....................... G16Y 40/10 |
| 2021/0051530 A1* | 2/2021 | Venkataraman ...... H04W 76/12 |
| 2021/0064512 A1 | 3/2021 | Sirov et al. |
| 2021/0064591 A1 | 3/2021 | Sun et al. |
| 2021/0075700 A1* | 3/2021 | Palladino .............. H04L 67/562 |
| 2021/0117293 A1 | 4/2021 | Luo et al. |
| 2021/0133031 A1 | 5/2021 | Moldvai et al. |
| 2021/0135983 A1* | 5/2021 | Farnham ............. H04L 43/0852 |
| 2021/0141921 A1 | 5/2021 | Toplak |
| 2021/0141923 A1 | 5/2021 | Wu et al. |
| 2021/0144060 A1 | 5/2021 | Cencini et al. |
| 2021/0194825 A1* | 6/2021 | Goodman ............... G06F 16/29 |
| 2021/0200643 A1 | 7/2021 | Luo et al. |
| 2021/0218598 A1 | 7/2021 | Ganapathy et al. |
| 2021/0281428 A1 | 9/2021 | Kempf et al. |
| 2021/0328979 A1* | 10/2021 | M .......................... H04L 9/3263 |
| 2021/0391999 A1 | 12/2021 | Chilamakuri et al. |
| 2021/0400533 A1* | 12/2021 | Kwok ............... H04W 72/1268 |
| 2021/0406132 A1* | 12/2021 | Gupta ............... G06F 11/1464 |
| 2021/0406717 A1 | 12/2021 | Tauheed et al. |
| 2022/0004469 A1* | 1/2022 | Shen ................... G06F 11/2028 |
| 2022/0050753 A1* | 2/2022 | Mehta ................... G06F 3/0608 |
| 2022/0066993 A1 | 3/2022 | Khanuja et al. |
| 2022/0116445 A1* | 4/2022 | Filippou ............ H04L 41/0806 |
| 2022/0311681 A1* | 9/2022 | Palladino ............ H04L 43/0852 |
| 2022/0351169 A1 | 11/2022 | Kim et al. |
| 2022/0417205 A1* | 12/2022 | Nainar .................. H04L 45/745 |
| 2023/0065444 A1 | 3/2023 | Pyla et al. |
| 2023/0095814 A1 | 3/2023 | Sarkar |
| 2023/0096071 A1 | 3/2023 | Sarkar |
| 2023/0108625 A1* | 4/2023 | Yi .......................... H04W 76/15 370/328 |
| 2023/0115093 A1 | 4/2023 | Zhou |
| 2023/0125754 A1* | 4/2023 | Willett .................. H04L 63/105 717/102 |
| 2023/0164567 A1* | 5/2023 | Fellows ................ G06F 21/552 455/410 |
| 2023/0185823 A1 | 6/2023 | Chu et al. |
| 2023/0195529 A1 | 6/2023 | Luthra et al. |
| 2023/0214305 A1* | 7/2023 | Hockey ............... G06F 11/3072 714/42 |
| 2023/0216736 A1* | 7/2023 | Almadani ............. H04L 41/082 709/224 |
| 2023/0231912 A1* | 7/2023 | Vohra .................... H04L 67/561 709/217 |
| 2023/0247087 A1 | 8/2023 | Nagaraja et al. |
| 2023/0251938 A1 | 8/2023 | Sontakke et al. |
| 2023/0344885 A1* | 10/2023 | Arnold .................... G06F 9/542 |
| 2023/0379699 A1* | 11/2023 | Oerton .................. H04W 12/37 |
| 2023/0418639 A1* | 12/2023 | Vaishnav ............ G06F 9/45533 |
| 2024/0045585 A1 | 2/2024 | Kuchibhotla et al. |
| 2024/0045834 A1 | 2/2024 | Kuchibhotla et al. |
| 2024/0126777 A1 | 4/2024 | Tylik et al. |
| 2024/0134824 A1 | 4/2024 | Khanuja et al. |
| 2024/0161006 A1 | 5/2024 | Dey et al. |

FOREIGN PATENT DOCUMENTS

| | | |
|---|---|---|
| CN | 108664660 A | 10/2018 |
| CN | 113010599 A | 6/2021 |
| EP | 1 654 683 B1 | 5/2006 |
| EP | 2 980 707 A1 | 2/2016 |
| GB | 2 451 943 A | 2/2009 |
| LU | 102236 B1 | 11/2020 |
| TW | 201600970 A1 | 1/2016 |
| WO | WO-2010/106578 | 9/2010 |
| WO | WO-2016/069029 A1 | 5/2016 |
| WO | WO-2020/026476 | 2/2020 |
| WO | WO-2020/072338 A1 | 4/2020 |
| WO | WO-2021/108075 A1 | 6/2021 |

OTHER PUBLICATIONS

Oracle, "https://web.archive.org/web/20170829005212/https://docs.oracle.com/cd/E24628_01lem.121/e27046/cloning_database.htm#EMLCM93230", Aug. 29, 2017 (Year: 2017).

Adobe. "Creating and configuring the database" Experience League. Dec. 2021. Retrieved from https://experienceleague.adobe.com/docs/campaign-classic/using/installing-campaign-classic/initial-configuration/creating-and-configuring-the-database.html?lang=en accessed Jul. 26, 2023.

AWS. "Create a DB instance" Amazon Relational Database Service. Jan. 2016. Retrieved from https://docs.aws.amazon.com/AmazonRDS/latest/UserGuide/CHAP_Tutorials.WebServerDB.CreateDBInstance.html (accessed Jul. 26, 2023).

AWS. "Creating an Amazon RDS DB instance" Amazon Relational Database Service. 2020. Retrieved from https://docs.aws.amazon.com/AmazonRDS/latest/UserGuide/USER_CreateDBInstance.html (accessed Jul. 26, 2023).

AWS. "Creating and connecting to a MySQL DB instance" Amazon Relational Database Service. May 2014. Retrieved from https://docs.aws.amazon.com/AmazonRDS/latest/UserGuide/CHAP_GettingStarted.CreatingConnecting.MySQL.html (accessed Jul. 26, 2023).

AWS. "Regions and Availability Zones" About AWS. Apr. 2019. Retrieved from https://aws.amazon.com/about-aws/global-infrastructure/regions_az/?p=ngi&loc=2 (accessed Jul. 26, 2023).

DBInsight. "Turn your Database into a Service" A dbInsight white paper for Nutanix. Feb. 2020. Retrieved from https://nutanix.com/content/dam/nutanix/resources/white-papers/wp-turn-your-database-into-a-service.pdf (accessed Jul. 26, 2023).

Google. "Create a MySQL database hosted in Google Cloud" AppSheet Help. 2020. Retrieved from https://support.google.com/appsheet/answer/10107301?hl=en&ref_topic=10102124&sjid=7557016717740597161-AP (accessed Jul. 26, 2023).

(56)        References Cited

OTHER PUBLICATIONS

Jain, Viral. "How to Create SQL Database in AWS" C-Sharp Corner. May 4, 2018. Retrieved from https://www.c-sharpcorner.com/article/how-to-create-sql-database-in-aws/ (accessed Jul. 26, 2023).

Launier, Jeremy et al. "Introducing a New Era in Database Management" Nutanix. Oct. 6, 2020. Retrieved from https://www.nutanix.com/blog/introducing-new-era-in-database-management (accessed Jul. 26, 2023).

Nutanix. "Clone Management" Nutanix Support and Insights. Jan. 2022. Retrieved from https://portal.nutanix.com/page/documents/details?targetId=Nutanix-Era-User-Guide-v2_4:top-clone-database-management-c.html (accessed Jul. 26, 2023).

Nutanix. "Era Overview" Nutanix Support and Insights. Jan. 2022. Retrieved from https://portal.nutanix.com/page/documents/details?targetId=Nutanix-Era-User-Guide-v2_4:top-era-overview-c.html (accessed Jul. 26, 2023).

Nutanix. "Era Profiles" Nutanix Support and Insights. Jan. 2022. Retrieved from https://portal.nutanix.com/page/documents/details?targetId=Nutanix-Era-User-Guide-v2_4:top-era-getting-started-profiles-c.html (accessed Jul. 26, 2023).

Nutanix. "Era Terminology Reference" Nutanix Support and Insights. Jan. 2022. Retrieved from https://portal.nutanix.com/page/documents/details?targetId=Nutanix-Era-User-Guide-v2_4:top-era-terminology-reference-r.html (accessed Jul. 26, 2023).

Nutanix. "Era Time Machine Management" Nutanix Support and Insights. Jan. 2022. Retrieved from https://portal.nutanix.com/page/documents/details?targetId=Nutanix-Era-User-Guide-v2_4:top-era-time-machine-management-c.html (accessed Jul. 26, 2023).

Nutanix. "Get Started with Era" Nutanix Support and Insights. Jan. 2022. Retrieved from https://portal.nutanix.com/page/documents/details?targetId=Nutanix-Era-User-Guide-v2_4:top-era-getting-started-c.html (accessed Jul. 26, 2023).

Nutanix. "Launching a Blueprint from the Marketplace" Nutanix Support and Insights. Sep. 2022. Retrieved from https://portal.nutanix.com/page/documents/details?targetId=Nutanix-Calm-Admin-Operations-Guide-v3_6_0:nuc-marketplace-launch-application-blueprint-t.html (accessed Jul. 26, 2023).

Nutanix. "Launching a Blueprint" Nutanix Support and Insights. Sep. 2022. Retrieved from https://portal.nutanix.com/page/documents/details?targetId=Nutanix-Calm-Admin-Operations-Guide-v3_6_0:nuc-blueprints-launch-blueprint-page-t.html (accessed Jul. 26, 2023).

Nutanix. "Multi-Cluster Management" Nutanix Support and Insights. Oct. 2020. Retrieved from https://portal.nutanix.com/page/documents/details?targetId=Nutanix-Era-User-Guide-v2_0:era-era-multicluster-management-c.html (accessed Jul. 26, 2023).

Nutanix. "Nutanix Calm Overview" Nutanix Support and Insights. Jul. 2021. Retrieved from https://portal.nutanix.com/page/documents/solutions/details?targetId=RA-2093-Nutanix-Calm:top-nutanix-calm-overview.html (accessed Jul. 26, 2023).

Nutanix. "Nutanix Cluster Management" Nutanix Support and Insights. Jan. 2022. Retrieved from https://portal.nutanix.com/page/documents/details?targetId=Nutanix-Era-User-Guide-v2_4:top-era-multicluster-management-c.html (accessed Jul. 26, 2023).

Nutanix. "Provisioning a MongoDB Replica Set" Nutanix Support and Insights. Sep. 2021. Retrieved from https://portal.nutanix.com/page/documents/details?targetId=Nutanix-Era-User-Guide-v2_3:top-era-provision-mongodb-replica-t.html (accessed Jul. 26, 2023).

Nutanix. "Provisioning a PostgreSQL Instance" Nutanix Support and Insights. Jan. 2021. Retrieved from https://portal.nutanix.com/page/documents/details?targetId=Nutanix-Era-User-Guide-v2_3:top-era-provisioning-a-postgresql-database-t.html (accessed Jul. 26, 2023).

Sereno Cloud Solution. "Nutanix 1 Click Database Service by ERA" Medium Enterprise Clouds. Jan. 2021. Retrieved from https://www.serenoclouds.com/medium-enterprise-clouds/private-hybrid-clouds/nutanix-enterprise-cloud-solution/nutanix-1-click-database-service-by-era/ (accessed Jul. 26, 2023).

Sharma, Madhurkant. "Cloud Computing Platforms and Technologies" Geeks for Geeks. Sep. 8, 2018. Retrieved from https://www.geeksforgeeks.org/cloud-computing-platforms-and-technologies/ (accessed Jul. 26, 2023).

Tessell. "Tessell for Oracle on Azure" LinkedIn. Jun. 2022. Retrieved from https://www.linkedin.com/posts/tessell-inc_tessell-for-oracle-on-azure-activity-7069795242467557376-1Guw/?utm_source=share&utm_medium=member_desktop (accessed Jul. 26, 2023).

Tessell. "Tessell" LinkedIn. 2021. Retrieved from https://www.linkedin.com/company/tessell-inc/posts/?feedView=all (accessed Jul. 26, 2023).

Westermann, Daniel. "pg_auto_failover: Failover and switchover scenarios" Application Integration & Middleware. Nov. 11, 2020. Retrieved from https://www.dbi-services.com/blog/pg_auto_failover-failover-and-switchover-scenarios/ (accessed Jul. 26, 2023).

YouTube Video screenshots for Alibaba Cloud. "How-to | Launch a MySQL Instance on Alibaba Cloud ApsaraDB for Relational Database Service" YouTube. Feb. 27, 2017. https://youtu.be/E5wGolVFBuU [youtube.com].

YouTube Video screenshots for Alibaba Cloud. "How-to | Set Up a Multi tier WordPress Site on Alibaba Cloud" YouTube. Jun. 25, 2018. https://youtu.be/yWXhibylW6M [youtube.com].

YouTube Video screenshots for Nutanix University. "How to Provision a PostgreSQL cluster using Nutanix Era | Nutanix University" YouTube. Aug. 8, 2019. https://youtube.com/watch?v=FoDGtORWNnU [youtube.com].

YouTube Video screenshots for Nutanix University. "Multicloud Database Provisioning with Nutanix Era Part 1 | Tech Bytes | Nutanix University" YouTube. Oct. 28, 2021. https://youtu.be/q3KOcdyM7PY [youtube.com].

YouTube Video screenshots for Nutanix University. "Nutanix Era: Provision a database from a backup file | Nutanix University" YouTube. Jul. 1, 2021. https://youtu.be/SfpGqaqXsbo [youtube.com].

YouTube Video screenshots for Nutanix. "Zero Byte Clone Data Management | Build it Better: DBaaS with Nutanix Era | Part 2%" YouTube. Mar. 17, 2021. https://youtube.com/watch?v=XIGtTA2dM80 [youtube.com].

AWS. "Amazon RDS Backup & Restore Using AWS Backup How-to Guide" Getting Started Resource Center. Jun. 14, 2021. Retrieved from https://aws.amazon.com/getting-started/hands-on/amazon-rds-backup-restore-using-aws-backup/ (accessed Dec. 7, 2023).

AWS. "Amazon RDS Backup and Restore" AWS. Sep. 18, 2020. Retrieved from https://aws.amazon.com/rds/features/backup/ (accessed Dec. 7, 2023).

AWS. "Backup with AWS" AWS. Jun. 2019. Retrieved from https://pages.awscloud.com/rs/112-TZM-766/images/AWS004%20B%26R%20eBook%20R4i.pdf (accessed Dec. 7, 2023).

AWS. "Getting started 3: Create a scheduled backup" AWS Backup. Oct. 21, 2019. Retrieved from https://docs.aws.amazon.com/aws-backup/latest/devguide/create-a-scheduled-backup.html (accessed Dec. 7, 2023).

AWS. "Tagging Amazon RDS resources" Amazon Relational Database Service. Jan. 16, 2013. Retrieved from https://docs.aws.amazon.com/AmazonRDS/latest/UserGuide/USER_Tagging.html (accessed Dec. 7, 2023).

AWS. "Working with backups" Amazon Relational Database Service. Jan. 16, 2013. Retrieved from https://docs.aws.amazon.com/AmazonRDS/latest/UserGuide/USER_WorkingWithAutomatedBackups.html (accessed Dec. 7, 2023).

Husemoller, John. "Automate AWS Backups with AWS Service Catalog" AWS Cloud Operations & Migrations Blog. Jan. 31, 2021. Retrieved from https://aws.amazon.com/blogs/mt/automate-aws-backups-with-aws-service-catalog/ (accessed Dec. 7, 2023).

Hussain, Sadequl. "Running SQL Server Databases in the Amazon Cloud—RDS Backup and Restore (Part 3)" MSSQL Tips. Jul. 2014. Retrieved from https://www.mssqltips.com/sqlservertip/3290/running-sql-server-databases-in-the-amazon-cloud-rds-backup-and-restore-part-3/ (accessed Dec. 7, 2023).

Sommer, Chris. "Beware the automated backup window when running native SQL Server backups in RDS" SQL Server Central. Aug. 4, 2017. Retrieved from https://www.sqlservercentral.com/blogs/beware-the-automated-backup-window-when-running-native-sql-server-backups-in-rds (accessed Dec. 7, 2023).

(56) References Cited

OTHER PUBLICATIONS

"Creating Instances," Google Cloud ("Google") (Wayback Machine Capture, Sep. 18, 2018), available at https://www.archive.org/web/20180918103721/https://cloud.google.com/sql/docs/mysql/create-instance.

x201CNutanix Era: Databases Made Simple,” as archived by the Internet Archive on Sep. 26, 2020, available at http://web.archive.org/web/20200926222827/https://www.nutanix.com/blog/nutanix-era-databases-made-simple (1 of 3).

“Taking a Backup Using Snapshots” (“LVM-Howto”) (Wayback Machine Capture, Jan. 20, 2007), available at https://web.archive.org/web/20070120200004/https://tldp.org/HOWTO/LVM-HOWTO/snapshots_backup.html (2 of 3). “Windows Geo-Clustering: SQL Server, ” published Oct. 12, 2014 (3 of 3).

7 more ways to Query Always on Availability Groups, as archived by the Internet Archive on Mar. 30, 2019, available at https://web.archive.org/web/20190330182441/https://sqlundercover.com/2019/02/19/7-more-ways-to-query-always-on-availability-groups/.

Amazon Relational Database Service User Guide (2016) (“RDS ”) (Wayback Machine Capture, Apr. 12, 2016), available at https://web.archive.org/web/20160412105355/http://docs.aws.amazon.com/AmazonRDS/latest/UserGuide/rds-ug.pdf.

Federal Court Management Statistics–Profiles, U.S. District Courts𠄼ombined Civil and Criminal (Dec. 2024).

Order Granting Defendant’s Motion to Compel Arbitration (staying the remaining claims) in *Nutanix, Inc.* v. *Tessell, Inc.*, Case No. 3:24-cv-01729 (N.D. Cal. Mar. 20, 2024).

SQL Server AlwaysOn Availability Group Backup Preference Setting, as archived by the Internet Archive on Sep. 25, 2020, available at https://www.mssqltips.com/sqlservertip/4976/sql-server-alwayson-availability-group-backup-preference-setting/.

The American Heritage Dictionary of the English Language (5th ed. 2011) ("Heritage").

Use the Availability Group Wizard (SQL Server Management Studio), as archived by the Interne Archive on Jan. 20, 2020, available at https://web.archive.org/web/20200120100053/https://docs.microsoft.com/en-us/sql/database-engine/availability-groups/windows/use-the-availability-group-wizard-sql-server-management-studio?view=sql-server-ver15.

Using Oracle Database Cloud Service – Creating a Database Deployment (2017) (“Oracle”) (Wayback Machine Capture, Jan. 18, 2017), available at https://web.archive.org/web/20170118071307/https://docs.oracle.com/en/cloud/paas/database-dbaascloud/csdbi/create-db-deployment.html.

AWS. "Working with SSM Agent" AWS Systems Manager. May 4, 2022. Retrieved from https://docs.aws.amazon.com/systems-manager/latest/userguide/ssm-agent.html (accessed Oct. 9, 2023).

Bailey, Chris, et al. "IBM joins the Crossplane community" IBM Developer Blog. Dec. 15, 2020. Retrieved from https://developer.ibm.com/blogs/ibm-joins-the-crossplane-community/ (accessed Sep. 28, 2023).

Baird, Colin. "MongoDB Atlas Security" Medium. Oct. 28, 2021. Retrieved from https://medium.com/@colinbaird_51123/mongodb-atlas-security-46996fb214e (accessed Sep. 28, 2023).

Foreign Search Report on PCT Dtd Sep. 7, 2023.

FreeCodeCamp. "MongoDB Atlas Tutorial—How to Get Started" FreeCodeCamp. Feb. 4, 2021. Retrieved from https://www.freecodecamp.org/news/get-started-with-mongodb-atlas/ (accessed Sep. 28, 2023).

Github. "Multi-tenancy & Row-level Security" Tableau Embedding Playbook. Jul. 7, 2020. Retrieved from https:/tableau.github.io/embedding-playbook/pages/04_multitenancy_and_rls (accessed Sep. 28, 2023).

Kubernetes. "Access Clusters Using the Kubernetes API" Kubernetes Documentation. Apr. 11, 2019. Retrieved from https://kubernetes.io/docs/tasks/administer-cluster/access-cluster-api/ (accessed Oct. 11, 2023).

Kubernetes. "Accessing the Kubernetes API from a Pod" Kubernetes Documentation. May 30, 2022. Retrieved from https://kubernetes.io/docs/tasks/run-application/access-api-from-pod/ (accessed Oct. 9, 2023).

Kubernetes. "Authenticating" Kubernetes Documentation. Jul. 12, 2018. Retrieved from https://kubernetes.io/docs/reference/access-authn-authz/authentication/ (accessed Oct. 11, 2023).

Kubernetes. "Communication between Nodes and the Control Plane" Kubernetes Documentation. May 1, 2020. Retrieved from https://kubernetes.io/docs/concepts/architecture/control-plane-node-communication/ (accessed Oct. 9, 2023).

Kubernetes. "Kubelet Configuration (v1beta1)" Kubernetes Documentation. May 30, 2022. Retrieved from https://kubernetes.io/docs/reference/config-api/kubelet-config.v1beta1/ (accessed Oct. 9, 2023).

Kubernetes. "kubelet" Kubernetes Documentation. May 4, 2022. Retrieved from https://kubernetes.io/docs/reference/command-line-tools-reference/kubelet/ (accessed Oct. 9, 2023).

Kubernetes. "Kubernetes Components" Kubernetes Documentation. May 20, 2022. Retrieved from https://kubernetes.io/docs/concepts/overview/components/ (accessed Oct. 9, 2023).

Kubernetes. "Nodes" Kubernetes Documentation. Jul. 14, 2017. Retrieved from https://kubernetes.io/docs/concepts/architecture/nodes/ (accessed Oct. 11, 2023).

Kubernetes. "Operating etcd clusters for Kubernetes" Kubernetes Documentation. Sep. 27, 2018. Retrieved from https://kubernetes.io/docs/tasks/administer-cluster/configure-upgrade-etcd/ (accessed Oct. 11, 2023).

Kubernetes. "PKI certificates and requirements" Kubernetes Documentation. Jun. 16, 2019. Retrieved from https://kubernetes.io/docs/setup/best-practices/certificates/ (accessed Oct. 11, 2023).

Kubernetes. "Pod v1 core" Kubernetes Documentation. Mar. 30, 2022. Retrieved from https://kubernetes.io/docs/reference/generated/kubernetes-api/v1.23/#pod-v1-core (accessed Oct. 9, 2023).

Kubernetes. "Reconfiguring a kubeadm cluster" Kubernetes Documentation. May 16, 2022. Retrieved from https://kubernetes.io/docs/tasks/administer-cluster/kubeadm/kubeadm-reconfigure/ (accessed Oct. 9, 2023).

Kubernetes. "The Kubernetes API" Kubernetes Documentation. May 3, 2022. Retrieved from https://kubernetes.io/docs/concepts/overview/kubernetes-api/ (accessed Oct. 9, 2023).

Magerramov, Joe. "Avoiding overload in distributed systems by putting the smaller service in control" Amazon Builder's Library. May 18, 2022. Retrieved from https://aws.amazon.com/builders-library/avoiding-overload-in-distributed-systems-by-putting-the-smaller-service-in-control/ (accessed Oct. 9, 2023).

Melo, Gilson. "Overview of the Interconnect Between Oracle and Microsoft" Oracle Cloud Infrastructure Blog. Jun. 5, 2019 Retrieved from https://blogs.oracle.com/cloud-infrastructure/post/overview-of-the-interconnect-between-oracle-and-microsoft (accessed Sep. 28, 2023).

Microsoft. "How Project schedules tasks: Behind the scenes" Project Desktop. Nov. 12, 2020. Retrieved from https://support.microsoft.com/en-us/office/how-project-schedules-tasks-behind-the-scenes-df3431ab-8d8a-4047-afc6-a87b547dbac0 (accessed Sep. 28, 2023).

MongoDB. "Multi-cloud Management" MongoDB. Jan. 21, 2022. Retrieved from https://www.mongodb.com/multicloud/management (accessed Sep. 28, 2023).

MongoDB. "What is Multi-Cloud?" MongoDB. May 26, 2022. Retrieved from https://www.mongodb.com/basics/multicloud (accessed Sep. 28, 2023).

Oracle. "Exadata Database Service on Cloud@Customer Security Controls" Oracle Gen 2 Exadata Database Service on Cloud@Customer Security Controls. Oct. 26, 2020. Retrieved from https://www.oracle.com/a/ocom/docs/engineered-systems/exadata/exadata-cloud-at-customer-security-controls.pdf (accessed Oct. 9, 2023).

Oracle. "Exadata Database Service on Dedicated Infrastructure Security Controls" Oracle OCI Exadata Database Service on Dedicated Infrastructure Security Controls. Jan. 23, 2022. Retrieved from https://www.oracle.com/a/ocom/docs/engineered-systems/exadata/exadata-cloud-service-security.pdf (accessed Oct. 11, 2023).

Progress. "Multi-tenant database architecture" Progress Documentation. Sep. 5, 2021. Retrieved fromhttps://docs.progress.com/bundle/

(56) References Cited

OTHER PUBLICATIONS openedge-database-management-117/page/Multi-tenant-database-architecture.html (accessed Sep. 28, 2023).

Progress. "Multi-tenant features" Progress Documentation. Apr. 12, 2017. Retrieved from https://docs.progress.com/bundle/openedge-database-management-117/page/Multi-tenant-features.html (accessed Sep. 28, 2023).

Progress. "Simple tenancy" Progress Documentation. Apr. 12, 2017. Retrieved from https://docs.progress.com/bundle/openedge-database-management-117/page/Simple-tenancy.html (accessed Sep. 28, 2023).

Progress. "Table partitioning details" Progress Documentation. Sep. 6, 2021. Retrieved from https://docs.progress.com/bundle/openedge-database-management-117/page/Table-partitioning-details.html (accessed Sep. 28, 2023).

Progress. "Tenant ID" Progress Documentation. Apr. 12, 2017. Retrieved from https://docs.progress.com/bundle/openedge-database-multitenancy-117/page/Tenant-ID.html (accessed Sep. 28, 2023).

Progress. "Tenant-ID( ) method" Progress Documentation. Jun. 2011. Retrieved from https://docs.progress.com/bundle/abl-reference/page/TENANT-ID-method.html# (accessed Sep. 28, 2023).

Progress. "What is multi-tenancy?" Progress Documentation. Apr. 12, 2017. Retrieved from https://docs.progress.com/bundle/openedge-database-multitenancy-117/page/What-is-multi-tenancy.html (accessed Sep. 28, 2023).

SaleForce. "Row-Level Security Example based on Role Hierarchy and Record Ownership" SalesForce Help. Apr. 2021. Retrieved from https://help.salesforce.com/s/articleView?language=en_US&id=sf.bi_security_rowlevel_example_rolehierarchy.htm&type=5 (accessed Sep. 28, 2023).

Sathaye, Praseeda. "Using IAM database authentication with workloads running on Amazon EKS" AWS Blog. May 27, 2022. Retrieved from https://aws.amazon.com/blogs/containers/using-iam-database-authentication-with-workloads-running-on-amazon-eks/ (accessed Oct. 11, 2023).

Tabbara, Bassam, et al. "Introducing Crossplane—An Open Source Multi-Cloud Control-Plane" Dec. 4, 2018. Retrieved from https://docs.google.com/document/d/1whncqdUeU2cATGEJhHvzXWC9xdK29Er45NJeoemxebo/mobilebasic (accessed Sep. 28, 2023).

Ten Six. "How to Assign a Task Calendar in Microsoft Project" Ten Six Consulting. Feb. 27, 2018. Retrieved from https://tensix.com/how-to-assign-a-task-calendar-in-microsoft-project/ (accessed Sep. 28, 2023).

Viveros, P., et al. "Optimal grouping and scheduling of preventive maintenance activities" Research Publishing, Singapore.Nov. 1, 2020. Retrieved from https://re.public.polimi.it/retrieve/handle/11311/1181262/685019/ (accessed Sep. 28, 2023).

YouTube Video screenshots for Progress User Assistance. "Creating tenants, domains, and users in a Progress OpenEdge multi tenant database" YouTube. May 23, 2016. Retrieved from https://youtu.be/3kGL2afVV_E [youtube.com] (accessed Sep. 28, 2023).

YouTube Video screenshots for Progress. "Data Management: Table Partitioning and Multi-tenancy" YouTube. Oct. 8, 2018. Retrieved from https://www.youtube.com/watch?v=NbEuNmSazh8 [youtube.com] (accessed Sep. 28, 2023).

YouTube Video screenshots for Progress. "Evolving Your OpenEdge Architecture" YouTube. Apr. 26, 2019. Retrieved from https://youtu.be/-7r7xISRe3U [youtube.com] (accessed Sep. 28, 2023).

"Amazon RDS Now Supports Setting Up Connectivity Between Your RDS Database and EC2 Compute Instance in 1-Click", Amazon Web Services, https://aws.amazon.com/rds.

"Azure Arc extends the Azure control plane", https://infohub.delltechnologies.com/l/techbook-dell-emc-integrated-system-for-microsoft-azure-stack-hci-2/azure-arc-extends-the-azure-control-plane-14.

"Configure cross-tenant access settings for B2B collaboration", Azure AD, Microsoft Entra, May 24, 2022, 21pp.

"Connected Machine Agent Prerequisites", Sep. 27, 2022, https://learn.microsoft.com/en-us/azure/azure-arc/servers/prerequisites.

"Control Plane", https://docs.controlplane.com.

"Exadata Database Service onCloud@Customer Administrator'sGuide", https://docs.oracle.com/en/engineered-systems/exadata-cloud-at-customer/ecccm/ecc-network-requirements.html#GUID-F06BD75B-E971-48ED-8699-E1004D4B4AC1.

Features and Capabilities of Azure Arcenabled SQL Managed Instance:, Aug. 13, 2022, https://learn.microsoft.com/en-us/azure/azure-arc/data/managed-instance-features.

"Managing Cloud-Native Workloads with Anthos", https://authors.packtpub.com/wp-content/uploads/2021/10/Chapter-8-Professional-Cloud-Architect-1.pdf.

"Oracle Exadata Cloud@Customer X9M", Version 1.17, 2022, https://www.oracle.com/dk/a/ocom/docs/engineered-systems/exadata/exacc-x9m-ds.pdf.

"Overview of Azure Connected Machine Agent", Sep. 4, 2022, https://learn.microsoft.com/en-us/azure/azure-arc/servers/agent-overview.

"Row-Level Security", Sep. 17, 2022, https://learn.microsoft.com/en-us/sql/relational-databases/security/row-level-security?view=sql-server-ver16.

"Use Azure Private Link to Securely Connect Servers to Azure Arc", Jul. 28, 2022, https://learn.microsoft.com/en-us/azure/azure-arc/servers/private-link-security.

Actifio Enablement Team, "https://Awww.youtube.com/watch?v=7mCcJTXxFM3l", "Oracle Advanced Data Protection and Workflows", May 15, 2018 ) (Year: 2018).

Alhamazani, et al, "Cross-Layer Multi-Cloud Real-Time Application QoS Monitoring and Benchmarking As-a-Service Framework", https://arxiv.org/ftp/arxiv/papers/1502/1502.00206.pdf.

Aluciani. "Provisioning PostgreSQL to be Highly Available and Resilient on Nutanix" Nutanix Community Blog. 2019. Retrieved from https://next.nutanix.com/community-blog-154/provisioning-postgresql-to-be-highly-available-and-resilient-on-nutanix-33726 (Year: 2019).

Amazon Web Services, "Amazon RDS Now Supports Setting up Connectivity Between You RDS Database and EC2 Compute Instance in 1-Click", https://aws.amazon.com/about-aws/whats-new/2022/08/amazon-rds-setting-up-connectivity-rds-database-ec2-compute-instance-1-click/.

Amazon Web Services, "Amazon RDS on Outposts", https://aws.amazon.com/rds/outposts/?pg=In&sec=hiw.

Amazon Web Services, "Configuring and Using Oracle Connection Manager on Amazon EC2 for Amazon RDS for Oracle", Jan. 12, 2021, https://aws.amazon.com/blogs/database/configuring-and-using-oracle-connection-manager-on-amazon-ec2-for-amazon-rds-for-oracle.

Amazon Web Services, "SaaS Tenant Isolation Strategies. Isolating Resources in a Multi-Tenant Environment", (Aug. 2020).

Amazon, "Amazon Aurora User Guide for Aurora: Overview of multi-master clusters" Amazon Aurora User Guide from https://docs.aws.amazon.com/AmazonRDS/latest/AuroraUserGuide/aurora-ug.pdf#aurora-multi-master (accessed Jun. 28, 2021).

Anjum, Maaz, "Database Provisioning in EM12c: Provision me a Database Now!" Slideshare, (Dec. 12, 2013) from https://www.slideshare.net/MaazAnjum/maaz-anjum-gouser-database-provisioning-in-em12c-provision-me-a-database-now (accessed Jun. 28, 2021).

Anthos Technical Overview, https://cloud.google.com/anthos/docs/concepts/overview.

ApexSQL, "Automated database provisioning using ApexSQL DevOps toolkit" ApexSQL Knowledgebase (2020) from https://knowledgebase.apexsql.com/automated-database-provisioning-using-apexsql-devops-toolkit/ (accessed Jun. 28, 2021).

Arslan, Erman, "Delphix—Notes vol. 1, my new toy for the upcoming months," Erman Arslan's Oracle Blog, published Aug. 8, 2016, retrieved on Jan. 2, 2023 from http://ermanarslan.blogspot.com/2016/08/delphix-notes-vol-1-my-new-toy-for.html.

Asanka, Dinesh, "Point in Time Recovery with SQL Server" SQL Shack, published Dec. 19, 2016, retrieved Feb. 11, 2022 from <https://www.sqlshack.com/point-in-time-recovery-with-sql-server/> (Year: 2016).

AWS Database Blog, "Configuring and Using Oracle Connection Manager on Amazon for EC2 for Amazon RDS for Oracle", Jan. 12,

(56)     References Cited

OTHER PUBLICATIONS 2021, https://aws.amazon.com/blogs/database/configuring-and-using-oracle-connection-manager-on-amazon-ec2-for-amazon-rds-for-oracle/.

AWS Prescriptive Guidance, "PostgreSQL Pool Model", https://docs.aws.amazon.com/prescriptive-guidance/latest/saas-multitenant-managed-postgresql/pool.html.

AWS Prescriptive Guidance, "Row-Level Security Recommendations", https://docs.aws.amazon.com/prescriptive-guidance/latest/saas-multitenant-managed-postgresql/rls.html.

AWS Serverless SaaS Workshop—Lab4 : Isolating tenant data in a pooled model—Adding the missing code.

AWS Serverless SaaS Workshop—Lab4 : Isolating tenant data in a pooled model—Revisiting Authentication, Authorization, & Tenant Isolation.

AWS, "Working with Aurora multi-master clusters" User Guide for Aurora. 2020. Received from https://docs.aws.amazon.com/AmazonRDS/latest/AuroraUserGuide/aurora-multi-master.html (Year: 2020).

AWS. "Amazon DocumentDB elastic clusters: how it works" Amazon DocumentDB. Retrieved from https://docs.aws.amazon.com/documentdb/latest/developerguide/elastic-how-it-works.html (accessed Apr. 6, 2023).

AWS. "Amazon EC2 M5 Instances" Amazon DocumentDB. Amazon EC2. Retrieved from https://aws.amazon.com/ec2/instance-types/m5/ (accessed Apr. 6, 2023).

AWS. "Amazon ECS clusters" Amazon Elastic Container Service. Retrieved from https://docs.aws.amazon.com/AmazonECS/latest/developerguide/clusters.html (accessed Apr. 6, 2023).

AWS. "Amazon Virtual Private Cloud" User Guide. Retrieved from https://docs.aws.amazon.com/pdfs/vpc/latest/userguide/vpc-ug.pdf#what-is-amazon-vpc (accessed Apr. 6, 2023).

AWS. "AWS glossary" AWS General Reference Guide. Retrieved from https://docs.aws.amazon.com/general/latest/gr/glos-chap.html (accessed Apr. 6, 2023).

AWS. "Copy a snapshot" Amazon Elastic Compute Cloud. Retrieved from https://docs.aws.amazon.com/AWSEC2/latest/UserGuide/ebs-copy-snapshot.html#ebs-snapshot-copy (accessed Apr. 6, 2023).

AWS. "CopySnapshot" Amazon Elastic Compute Cloud. Retrieved from https://docs.aws.amazon.com/AWSEC2/latest/APIReference/API_CopySnapshot.html (accessed Apr. 6, 2023).

AWS. "CreateDBInstanceReadReplica" Amazon Relational Database Service. Retrieved from https://docs.aws.amazon.com/AmazonRDS/latest/APIReference/API_CreateDBInstanceReadReplica.html (accessed Apr. 25, 2023).

AWS. "Introducing Five New Amazon EC2 Bare Metal Instances" Amazon Web Services. Feb. 13, 2019. Retrieved from https://aws.amazon.com/about-aws/whats-new/2019/02/introducing-five-new-amazon-ec2-bare-metal-instances/ (accessed Apr. 6, 2023).

AWS. "Kubernetes on AWS" Amazon Web Services. Retrieved from https://aws.amazon.com/kubernetes/#:~:text=Kubernetes%20manages%20clusters%20of%20Amazon,premises%20and%20in%20the%20cloud (accessed Apr. 6, 2023).

AWS. "Storage" Amazon Elastic Compute Cloud. Retrieved from https://docs.aws.amazon.com/AWSEC2/latest/WindowsGuide/Storage.html (accessed Apr. 6, 2023).

AWS. "Use EBS direct APIs to access the contents of an EBS snapshot" Amazon Elastic Compute Cloud. Retrieved from https://docs.aws.amazon.com/AWSEC2/latest/UserGuide/ebs-accessing-snapshot.html (accessed Apr. 6, 2023).

AWS. "User Guide for Linux Instances" Amazon Elastic Compute Cloud. 2023. Retrieved from https://docs.aws.amazon.com/pdfs/AWSEC2/latest/UserGuide/ec2-ug.pdf#ebs-accessing-snapshot (accessed Apr. 6, 2023).

AWS. "What Is an Instance in Cloud Computing?" Amazon Web Services. Retrieved from https://aws.amazon.com/what-is/cloud-instances/#:~:text=You%20can%20run%20multiple%20virtual,of%20sharing%20and%20scaling%20resources (accessed Apr. 6, 2023).

AWS. "Working with DB instance read replicas" Amazon Relational Database Service. Retrieved from https://docs.aws.amazon.com/AmazonRDS/latest/UserGuide/USER_ReadRepl.html (accessed Apr. 25, 2023).

AWS. "Working with read replicas for Microsoft SQL Server in Amazon RDS" Amazon Relational Database Service. Retrieved from https://docs.aws.amazon.com/AmazonRDS/latest/UserGuide/SQLServer.ReadReplicas.html (accessed Apr. 25, 2023).

Ay, Neslisah. "How to Set Up a High Available PostgreSQL Cluster Using Patroni" Neslisah Ay Medium Page. Mar. 18, 2019. Retrieved from https://medium.com/@neslisah.demirci/how-to-set-up-a-high-available-postgresql-cluster-using-patroni-d7044a754d2f (Year: 2019).

BackupAssist, "https://backupassist.com/support/en/backupassist/manage/calendar.htm", Jul. 1, 2017 (Year: 2017).

Balasubramanian, Sudhir, "Virtual vols. for Database Backup and Recovery" VMware Virtualize Applications (Nov. 5, 2015) from https://blogs.vmware.com/apps/2015/11/virtual-volumes-for-database-backup-and-recovery-2.html (accessed Jun. 2, 2021).

Banthia, Bakul. "Can I share snapshots with specific users?" Tessell. Retrieved from https://help.tessell.com/en/articles/7118615-can-i-share-snapshots-with-specific-users (accessed Apr. 6, 2023).

Banthia, Bakul. "Do I need to enable snapshots for my database service or is it done automatically?" Tessell. Retrieved from https://help.tessell.com/en/articles/7118606-do-i-need-to-enable-snapshots-for-my-database-service-or-is-it-done-automatically (accessed Apr. 6, 2023).

Banthia, Bakul. "How can I perform cross-region snapshots and point-in-time-restore (PITR) for my disaster recovery needs?" Tessell. Retrieved from https://help.tessell.com/en/articles/6614103-how-can-i-perform-cross-region-snapshots-and-point-in-time-restore-pitr-for-my-disaster-recovery-needs (accessed Apr. 6, 2023).

Banthia, Bakul. "How do I provision a database service?" Tessell. Retrieved from https://help.tessell.com/en/articles/7118590-how-do-i-provision-a-database-service (accessed Apr. 6, 2023).

Banthia, Bakul. "How does billing work in Tessell?" Tessell. Retrieved from https://help.tessell.com/en/articles/6624926-how-does-billing-work-in-tessell (accessed Apr. 6, 2023).

Banthia, Bakul. "How does Tessell guarantee Zero Data Loss for Oracle?" Tessell. Retrieved from https://help.tessell.com/en/articles/7118627-how-does-tessell-guarantee-zero-data-loss-for-oracle (accessed Apr. 6, 2023).

Banthia, Bakul. "How does Tessell host Oracle databases on Azure?" Tessell. Retrieved from https://help.tessell.com/en/articles/7118621-how-does-tessell-host-oracle-databases-on-azure (accessed Apr. 6, 2023).

Banthia, Bakul. "Manage Data on Your Multi-tenant SaaS Environment with Tessell" Tessell. Feb. 25, 2023. Retrieved from https://tessell.com/blogs/manage-multi-tenant-saas-metadata (accessed May 9, 2023).

Banthia, Bakul. "Snapshots" Tessell. Retrieved from https://help.tessell.com/en/collections/3899147-snapshots (accessed Apr. 6, 2023).

Banthia, Bakul. "What are all the Apps in Tessell?" Tessell. Retrieved from https://help.tessell.com/en/articles/7118551-what-are-all-the-apps-in-tessell (accessed Apr. 6, 2023).

Banthia, Bakul. "What is an Availability Machine?" Tessell. Retrieved from https://help.tessell.com/en/articles/7118549-what-is-an-availability-machine (accessed Apr. 6, 2023).

Banthia, Bakul. "What is Tessell and how does it work?" Tessell. Retrieved from https://help.tessell.com/en/articles/7118534-what-is-tessell-and-how-does-it-work (accessed Apr. 6, 2023).

Banthia, Bakul. "What is Tessell's security posture?" Tessell. Retrieved from https://help.tessell.com/en/articles/6624923-what-is-tessell-s-security-posture (accessed Apr. 25, 2023).

Banthia, Bakul. "What is Tessell's unified data management?" Tessell. Retrieved from https://help.tessell.com/en/articles/6624933-what-is-tessell-s-unified-data-management (accessed Apr. 6, 2023).

Banthia, Bakul. "What is the patch set composition of DB engine version for Oracle?" Tessell. Retrieved from https://help.tessell.com/en/articles/6614079-what-is-the-patch-set-composition-of-db-engine-version-for-oracle (accessed Apr. 6, 2023).

Banthia, Bakul. "Where are my automated snapshots stored and how do I manage their retention?" Tessell. Retrieved from https://

(56) References Cited

OTHER PUBLICATIONS help.tessell.com/en/articles/7118607-where-are-my-automated-snapshots-stored-and-how-do-i-manage-their-retention (accessed Apr. 6, 2023).

Banthia, Bakul. "Where are the databases hosted in Tessell?" Tessell. Retrieved from https://help.tessell.com/en/articles/6624929-where-are-the-databases-hosted-in-tessell (accessed Apr. 6, 2023).

Banthia, Bakul. "Why choose Tessell for your startup?" Tessell. Mar. 24, 2023. Retrieved https://tessell.com/blogs/why-tessell-for-startups (accessed May 9, 2023).

Barr, Jeff. "Amazon EC2 Bare Metal Instances with Direct Access to Hardware" AWS News Blog. Nov. 28, 2017. Retrieved from https://aws.amazon.com/blogs/aws/new-amazon-ec2-bare-metal-instances-with-direct-access-to-hardware/ (accessed Apr. 6, 2023).

Barr, Jeff. "New-Cross-Account Copying of Encrypted EBS Snapshots" AWS News Blog. Jun. 21, 2016. Retrieved from https://aws.amazon.com/blogs/aws/new-cross-account-copying-of-encrypted-ebs-snapshots/ (accessed Apr. 6, 2023).

Bolton, Dean et al. "Database-as-a-Service (DBaaS) Reference Architecture with VMware and Tintri" VMware Tintri VLSS (2015) from https://blogs.vmware.com/apps/files/2015/10/vRA_DBAAS_VLSS_Tintri.pdf (Jun. 2, 2021).

Brooks, Aaron, "19 Best A/B Testing Tools in 2021" (published Aug. 12, 2020) Venture Harbour, from https://www.ventureharbour.com/best-a-b-testing-tools/ (accessed Sep. 14, 2021).

Brull, Jim, "Oracle Cloud Database vs On-Premises—Understanding the Differences" Centroid—OCI, Oracle Cloud. 2020. Received from https://www.centroid.com/blog/oracle-cloud-database-vs-on-premises/ (Year: 2020).

Brummitt, Karis et al., "Database provisioning just got a lot easier—and a lot smarter" RealWire (Feb. 27, 2017) from https://www.realwire.com/releases/Database-provisioning-just-got-a-lot-easier-and-a-lot-smarter (accessed Jun. 28, 2021).

Bucur, et al., "Multi-Cloud Resource Management Techniques for Cyber-Physical Systems", MDPI, Dec. 15, 2021, https://www.ncbi.nlm.nih.gov/pmc/articles/PMC8706026/.

Cano, Ignacio, et al. "Curator: Self-Managing Storage for Enterprise Clusters" (Mar. 27, 2017), from https://www.usenix.org/conference/nsdi17/.

Cisco Public "Hyperconvergence for Databases" (2019) from https://www.cisco.com/c/dam/en/us/products/collateral/hyperconverged-infrastructure/hyperflex-hx-series/le-60303-hxsql-aag.pdf (accessed Dec. 18, 2019).

Cisco Public, "Cisco HyperFlex All-Flash Systems for Oracle Database Deployments" (Jun. 2017) from https://www.cisco.com/c/en/us/products/collateral/hyperconverged-infrastructure/hyperflex-hx-series/whitepaper_c11-739237.pdf (accessed Dec. 18, 2019).

Cisco Public, "Cisco HyperFlex All-NVMe Systems for Oracle Database: Reference Architecture" (2019) from https://www.cisco.com/c/en/us/products/collateral/hyperconverged-infrastructure/hyperflex-hx-series/hx-oracle-wp.html (accessed Dec. 18, 2019).

Cisco Public, "Cisco HyperFlex HX Data Platform" (2018) from https://www.cisco.com/c/dam/en/us/products/collateral/hyperconverged-infrastructure/hyperflex-hx-series/white-paper-c11-736814.pdf (accessed Dec. 18, 2019).

Cormac, "Virtual Volumes (VVols) and Replication/DR" cormachogan.com (Apr. 13, 2015) from https://cormachogan.com/2015/04/13/virtual-volumes-vvols-and-replicationdr/ (accessed Jun. 2, 2021).

Cunnhingham, "Introducing PlanetScale Managed Cloud", Nov. 3, 2021, https://planetscale.com/blog/introducing-planetscale-managed-cloud.

Delphix "Backup and Recovery Strategies for the Delphix Engine" (published 2017) Delphix Corp., from https://docs.delphix.com/docs/data-backup-and-recovery-solutions/backup-and-recovery-strategies-for-the-delphix-engine (accessed Dec. 19, 2019).

Delphix "Database Provisioning Overview" (published 2017) Delphix Corp., from https://docs.delphix.com/docs/introduction/database-virtualization-with-delphix/database-provisioning-overview (accessed Dec. 19, 2019).

Delphix "Quick Start Guides" (published 2017) Delphix Corp., from https://docs.delphix.com/docs52/quick-start-guides (accessed Dec. 19, 2019).

Delphix "Replication" (Published 2017) Delphix Corp., from https://docs.delphix.com/docs52/data-backup-and-recovery-solutions/replication (accessed Dec. 19, 2019).

Delphix Corp., "Delphix Engine User Guide," Delphix, published Dec. 2017, retrieved Jan. 2, 2023 from https://docs.delphix.com/docs52/files/83053093/83053098/2/1512670775673/Delphix EngineUser Guide.pdf.

Delphix Corp., "Delphix Engine User Guide," Delphix, published Nov. 2018, retrieved Jan. 2, 2023 from https://docs.delphix.com/docs531/files/98113199/98116076/2/1542301179433/User Guide.pdf.

Delphix Corp., "Delphix Engine User Guide," Delphix, published Oct. 2017, retrieved Jan. 2, 2023 from https://docs.delphix.com/docs-old/files/74711255/74715951/5/1509647013871/Delphix EngineUser Guide.pdf.

Delphix Corp., "FAQ: SnapShot and SnapSync (KBA1014)," Delphix, published March, 4 2022, retrieved Jan. 2, 2023 from https://support.delphix.com/Continuous_Data_Engine_(formerly_Virtualization_Engine)/Delphix_Admin/FAQ%3A_SnapShot_and_SnapSync_(KBA1014).

Delphix Corp., "Linking to a Database," Database Linking Overview, published Dec. 2017, retrieved on Jan. 2, 2023 from https://docs.delphix.com/docs52/introduction/database-virtualization-with-delphix/database-linking-overview.

Delphix Corp., "Understanding Timelines," Understanding Timelines and How to Preserve Data in a Point in Time, published Jun. 2018, retrieved Jan. 2, 2023 from https://docs.delphix.com/docs526/delphix-self-service/delphix-self-service-data-user-guide/understanding-timelines-and-how-to-preserve-data-in-a-point-in-time.

Delphix Corp., "What Does the Delphix Engine Do?," Delphix Engine Overview, published Dec. 2017, retrieved on Jan. 2, 2023 from https://docs.delphix.com/docs52/introduction/database-virtualization-with-delphix/delphix-engine-overview.

Delphix Corp., "What's New Guide for 5.2," Delphix, published Dec. 2017, retrieved on Jan. 2, 2023 from https://docs.delphix.com/docs52/files/83053093/83056028/2/1513184739765/What%27s New Guidefor 5.2.pdf.

Delphix, "Provisioning and Managing Virtual Databases" Delphix Engine 6.0.8.0 Documentation (2020) from https://docs.delphix.com/docs/datasets/getting-started/provisioning-and-managing-virtual-databases (accessed Jun. 28, 2021).

Delphix, "Understanding SnapSync and LogSync for Oracle" (May 5, 2013) from https://www.delphix.com/blog/data-virtualization/understanding-snapsync-and-logsync-oracle (accessed Jan. 7, 2020).

Drake, Sam et al. "Architecture of Highly Available Databases" International Service Availability Symposium, pp. 1-16. Springer, Berlin, Heidelberg, 2004. (Year: 2004).

Dremio, "Multiple AWS Clusters" Dremio. 2020. Received from https://docs.dremio.com/deployment/provisioning-ec2.html (Year: 2020).

Ex Parte Quayle Action with Refs. on U.S. Appl. No. 29/733,571 Dtd Feb. 11, 2022.

Extended European Search Report re EP21192308.1 Dtd Jan. 24, 2022.

Extended European Search Report re EP21192379.2 Dtd Jan. 26, 2022.

Featonby, Malcolm. "Amazon ECS availability best practices" Containers. Nov. 8, 2019. Retrieved from https://aws.amazon.com/blogs/containers/amazon-ecs-availability-best-practices/ (accessed Apr. 6, 2023).

Fenton, Tom, "How to Create VMware Virtual Volumes" Virtualization & Cloud Review (Feb. 26, 2015) from https://virtualizationreview.com/articles/2015/02/26/how-to-create-vmware-virtual-volumes.aspx (accessed Jun. 2, 2021).

Final Office Action on U.S. Appl. No. 16/234,547 Dtd May 11, 2023.

Flecha, Pete, "Whats New in Virtual Volumes (vVols) 2.0" VMware vSAN Virtual Blocks Blog (Oct. 18, 2016) from https://blogs.vmware.com/virtualblocks/2016/10/18/whats-new-in-virtual-volumes-2-0/ (accessed Jun. 2, 2021).

(56) References Cited

OTHER PUBLICATIONS

Flexera. "How can I copy an EBS snapshot between different EC2 regions?" Flexera CMP Docs. Retrieved from https://docs.rightscale.com/faq/clouds/aws/How_can_I_copy_an_EBS_snapshot_between_different_EC2_regions.html (accessed Apr. 6, 2023).

Friedman, Vitaly, "Designing the Perfect Date and Time Picker." Smashing Magazine, published Jul. 2017 (Retrieved from the Internet Apr. 7, 2020). Internet URL: <https://www.smashingmagazine.com/2017 /07 /designing-perfect-date-time-picker/> (Year: 2017).

Fritchey, Grant, "SQL Server Database Provisioning" Redgate, (Nov. 4, 2016) from https://www.red-gate.com/simple-talk/devops/database-devops/sql-server-database-provisioning/ (accessed Jun. 28, 2021).

Geek University, "VM snapshot files," VMware ESXi course, retrieved Sep. 11, 2022 from https://geek-university.com/vm-snapshot-files/.

Geier, Eric, "Using Static IP Addresses on Your Network" Cisco Press. Sep. 14, 2009. Received from https://www.ciscopress.com/articles/article.asp?p=1393495. (Year: 2009).

Google Cloud, "Architectures for high availability of PostgreSQL clusters on Compute Engine" Google Cloud Architecture Center, (Jan. 21, 2021) from https://cloud.google.com/architecture/architectures-high-availability-postgresql-clusters-compute-engine (accessed Dec. 14, 2021).

Grace, Cato, "What's New in SRM and vSphere Replication 8.3" VMware vSAN Virtual Blocks Blog (Mar. 10, 2020) from https://blogs.vmware.com/virtualblocks/2020/03/10/whats-new-srm-vr-83/ (accessed Jun. 2, 2021).

Guevara, Introducing PlanetScale Insights: Advanced query monitoring, May 26, 2022, https://planetscale.com/blog/introducing-planetscale-insights-advanced-query-monitoring.

Gui, Huan et al. "Network A/B Testing: From Sampling to Estimation" Proceedings of the 24th International Conference on World Wide Web (WWWWW 15), pp. 399-409, May 18, 2015. DOI: 10.1145/2736277.2741081 (Year: 2015).

Hammerspace, "Simplify Database Deployment Across Kubernetes Clusters" Hammerspace Solution Brief. 2020. Received from https://hammerspace.com/wp-content/uploads/2019/03/HS0107-USEN-Multi-Cluster-Database-Deployments.pdf (Year: 2020).

Hashicorp Terraform. "tessell_dap (Data Source)" tessell. Retrieved from https://registry.terraform.io/providers/TessellDevelopment/tessell/latest/docs/data-sources/dap#nestedatt--target_cloud_locations (accessed Apr. 6, 2023).

Hashicorp Terraform. "tessell_database_backup (Resource)" tessell. Retrieved from https://registry.terraform.io/providers/TessellDevelopment/tessell/latest/docs/resources/database_backup (accessed Apr. 6, 2023).

Hashicorp Terraform. "tessell_db_service (Resource)" tessell. Retrieved from https://registry.terraform.io/providers/tessell-cloud/tessell/latest/docs/resources/db_service#snapshot_configuration (accessed Apr. 6, 2023).

Hosterman, Cody, "Introducing vSphere Virtual Volumes on the FlashArray" Pure Storage (Jun. 13, 2017) from https://blog.purestorage.com/purely-technical/introducing-vsphere-virtual-volumes-on-the-flasharray/ (accessed Jun. 2, 2021).

Hosterman, Cody, "Introducing vSphere Virtual Volumes on the FlashArray" PureStorage, (Jun. 13, 2017) from https://blog.purestorage.com/purely-technical/introducing-vsphere-virtual-volumes-on-the-flasharray/ (accessed Jun. 28, 2021).

Hosterman, Cody, "Virtual Volumes and Array Snapshots Part I: Managed Snapshots" codyhosterman.com (Jul. 30, 2018) from https://www.codyhosterman.com/2018/07/virtual-volumes-and-array-snapshots-part-i-managed-snapshots/ (accessed Jun. 2, 2021).

Hosterman, Cody, "What's New in vSphere 7.0 Storage Part I: vVols are all over the place!" codyhosterman.com (Mar. 10, 2021) from https://www.codyhosterman.com/2020/03/whats-new-in-vsphere-7-0-storage-part-i-vvols-are-all-over-the-place/ (accessed Jun. 2, 2021).

Hu et al. "Architecture of Highly Available Databases" Lecture Notes in Computer Science (LCNS). vol. 3335, pp. 1-16. May 2004. DOI: 10.1007/978-3-540-30225-4_1. (Year: 2004).

IBM, "Creating a database deployment on the cluster" IBM Cloud Paks 2.1.0 (2021) from https://www.ibm.com/docs/en/cloud-paks/cp-data/2.1.0?topic=database-creating-deployment (accessed Jun. 28, 2021).

Kaplan, Steve. "The Tessellator Crunches Cloud Costs" Tessellator Book 1. 2022. Retrieved from https://tessell.com/documents/Tessellator%20Book%201.pdf (accessed Apr. 6, 2023).

Kaplan, Steven. "Bringing the Art and Science of Tessellation to Data" Tessell. Feb. 20, 2023. Retrieved from https://tessell.com/blogs/tessellation-of-data (accessed May 9, 2023).

Kaplan, Steven. "The Tessell Alternative to Oracle Database Services for Microsoft Azure" Tessell. Feb. 15, 2023. Retrieved from https://tessell.com/blogs/the-tessell-alternative-to-oracle-dbaas-on-azure (accessed May 9, 2023).

Kaplan, Steven. "The Why and How of Cloud Databases . . . and how Tessell changes the game" Tessell. Jan. 24, 2023. Retrieved from https://tessell.com/blogs/the-why-and-how-of-cloud-databases (accessed May 9, 2023).

Katz, Jonathan S. "Multi-Kubernetes Cluster PostgreSQL Deployments" Crunchy Data. May 7, 2020. Received from https://info.crunchydata.com/blog/multi-kubernetes-cluster-postgresql-deployments (Year: 2020).

Khanuja, Kamaldeep. "Benchmark Tessell RDS PostgreSQL performance using PGIO (SLOB)" Tessell. Mar. 1, 2023. Retrieved from https://tessell.com/blogs/postgresql-benchmark (accessed May 9, 2023).

Khanuja, Kamaldeep. "Tessell supports AWS PrivateLink" Tessell. Jan. 11, 2023. Retrieved from https://tessell.com/blogs/aws-tessell-privatelink (accessed Apr. 25, 2023).

Khanuja, Kamaldeep. "Tessell supports AWS PrivateLink" Tessell. Jan. 11, 2023. Retrieved from https://tessell.com/blogs/aws-tessell-privatelink (accessed May 9, 2023).

Kohavi, Ron et al., "Online Controlled Experiments and A/B Testing" Encyclopedia of Machine Learning and Data Mining, vol. 7, No. 8, pp. 922-929. Jan. 2017. DOI: 10.1007/978-1-4899-7502-7 891-1 (Year: 2017).

Kolasa, Konrad, "Date Picker." Dribbble, published Feb. 28, 2017 (Retrieved from the Internet Apr. 7, 2020). Internet URL: <https://dribbble.com/shots/3326020-Date-Picker> (Year: 2017).

Krishnia, Rajesh. "Fully Managed Oracle Database Service on Azure with Tessell" Tessell. Mar. 5, 2023. Retrieved from https://tessell.com/blogs/azure-tessell-oracle-dbaas (accessed May 9, 2023).

Kubernetes "Configure Access to Multiple Clusters" Kubernetes Documentation. Oct. 22, 2020. Retrieved from https://kubernetes.io/docs/tasks/access-application-cluster/configure-access-multiple-clusters/ (Year: 2020).

Kubernetes, "Configure Access to Multiple Clusters" Kubernetes Documentation. Oct. 22, 2020. Received from https://kubernetes.io/docs/tasks/access-application-cluster/configure-access-multiple-clusters/ (Year: 2020).

Kuchibhotla, Bala. "Tessell's journey: How and why it all started?" Tessell. Mar. 24, 2023. Retrieved from https://tessell.com/blogs/why-tessell (accessed May 9, 2023).

Kuchibhotla, Bala. "Why choose Tessell for your enterprise?" Tessell. Mar. 24, 2023. Retrieved from https://tessell.com/blogs/why-tessell-for-enterprises (accessed May 9, 2023).

Kumar, Madan. "Managing High Availability in PostgreSQL—Part III: Patroni" ScaleGrid. Aug. 22, 2019. Retrieved from https://scalegrid.io/blog/managing-high-availability-in-postgresql-part-3/ (Year: 2019).

Kumar, Sandip. "Benchmark Tessell RDS Oracle performance using SLOB" Tessell. Apr. 13, 2023. Retrieved from https://tessell.com/blogs/oracle-benchmark (accessed May 9, 2023).

Lctree, "Lctree," Linked Clone Tree Visualizer for vCloud Director, published (Nov. 28, 2012).

Lee, Brandon, "VMware vSphere 7 vVols New Features" VirtualiztaionHowto (Jun. 3, 2020) from https://www.virtualizationhowto.com/2020/06/vmware-vsphere-7-vvols-new-features/ (accessed Jun. 2, 2021).

M. A. Metawai et al. "Load balancing in distributed multi-agent computing systems" Ain Shams Engineering Journal. ASEJ. May 23, 2012. p. 237-249. (Year: 2012).

(56)        References Cited

OTHER PUBLICATIONS

Matijaca, Ante, "Dashboard" Dribble, published Dec. 21, 2015, retrieved Feb. 11, 2022 from <https://dribbble.com/shots/2417233-Dashboard> (Year: 2015).
Meadowcroft, Ben, "Virtual Volumes: First Year in Review" VMware vSAN Virtual Blocks Blog (Mar. 14, 2016) from https://blogs.vmware.com/virtualblocks/2016/03/14/virtual-volumes-first-year-in-review/ (accessed Jun. 28, 2021).
Mehta, Siddharth, "Analytics with Bower BI Desktop Dynamic Line References" MSSQL Tips, published Oct. 2, 2017, retrieved Feb. 11, 2022 from <https://www.mssqltips.com/sqlservertip/5084/analytics-with-power-bi-desktop-dynamic-line-references/? (Year: 2017).
Mellor, Chris "Beam, Flow and Era: Not a yoga class, silly, Nutanix's move into copy data management" (published May 10, 2019) The Register, from https://www.theregister.co.uk/2018/05/10/nutanix_beam_flow_era/ (accessed Dec. 18, 2019).
Mellor, Chris "Delphix sends database virtualization sailing up the Amazon" (published Dec. 1, 2017) The Register, from https://www.theregister.co.uk/2017/12/01/delphix_database_virtualization_comes_to_aws/ (accessed Dec. 18, 2019).
Microsoft Docs, "Always on availability groups: a high-availability and disaster-recovery solution" Microsoft SQL Docs, Apr. 23, 2019 (2019), https://docs.microsoft.com/en-us/sql/database-engine/availability-groups/windows/always-on-availability-groups-sql-server?view=sql-server-ver15.
Microsoft Docs, "What is an Always on availability group?" Microsoft SQL Docs, Apr. 29, 2020 (2020) https://docs.microsoft.com/en-us/sql/database-engine/availability-groups/windows/overview-of-always-on-availability-groups-sql-server?view=sql-server-ver15.
Microsoft SQL, "Upgrading Always on Availability Group Replica Instances" Microsoft SQL Docs, Jan. 10, 2018, retrieved from https://docs.microsoft.com/en-us/sql/database-engine/availability-groups/windows/upgrading-always-on-availability-group-replica-instances?view=sql-server-ver15 (retrieved Feb. 15, 2021).
Microsoft, "Use a template to create an Access desktop database," Microsoft Office Support, retrieved Sep. 29, 2022 from https://support.microsoft.com/en-us/office/use-a-template-to-create-an-access-desktop-database-d9354d47-e4ce-4efb-878b-c48f3650fb73.
Microsoft, "Database Engine Instances (SQL Server)" Oct. 2, 2020, from https://docs.microsoft.com/en-us/sql/database-engine/configure-windows/database-engine-instances-sql-server?view=sql-server-ver15 (retrieved Jan. 25, 2022).
Microsoft. "Basic Always on availability groups for a single database" SQL Server. Mar. 3, 2023. Retrieved from https://learn.microsoft.com/en-us/sql/database-engine/availability-groups/windows/basic-availability-groups-always-on-availability-groups?view=sql-server-ver16 (accessed Apr. 25, 2023).
Microsoft. "What is BareMetal Infrastructure on Azure?" BareMetal Infrastructure. Apr. 10, 2023. Retrieved from https://learn.microsoft.com/en-us/azure/baremetal-infrastructure/concepts-baremetal-infrastructure-overview (accessed Apr. 20, 2023).
Mitchell, Cal. "Migrating on Prem SQL Server to Multi Cloud With Tessell" SQLpipe. Feb. 18, 2023. Retrieved from https://www.sqlpipe.com/blog/migrating-on-prem-sql-server-to-multi-cloud-with-tessell (accessed Apr. 6, 2023).
MP4 Video screenshots for Tessell. "Backups" Tessell. Retrieved from https://tessell.com/videos/Backups.mp4 (accessed Apr. 25, 2023).
MP4 Video screenshots for Tessell. "DataFlow" Tessell. Retrieved from https://tessell.com/videos/DataFlow.mp4 (accessed Apr. 25, 2023).
Mulford, Juan, "vSphere 7—Describe Instant Clone Architecture and Use Cases," Mulcas Cloudy Infrastructures, published Dec. 28, 2021, retrieved Sep. 11, 2022 from https://mulcas.com/vsphere-7-describe-instant-clone-architecture-and-use-cases/.
Murugan, Palani, "Delphix Dynamic Data Platform on VMware vSAN," VMware Virtual Blocks Blog, published Nov. 20, 2017, retrieved on Jan. 2, 2023 from https://blogs.vmware.com/virtualblocks/2017/11/20/delphix-vsan/.

MVware, "Horizon Architecture", https://techzone.vmware.com/resource/horizon-architecture#introduction.
Net App Support, "Data replication from one destination to another in a series (cascading)" Net App. 2015. Received from https://library.netapp.com/ecmdocs/ECMP1635994/html/GUID-25C143ED-C369-4129-B055-C532FDB8AB79.html (Year: 2015).
Netapp Support, "Cloning databases using SnapManager" (Aug. 2013) from, https://library.netapp.com/ecmdocs/ECMP1217281/html/GUID-EAA4950A-C186-423D-9574-6EA12A92E53D.html (accessed Dec. 17, 2019).
Netapp Support, "Types of SnapManager restore operations" (Aug. 2013) from, https://library.netapp.com/ecmdocs/ECMP1217281/html/GUID-599DF5AE-C49F-4BF0-A96C-E6E71FAFF102.html (accessed Dec. 17, 2019).
Nizhegolenko, Alexey. "High-Availability MySQL cluster with load balancing using HAProxy and Heartbeat." Towards Data Science. Dec. 3, 2018. Retrieved from https://towardsdatascience.com/high-availability-mysql-cluster-with-load-balancing-using-haproxy-and-heartbeat-40a16e134691 (Year: 2018).
Non-Final Office Action on U.S. Appl. No. 16/234,547 Dtd Nov. 7, 2022.
Notion, "Database templates," Notion Help Center, retrieved Sep. 29, 2022 from https://www.notion.so/help/database-templates.
Nutanix "Nutanix announces Flow, Era and Beam and .NEXT 2018" (published May 9, 2018) Nutanix Youtube, from https://www.youtube.com/watch?v=w40asaGtrkU (accessed Dec. 19, 2019).
Nutanix Inc., "Prism 5.5, Prism Central Guide" (Jul. 7, 2020) pp. 1-618.
Nutanix, "Blueprints Usage," Nutanix Support and Insights, retrieved Sep. 29, 2022 from https://portal.nutanix.com/page/documents/details?targetId=Nutanix-Calm-Admin-Operations-Guide-v3_2_7:nuc-nucalm-blueprints-intro-c.html.
Nutanix, "Creating a Playbook," Nutanix Support and Insights, retrieved Sep. 29, 2022 from https://portal.nutanix.com/page/documents/details?targetId=Nutanix-Beam-User-Guide:bea-playbook-create-t.html.
Nutanix, "Creating a ServiceNow Template in Beam," Nutanix Support and Insights, retrieved Sep. 29, 2022 from https://portal.nutanix.com/page/documents/details?targetId=Nutanix-Beam-User-Guide:bea-servicenow-template-create-cg-t.html.
Nutanix, "Nutanix Hybrid Cloud Infrastructure Now Available on Amazon Web Services" Nutanix Press Release. Aug. 11, 2020. Received from https://www.nutanix.com/press-releases/2020/nutanix-clusters-on-aws?icid=111AJW0ZPW22N (Year: 2020).
Nutanix, Inc. "Prism Central Guide", Acropolis 5.0, (Oct. 18, 2018), pp. 1-374.
Nutanix, Inc., "Acropolis Advance Administration Guide" Acropolis 5.0 Feb. 9, 2018, pp. 1-60.
Nutanix, Inc., "Acropolis Advanced Administration Guide" Acropolis 5.1, Jul. 11, 2018, pp. 1-63.
Nutanix, Inc., "Prism Central Guide", Acropolis 5.1, (Oct. 18, 2018), pp. 1-410.
Nutanix, Inc., "Prism Web Console Guide" Prism 5.8, (Mar. 19, 2019), pp. 1-808.
Nyffenegger et al., "SQL Server Instance" 2017, from https://renenyffenegger.ch/notes/development/databases/SQL-Server/architecture/instance (retrieved Jan. 25, 2022).
Opster, "High Availability in Elasticsearch—Cross Cluster Replication and Alternatives" Opster. 2020. Received from https://opster.com/blogs/elasticsearch-cross-cluster-replication-overview/ (Year: 2020).
Opster, "Multi-Cluster Load Balancer—An Alternative to Cross Cluster Replication" Opster. 2020. Received from https://opster.com/elasticsearch-multi-cluster-load-balancer/ (Year: 2020).
Or, Andrew, "Understanding your Apache Spark Application Through Visualization" Data Bricks, published Jun. 22, 2015, retrieved Feb. 11, 2022 from <https://databricks.com/blog/2015/06/22/understanding-your-spark-application-through-visualization.html> (Year: 2015).
Oracle Cloud, "Using Oracle Autonomous Database on Shared Exadata Infrastructure" published Dec. 2022.
Oracle Communications, "Provisioning Database Interface User's Guide, Release 16.0" (Sep. 2014) Oracle, p. 1-174.
Oracle Help Center, "Enterprise Manager Lifecycle Management Administrator's Guide, 4. Overview of Database Provisioning"

(56) References Cited

OTHER PUBLICATIONS (2019) from, https://docs.oracle.com/cd/E24628_01/em.121/e27046/prov_db_overview.htm#EMLCM12206, (accessed Dec. 17, 2019).

Oracle, "Creating Databases Using Database Template," Cloud Administration Guide, retrieved Sep. 29, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.

Oracle, "Creating Databases Using Database Template," Cloud Administration Guide, retrieved on Oct. 17, 2022 from https://docs.oracle.com/en/enterprise-manager/cloud-control/enterprise-manager-cloud-control/13.4/emclo/creating-databases-using-database-template.html#GUID-BB3923BE-192D-40A2-9C5D-AAC5BA3326C0.

Oracle, "Creating Databases Using Database Template," Enterprise Manager Cloud Administration Guide, retrieved Sep. 29, 2022 from https://docs.oracle.com/cd/E91266_01/EMCLO/GUID-BB3923BE-192D-40A2-9C5D-AAC5BA3326C0.htm#EMCLO2097.

Oracle, "Creating Databases Using Database Template," Enterprise Manager Cloud Administration Guide, retrieved on Oct. 17, 2022 from https://docs.oracle.com/cd/E91266_01/EMCLO/GUID-BB3923BE-192D-40A2-9C5D-AAC5BA3326C0.htm#EMCLO2097.

Oracle, "Exadata Cloud@Customer Security Controls", Version 2.18, Jul. 27, 2022, https://www.oracle.com/a/ocom/docs/engineered-systems/exadata/exadata-cloud-at-customer-security-controls.pdf.

Oracle, "Introduction to Blueprints," Enterprise Manager Cloud Administration Guide, retrieved Sep. 29, 2022 from https://docs.oracle.com/cd/E63000_01/EMCLO/blueprint.htm#EMCLO1910.

Oracle, "Oracle Exadata Cloud@Customer X9M", Version 1.17, 2022, https://www.oracle.com/dk/a/ocom/docs/engineered-systems/exadata/exacc-x9m-ds.pdf.

Oracle, "Oracle Gen 2 Exadata Cloud@Customer Security Controls", version 2.18, Jul. 27, 2022, https://www.oracle.com/a/ocom/docs/engineered-systems/exadata/exadata-cloud-at-customer-security-controls.pdf.

Oracle, "Using the DBaaS Self Service Portal," Cloud Administration Guide, retrieved Sep. 29, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.

Oracle, "Using the DBaaS Self Service Portal," Cloud Administration Guide, retrieved on Oct. 17, 2022 from https://docs.oracle.com/en/enterprise-manager/cloud-control/enterprise-manager-cloud-control/13.4/emclo/using-dbaas-self-service-portal.html#GUID-2FDAFF57-E1D2-4049-8E78-2704BB12D2FD.

Oracle, "Part III: Database Provisioning" Enterprise Manager Lifecycle Management Administrator's Guide (2012) from https://docs.oracle.com/cd/E24628_01/em.121/e27046/part_db_prov.htm#CHDBHBCE (accessed Jun. 28, 2021).

Palmer, Brent, "Date Range." Dribbble, published Oct. 21, 2015 (Retrieved from the Internet Apr. 7, 2020). Internet URL: <https://dribbble.com/shots/2306949-Date-Range> (Year: 2015).

Parikh, Priyank. "Benchmark Tessell RDS MySQL performance using Sysbench" Tessell. Apr. 19, 2023. Retrieved from https://tessell.com/blogs/mysql-benchmark (accessed May 9, 2023).

Patil, Manoj E. et al. "Design and Implementation of Graphical User Interface for Relational Database Management System" (2012), International Jounral of Computer Science and Information Technologies (IJCSIT), vol. 3 (3), p. 3871-3874.

Pillai, Animesh. "High-performance data infrastructure for the cloud era" Tessell. Retrieved from https://app.hubspot.com/documents/20843544/view/494538972?accessId=b713c0 (accessed Apr. 13, 2023).

PlanetScale, Deployment Options Documentation, Aug. 1, 2022, https://planetscale.com/docs/concepts/deployment-options#cloud.

PlanetScale, Query Insights Documentation, 2022, https://planetscale.com/docs/concepts/query-insights#insights-page-overview.

PlanetScale, The MySQL-compatible serverless database platform, 2022, https://planetscale.com.

PlanetScale. "PlanetScale is the world's most advanced serverless MySQL platform" PlanetScale. Retrieved from https://planetscale.com/ (accessed Apr. 6, 2023).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Polovyi, Ivan. "AWS ECS Cluster using the EC2 Launch Type" AWS in Plain English. Jul. 25, 2021. Retrieved from https://aws.plainenglish.io/aws-ecs-cluster-using-the-ec2-launch-type-cb5ae2347b46 (accessed Apr. 6, 2023).

Principled Technologies, "VMware vCloud Automation Center DBaaS: Provision databases in minutes" A Principled Technologies Test Report (Aug. 2014) from https://www.principledtechnologies.com/vmware/vCAC_DBaaS_0914.pdf (accessed Jun. 2, 2021).

Raffic, Mohammed, "Creating Linked Clone Desktop Pools in VMware Horizon View 6.X," VMware Arena, published Mar. 15, 2017, retrieved Sep. 11, 2022 from http://www.vmwarearena.com/creating-linked-clone-desktop-pools-in-vmware-horizon-view-6-x/.

Rawat, Maneesh. "Nitro Boost your PostgreSQL Workloads" PGConf India. Feb. 23, 2023. Retrieved from https://pgconf.in/conferences/pgconfin2023/program/proposals/356 (accessed Apr. 6, 2023).

Red Hat "Chapter 4. Configuring the Haproxy Load Balancer" Red Hat Customer Portal. 2020. Retrieved on Dec. 22, 2020 from https://access.redhat.com/documentation/en-us/red_hat_cloudforms/4.6/html/high_availability_guide/configuring_haproxy (Year: 2020).

Reed, Kate "Nutanix Introduces Database Services with Era" (published May 9, 2018) Business Wire, from https://www.businesswire.com/news/home/20180509005397/en/ (accessed Dec. 18, 2019).

Reed, Kate "Nutanix Introduces Database Services with Era" (published May 9, 2018) Nutanix Press Releases, from https://ir.nutanix.com/company/press-releases/press-release-details/2018/Nutanix-Introdu/ (accessed Dec. 18, 2019).

Rocheleau, Jake, "30 Best Free Calendar & Datepicker jQuery Plugins." Vandelay Design, published Aug. 29, 2018 (Retrieved from the Internet Apr. 7, 2020). Internet URL: <https://www.vandelaydesign.com/30-best-free-jquery-plugins/> (Year: 2018).

Rubrik, "Exploring the Depth of Simplicity: Protecting Microsoft SQL Server with Rubrik," Technical White Paper, published Mar. 2017, retrieved on Jan. 2, 2023 from https://www.rubrik.com/content/dam/rubrik/en/resources/white-paper/Protecting-Microsoft-SQLServer-with-Rubrik.pdf.

Rubrik, "Hyperconverged Infrastructure with the Simplest Data Protection," published Jan. 2016, retrieved on Jan. 2, 2023 from https://web.archive.org/web/20210117100439/https://www.rubrik.com/wp-content/uploads/2015/12/Joint-Solution-Brief-Nutanix-and-Rubrik.pdf.

Sandbu, Marius. "Tessell—A new way to provide DBaaS in Public Cloud" Marius Sandbu Tech Ramblings. Nov. 1, 2022. Retrieved from https://msandbu.org/tessell-a-new-way-to-provide-dbaas-in-public-cloud/ (accessed Apr. 6, 2023).

Sanglaji, Maryam et al. "Nutanix Era: Databases Made Simple" (published 2018) Nutanix, from https://www.nutanix.com/blog/nutanix-era-databases-made-simple (accessed Dec. 18, 2019).

Sanglaji, Maryam et al. "Nutanix Era: One-click Database Management (London)" (published 2018) .NEXT Conference 2018, from https://next.nutanix.com/next-conference-2018-54/nutanix-era-one-click-database-manag (accessed Dec. 18, 2019).

(56) References Cited

OTHER PUBLICATIONS

Sanglaji, Maryam et al. "Nutanix Era: One-click Database Management" (published 2018) .NEXT Conference 2018, from https://www.dropbox.com/s/tfhw1nb0rcvexg3/NEXTEURO2018%20-%20Nutanix%20Era-One%20click%20Database%20Management.pdf?dl=0 (accessed Dec. 18, 2019).

Savjani, Parikshit, "Automate your Azure Database for MySQL deployments using ARM templates," Microsoft Azure, published Nov. 1, 2018, retrieved Sep. 29, 2022 from https://azure.microsoft.com/en-us/blog/automate-your-azure-database-for-mysql-deployments-using-arm-templates/.

Sharif, Ashraf. "Making Your Database Components Highly Available (HA) via Load Balancers". Several Nines. Mar. 20, 2018. Retrieved from https://severalnines.com/blog/become-clustercontrol-dba-making-your-db-components-ha-load-balancers (Year: 2018).

Singh, Deepak. "Cluster Management with Amazon ECS" AWS Compute Blog. Feb. 6, 2015. Retrieved from https://aws.amazon.com/blogs/compute/cluster-management-with-amazon-ecs/ (accessed Apr. 6, 2023).

Stack Exchange Users. "PostgreSQL High Availability/Scalability using HAProxy and PGBouncer" Stack Exchange. Nov. 2020. Retrieved from https://dba.stackexchange.com/questions/56559/postgresql-high-availability-scalability-using-haproxy-and-pgbouncer (Year: 2020).

Stepan, "How to Set Up Multi-Cluster Load Balancing with GKE", DoiT International. Aug. 17, 2020. Received from https://blog.doit-intl.com/how-to-setup-multi-cluster-load-balancing-with-gke-4b407e1f3dff (Year: 2020).

Stone, "Cross Tenant Access", LoanPro Help, https://help.loanpro.io/article/vyy37c5bhd-cross-tenant-access, accessed Jun. 29, 2022.

Storti, Brian "A Primer on Database Replication" Brianstorti.com (May 23, 2017) from https://www.brianstorti.com/replication/ (accessed Jun. 28, 2021).

Tahir, Saqlain. "Field Notes: SQL Server Deployment Options on AWS Using Amazon EC2" AWS Architecture Blog. Jun. 18, 2021. Retrieved from https://aws.amazon.com/blogs/architecture/field-notes-sql-server-deployment-options-on-aws-using-amazon-ec2/ (accessed Apr. 6, 2023).

Tang, "Multi-tenant access control for cloud services", Aug. 2014, The University of Texas at San Antonio College of Sciences.

Tarvo, Alexander et al., "CanaryAdvisor: a statistical-based tool for canary testing (demo)" Proceedings of the 2015 International Symposium on Software Testing and Analysis (ISSTA 2015), pp. 418-422, Jul. 13, 2015, DOI: 10.1145/2771783.2784770 (Year: 2015).

Tessell for Oracle, "Fully-managed, high-performance Oracle databases with enterprise-grade data protection, security, and compliance@ your terms", 2022, https://www.tessell.io/services/oracle.

Tessell. "Announcing SOC 2 Type I Certification for Tessell" Tessell. Mar. 31, 2023. Retrieved from https://tessell.com/blogs/tessell-soc2-type1 (accessed May 9, 2023).

Tessell. "Azure Tessell for Oracle" Microsoft. Retrieved from https://azuremarketplace.microsoft.com/en-us/marketplace/apps/tessellinc1655919615020.tessell_database_service?ocid=GTMRewards_WhatsNewBlog_healthcareazurecloudsecurityassessment_Vol160&tab=Overview (accessed Apr. 6, 2023).

Tessell. "Cloud Databases. Done Right. At Scale." Tessell. Retrieved from https://tessell.com/ (accessed Apr. 6, 2023).

Tessell. "Differentiated Infrastructure. Delightful Management." Tessell. Retrieved from https://query.prod.cms.rt.microsoft.com/cms/api/am/binary/RW13XNT (accessed Apr. 6, 2023).

Tessell. "It's official: Tessell's DBaaS is Co-Sell Ready with Microsoft Azure" Tessell. Mar. 10, 2023. Retrieved from https://tessell.com/blogs/azure-tessell-ip-co-sell (accessed May 9, 2023).

Tessell. "Migrating a #SQLServer #database to a multi-cloud environment poses many challenges." Twitter. Retrieved from https://twitter.com/tessell/status/1631039267672674304 (accessed Apr. 20, 2023).

Tessell. "Multi-AZ High Availability for Oracle Standard Edition 2" Tessell. Retrieved from https://query.prod.cms.rt.microsoft.com/cms/api/am/binary/RW10vv8 (accessed Apr. 13, 2023).

Tessell. "Multi-AZ High Availability for Oracle Standard Edition 2" Tessell. Retrieved from https://query.prod.cms.rt.microsoft.com/cms/api/am/binary/RW13XNV (accessed Apr. 6, 2023).

Tessell. "Plans & Pricing" Tessell. Retrieved from https://tessell.com/pricing?show=service (accessed Apr. 6, 2023).

Tessell. "Pricing Guide" Tessell. Retrieved from https://tessell.com/pricing/guide?engine=PostgreSQL&cloud=AWS&workload=HighPerformance&deploymentOption=Professional&workflow=self (accessed Apr. 6, 2023).

Tessell. "Product Help, FAQs, Knowledge Base, and more . . . " Tessell. Retrieved from https://help.tessell.com/en/ (accessed Apr. 6, 2023).

Tessell. "Product Overview" AWS Marketplace. Retrieved from https://aws.amazon.com/marketplace/pp/prodview-h2caqujt4pp3q (accessed Apr. 6, 2023).

Tessell. "Tessell Blogs" Tessell. Retrieved from https://tessell.com/blogs (accessed May 9, 2023).

Tessell. "Tessell Database as a Service" AWS Marketplace. Retrieved from https://aws.amazon.com/marketplace/seller-profile?id=37c6e91e-5c34-43b2-b938-91ac9f9b9a73 (accessed Apr. 6, 2023).

Tessell. "Tessell for Enterprises" Tessell. Retrieved from https://tessell.com/platform/enterprises (accessed Apr. 6, 2023).

Tessell. "Tessell for MySQL" Tessell. Retrieved from https://tessell.com/services/mysql (accessed Apr. 6, 2023).

Tessell. "Tessell for Oracle" Tessell. Retrieved from https://tessell.com/services/oracle (accessed Apr. 6, 2023).

Tessell. "Tessell for PostgreSQL" Tessell. Retrieved from https://tessell.com/services/postgresql (accessed Apr. 6, 2023).

Tessell. "Tessell for SQL Server" Tessell. Retrieved from https://tessell.com/services/sqlserver (accessed Apr. 6, 2023).

Tessell. "Tessell for Startups" Tessell. Retrieved from https://tessell.com/platform/developers (accessed Apr. 6, 2023).

Tessell. "Tessell" Twitter. Retrieved from https://twitter.com/tessell (accessed Apr. 20, 2023).

Tessell. "Tessell" YouTube. Retrieved from https://www.youtube.com/channel/UCMSdbKchVXPIEreaRbW-fLw?app=desktop (accessed Apr. 6, 2023).

Tessell. "The Tessell platform provides unparalleled security for your data and users" Tessell Data Transform Enterprise. Retrieved from https://query.prod.cms.rt.microsoft.com/cms/api/am/binary/RE50pqt (accessed Apr. 13, 2023).

Tessell. "The Tessell platform provides unparalleled security for your data and users" Tessell. Retrieved from https://query.prod.cms.rt.microsoft.com/cms/api/am/binary/RW13XNU (accessed Apr. 6, 2023).

Tessell. "We take care of your data infrastructure and data management needs" Tessell. Retrieved from https://www.tessell.com/about-us (accessed Apr. 6, 2023).

The Nutanix Bible; from https://nutanixbible.com/; accessed on Jan. 12, 2016.

The Nutanix Bible; from https://nutanixbible.com/; accessed on Jun. 25, 2018.

The Nutanix Bible; from https://nutanixbible.com/; accessed on Jan. 3, 2017.

The Nutanix Bible; from https://nutanixbible.com/; accessed on Jan. 3, 2018.

The Nutanix Bible; from https://nutanixbible.com/; accessed on Sep. 4, 2015.

The Nutanix Bible; from https://nutanixbible.com/; accessed on Jan. 8, 2019.

The Nutanix Bible; from https://nutanixbible.com/; accessed on Jun. 8, 2017.

The Nutanix Bible; from https://nutanixbible.com/; accessed on Jun. 9, 2016.

Twitter Video screenshots for Tessell. "Tessell's delightful data management . . . " Twitter. Apr. 19, 2023. https://twitter.com/tessell/status/1648775051980816385 [twitter.com].

Virtualization Works, "VMware vFabric Data Director" Virtualization Works: VMware Authorized Online Reseller, (Jun. 2021) from https://www.virtualizationworks.com/vFabric-Data-Director.asp#:~:text=VMware%C2%AE%20vFabric%E2%84%A2%20Data,agility%20and%20reducing%20database%20TCO (accessed Jun. 28, 2021).

(56) References Cited

OTHER PUBLICATIONS

VMware "VMware vFabric Data Director Administrator and User Guide: Clone a Database" (2012) from https://pubs.vmware.com/datadirector/index.jsp?topic=%2Fcom.vmware.datadirector.admin.doc%2FGUID-426EEA1E-BF44-462F-B400-E2421F53144D.html (accessed Dec. 17, 2019).

VMware Horizon, "Horizon Control Plane Services Architecture", Sep. 2021, https://images.techzone.vmware.com/sites/default/files/resource/horizon_control_plane_services_architecture_noindex.pdf.

VMware Tanzu, "Innovate and grow your business on any and many clouds-fast", 2022.

VMware, "Clone a Virtual Machine," VMware Fusion, published Sep. 3, 2020, retrieved Sep. 11, 2022 from https://docs.vmware.com/en/VMware-Fusion/12/com.vmware.fusion.using.doc/GUID-482C606F-0143-4466-A64A-F64116BC5430.html.

VMware, "Create a Workload Cluster Template," VMware Telco Cloud Automation, published Apr. 6, 2021, retrieved on Sep. 29, 2022 from https://docs.vmware.com/en/VMware-Telco-Cloud-Automation/1.9/com.vmware.tca.userguide/GUID-E33A228F-4FB6-41BB-BC8E-AB0D3642B788.html.

VMware, "Deploy a Virtual Machine from a Template in the vSphere Web Client," VMware vSphere, published Apr. 8, 2021, retrieved Sep. 29, 2022 from https://docs.vmware.com/en/VMware-vSphere/6.7/com.vmware.vsphere.vm_admin.doc/GUID-8254CD05-CC06-491D-BA56-A773A32A8130.html.

VMware, "Getting Started with Database Ingestion," VMware vFabric Data Director 2.0, retrieved Sep. 11, 2022 from https://www.vmware.com/pdf/vfabric-data-director-20-database-ingestion-guide.pdf.

VMware, "Horizon 7 Administration," VMware Horizon 7 7.13, published Oct. 2020, retrieved Sep. 11, 2022 from https://docs.vmware.com/en/VMware-Horizon-7/7.13/horizon-administration.pdf.

VMware, "Horizon Cloud on Microsoft Azure Architcture", https://techzone.vmware.com/resource/horizon-cloud-on-microsoft-azure-architecture#introduction.

VMware, "Horizon Cloud Pods in Microsoft Azure—Create a VDI Multi-Cloud Assignment in Your Horizon Cloud Tenant Environment", Aug. 8, 2022, https://docs.vmware.com/en/VMware-Horizon-Cloud-Service/services/hzncloudmsazure.admin15/GUID-9EE86FC9-49CB-4995-8346-3AA76CCE96F8.html.

VMware, "Horizon Control Plane Services Architecture", Sep. 2021, https://images.techzone.vmware.com/sites/default/files/resource/horizon_control_plane_services_architecture_noindex.pdf.

VMware, "Horizon Messaging", https://docs.vmware.com/en/VMware-Horizon-7/7.13/horizon-architecture-planning/GUID-39B5D03B-F619-4355-A30A-F8544D95539C.html.

VMware, "Learn More About Network Profiles in vRealize Automation Cloud", https://docs.vmware.com/en/vRealize-Automation/services/Using-and-Managing-Cloud-Assembly/GUID-01E442EE-4004-4ED1-AA32-9CF73F24CB09.html.

VMware, "Managing Virtual Machines in VMware Cloud on AWS," VMware Cloud on AWS, published Feb. 11, 2021, retrieved on Sep. 29, 2022 from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html.

VMware, "Setting Up Virtual Desktops in Horizon Console," VMware Horizon 7 7.13, published Oct. 2020, retrieved Sep. 11, 2022 from https://docs.vmware.com/en/VMware-Horizon-7/7.13/virtual-desktops.pdf.

VMware, "Snapshot Files," VMware vSphere, published Jul. 29, 2022, retrieved Sep. 11, 2022 from https://docs.vmware.com/en/VMware-vSphere/7.0/com.vmware.vsphere.vm_admin.doc/GUID-38F4D574-ADE7-4B80-AEAB-7EC502A379F4.html.

VMware, "Understanding Clones in VMware vSphere 7," Performance Study, published May 27, 2021, retrieved on Sep. 11, 2022 from https://www.vmware.com/content/dam/digitalmarketing/vmware/en/pdf/techpaper/performance/cloning-vSphere7-perf.pdf.

VMWare, "Using VMware Workstation Pro," VMware Workstation Pro 16.0, published 2021, retrieved Sep. 11, 2022 from https://docs.vmware.com/en/VMware-Workstation-Pro/16.0/workstation-pro-16-user-guide.pdf.

VMware, "VMware Horizon 7 Instant-Clone Desktops and RDSH Servers," VMware Horizon 7.x, published Jul. 2017, retrieved Sep. 11, 2022 from https://www.vmware.com/content/dam/digitalmarketing/vmware/en/pdf/techpaper/vmware-horizon-view-instant-clone-technology.pdf.

VMware, "VMware Horizon on VMware vSAN Best Practices," Technical White Paper, published Dec. 2020, retrieved Sep. 11, 2022 from https://www.vmware.com/content/dam/digitalmarketing/vmware/en/pdf/products/vsan/vmware-horizon-7-on-vmware-vsan-best-practices.pdf.

VMware, "VMware vFabric Data DirectorAdministrator and User Guide," vFabric Data Director 1.0, retrieved Sep. 11, 2022 from https://usermanual.wiki/vmware/vfabricdatadirector10ag.715740134/view.

VMware, "VMware vStorage Virtual Machine File System," Vmware Technical White Paper Updated for VMware Vsphere 4 Version 2.0, retrieved Sep. 11, 2022 from https://www.vmware.com/content/dam/digitalmarketing/vmware/en/pdf/techpaper/vmware-vmfs-tech-overview-white-paper.pdf.

VMware, "vRealize Automation Cloud and VMware Cloud on AWS", https://www.vmware.com/content/dam/digitalmarketing/vmware/en/pdf/vrealize-automation/vmw-vrealize-automation-cloud-on-aws-solution-brief.pdf.

VMware, "Create a Workload Cluster Template" (published Apr. 6, 2021) from https://docs.vmware.com/en/VMware-Telco-Cloud-Automation/1.9/com.vmware.tca.userguide/GUID-E33A228F-4FB6-41BB-BC8E-AB0D3642B788.html (accessed Sep. 10, 2021).

VMware, "Deploy a Virtual Machine from a Template in the vSphere Web Client" (published Apr. 8, 2021) from https://docs.vmware.com/en/VMware-vSphere/6.7/com.vmware.vsphere.vm_admin.doc/GUID-8254CD05-CC06-491D-BA56-A773A32A8130.html (accessed Sep. 10, 2021).

VMware, "Getting Started with Database-as-a-Service" VMware vFabric Data Director 2.0 (2012) from https://www.vmware.com/pdf/vfabric-data-director-20-database-as-a-service-guide.pdf (accessed Jun. 2, 2021).

VMware, "Managing Virtual Machines in VMware Cloud on AWS" (published Feb. 11, 2021) from https://docs.vmware.com/en/VMware-Cloud-on-AWS/services/com.vmware.vsphere.vmc-aws-manage-data-center-vms.doc/GUID-5ED3C460-9E84-4E12-90CF-48EB9EDDCDD6.html (accessed Sep. 10, 2021).

VMware, "Virtual Volumes and Replication" VMware Docs (May 31, 2019) from https://docs.vmware.com/en/VMware-vSphere/6.5/com.vmware.vsphere.storage.doc/GUID-6346A936-5084-4F38-ACB5-B5EC70AB8269.html (accessed Jun. 2, 2021).

VMware, "VMware vFabric Data Director 2.0: Getting Started with Database Provisioning" (2012) from https://www.vmware.com/pdf/vfabric-data-director-20-database-provision-guide.pdf (accessed Dec. 18, 2019).

VMware, "What's New in vSphere 7 Core Storage" VMware the Cloud Platform Tech Zone (May 17, 2021) from https://core.vmware.com/resource/whats-new-vsphere-7-core-storage#sec2-sub5 (accessed Jun. 2, 2021).

VMware, "What's New: vSphere Virtual Volumes" VMware Storage Business Unit Documentation (Aug. 2015) from https://www.vmware.com/content/dam/digitalmarketing/vmware/en/pdf/products/virtualvolumes/vmware-whats-new-vsphere-virtual-volumes.pdf (accessed Jun. 2, 2021).

VMWare, Cloud Control Plane Management, "Horizon Control Plane Services", https://www.vmware.com/in/products/horizon/controlplane.html.

VMware, Create Network Profiles, https://vdc-repo.vmware.com/vmwb-repository/dcr-public/e07569a6-6154-45d7-acdf-595e0b089892/44bb2e01-dd74-44e8-98da-b16f257b9a8d/GUID-35DF1889-6E34-449E-915A-3BC5C4DA172C.html.

Vogels, Werner. "Under the Hood of Amazon EC2 Container Service" All Things Distributed. Jul. 20, 2015. Retrieved from https://www.allthingsdistributed.com/2015/07/under-the-hood-of-the-amazon-ec2-container-service.html (accessed Apr. 6, 2023).

(56) References Cited

OTHER PUBLICATIONS

Warner, Alex et al., "Chapter 16—Canarying Releases" (published 2018) Google Workbook published by O'Reilly Media, Inc., from https://sre.google/workbook/canarying-releases/ (accessed Sep. 14, 2021).

Warren, "Internet Archive Wayback Machine Introduces New Beta Version With Calendar View." warren's blog, published Jan. 23, 2011 (Retrieved from the Internet Apr. 7, 2020). Internet URL: <warrenduecker.blogspot.com/2011/01/internet-archive-wayback-machine.html> (Year: 2011).

WebDeveloper Juice, "7 Beatiful Web Based Timeline Using Javascript and CSS," WebDeveloper Juice, published Sep. 28, 2011, retrieved Feb. 11, 2022 from <https://www.webdeveloperjuice.com/2011/09/28/7-beautiful-web-based-timeline-using-javascript-and-css/> (Year: 2011).

Wickstrom, Frank, "Keeping personal data personal with database sanitization" Anders. (Jun. 26, 2019) from https://www.anders.com/en/blog/keeping-personal-data-personal-with-database-sanitization/ (accessed Jun. 28, 2021).

YouTube Video for Delphix Corp., "How to Create Database Copies with Delphix," YouTube, Apr. 3, 2018, https://www.youtube.com/watch?v=1EjR-k4EJ68 [youtube.com].

YouTube Video for Rubrik, "Item-level Recovery with Rubrik SQL Server Live Mount," YouTube, Jul. 12, 2018, https://www.youtube.com/watch?app=desktop&v=Upp4Ume03P0&feature=youtu.be [youtube.com].

YouTube Video screenshots for "Nutanix Business Critical Applications & Databases—.NEXT Europe 2019," YouTube, Oct. 16, 2019, https://www.youtube.com/watch?v=KI7IEmm6j6o [youtube.com].

YouTube Video screenshots for "Nutanix Era .NEXT 2019 Demo," YouTube, May 10, 2019, https://www.youtube.com/watch?v=PAWHHdCEArc&t=267s [youtube.com].

YouTube Video screenshots for Amazon Web Services. "Amazon ECS: Core Concepts" YouTube. Aug. 31, 2017. https://www.youtube.com/watch?app=desktop&v=eq4wL2MiNqo&feature=youtu.be [youtube.com].

YouTube Video screenshots for Nutanix , "Nutanix Era .NEXT 2019 Demo", YouTube, May 10, 2019, https://youtu.be/PAWHHdCEArc [youtube.com].

YouTube Video screenshots for Nutanix , "Unify Private and Public Clouds with Nutanix Clusters", YouTube, Jul. 31, 2020, https://www.youtube.com/watch?v=xuw4F4wBDoc [youtube.com].

Affidavit of Nathaniel E Frank-White, Aug. 10, 2024.

Expedia, Preferred Class Drop Down, www.expedia.com.

Foreign Action other than Search Report on PCT Dtd Jan. 2, 2025.

Google, Creating Instances, Cloud SQL for MySQL, pp. 1-5.

McGraw-Hill Dictionary of Scientific and Technical Terms, recoil milking—recovery system, pp. 4, 6th edition.

MySQL, "Supported Platforms: MySQL Database", https://web.archive.org/web/20181106221826/https://www.mysql.com/support/supportedplatforms/database.html.

New Oxford American Dictionary, Third Edition, "authorized—avail", 4 pages, 2010.

*Nutanix* v. *Tessell*, "Civil Docket for Case 3:24-cv-01729-AMO".

*Nutanix* v. *Tessell*, "Order Setting initial Case Management Conference and ADR Deadlines", Northern District of California, Mar. 20, 2024.

Taking a Backup Using Snapshots, LVM HOWTO, Chapter 13 Recipes.

*Tessell* v. *Nutanix* IPR Power of Attorney.

*Tessell* v. *Nutanix*, IPR2025-00322, Dec. 18, 2024, pp. 7.

Amudala, Rajasekhar. "Add Targets Manually on EM Cloud Control 13c" Oracle DBA—Tips and Techniques. Jul. 13, 2020. Retrieved from http://www.br8dba.com/add-targets-manually-on-em-cloud-control-13c/ (accessed Aug. 30, 2023).

AWS. "Amazon CloudFormation" Amazon CloudFormation. Oct. 25, 2021. Retrieved from https://web.archive.org/web/20211025042539/https://www.amazonaws.cn/en/cloudformation/ (accessed Sep. 14, 2023).

AWS. "Amazon RDS Custom architecture" Amazon Relational Database Service. May 24, 2022. Retrieved from https://docs.aws.amazon.com/AmazonRDS/latest/UserGuide/custom-concept.html (accessed Aug. 30, 2023).

AWS. "Amazon Relational Database Service (RDS)" Amazon Relational Database Service. Dec. 24, 2017. Retrieved from https://web.archive.org/web/20171224182936/https://aws.amazon.com/rds/#features (accessed Sep. 6, 2023).

AWS. "Amazon VPC FAQs" Amazon VPC. Dec. 14, 2021. Retrieved from https://aws.amazon.com/vpc/faqs/ (accessed Sep. 6, 2023).

AWS. "Announcing Amazon RDS Custom for Oracle" Amazon Relational Database Service. Oct. 26, 2021. Retrieved from https://aws.amazon.com/about-aws/whats-new/2021/10/amazon-rds-custom-oracle/ (accessed Aug. 30, 2023).

AWS. "AWS CloudFormation concepts" AWS CloudFormation. Oct. 22, 2021. Retrieved from https://docs.aws.amazon.com/AWSCloudFormation/latest/UserGuide/cfn-whatis-concepts.html (accessed Sep. 6, 2023).

AWS. "AWS Rule Functions" AWS CloudFormation. Sep. 24, 2021. Retrieved from https://web.archive.org/web/20210924041142/https:/docs.aws.amazon.com/AWSCloudFormation/latest/UserGuide/intrinsic-function-reference-rules.html (accessed Sep. 6, 2023).

AWS. "AWS::EC2::Subnet" AWS CloudFormation. Oct. 2021. Retrieved from https://docs.aws.amazon.com/AWSCloudFormation/latest/UserGuide/aws-resource-ec2-subnet.html (accessed Sep. 6, 2023).

AWS. "Configuring a DB instance for Amazon RDS Custom for Oracle" Amazon Relational Database Service. Dec. 3, 2021. Retrieved from https://docs.aws.amazon.com/AmazonRDS/latest/UserGuide/custom-creating.html (accessed Aug. 30, 2023).

AWS. "Create a custom Windows AMI" Amazon Elastic Compute Cloud. Jan. 15, 2013. Retrieved from https://docs.aws.amazon.com/AWSEC2/latest/WindowsGuide/Creating_EBSbacked_WinAMI.html (accessed Aug. 30, 2023).

AWS. "Creating a MySQL DB Instance and Connecting to a Database on a MySQL DB Instance" Amazon Relational Database Service. Dec. 22, 2017. Retrieved from https://web.archive.org/web/20171222204154/https:/docs.aws.amazon.com/AmazonRDS/latest/UserGuide/CHAP_GettingStarted. CreatingConnecting.MySQL.html (accessed Sep. 6, 2023).

AWS. "Creating an Amazon RDS DB instance" Amazon Relational Database Service. May 13, 2020. Retrieved from https://docs.aws.amazon.com/AmazonRDS/latest/UserGuide/USER_CreateDBInstance.html#USER_CreateDBInstance.Settings (accessed Aug. 30, 2023).

AWS. "Creating and connecting to an Oracle DB instance" Amazon Relational Database Service. Jun. 6, 2014. Retrieved from https://docs.aws.amazon.com/AmazonRDS/latest/UserGuide/CHAP_GettingStarted.CreatingConnecting.Oracle.html (accessed Aug. 30, 2023).

AWS. "How Amazon VPC works" Amazon VPC. Oct. 26, 2021. Retrieved from https://docs.aws.amazon.com/vpc/latest/userguide/how-it-works.html (accessed Sep. 6, 2023).

AWS. "Maintaining a DB instance" Amazon Relational Database Service. Sep. 5, 2015. Retrieved from https://docs.aws.amazon.com/AmazonRDS/latest/UserGuide/USER_UpgradeDBInstance.Maintenance.html#OS_Updates (accessed Aug. 30, 2023).

AWS. "Regions and Availability Zones" Amazon Relational Database Service. Dec. 22, 2017. Retrieved from https://web.archive.org/web/20171222195304/http:/docs.aws.amazon.com/AmazonRDS/latest/UserGuide/Concepts.RegionsAndAvailabilityZones.html (accessed Sep. 6, 2023).

AWS. "Rules" AWS CloudFormation. Feb. 9, 2021. Retrieved from https://docs.aws.amazon.com/AWSCloudFormation/latest/UserGuide/Welcome.html (accessed Sep. 6, 2023).

AWS. "What is AWS CloudFormation?" AWS CloudFormation. Feb. 18, 2020. Retrieved from https://docs.aws.amazon.com/AWSCloudFormation/latest/UserGuide/Welcome.html (accessed Sep. 6, 2023).

AWS. "Working with Amazon RDS Custom" Amazon Relational Database Service. Nov. 27, 2021. Retrieved from https://docs.aws.amazon.com/AmazonRDS/latest/UserGuide/rds-custom.html (accessed Aug. 30, 2023).

(56)　　　　　References Cited

OTHER PUBLICATIONS

AWS. "Working with custom engine versions for Amazon RDS Custom for Oracle" Amazon Relational Database Service. Dec. 3, 2021. Retrieved from https://docs.aws.amazon.com/AmazonRDS/latest/UserGuide/custom-cev.html (accessed Aug. 30, 2023).

Berger, Martin. "AWS Custom Engine Versions for Amazon RDS Custom for Oracle—Sightseeing Tour Part 1/3—Setup" Martinberger. com. May 15, 2022. Retrieved from https://www.martinberger.com/2022/05/aws-custom-engine-versions-for-amazon-rds-custom-for-oracle-sightseeing-tour-part-1-3-setup/ (accessed Aug. 30, 2023).

Bhrara, Raminder. "Oracle Cloud Infrastructure OCI Gen-2 Cloud Security—Part II (Identity and Access Management)" RedThunder. Blog. Dec. 31, 2018. Retrieved from https://redthunder.blog/2018/12/31/oracle-cloud-infrastructure-oci-gen-2-cloud-security-part-ii-identity-and-access-management/ (accessed Sep. 14, 2023).

Bugsnag. "Install using CloudFormation" SmartBear BugSnag Docs. Jul. 28, 2021. Retrieved from https://web.archive.org/web/20210728140402/https://docs.bugsnag.com/on-premise/clustered/cloudformation-installation/ (accessed Sep. 14, 2023).

CloudThat. "Virtualization in Amazon Web Services" CloudThat. Oct. 16, 2014. Retrieved from https://www.cloudthat.com/resources/blog/virtualization-in-amazon-web-services (accessed Aug. 30, 2023).

CommVault. "Adding a Database Group for Alibaba Cloud ApsaraDB RDS for MySQL" Essential. Sep. 22, 2020. Retrieved from https://documentation.commvault.com/v11/essential/122970_adding_database_group_for_alibaba_cloud_apsaradb_rds_for_mysql.html (accessed Aug. 30, 2023).

CommVault. "Creating a Server Backup Plan" Essential. Nov. 6, 2020. Retrieved from https://documentation.commvault.com/v11/essential/130962_creating_server_backup_plan.html (accessed Aug. 30, 2023).

CommVault. "Creating a Server Plan" Essential. Oct. 27, 2021. Retrieved from https://documentation.commvault.com/2023e/essential/86648_creating_server_plan.html (accessed Aug. 30, 2023).

CommVault. "Restoring a Database Group for Alibaba Cloud ApsaraDB RDS for MySQL" Essential. Feb. 18, 2021. Retrieved from https://documentation.commvault.com/2023e/essential/122176_restoring_database_group_for_alibaba_cloud_apsaradb_rds_for_mysql.html (accessed Aug. 30, 2023).

Donchovski, Igor. "Maintenance for MongoDB Replica Sets" SlideShare. Oct. 2, 2019. Retrieved from https://www.slideshare.net/IgorLE/maintenance-for-mongodb-replica-sets (accessed Aug. 30, 2023).

Duvuri, Aditya. "Policies in Oracle Cloud Infrastructure (OCI) Data Integration" Oracle Cloud Infrastructure Blog. Aug. 17, 2020. Retrieved from https://blogs.oracle.com/dataintegration/post/policies-in-oracle-cloud-infrastructure-oci-data-integration (accessed Sep. 14, 2023).

Erwin, Danyelle. "What's New in SAP HANA Cockpit 2.0 SP 12" SAP Community. Jun. 22, 2020. Retrieved from https://blogs.sap.com/2020/06/22/whats-new-in-sap-hana-cockpit-2.0-sp-12/ (accessed Aug. 30, 2023).

Google Cloud. "Configurations Overview" Cloud Deployment Manager. Oct. 16, 2021. Retrieved from https://web.archive.org/web/20211016075925/https://cloud.google.com/deployment-manager/docs/configuration/ (accessed Sep. 6, 2023).

Google Cloud. "Creating Instances" Database Products. Sep. 18, 2018. Retrieved from https://web.archive.org/web/20180918103721/https://cloud.google.com/sql/docs/mysql/create-instance (accessed Sep. 6, 2023).

Google Cloud. "Deployment Manager Fundamentals" Cloud Deployment Manager. Feb. 27, 2021. Retrieved from https://web.archive.org/web/20210227173536/https://cloud.google.com/deployment-manager/docs/fundamentals (accessed Sep. 6, 2023).

Google Cloud. "Google Cloud Deployment Manager Documentation" Cloud Deployment Manager. Dec. 14, 2021. Retrieved from https://web.archive.org/web/20211214023957/https://cloud.google.com/deployment-manager/docs (accessed Sep. 14, 2023).

Google Cloud. "REST Resource: networks" Compute Engine. Nov. 5, 2021. Retrieved from https://cloud.google.com/compute/docs/reference/rest/beta/networks (accessed Sep. 6, 2023).

Google Cloud. "REST Resource: subnetworks" Compute Engine. Jul. 1, 2019. Retrieved from https://cloud.google.com/compute/docs/reference/rest/beta/subnetworks (accessed Sep. 6, 2023).

Google Cloud. "Supported resource types" Cloud Deployment Manager. Sep. 16, 2021. Retrieved from https://web.archive.org/web/20210916123002/https:/cloud.google.com/deployment-manager/docs/configuration/supported-resource-types (accessed Sep. 6, 2023).

Google Cloud. "VPC networks" Virtual Private Cloud. Oct. 29, 2021. Retrieved from https://cloud.google.com/vpc/docs/vpc (accessed Sep. 6, 2023).

Havewala, Porus. "Back Up a Thousand Databases Using Enterprise Manager Cloud Control 12c" Technical Article. Jan. 2014. Retrieved from https://www.oracle.com/technical-resources/articles/enterprise-manager/havewala-rman-em12c.html (accessed Aug. 30, 2023).

Hinker, Stefan. "A Patch Train Solution for OCI OS Management" A-Team Chronicles. Jul. 17, 2020. Retrieved from https://www.ateam-oracle.com/post/a-patch-train-solution-for-oci-os-management (accessed Aug. 30, 2023).

Lei, Joanne. "Cross-tenancy access: AssumeRole in OCI" Oracle Cloud Infrastructure Blog. Mar. 1, 2022. Retrieved from https://blogs.oracle.com/cloud-infrastructure/post/cross-tenancy-access-assumerole-in-oci (accessed Sep. 14, 2023).

Mathew, Prince. "Custom Database Software Images now available on Gen2 Exadata Cloud@Customer" Oracle Database Insider. Jun. 10, 2021. Retrieved from https://blogs.oracle.com/database/post/custom-database-software-images-now-available-on-gen2-exadata-cloudcustomer (accessed Aug. 30, 2023).

Matijaca, Ante, "Dashboard" Dribbble, published Dec. 21, 2015, retrieved Feb. 11, 2022 from <https://dribbble.com/shots/2417233-Dashboard> (Year: 2015).

Melo, Gilson. "Overview of the Interconnect Between Oracle and Microsoft" Oracle Cloud Infrastructure Blog. Jun. 5, 2019. Retrieved from https://blogs.oracle.com/cloud-infrastructure/post/overview-of-the-interconnect-between-oracle-and-microsoft (accessed Sep. 14, 2023).

MongoDB. "mongo Shell Methods" Reference. Aug. 2019. Retrieved from https://www.mongodb.com/docs/v4.2/reference/method/ (accessed Aug. 30, 2023).

MongoDB. "mongodb" GitHub. Mar. 2015. Retrieved from https://github.com/mongodb/docs/blob/v4.2/source/core/replica-set-priority-0-member.txt (accessed Aug. 30, 2023).

MongoDB. "Priority 0 Replica Set Members" MongoDB Manual. Aug. 2019. Retrieved from https://www.mongodb.com/docs/manual/core/replica-set-priority-0-member/ (accessed Aug. 30, 2023).

MongoDB. "Replica Set Elections" MongoDB Manual. Aug. 2019. Retrieved from https://www.mongodb.com/docs/manual/core/replica-set-elections/ (accessed Aug. 30, 2023).

MongoDB. "Replica Set Members" Replication. Aug. 2019. Retrieved from https://www.mongodb.com/docs/v4.2/core/replica-set-members/#replica-set-secondary-members (accessed Aug. 30, 2023).

MongoDB. "The mongo Shell" MongoDB. Aug. 2019. Retrieved from https://www.mongodb.com/docs/v4.2/mongo/ (accessed Aug. 30, 2023).

MongoDB. "Troubleshoot Replica Sets" MongoDB Manual. Aug. 2019. Retrieved from https://www.mongodb.com/docs/manual/tutorial/troubleshoot-replica-sets/ (accessed Aug. 30, 2023).

MongoDB. "Upgrade a Replica Set to 4.2" Replication. Aug. 2019. Retrieved from https://www.mongodb.com/docs/v4.2/release-notes/4.2-upgrade-replica-set/ (accessed Aug. 30, 2023).

MySQL. "Creating a MySQL Server Deployment" Documentation. Mar. 13, 2017. Retrieved from https://web.archive.org/web/20170313043247/http:/docs.oracle.com/cloud/latest/mysql-cloud/UOMCS/GUID-D03FE523-AD8D-4C53-935C-D5D6513D2A24.htm#GUID-D03FE523-AD8D-4C53-935C-D5D6513D2A24 (accessed Sep. 6, 2023).

Non-Final Office Action on U.S. Appl. No. 17/694,964 Dtd Aug. 9, 2023.

Non-Final Office Action on U.S. Appl. No. 17/951,632 Dtd Sep. 14, 2023.

(56) References Cited

OTHER PUBLICATIONS

Oracle, "Webinar: Automate your database provisioning to increase efficiency and standardization" (published Jul. 14, 2020) Oracle Youtube, from https://www.youtube.com/watch?v=nUMdekXyqr4 (accessed Jun. 28, 2021).

Oracle. "About Managed Targets" Enterprise Manager Cloud Control Extensibility Programmer's Guide. May 2014. Retrieved from https://docs.oracle.com/cd/E24628_01/doc.121/e25159/managed_targets.htm#EMPRG140 (accessed Aug. 30, 2023).

Oracle. "Accessing Object Storage Resources Across Tenancies" Oracle Cloud Infrastructure Documentation. Sep. 21, 2021. Retrieved from https://web.archive.org/web/20210921123150/https://docs.oracle.com/en-us/iaas/Content/Object/Concepts/accessingresourcesacrosstenancies.htm (accessed Sep. 14, 2023).

Oracle. "Create Oracle Database Homes on an Exadata Cloud Infrastructure System" Oracle Cloud Infrastructure Documentation. May 16, 2022. Retrieved from https://docs.oracle.com/en-us/iaas/exadatacloud/exacs/creating-database-homes-exacc.html (accessed Aug. 30, 2023).

Oracle. "Managing Groups" Enterprise Manager Cloud Control Administrator's Guide. Feb. 2016. Retrieved from https://docs.oracle.com/cd/E24628_01/doc.121/e24473/group_management.htm#EMADM9216 (accessed Aug. 30, 2023).

Oracle. "Managing Software Sources" Oracle Cloud Infrastructure Documentation. Sep. 17, 2021. Retrieved from https://docs.oracle.com/en-us/iaas/os-management/osms/osms-software-sources.htm (accessed Aug. 30, 2023).

Oracle. "Overview of Identity and Access Management" Oracle Cloud Infrastructure Documentation. May 5, 2022. Retrieved from https://web.archive.org/web/20220505171702/https://docs.oracle.com/en-us/iaas/Content/Identity/Concepts/overview.htm (accessed Sep. 14, 2023).

Oracle. "Securing Object Storage" Oracle Cloud Infrastructure Documentation. Apr. 2021. Retrieved from https://docs.public.oneportal.content.oci.oraclecloud.com/en-us/iaas/Content/Security/Reference/objectstorage_security.htm (accessed Sep. 14, 2023).

Oracle. "Update Your Database Homes and Grid Infrastructure Via the OCI Web Console on the Exadata Cloud Service" Oracle Database Insider. May 2, 2020. Retrieved from https://blogs.oracle.com/database/post/update-your-database-homes-and-grid-infrastructure-via-the-oci-web-console-on-the-exadata-cloud-service (accessed Aug. 30, 2023).

Oracle. "User Credentials" Oracle Cloud Infrastructure Documentation. May 19, 2022. Retrieved from https://web.archive.org/web/20220519195404/https:/docs.oracle.com/en-us/iaas/Content/Identity/Concepts/usercredentials.htm (accessed Sep. 14, 2023).

Oracle. "User Guide" Oracle Cloud Infrastructure. Nov. 26, 2019. Retrieved from https://docs.oracle.com/cd/E97706_01/pdf/ug/OCI_User_Guide.pdf (accessed Aug. 30, 2023).

Oracle. "Using DBMS_Rolling to Perform a Rolling Upgrade" Concepts and Administration. Sep. 2020. Retrieved from https://docs.oracle.com/en/database/oracle/oracle-database/19/sbydb/using-DBMS_ROLLING-to-perform-rolling-upgrade.html#GUID-70C09F5B-90BE-4C8C-96A5-45A52E05D380 (accessed Aug. 30, 2023).

Oracle. "Using Pre-Authenticated Requests" Oracle Cloud Infrastructure Documentation. Apr. 2021. Retrieved from https://docs.public.oneportal.content.oci.oraclecloud.com/en-us/iaas/Content/Object/Tasks/usingpreauthenticatedrequests.htm#Using_PreAuthenticated_Requests (accessed Sep. 14, 2023).

Pederson, Jenna. "Provisioning an RDS Database With Cloudformation (Part 2)" Jenna Pederson. Jun. 28, 2021. Retrieved from https://jennapederson.com/blog/2021/6/28/provisioning-an-rds-database-with-cloudformation-part-2/ (accessed Sep. 6, 2023).

Quest. "Creating custom User-defined Database Groups" Support. Aug. 16, 2017. Retrieved from https://support.quest.com/kb/4229519/creating-custom-user-defined-database-groups (accessed Aug. 30, 2023).

Reinero, Bryan. "Your Ultimate Guide to Rolling Upgrades" MongoDB. May 1, 2018. Retrieved from https://www.mongodb.com/blog/post/your-ultimate-guide-to-rolling-upgrades (accessed Aug. 30, 2023).

Shah, Manish. "Gen 2 Exadata Cloud at Customer New Features: Shared Oracle_Home" Exadata Database Machine. Jun. 2, 2020. Retrieved from https://blogs.oracle.com/exadata/post/gen-2-exadata-cloud-at-customer-new-features-shared-oracle-home (accessed Aug. 30, 2023).

Steven Tom, Idaho National Laboratory, "Recommended Practice for Patch Management of Control Systems", Dec. 2008, Cybersecurity Infrastructure Security Agency (CISA), U.S. Department of Homeland Security. (Year: 2008).

Tudip Digital. "What is Deployment Manager?" Tudip. Jun. 24, 2019. Retrieved from https://tudip.com/blog-post/what-is-deployment-manager/ (accessed Sep. 6, 2023).

Wong, Julie. "OS Management with Oracle Cloud Infrastructure" Oracle Cloud Infrastructure Blog. Mar. 11, 2020. Retrieved from https://blogs.oracle.com/cloud-infrastructure/post/os-management-with-oracle-cloud-infrastructure (accessed Aug. 30, 2023).

YouTube Video screenshots for "Nutanix Business Critical Applications & Databases—.NEXT Europe 2019," YouTube, Oct. 16, 2019, https://www.youtube.com/watch?v=KI7IEmm6j60 [youtube.com].

YouTube Video screenshots for "Nutanix Era .NEXT 2019 Demo," YouTube, May 10, 2019, https://www.youtube.com/watch?v=8hbpfrOSw0U [youtube.com].

YouTube Video screenshots for AOS Note. "How to Create an RDS Database Using CloudFormation" YouTube. Feb. 17, 2021. https://youtu.be/h73xPAwffec [youtube.com].

YouTube Video screenshots for Cloud Advocate. "Google Cloud Deployment Manager—Getting Started" YouTube. Aug. 28, 2020. https://youtu.be/qVKp7W1bfrE [youtube.com].

Yun, Channy. "Amazon RDS Custom for Oracle—New Control Capabilities in Database Environment" AWS News Blog. Oct. 26, 2021. Retrieved from https://aws.amazon.com/blogs/aws/amazon-rds-custom-for-oracle-new-control-capabilities-in-database-environment/ (accessed Aug. 30, 2023).

Zhou, Siyuan, et al. "Fault-Tolerant Replication with Pull-Based Consensus in MongoDB" Usenix. Mar. 10, 2021. Retrieved from https://www.usenix.org/system/files/nsdi21-zhou.pdf (accessed Aug. 30, 2023).

"About Snapshots and Clones", Administering Oracle Java Cloud Service, https://docs.oracle.com/en/cloud/paas/java-cloud/jscag/snapshots-and-clones1.html#GUID-28871F48-A458-41C1-86F8-566ED842C3D5.

"Cloning a volume for an Amazon Aurora DB cluster", https://docs.aws.amazon.com/AmazonRDS/latest/AuroraUserGuide/Aurora.Managing.Clone.html.

"Dell PS Series Snapshots and Clones: Best Practices and Sizing Guidelines", Dell Storage Engineering, Nov. 2019, https://dl.dell.com/manuals/common/ps-series-snapshots-clones-bp1027_en-us.pdf.

"Enterprise Manager Cloud Administration Guide", Oracle Help Center, 2024, https://docs.oracle.com/cd/E24628_01/doc.121/e28814/cloud_db_clonesnap.htm#CEGCJCBC.

"Protecting Microsoft SQL Server with Rubrik", Rubrik Technical Marketing, Sep. 2023, https://www.rubrik.com/content/dam/rubrik/en/resources/white-paper/rwp-protecting-microsoft-sql-server-with-rubrik.pdf.

Maruthachalam, et al., "A Distributed System Design for Next Generation Storage and Remote Replication", 2014, https://ieeexplore.ieee.org/abstract/document/6814686.

YouTube Video screenshots for Tessell. "Eliminate IOPS metering for your cloud data infrastructure" YouTube. Oct. 20, 2022. https://www.youtube.com/watch?v=Puk0fQ43PmA [youtube.com].

YouTube Video screenshots for Tessell. "Tessell DBaaS on your choice of cloud at your terms" YouTube. Sep. 14, 2022. https://www.youtube.com/watch?v=sfWo0KyT1Do [youtube.com].

YouTube Video screenshots for Tessell. "Tessell. Choice. Power to you." YouTube. Mar. 6, 2023. https://www.youtube.com/watch?v=4DduLUdikRY [youtube.com].

(56) References Cited

OTHER PUBLICATIONS

YouTube Video screenshots for Tessell. "Why Tessell?" YouTube. Jan. 15, 2023. https://www.youtube.com/watch?v=JSOPhTgwrXI [youtube.com].

Zhang, Junchi, "vFabric Data Director 2.7 customer deck," published May 17, 2013, retrieved Sep. 11, 2022 from https://www.slideshare.net/harryaya/vfabric-data-director-27-customer-deck.

"Recommended Practice for Patch Management of Control Systems", Steven Tom, Idaho National Laboratory, Dec. 2008, Cybersecurity Infrastructure Security Agency (CISA), US. Department of Homeland Security (Year: 2008).

High availability software—Wikipedia (Year: 2016).

Communication under Rule 71(3) EPC for EP application 23159241. 1, Oct. 2, 2025.

Enterprise Manager Lifecycle Management Administrator's Guide, "14 Cloning Oracle Databases and Pluggable Databases", https://web.archive.org/web/20170829005212/https://docs.oracle.com/cd/E24628_01/em.121/e27046/cloning_database.htm#EMLCM93230, 2017, Oracle.

Oracle®, "Oracle® Enterprise Manager Cloud Administration Guide 120 Release 5 (12.1.0.5)E28814-19", Dec. 2015 (Year: 2015).

"Database Management Revolutionized by AI", OCI, https://www.oracle.com/artificial-intelligence/transform-database-management-with-ai/, Oct. 16, 2025.

"AI agents in Azure Cosmos DB", https://learn.microsoft.com/en-US/azure/cosmos-db/ai-agents, Mar. 9, 2025.

"MCP: Transform Database Admin Tasks with LLMs", https://builder.aws.com/content/2umKOtgxiPzrAf0RzQOdnFhGedg/mcp-transform-database-admin-tasks-with-llms, Jun. 8, 2025.

"Oracle Autonomous Database", White Paper Series, 13 pages, Sep. 2018.

"What are the future trends in DBMS technology? Advances in data and systems have led to the following advances in DBMS technology. ", https://aws.amazon.com/what-is/dbms/, Oct. 16, 2025.

Garg, "Neon: The Serverless PostgreSQL Platform Built for AI Agents", Gocodeo, Jun. 16, 2025, https://www.gocodeo.com/post/neon-the-serverless-postgresql-platform-built-for-ai-agents.

Marodia, Democratizing database observability with AI-assisted troubleshooting, https://cloud.google.com/blog/products/databases/inside-ai-assisted-troubleshooting-for-databases, May 13, 2025.

Oracle, "Oracle Autonomous Database Technical Overview", Version [2.1], 20 page, Jul. 2020.

* cited by examiner

1910

Receive, at the HCS of the control plane, a request for an API call to the public cloud

1920

Fetch, using the HCS, a network profile based on the request

1930

Extract, using the HCS, sub-inputs from the network profile

1940

Make, using the HCS, an API call to the public cloud using information from the request and the sub-inputs

1900

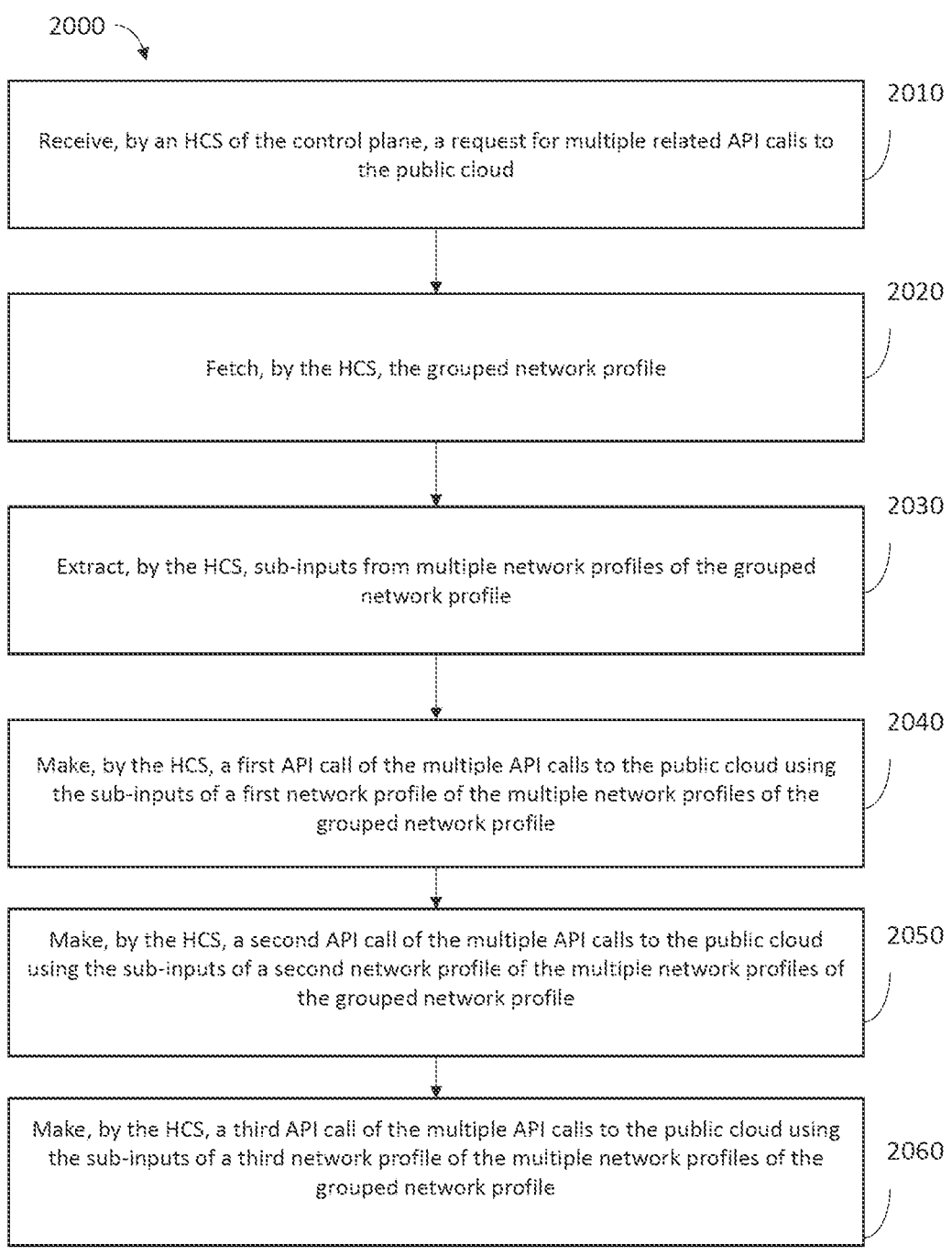

2000

2010
Receive, by an HCS of the control plane, a request for multiple related API calls to the public cloud 2020
Fetch, by the HCS, the grouped network profile 2030
Extract, by the HCS, sub-inputs from multiple network profiles of the grouped network profile 2040
Make, by the HCS, a first API call of the multiple API calls to the public cloud using the sub-inputs of a first network profile of the multiple network profiles of the grouped network profile 2050
Make, by the HCS, a second API call of the multiple API calls to the public cloud using the sub-inputs of a second network profile of the multiple network profiles of the grouped network profile 2060
Make, by the HCS, a third API call of the multiple API calls to the public cloud using the sub-inputs of a third network profile of the multiple network profiles of the grouped network profile

FIG. 20

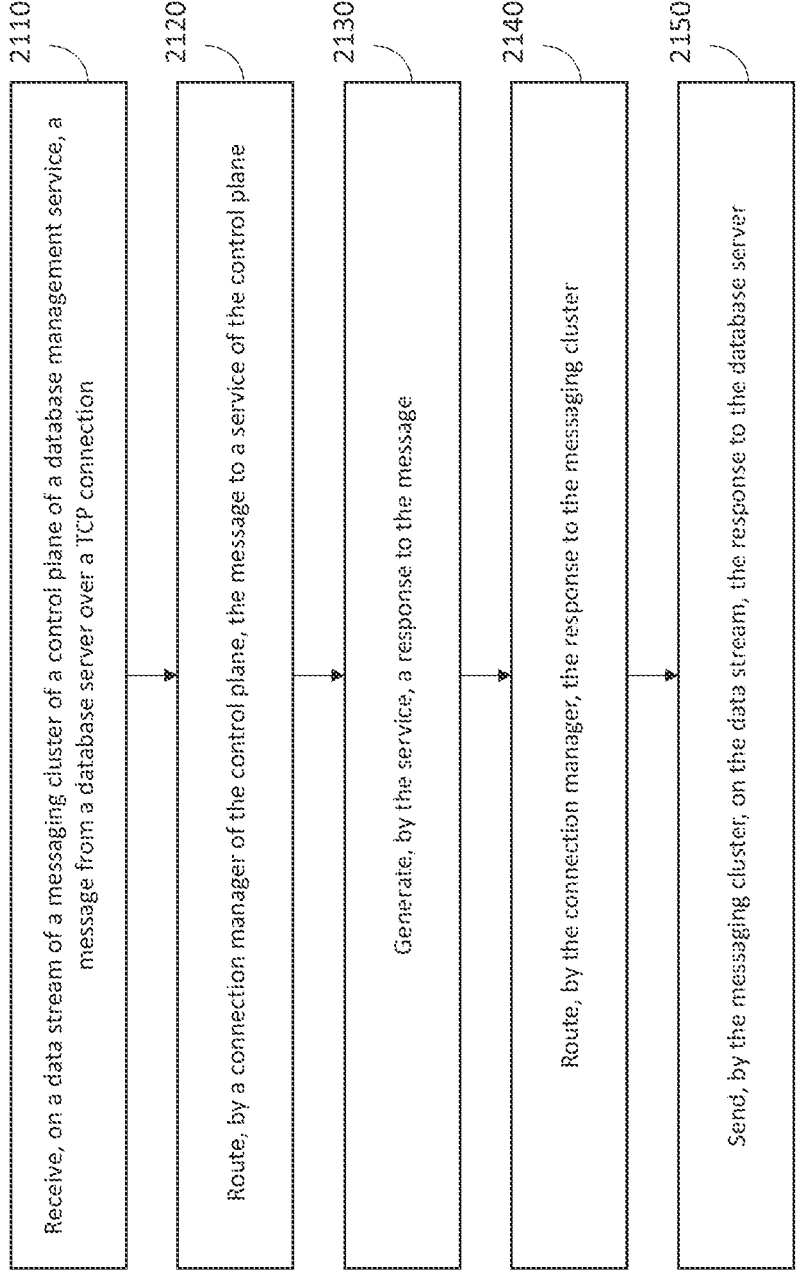

2110

Receive, on a data stream of a messaging cluster of a control plane of a database management service, a message from a database server over a TCP connection

2120

Route, by a connection manager of the control plane, the message to a service of the control plane

2130

Generate, by the service, a response to the message

2140

Route, by the connection manager, the response to the messaging cluster

2150

Send, by the messaging cluster, on the data stream, the response to the database server

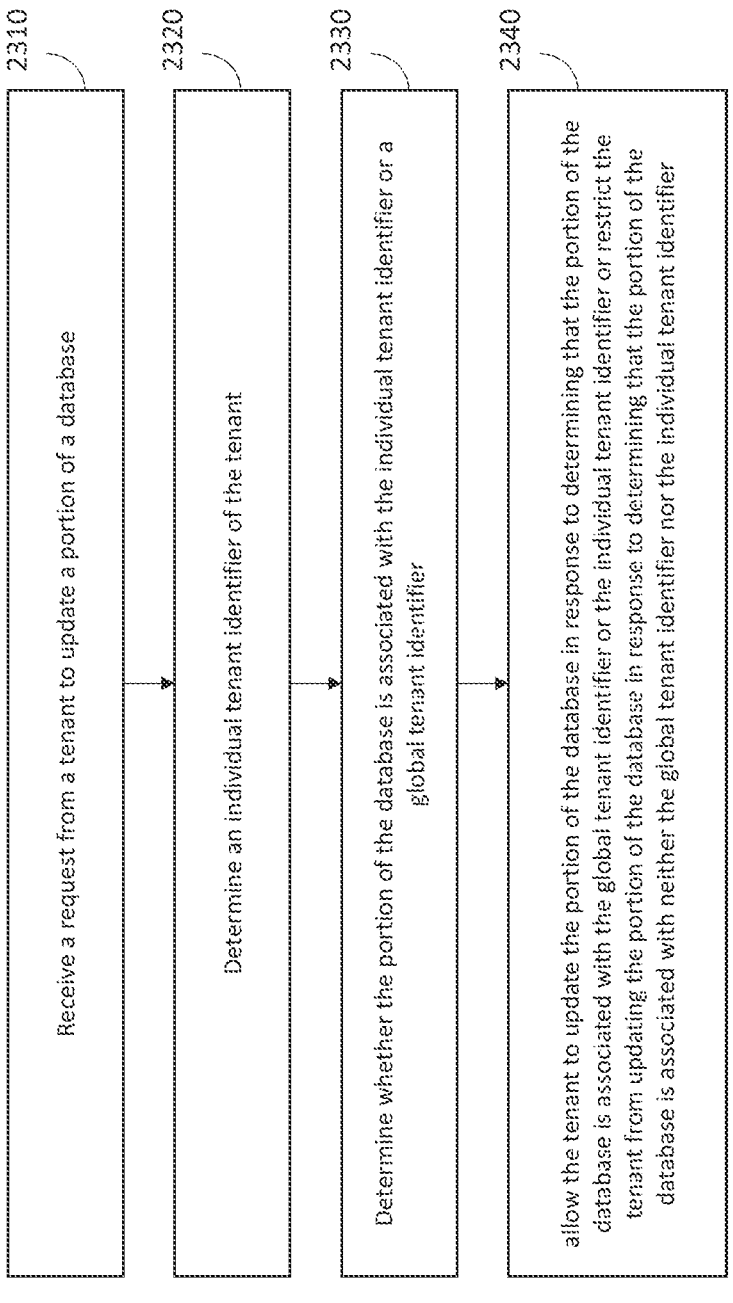

2310 — Receive a request from a tenant to update a portion of a database

2320 — Determine an individual tenant identifier of the tenant

2330 — Determine whether the portion of the database is associated with the individual tenant identifier or a global tenant identifier 2340 — allow the tenant to update the portion of the database in response to determining that the portion of the database is associated with the global tenant identifier or the individual tenant identifier or restrict the tenant from updating the portion of the database in response to determining that the portion of the database is associated with neither the global tenant identifier nor the individual tenant identifier

Identify permissible interval "I1" = "A1" (advance) + "D1" (delay)    2510

Identify number of buckets "N" = 24 x 60 (mins a day) / "I1" (interval) or 24x60x60 (seconds a day)/ "I1"    2520

Schedule "N" events a day recurring daily    2530

Create metadata entry for each bucket depending on periodicity in memory    2540

End

Identify Bucket : Advance or delay E1 , E2 to nearest bucket

2610

Update metadata of respective buckets

2620

2600

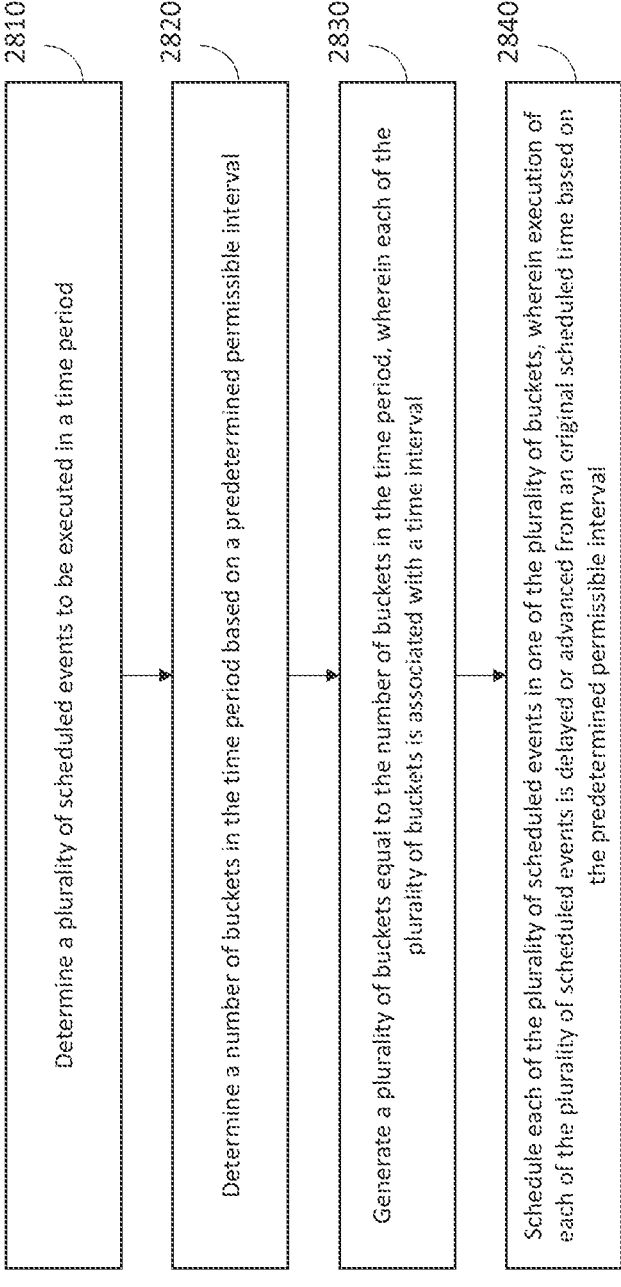

2810

Determine a plurality of scheduled events to be executed in a time period

2820

Determine a number of buckets in the time period based on a predetermined permissible interval

2830

Generate a plurality of buckets equal to the number of buckets in the time period, wherein each of the plurality of buckets is associated with a time interval

2840

Schedule each of the plurality of scheduled events in one of the plurality of buckets, wherein execution of each of the plurality of scheduled events is delayed or advanced from an original scheduled time based on the predetermined permissible interval

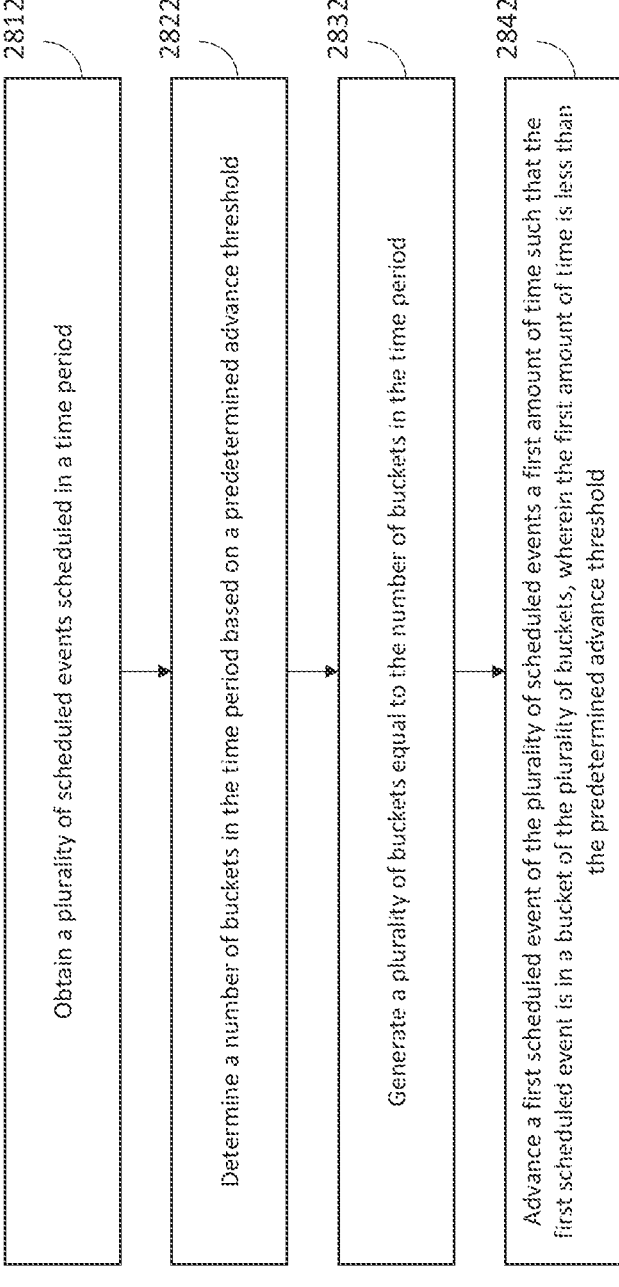

2802

2812

Obtain a plurality of scheduled events scheduled in a time period

2822

Determine a number of buckets in the time period based on a predetermined advance threshold

2832

Generate a plurality of buckets equal to the number of buckets in the time period

2842

Advance a first scheduled event of the plurality of scheduled events a first amount of time such that the first scheduled event is in a bucket of the plurality of buckets, wherein the first amount of time is less than the predetermined advance threshold

FIG. 28B

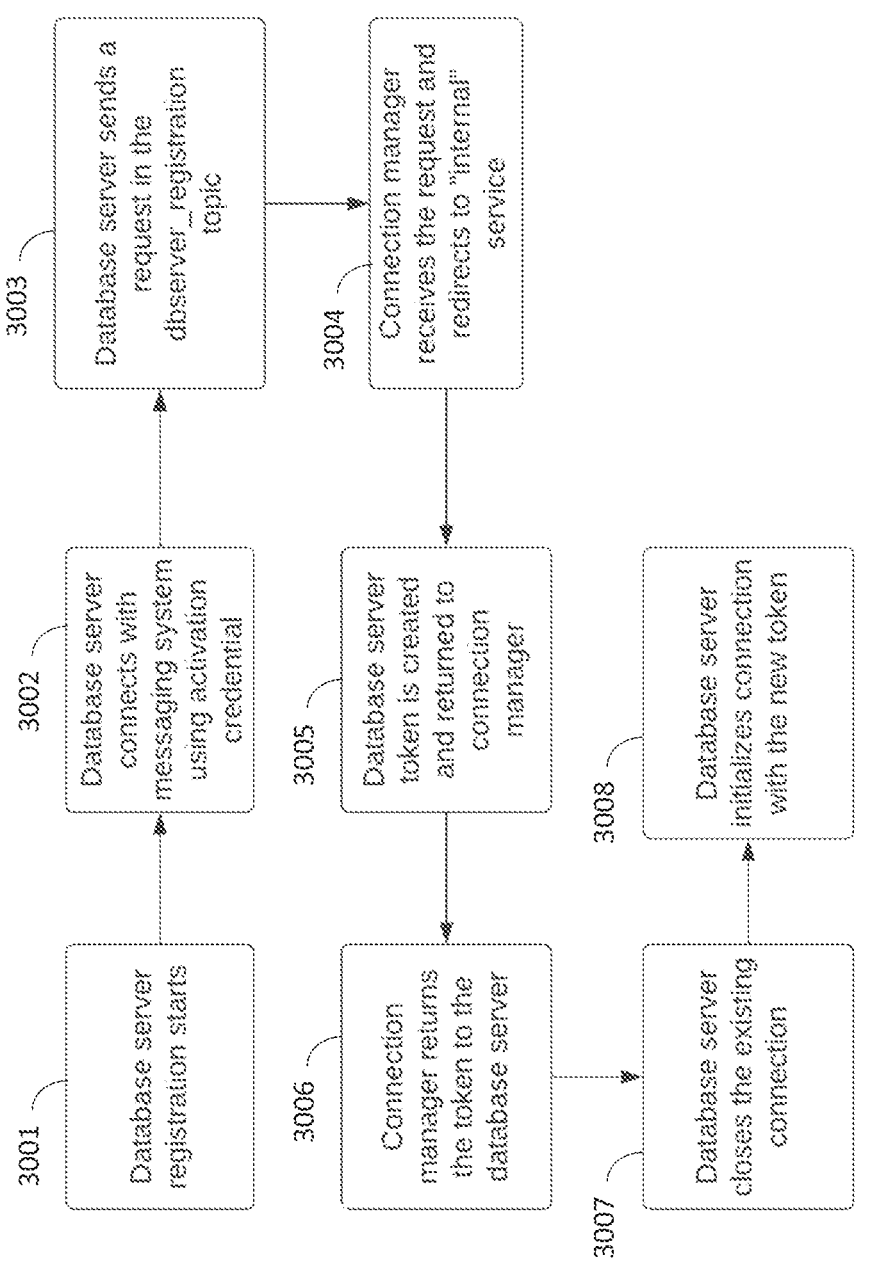

3001 Database server registration starts

3002 Database server connects with messaging system using activation credential

3003 Database server sends a request in the dbserver_registration_topic

3004 Connection manager receives the request and redirects to "internal" service 3005 Database server token is created and returned to connection manager 3006 Connection manager returns the token to the database server 3007 Database server closes the existing connection 3008 Database server initializes connection with the new token

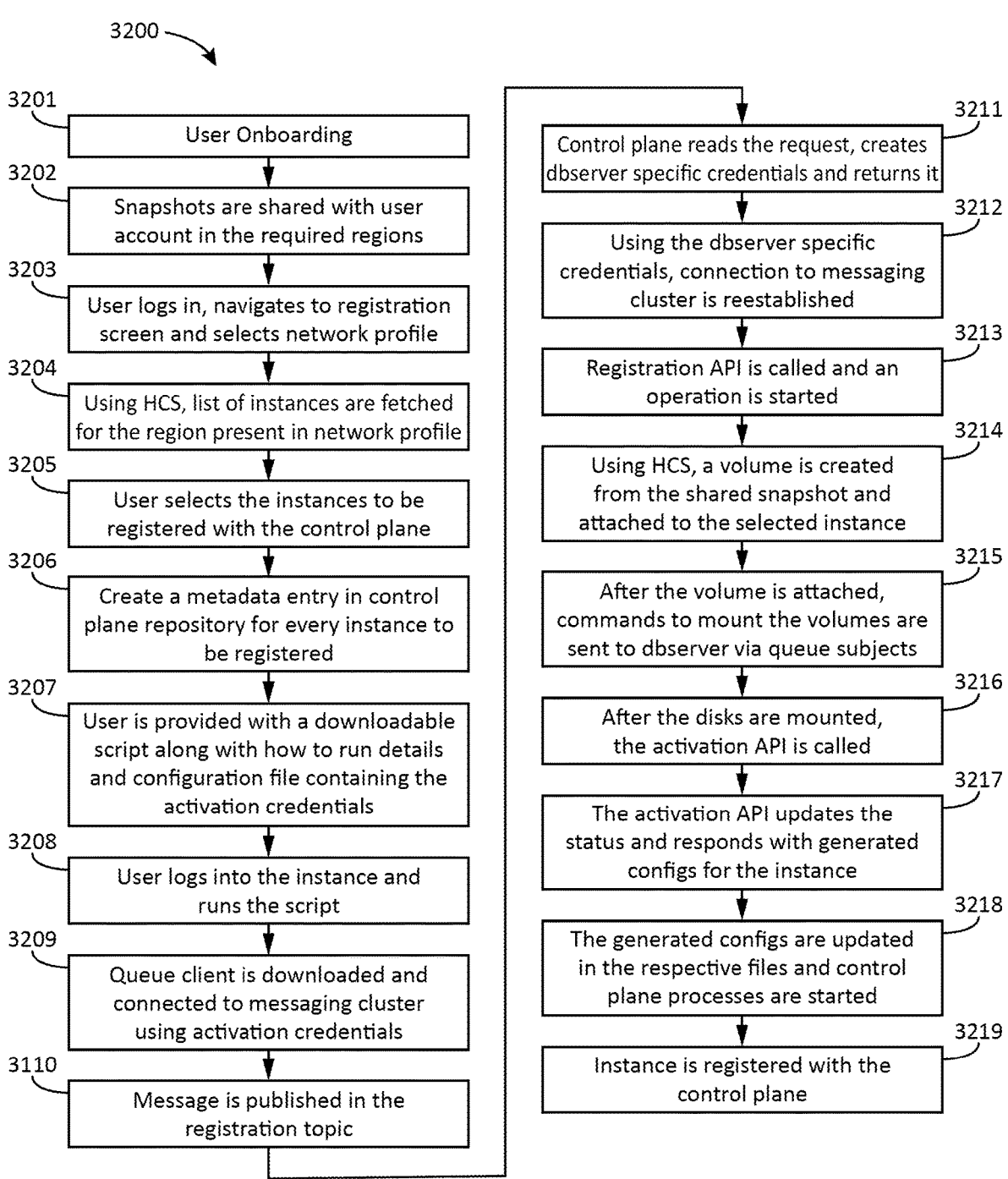

3200

3201 — User Onboarding

3202 — Snapshots are shared with user account in the required regions

3203 — User logs in, navigates to registration screen and selects network profile 3204 — Using HCS, list of instances are fetched for the region present in network profile 3205 — User selects the instances to be registered with the control plane 3206 — Create a metadata entry in control plane repository for every instance to be registered 3207 — User is provided with a downloadable script along with how to run details and configuration file containing the activation credentials 3208 — User logs into the instance and runs the script 3209 — Queue client is downloaded and connected to messaging cluster using activation credentials 3110 — Message is published in the registration topic 3211 — Control plane reads the request, creates dbserver specific credentials and returns it 3212 — Using the dbserver specific credentials, connection to messaging cluster is reestablished 3213 — Registration API is called and an operation is started 3214 — Using HCS, a volume is created from the shared snapshot and attached to the selected instance 3215 — After the volume is attached, commands to mount the volumes are sent to dbserver via queue subjects 3216 — After the disks are mounted, the activation API is called 3217 — The activation API updates the status and responds with generated configs for the instance 3218 — The generated configs are updated in the respective files and control plane processes are started 3219 — Instance is registered with the control plane

3301 — User logs in

3302 — User selects the database and region to be provisioned

3303 — Operation is initiated

3304 — Using HCS, an instance is created with the user data property (cloud init) set.

The cloud-init will be configured to download and run the registration script with the activation credential for user 3305 — On bootup, the user data property is executed

3108

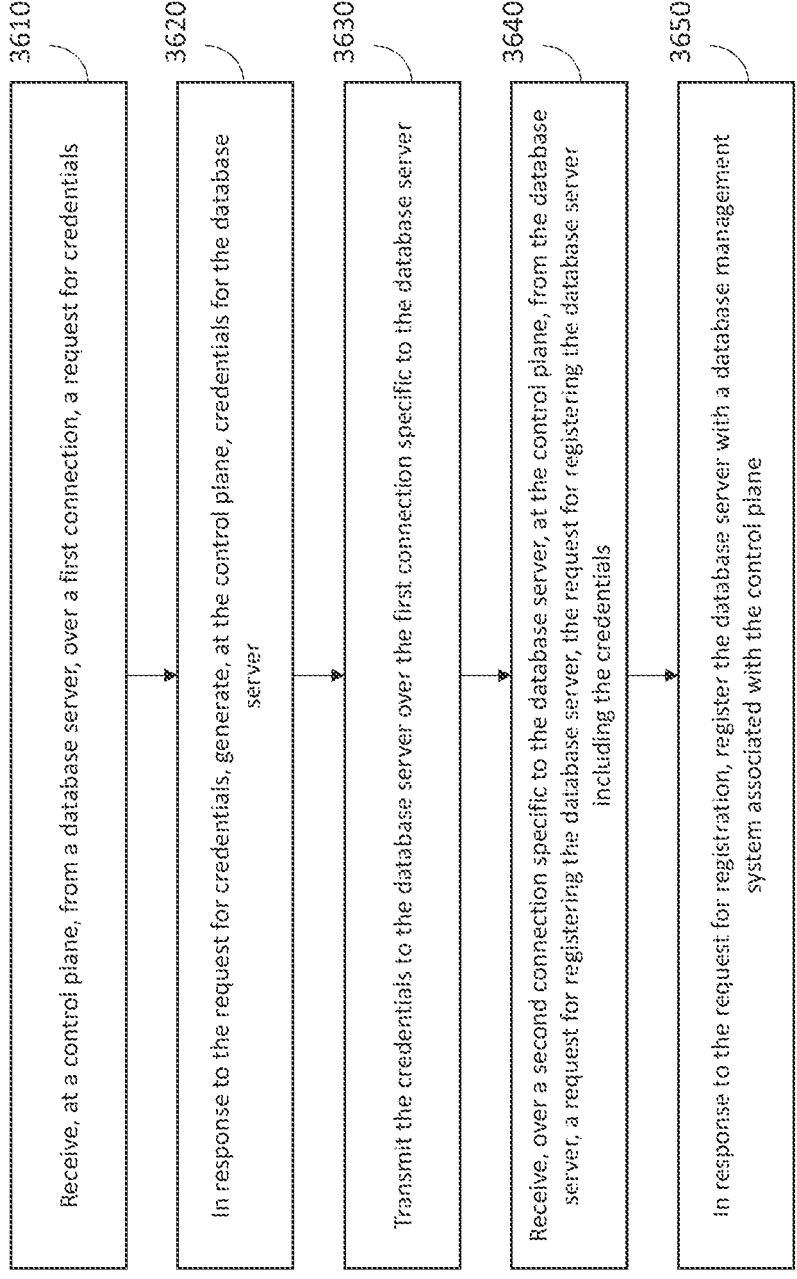

3610
Receive, at a control plane, from a database server, over a first connection, a request for credentials 3620
In response to the request for credentials, generate, at the control plane, credentials for the database server 3630
Transmit the credentials to the database server over the first connection specific to the database server 3640
Receive, over a second connection specific to the database server, at the control plane, from the database server, a request for registering the database server, the request for registering the database server including the credentials 3650
In response to the request for registration, register the database server with a database management system associated with the control plane

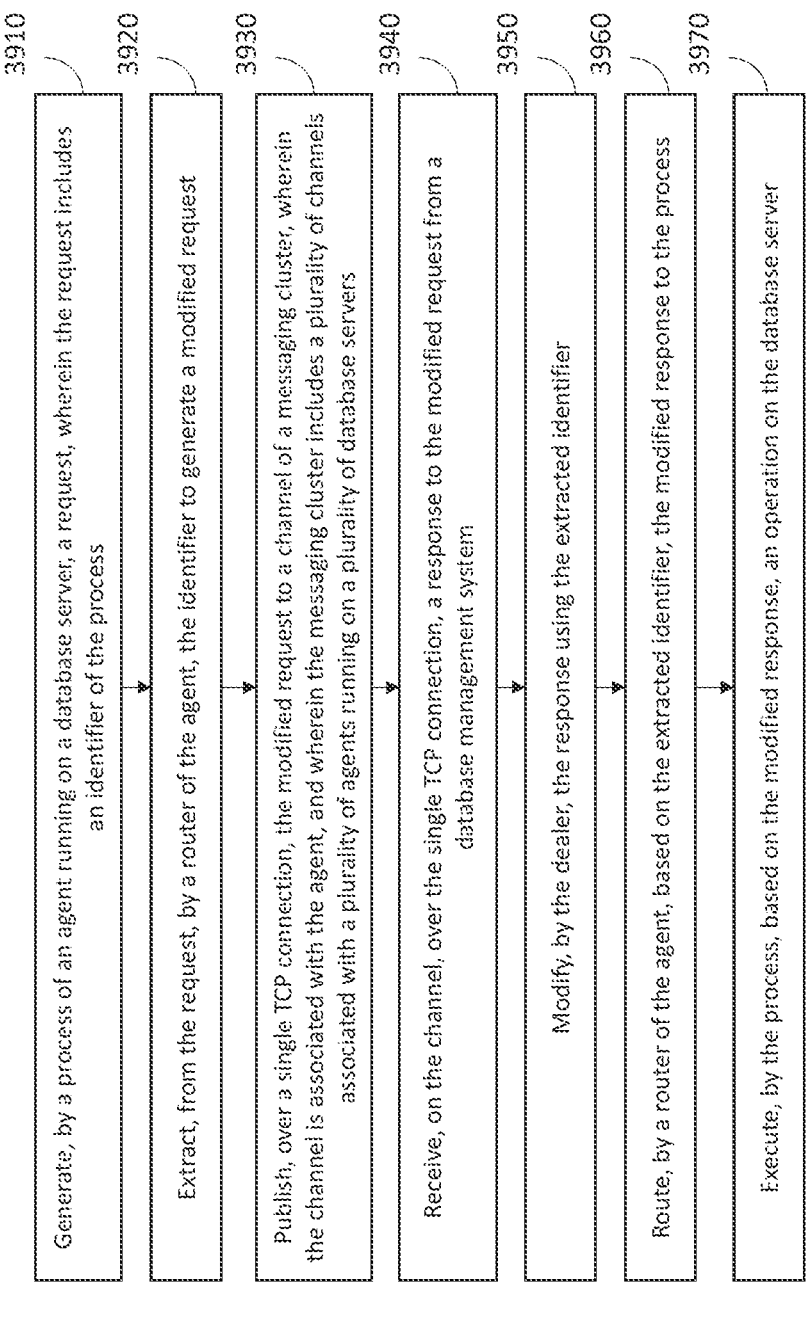

3910

Generate, by a process of an agent running on a database server, a request, wherein the request includes an identifier of the process

3920

Extract, from the request, by a router of the agent, the identifier to generate a modified request

3930

Publish, over a single TCP connection, the modified request to a channel of a messaging cluster, wherein the channel is associated with the agent, and wherein the messaging cluster includes a plurality of channels associated with a plurality of agents running on a plurality of database servers

3940

Receive, on the channel, over the single TCP connection, a response to the modified request from a database management system

3950

Modify, by the dealer, the response using the extracted identifier

3960

Route, by a router of the agent, based on the extracted identifier, the modified response to the process

3970

Execute, by the process, based on the modified response, an operation on the database server

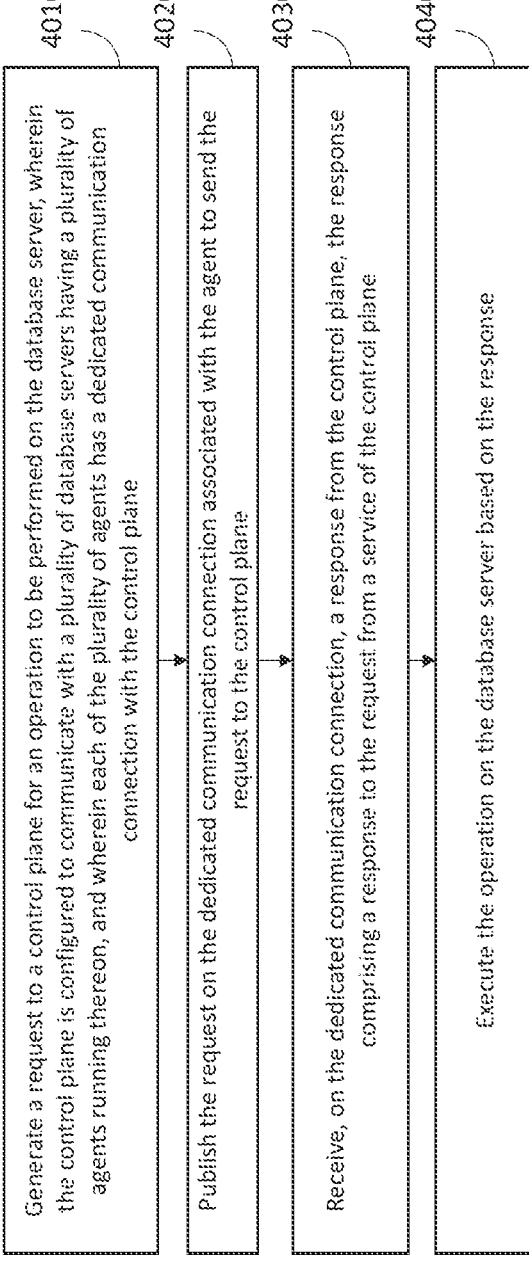

4000

Generate a request to a control plane for an operation to be performed on the database server, wherein the control plane is configured to communicate with a plurality of database servers having a plurality of agents running thereon, and wherein each of the plurality of agents has a dedicated communication connection with the control plane

4010

Publish the request on the dedicated communication connection associated with the agent to send the request to the control plane

4020

Receive, on the dedicated communication connection, a response from the control plane, the response comprising a response to the request from a service of the control plane

4030

Execute the operation on the database server based on the response

DATABASE SERVER AGENT

CROSS-REFERENCE TO RELATED APPLICATIONS

This application claims priority to Indian Provisional Patent Application No. 202241035876, filed Jun. 22, 2022, the entirety of which is incorporated by reference herein.

BACKGROUND

Database as a service (DBaaS) allows users to utilize the functionality of a database without requiring the users to supply servers on which to host the database. A host of a DBaaS product may provide servers on which user databases are hosted. Database management software may facilitate use and maintenance of database servers.

SUMMARY

Aspects of the present disclosure are directed to a database management system including a control plane comprising a memory having computer-readable instructions stored thereon and processor that executes computer-readable instructions to execute one or more services running on the control plane, the control plane connected to a plurality of database servers, wherein each of the plurality of database servers is connected to the control plane via a communication channel, wherein the control plane comprises a plurality of data streams, each of the plurality of data streams configured to communicate messages of a designated type, and wherein the control plane is configured to communicate with a database server of the plurality of database servers using the plurality of data streams and the communication channel associated with the database server and the control plane.

Aspects of the present disclosure are directed to a system including a memory having computer-readable instructions stored thereon, and a processor of a control plane that executes the computer-readable instructions to, receive a request from a tenant to update a portion of a database, determine an individual tenant identifier of the tenant, determine whether the portion of the database is associated with the individual tenant identifier or a global tenant identifier, and allow the tenant to update the portion of the database in response to determining that the portion of the database is associated with the global tenant identifier or the individual tenant identifier or restrict the tenant from updating the portion of the database in response to determining that the portion of the database is associated with neither the global tenant identifier nor the individual tenant identifier.

Aspects of the present disclosure are directed to a system including a memory having computer-readable instructions stored thereon, and a processor that executes the computer-readable instructions to determine a plurality of scheduled events to be executed in a time period, determine a number of buckets in the time period based on a predetermined permissible interval, generate a plurality of buckets equal to the number of buckets in the time period, wherein each of the plurality of buckets is associated with a time interval, and schedule each of the plurality of scheduled events in one of the plurality of buckets, wherein execution of each of the plurality of scheduled events is delayed or advanced from an original scheduled time based on the predetermined permissible interval.

Aspects of the present disclosure are directed to a system including a memory having computer-readable instructions stored thereon, and a processor of a control plane that executes the computer-readable instructions to receive from a database server, over a first connection, a request for credentials, in response to the request for credentials, generate credentials for the database server, transmit the credentials to the database server over a second connection specific to the database server, receive, over the second connection, from the database server, a request for registering the database server, the request for registering the database server comprising the credentials, in response to the request for registering the database server, register the database server with a database management system associated with the control plane.

Aspects of the present disclosure are directed to a system comprising a memory having computer-readable instructions stored thereon, and a processor of a database server, the processor executing the computer-readable instructions to generate a request to a control plane for an operation to be performed on the database server, wherein the control plane is configured to communicate with a plurality of database servers having a plurality of agents running thereon, and wherein each of the plurality of agents has a dedicated communication connection with the control plane, publish the request on the dedicated communication connection associated with the agent to send the request to the control plane, receive, on the dedicated communication connection, a response from the control plane, the response comprising a response to the request from a service of the control plane, and execute the operation on the database server based on the response.

BRIEF DESCRIPTION OF THE DRAWINGS

FIG. 20 is an example flowchart illustrating operations of a method for making an API call to a public cloud using a grouped network profile, in accordance with some embodiments of the present disclosure.

FIG. 21 is an example flowchart illustrating operations of a method for processing, by the control plane of the database management system of FIG. 2, a request from a database server, in accordance with some embodiments of the present disclosure.

FIG. 23 is a flowchart illustrating operations in a method for the control plane of FIG. 2 to isolate messages across tenants of the database management system of FIG. 2, in accordance with some embodiments of the present disclosure.

FIG. 28A is an example flow chart illustrating operations in a method for aggregating scheduled events of the control plane of FIG. 2 in buckets, in accordance with some embodiments of the present disclosure.

FIG. 28B is an example flow chart illustrating operations in a method for aggregating scheduled events of the control plane of FIG. 2 in buckets by advancing one or more of the scheduled events, in accordance with some embodiments of the present disclosure.

FIG. 30 is an example flow chart illustrating operations in a method for registering a database server with the control plane of FIG. 2, in accordance with some embodiments of the present disclosure.

FIG. 32 is an example flow chart illustrating operations in a method for registering a database server with the control plane of FIG. 2 by providing software associated with the database management system in volumes which may be attached to the database server, in accordance with some embodiments of the present disclosure.

FIG. 36 is an example flow chart illustrating operations in a method for registering a database server with the control plane of FIG. 2, in accordance with some embodiments of the present disclosure.

FIG. 39 is an example flow chart illustrating operations in a method for communication between multiple processes of an agent of the control plane of FIG. 2 running on a database server and over a single connection, in accordance with some embodiments of the present disclosure.

FIG. 40 is an example flow chart illustrating operations in a method for communication between a database server and the control plane of FIG. 2 over a single connection, in accordance with some embodiments of the present disclosure.

Figure 1:
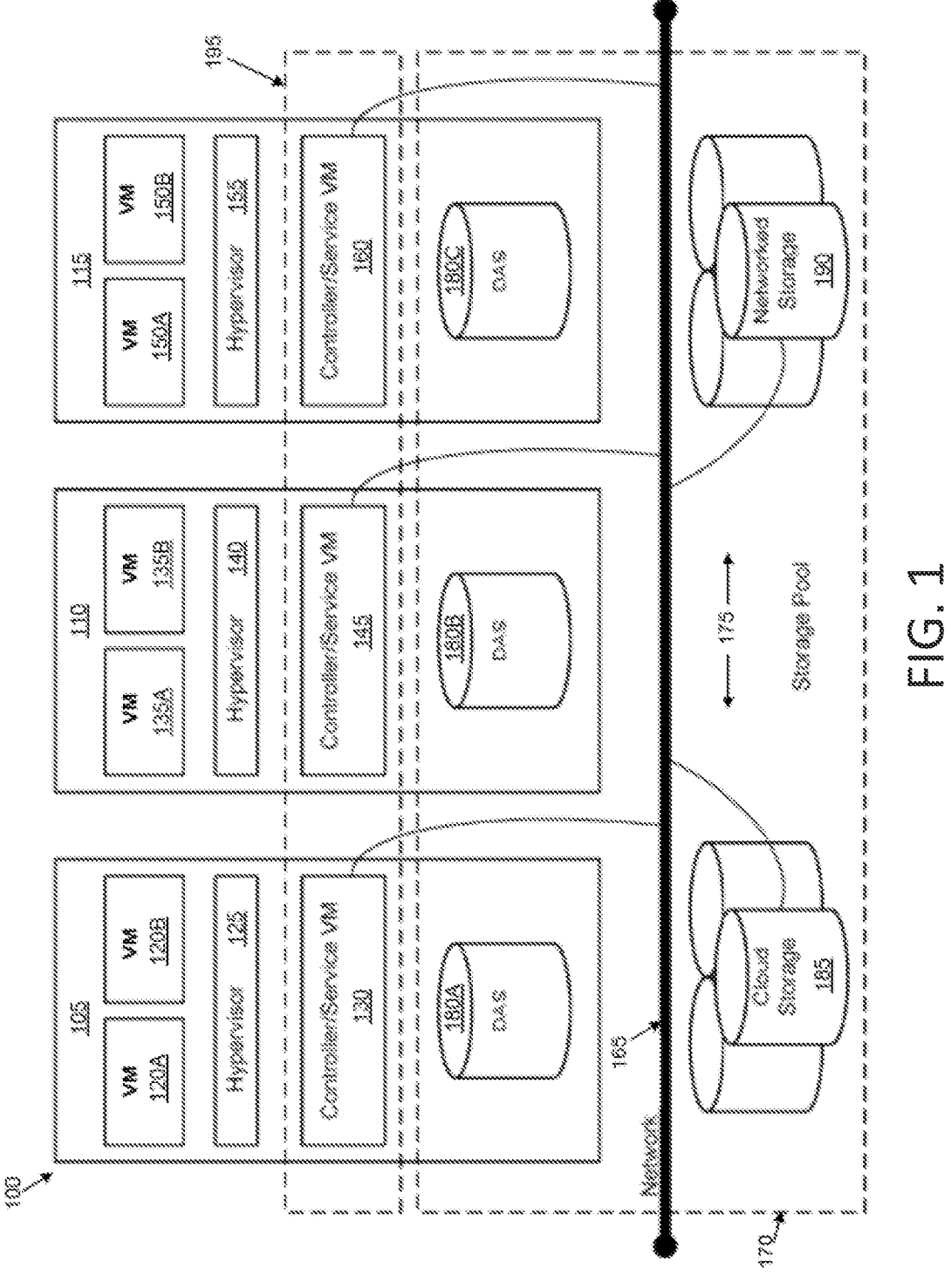
FIG. 1 illustrates an example cluster of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Embodiments of the present disclosure represent technical improvements over conventional database management systems. Communicating with a database server over a single connection reduces the number of connections required for a database management system control plane. For example, if each process running on a database server utilizes its own connection with the control plane, the control plane may require dozens of connections with each database server. Utilizing a single connection between the control plane and each database server reduces the number of open connections with the control plane, reducing resource consumption and increasing the security of the control plane. A messaging cluster may be used to receive messages at the control plane from the database servers. Each database server may send and receive messages from the control plane on topics of the messaging cluster unique to the database server. Use of topics unique to each database server increases the security of the control plane, as database servers cannot interfere with each other's messages or affect operations not communicated over their specific topics. Additionally, using a messaging cluster to receive messages on the control plane from database servers may serve to isolate tenants of the database management system, as messages received over database-server-specific topics may be associated with specific tenants. Furthermore, using a messaging cluster to receive messages on the control plane from database servers allows the control plane to communicate with database servers across a variety of public clouds, private clouds, and on-premises solutions.

Use of a global tenant represents a technical improvement over conventional database management systems. Associating common assets with a global tenant reduces memory usage, as common assets used by multiple tenants are not required to be stored as multiple copies, each associated with its own tenant. The global tenant allows multiple tenants of the database management system to quickly access common assets while maintaining isolation of tenant-specific data. Furthermore, enforcing tenant isolation using an execution context of a request to access tenant data in a database has the technical advantage of preventing data leakage. Conventional systems rely upon disparate code sets, often developed by different teams of developers, to coordinate in enforcing tenant isolation. Enforcing tenant isolation using the execution context of the request to access tenant data automatically enforces tenant isolation, regardless of a format of the request. Isolating tenant data using the execution context also allows the database management system to manage databases on systems which do not include tenant isolation parameters, such as on-premises systems.

Aggregating scheduled events has the technical advantage of reducing computational overhead of executing events for managing database in the database management system. Reducing the number of event executions reduces consumption of computing resources, allowing the database management system to more efficiently perform database management actions. Dynamically adapting the aggregation of events allows the database management system to optimize the efficiency of performing database management actions.

Automatically registering databases with the database management system to provide one-click registration of database servers has the technical advantage of reducing registration errors. Automatically registering databases with the database management system streamlines the registration process and ensures that proper communication channels are established between the control plane of the database management system and the database servers. Improper registration may result in missed communications or in security vulnerabilities. Registration failure or improper registration may lead to the database management system being unable to manage the database server.

Referring now to FIG. 1, a cluster 100 of a virtual computing system is shown, in accordance with some embodiments of the present disclosure. The cluster 100 may be incorporated in a cloud based implementation, an on-premise based implementation, or a combination of both. The cluster 100 may be part of a hyperconverged system or any other type of system. The cluster 100 includes a plurality of nodes, such as a first node 105, a second node 110, and a third node 115. Each of the first node 105, the second node 110, and the third node 115 may also be referred to as a "host" or "host machine." The first node 105 includes database virtual machines ("database VMs") 120A and 120B (collectively referred to herein as "database VMs 120"), a hypervisor 125 configured to create and run the database VMs, and a controller/service VM 130 configured to manage, route, and otherwise handle workflow requests between the various nodes of the cluster 100. Similarly, the second node 110 includes database VMs 135A and 135B (collectively referred to herein as "database VMs 135"), a hypervisor 140, and a controller/service VM 145, and the third node 115 includes database VMs 150A and 150B (collectively referred to herein as "database VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165. Further, although not shown, one or more of the first node 105, the second node 110, and the third node 115 may include one or more containers managed by a monitor (e.g., container system). In some embodiments, the controller/service VMs 130, 140, and 155 are not included in the cluster 100. The controller/service VMs 130, 145, and 160 may be in a first domain while the VMs 120, 135, and 150 are in a second domain. In an example, the controller/service VMs 130, 145, 160 are in a first cloud, the VMs 120 are in a second cloud, the VMs 130 are in a third cloud, and the VMs 150 are in a fourth cloud. In another example, the controller/service VMs 130, 140, 150 are in a first AWS account and the VMs 120, 135, and 150 are each in different, separate AWS accounts. Thus, the nodes 105, 110, and 115 may be nodes of various public or private clouds, with the controller/service VMs 130, 145, and 160 being separate from the VMs 120, 135, and 150. In an example, the controller/service VMs 130, 145, and 160 host a distributed control plane for managing the VMs 120, 135, and 150, where the VMs 120, 135, and 150 are database server VMs in public cloud accounts separate from a cloud account associated with the control plane.

The controller/service VMs 130, 145, and 160 can be considered a control plane and the VMs 120, 135, and 150 can be considered a data plane. The data plane may include data which is separate from the control logic executed on the control plane. VMs may be added to or removed from the data plane. AS discussed above, the control plane and the data plane may be in separate cloud accounts. Different VMs in the data plane may be in separate cloud accounts. In an example, the control plane is in a cloud account of a database management platform provider and the data plane is in cloud accounts of customers of the database management platform provider.

The cluster 100 also includes and/or is associated with a storage pool 170 (also referred to herein as storage subsystem). The storage pool 170 may include network-attached storage 175 and direct-attached storage 180A, 180B, and 180C. The network-attached storage 175 is accessible via the network 165 and, in some embodiments, may include cloud storage 185, as well as a networked storage 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be provided within the cluster. Likewise, although only two database VMs (e.g., the database VMs 120, the database VMs 135, the database VMs 150) are shown on each of the first node 105, the second node 110, and the third node 115, in other embodiments, the number of the database VMs on each of the first, second, and third nodes may vary to include other numbers of database VMs. Further, the first node 105, the second node 110, and the third node 115 may have the same number of database VMs (e.g., the database VMs 120, the database VMs 135, the database VMs 150) or different number of database VMs.

In some embodiments, each of the first node 105, the second node 110, and the third node 115 may include a hardware device, such as a server. For example, in some embodiments, one or more of the first node 105, the second node 110, and the third node 115 may include a server computer provided by Nutanix, Inc., Dell, Inc., Lenovo Group Ltd. or Lenovo PC International, Cisco Systems, Inc., etc. In other embodiments, one or more of the first node 105, the second node 110, or the third node 115 may include another type of hardware device, such as a personal computer, an input/output or peripheral unit such as a printer, or any type of device that is suitable for use in a node within the cluster 100. In some embodiments, the cluster 100 may be part of one or more data centers. Further, one or more of the first node 105, the second node 110, and the third node 115 may be organized in a variety of network topologies. Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. In some embodiments, the processing units may execute instructions without first copying the instructions to the RAM. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices that are suitable for a virtual computing system. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the networked storage 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the database VMs 120, the database VMs 135, and the database VMs 150.

Each of the database VMs 120, the database VMs 135, the database VMs 150 is a software-based implementation of a computing machine. The database VMs 120, the database VMs 135, the database VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the database VMs 120, the database VMs 135, the database VMs 150 that may run its own operating system and applications on the underlying physical resources just like a real computer. By encapsulating an entire machine, including CPU, memory, operating system, storage devices, and network devices, the database VMs 120, the database VMs 135, the database VMs 150 are compatible with most standard operating systems (e.g. Windows, Linux, etc.), applications, and device drivers.

Thus, each of the hypervisor 125, the hypervisor 140, and the hypervisor 155 is a virtual machine monitor that allows a single physical server computer (e.g., the first node 105, the second node 110, third node 115) to run multiple instances of the database VMs 120, the database VMs 135, and the database VMs 150 with each VM sharing the resources of that one physical server computer, potentially across multiple environments. For example, each of the hypervisor 125, the hypervisor 140, and the hypervisor 155 may allocate memory and other resources to the underlying VMs (e.g., the database VMs 120, the database VMs 135, the database VM 150A, and the database VM 150B) from the storage pool 170 to perform one or more functions.

By running the database VMs 120, the database VMs 135, and the database VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new database VMs are created (e.g., installed) on the first node 105, the second node 110, and the third node 115, each of the new database VMs may be configured to be associated with certain hardware resources, software resources, storage resources, and other resources within the cluster 100 to allow those virtual VMs to operate as intended.

The database VMs 120, the database VMs 135, the database VMs 150, and any newly created instances of the database VMs may be controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may be considered a local management system configured to manage various tasks and operations within the cluster 100. For example, in some embodiments, the local management system may perform various management related tasks on the database VMs 120, the database VMs 135, and the database VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the database VMs 120, the database VMs 135, the database VM 150A, and the database VM 150B, respectively, and for managing the interactions between those VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications. The network 165 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 105, the second node 110, or the third node 115 may be configured as a leader node. The leader node may be configured to monitor and handle requests from other nodes in the cluster 100. For example, a particular database VM (e.g., the database VMs 120, the database VMs 135, or the database VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 100 to fulfil that request). Upon fulfilling the input/output request, the controller/service VM of the leader node may send a response back to the controller/service VM of the node from which the request was received, which in turn may pass the response to the database VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein. For example, in some embodiments, the VMs 120, 135, and 150 are not in the same nodes as the controller/service VMs 130, 145 155. The VMs 120, 135, and 150 may be located in a different cloud than the controller/service VMs 130, 145 155.

Figure 2:
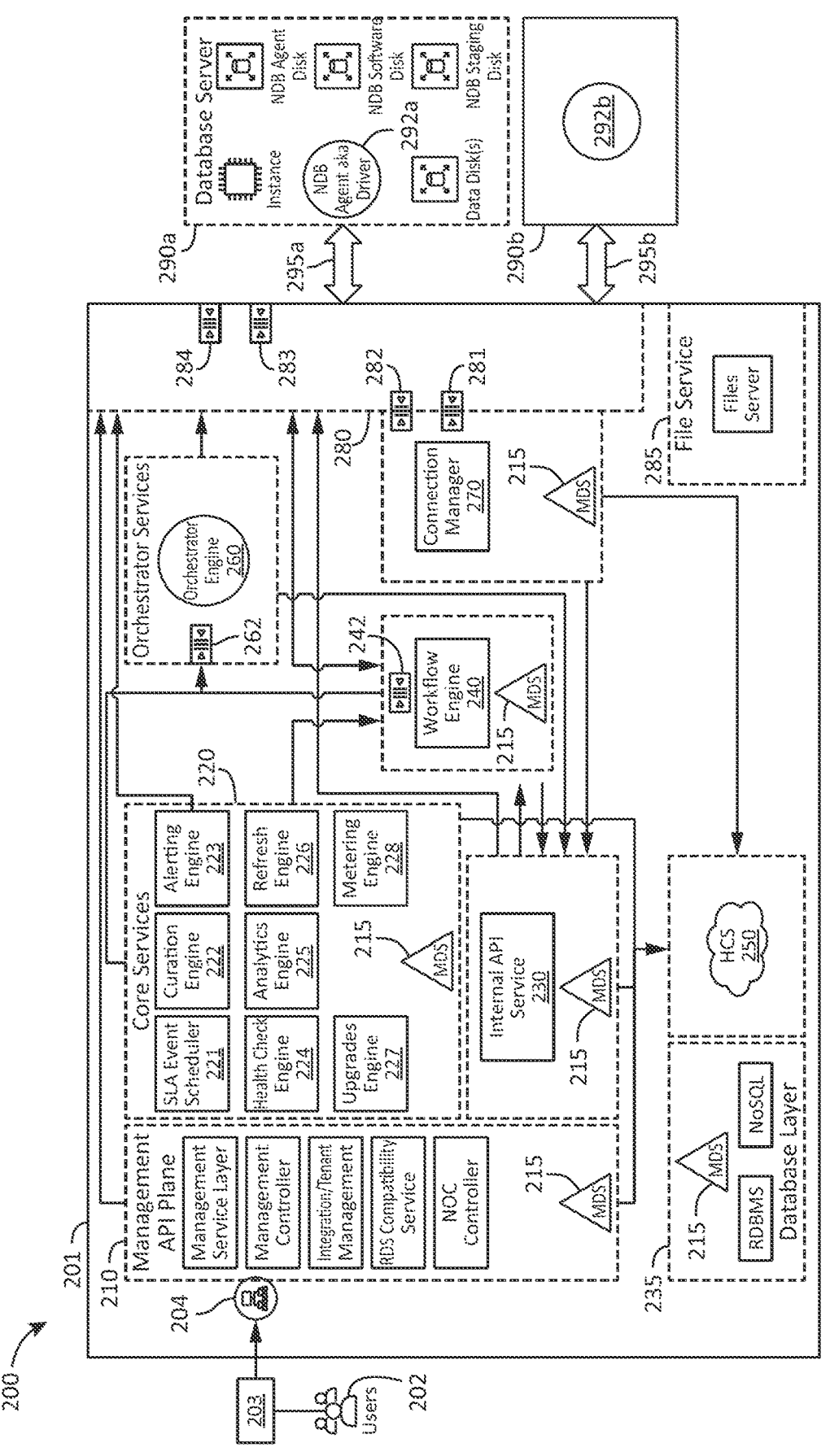
FIG. 2 is an example block diagram of a database management system having a control plane in communication with one or more database servers, in accordance with some embodiments of the present disclosure.

FIG. 2 is an example block diagram of a database management system 200 having a control plane in communication with one or more database servers, in accordance with some embodiments of the present disclosure. The database management system 200 may include a control plane 201. The control plane may be associated with resources (e.g., CPU, memory) of the cluster 100 of FIG. 1 for performing the operations described herein. In some embodiments, the control plane 201 may be hosted on the cluster 100 of FIG. 1. For example, the control plane 201 may be hosted on one or more of the database virtual machines 120 of the cluster 100. The control plane 201 may receive user input from one or more users 202. The one or more users 202 may input the user input using a user interface 203. In some embodiments, the user input may include Application Programming Interface (API) calls, Remote Procedure Calls (RPC), or any other type of input from the one or more users 202. In some embodiments the user input may include a user indication and/or a user selection at the user interface 203. One or more components of the control plane 201 may be displayed on the user interface 203.

The control plane 201 may include a management plane 210. The management plane 210 may receive user inputs (e.g., API calls) from sources external to the control plane 201, such as the one or more users 202. In some embodiments, the management plane 210 may receive the inputs via an application load balancer 204. The control plane may include a plurality of management planes which receive the inputs via the application load balancer 204, which balances the user input among the plurality of management planes. Balancing the user input may include determining a workload of each of the plurality of management planes and routing user input to the plurality of management planes such that each of the plurality of management planes has a substantially equal workload. The management plane 210 may translate the user inputs into a form suitable for the control plane 201 to understand. For example, the management plane 210 may translate or convert external API calls from the one or more users 202 to internal API calls for use within the control plane 201. The external API calls may be different from the internal API calls to prevent the external sources from directly making API calls to components (e.g., services) of the control plane 201, and potentially corrupting the components of the control plane. In this way, internal API calls are not accessible to user-facing external API endpoints. The management plane 210 may translate the external API calls to internal API calls according to a set of predetermined rules. In some embodiments, the internal API calls are used for services of the control plane 201 to communicate with each other to respond to the external API calls. In some embodiments, services of the control plane 201 may communicate with each other by submitting messages to messaging queues, such as the messaging queues of a messaging cluster 280. The management plane 210 may include, but is not limited to, a management service layer, a management controller, an integration and tenant management service, a Relational Database Service (RDS) compatibility service, and a network operations center (NOC) controller. The management plane may include other or additional services. The management plane 210 may include the external, publicly documented, APIs, the internal APIs, and logic for processing and translating the external APIs.

The control plane 201 may include core services 220. The core services 220 may include a service level agreement (SLA) event scheduler 221, a curation system 222, an alerting system 223, a health check system 224, an analytics system 225, a refresh system 226, an upgrades system 227, a metering system 228, and a network operations controller (NOC) system 229. The core services 220 may include additional, fewer, or different services. The core services 220 may operate for all tenants of the database management system 200. The core services 220 may operate for all database servers in communication with the database management system 200. In some embodiments, each database server is a tenant of the database management system 200. The core services 220 may communicate with each other. In some embodiments, the cores services 220 may communicate with other components of the control plane 201. For example, the core services 220 may share a state of an operation or request with each other and/or with other components of the control plane 201. The core services 220 may identify tasks or operations that need to be executed by the control plane 201. The core services 220 may execute the tasks or operations that need to be executed. The core services 220 may send the tasks or operations that need to be executed to a workflow system 240 or an orchestrator system 260 of the control plane 201 for execution.

The SLA event scheduler 221 may trigger snapshot operations (e.g., capturing snapshots) for a database server 290a in communication with the control plane 201 based on an SLA associated with the database server. The SLA event schedule 221 may trigger log-catchup operations (e.g., capturing transactional logs) for the database server 290a based on the SLA. The SLA event scheduler 221 may trigger snapshot and/or log-catchup events and push an operation skeleton to the workflow system 240 or orchestrator system 260 for execution. An operation skeleton may include fields which may be filled by the workflow system 240 and/or the orchestrator system 260 with actions of an operation.

The curation system 222 may create curation operations which are pushed to the workflow system or the orchestrator system 260 for execution. The curation system 222 may run periodically at a predefined frequency. For example, the curation system 222 may run once every hour. The curation system 222 may check snapshots and/or log backups of the database server 290*a*. The curation system 222 may trigger a curation operation if a snapshot and/or log backup falls outside of the SLA of the database server 290*a* and push an operation skeleton to the workflow system 240 or orchestrator system 260 for execution. A curation operation may include generating a snapshot based on a user request.

The alerting system 223 may raise alerts for events (e.g., asynchronous or synchronous events), such as operation failures. The alerting system 223 may receive alerts from other services of the core services 220. The services of the core services may raise alerts and/or send information to the alerting system 223 for the alerting system to raise an alert based on the information. The alerting system 223 may include an alerts queue. Services of the core services 220 and/or users may push alert data to the alerts queue for the alerting system to raise an alert based on the alert data. Raising the alert may include identifying one or more services and/or users and sending the alert to the one or more services and/or users.

The health check system 224 may periodically create health check operations to check a health of the cluster on which the control plane 201 is hosted and/or a health of a database server in communication with the control plane 201. The health check system 224 may create health check operations at a predetermined frequency. For example, the health check system 224 may create health check operations each hour. The health check system 224 may send the created operations to the workflow system 240 or the orchestrator system 260 for execution. The health check system 224 may execute health check operations. In some embodiments, the health check system 224 may execute health check operations based on a frequency and/or complexity of the heal check operations. For example, the health check system 224 may execute basic and frequent checks such as a cluster health check and a database server health check. In some embodiments, results of the health check operations may be sent to the alerting system 223 to raise an alert based on the results. For example, the results may indicate that a database server is offline or failing and the alerting system 223 may raise an alert to the curation engine 222 to restore the database server and/or to a user to notify the user of the offline or failing database server.

The analytics system 225 may periodically collect management information from the control plane 201 and push the management information to an analytics system. In some embodiments, collecting information from the control plane 201 may include polling the control plane 201 for updates to the management information. The management information may include information on operations executed by the control plane 201 to manage the database server 290*a*. For example, the management information may include a health of the database server 290*a*, backups of the database server 290*a*, when the backups of the database server 290*a* were generated, a UUID of the database server 290*a*, data streams associated with the database server 290*a*, and metadata of objects on the database server 290*a*. The analytics system 225 may be configured as a telemetry agent to collect data.

The control plane 201 may include a database layer 235. The database layer 235 may include one or more administration databases for storing management information from the database server 290*a*. The one or more administration databases may include metadata of objects on the database server 290*a* and the database server 290*b*. The control plane 201 may use the metadata of the objects on the database server 290*a* and the database server 290*b* to track and manage the objects on the database servers 290*a*, 290*b*. The database layer 235 may include one or more relational database management systems for managing the one or more administration databases. For example, the database layer 235 may include PostgreSQL, NoSQL, RDBMS, etc.

The refresh system 226 may manage refresh schedules for clones of the database server 290*a*. Refreshing a clone may include updating a clone of a database with a newer version of the database. For example, a clone of a database on the database server 290*a* may be refreshed to a more recent snapshot of the database on the database server 290*a*. The refresh may be synchronous or asynchronous. A synchronous refresh may including freezing the database to refresh the clone and an asynchronous refresh may include not freezing the database but to refresh the clone. The refresh system 226 may generate operations for refreshing the clones according to a user-defined schedule. For example, the refresh system 226 may generate operations for refreshing the clones based on user input. The user-defined schedule may include expiration dates for the clones. The refresh system 226 may generate operations for deleting the clones according to their expiration dates. For example, a clone with a lifetime of 30 days may be deleted 30 days after the clone is generated. The refresh system 226 may push the refresh operations and deletion operations to the workflow system 240 or the orchestrator system 260.

The upgrades system 227 may manage upgrades to an agent 292*a* of the control plane 201 running on the database server 290*a*. The upgrades system 227 may upgrade the agent 292*a* periodically according to a predetermined schedule. The upgrades system 227 may upgrade the agent 292*a* on-demand. The upgrades system 227 may push upgrade operations to the workflow system 240 or the orchestrator system 260 for execution.

The metering system 228 may collect metering data for the database server 290*a* such as total uptime within a billing cycle, pausing and resuming virtual machines of the database server 290*a*, and scaling up or down of an instance 294 of the database server 290*a*. The metering system 228 may transmit the metering data to a metering service and/or a billing service. The metering system 228 may transmit events from the metering data to the metering service and/or the billing service. In some embodiments, the events may be aggregated metering data.

The control plane 201 may include an internal API service 230. The internal API service 220 may be available to components of the control plane 201 and the database server 290*a* via a connection manager 270. The internal API service 220 is not available to external users. The internal API service 230 may map to internal APIs, public APIs used by the agent 292*a*, and new functionality for consumption within the control plane 201. The internal API service 230 may receive API calls from the components of the control plane 201 and the database server 290*a* via the connection manager 270. For example, the internal API service 230 may receive API calls from the workflow system 240 for executing operations. The internal API service 230 may be insulated from external sources such that the internal API service 230 is not accessible via public interfaces of the control plane 201. In some embodiments, the internal API service 230 may include multiple services, such as an operations service and a metadata access service. The multiple services may scale independently of each other. The internal API service 230 may be split into the multiple services based on implementation requirements of the control plane 201.

The control plane 201 may include the workflow system 240. The workflow system 240 may process events generated by the core services 220, as discussed herein. The workflow system 240 may generate operations based on events or operation skeletons generated by the cores services 220. The workflow system 240 may generate the operations to be executed within the context of a tenant, or within a tenant context. The workflow system 240 may be associated with a workflow queue 242. Events generated by the core services 220 are pushed to the workflow queue 242 for the workflow system 240 to convert them into operations.

The control plane 201 may include a hybrid cloud abstraction service (HCS) 250. The HCS 250 may receive requests from the connection manager 270 which originate from the core services 220 or the database server 290a. The HCS 250 may receive requests from the cores services 220 directly. The HCS may receive requests from the data base server 290a via the connection manager 270. The HCS 250 may receive requests which require making one or more API calls to cloud services external the control plane 201. The external cloud services may include public clouds, private clouds, and on-premise systems. The HCS 250 may provide an API to make API calls to the external cloud services. The HCS 250 may make the API calls to the external cloud services using the API. For example, the HCS 250 may make an API call to a cloud service on a public cloud to create an instance of a database on the public cloud.

The control plane 201 may include the orchestration system 260. The orchestration system 260 may execute operations from the core services 220 and/or the workflow system 240. The orchestration system 260 receives certain operations, as discussed herein, directly from the core services 220. The orchestration system 260 receives other operations, as discussed above, from the workflow system 240, as discussed herein. For example, the orchestration may execute operations including, but not limited to, provisioning, cloning, curation, and health checks. The orchestration system 260 may be associated with an orchestration queue 262. Operations sent to the orchestration system 260 may be pushed to the orchestration queue to be executed by the orchestration system 260. In some embodiments, the orchestration system 260 spawns a Python process per operation to be executed. The Python process may be responsible for orchestrating the process end to end.

The control plane 201 may include the connection manager 270. The connection manager may serve as a proxy for the database server 290a, or VMs running on the database server 290a. The connection manager 270 may listen for a message including an API call made by the agent 292a on a messaging cluster 280 and identify a message payload or content of the message by parsing the message payload. The connection manager 270 may listen to all topics on the messaging cluster 280 associated with the database server 290a. The connection manager 270 may generate a modified message from the message payload and send the modified message to one or more components of the control plane 201. For example, the connection manager 270 may generate an HTTP message from the message payload and send the HTTP message to one or more components of the control plane 201. In an example, the connection manager 270 generates an API call based on an HTTP method type, HTTP headers, a URL and a body from the message body and sends the API call to the HCS 250. The connection manager 270 may receive a reply to the modified message and send the reply to the agent 292a. The connection manager 270 may fetch certain information for generating the modified message. For example, the connection manager 270 may fetch cloud credentials for generating the modified message from the HCS service 250. In some implementations, the connection manager 270 may fetch a tenant ID of a tenant associated with the database server 290a and/or a database server ID associated with the database server 290a. The connection manager 270 may validate the request from the database server 290a. The connection manage 270 may compare a tenant identifier and a VM identifier in the message payload to the channel or topic of the messaging cluster 280 on which the message was received. For example, the connection manager 270 may scope the request from the database server 290a to the tenant and a VM of the database server 290a such that the VM cannot modify a status of an operation not being executed by the VM. The database server 290a and/or the agent 292a may be an untrusted entity to the control plane 201. Scoping the requests from the agent 292a and the database server 290a causes the requests to be processed in a limited context, mitigating harm caused by malicious requests.

In some embodiments, the connection manager 270 may obtain the tenant ID from a topic of the messaging cluster 280 on which the message was published. For example, the topic may be named "abc.xyz. request," where "abc" may be the tenant ID and "xyz" may be the database server ID. The tenant ID may be an identifier of a tenant of the control plane 201. The database server ID may be an identifier of the database server 290a. The database server 290a may be associated with the tenant having the tenant ID. In other embodiments, the connection manager 270 may obtain the tenant ID from a database server table on the control plane 201 which maps the database server ID to the tenant. The tenant ID may be needed in API calls the connection manager 270 makes to the internal API service 230. The internal API service 230 may use the tenant ID to enable row-level security (RLS). In some embodiments, the connection manager 270 may obtain an owner ID for modifying the message or generating the API call. The owner ID for the database server 292a may be a user ID of a user who provisioned the database server 292a. The user may be a user within a tenant account. In some embodiments, the connection manager 270 obtains the owner ID from the database server table which maps the database server ID to the owner ID. In other embodiments, the connection manager 270 obtains the owner ID in the message. For example, the owner ID may be in a header of the message from the agent 292. The owner ID may be needed in API calls the connection manager 270 makes to the internal API service 230. The internal API service 230 may use the owner ID to enforce role-based access control (RBAC).

The connection manager 270 may rate limit the VM of the database server 290a such that the VM cannot overwhelm the control plane 201. For example, the connection manager 270 may limit a number of messages accepted by the control plane 201 from the VM of the database server 290a within a period of time. The connection manager 270 may track metadata for each VM of the database server 290a. Based on the metadata, system alerts may be triggered by the alerting system 223, as discussed herein. For example, the connection manager may track a last seen time of a VM of the database server 290a and generate an alert if the last seen time exceeds a predetermined threshold. For example, the connection manager 270 may track when the connection manager 270 last received a message from the VM of the database server 290*a* to determine the last seen time of the VM. In some implementations, the connection manager 270 may include a plurality of connection managers. The plurality of connection managers may form a queue group from which a particular queue group is selected to receive a particular message from the database server 290*a*. In an example, the database server 290*a* sends a message to the control plane 201 using the messaging cluster 280. A connection manager of the plurality of connection managers in the queue group is selected to fetch the message. The queue group of connection managers may improve a scaling capability and availability of the connection manager relative to a single copy of the connection manager 270.

The control plane 201 may include a metadata store (MDS) 215. The MDS 215 may send and receive metadata from stateful components of the control plane 201, such as the core services 220. Stateful components of the control plane 201 may store a state with each other, such as a state of an operation or a database server. The MDS 215 may communicate with the management plane 215, the core services 220, the internal API service 230, the workflow system 240, and the connection manager 270. The MDS 215 may fetch a tenant ID from an execution context of a request, as discussed herein. The MDS 215 may set a variable with the tenant ID in a connection to the MDS 215. The tenant ID may be used to scope the request to a tenant associated with the tenant ID.

The control plane 201 may include the messaging cluster 280. In some embodiments, the messaging cluster 280 may include or be based on a messaging platform. A messaging cluster may be infrastructure which allows for data exchange segmented in the form of messages. For example, NATS is a messaging cluster platform. A messaging cluster server may be a compute instance that provides the functionality of a messaging cluster. The messaging cluster 280 may be a messaging service on the control plane 201. The messaging cluster 280 may be a client application that publishes and receives requests and replies between instances of the client application or between separate applications, such as the services of the control plane 201. The messaging cluster 280 may implement a control channel 295*a* over a single communication connection (e.g., a single transmission control protocol (TCP) connection). The communication connection between the database server 290*a* and the control plane 201 may be configured for control message exchange. For example, in some embodiments, the communication connection may be configured to facilitate two types of communications: (1) control plane initiated communication, which may include a request-response type communication and operation queuing; and (2) database server initiated communication, which may include request-response type communication. Request-response type communication may include sending a request and waiting for a response. Operation queuing may include sending an operation to a queue to be fetched and executed. The control channel 295*a* may be a communication channel between the database server 292*a* and the control plane 201. The control channel 295*a* may be a dedicated communication channel between the database server 292*a* and the control plane 201. The control channel 295*a* may include multiple topics for requests and operations between the database server 290*a* and the control plane 201. The multiple topics may organize messages on the messaging cluster 280 into various designated types, as discussed herein. For example, the designated types may include command messages for sending commands to the database server 290*a*, operations messages for sending operations to the database server 290*a*, and request messages for receiving requests from the database server 290*a*. The messaging cluster 280 may allow the control channel 295*a* to be implemented over the single TCP connection, as messages to various components of the control plane 201 are received by the messaging cluster and routed to the various components by the connection manager 270. Each database server may include a database server VM which has a single TCP/HTTPS connection with the control plane 201. The messaging cluster 280 may authenticate and authorize VMs of the database server 290*a*. The messaging cluster 280 may encrypt messages sent from the control plane 201 to the database server 290*a* and messages sent from the database server 290*a* to the control plane 201. The messaging cluster 280 may provide end-to-end encryption for messages between the control plane 201 and the database server 290*a*. The messaging cluster 280 may include a dedicated channel for registering database server VMs, as discussed herein. The messaging cluster 280 may scale to millions of connections, where each additional database server has a single connection with the control plane 201 for the database server VM to communicate with the control plane 201. The messaging cluster 280 may store messages to ensure delivery. The messaging cluster 280 may ensure only-once delivery for the messages using the stored messages. For example, if a connection with a database VM is severed, a message which was sent by the control plane 201 but not received by the database VM may be sent a second time by the messaging cluster 280 to ensure the message is received by the database VM. In some embodiments, the control plane 201 may be deployed on-premise and the messaging cluster 280 may also be deployed on-premise. In other embodiments, one or more of the control plane 201 or the messaging cluster 280 may be deployed on a cloud.

The messaging cluster 280 may include a registration topic 281 for registering the database server 290*a* and/or a VM of the database server 290*a*. Registration may include establishing a connection with and recording metadata of the database server 290*a* and/or the VM of the database server 290*a* such that the control plane 201 may manage databases on the database server 290*a*. The registration topic 281 may be open, such that unregistered database VMs may request registration using the registration topic 281, as discussed herein. The registration topic 281 may queue registration requests to be routed by the connection manager 270. The messaging cluster 280 may include a request topic 282 for receiving requests from one or more VMs of the database server 290*a*. The request topic 282 may queue requests from multiple database server VMs to be routed to by the connection manager 270. The messaging cluster 280 may include a database server operations topic 283 which queues operations to be executed on the database server 290*a*. The messaging cluster 280 may include a database server commands topic 284 which queues commands to the database server 290*a*. The request topic 282, the database server operations topic 283, and the database server commands topic 284 may be associated with and specific to the database server 290*a*. Each respective database server VM in communication with the control plane 201 may be associated with topics unique to the respective database server VM, as discussed herein.

The control plane 201 may include a file service 285. The file service 285 may be used to transfer large files between the control plane 201 and the database server 290*a*. For example, a software package for the agent 292*a* may be transferred to the database server 290*a* using the file service 285. In another example, logs from the agent 292*a* may be transferred to the control plane 201 using the file service

285. In some embodiments, the file service 285 is a storage location in a public cloud accessible to the control plane 201 and the database server 290*a*.

The control plane 201 may be in communication with a plurality of database servers, each database server having one or more VMs, an agent of the control plane 201, and a single TCP connection with the control plane 201. The control plane 201 may manage the plurality of database servers using a pooled model for tenant isolation. The core services 220 may serve the plurality of databases, scaling independent of each other as needed. Each respective agent running on the plurality of database servers is associated with a tenant and tenant ID of the tenant, and the connection manager 270 scopes requests from the respective agent to the tenant ID associated with the respective agent. Requests received by the management plane 210 from users of the database management system 200 carry a tenant context to scope the requests to a tenant associated with the tenant context, as discussed herein.

Components of the control plane 201 such as the management plane 210, the core services 220, the internal API service 230, the workflow system 240, the HCS 250, the orchestrator system 260, and the connection manager 270 may be deployed as services, containerized or otherwise. This approach allows the components of the control plane 201 to scale independently of each other based upon demand for each component. For example, the management plane 210 may scale based upon an API load on the management plane 210 while the internal API service 230 may scale, independent of the management plane 210, based on a number of database servers registered with the control plane 201.

The database management system 200 may include the database server 290*a*. The database server 290*a* may be a database server of a private cloud, a database server of a public cloud, a database server of a hybrid cloud, or an on-premises database server. For example, in some embodiments, the database server 290*a* may be a server of AMAZON WEB SERVICES (AWS), AZURE, or (GOOGLE CLOUD PLATFORM) GCP. The database server 290*a* may include the agent 292*a*. The agent 292*a* may be an agent of the control plane 201. The agent 292*a* may run on the database server 290*a*. The agent 292*a* may be installed on a VM of the database server 290*a*. The database server 290*a* and the agent 292 may be running on the VM. The database server 290*a* may include a database. The agent 292*a* may be a service. In some implementations, the agent 292*a* may be a containerized service. The agent 292*a* may establish the control channel 295*a* through registration, as discussed herein. The agent 292*a* may establish the control channel 295*a* upon booting up, as discussed herein. The agent 292*a* may execute commands and operations sent by the control plane 201. The agent 292*a* may make API calls to the control plane 201. The agent 292*a* may make API calls to the control plane 201 on a particular topic of the control channel 295*a*, as discussed herein.

The agent 292*a* may serve as an intermediary between the database server 405 and the control plane 440. The agent 292*a* may be associated with one or more databases on the database server 290*a*. In some embodiments, the agent 292*a* may be associated with two or more databases on the database server 290*a* which are copies or clones of each other. The agent 292*a* may be an autonomous software program configured for performing one or specific and approved operations. The agent 292*a* may be configured as software. The agent 292*a* may be associated with resources (e.g., CPU, memory, etc.) on the database server 290*a*. In some embodiments, the agent 292*a* is associated with resources of the VM of the database server 290*a*. Example operations that the agent 292*a* may perform may include database provisioning, database server provisioning (e.g., creating a database server virtual machine), database cloning, database server cloning (e.g., cloning a database server virtual machine), registering a database, registering a database server virtual machine, copy log operations, resiliency and curation operations, profile (e.g., network, software, compute, etc.) creation, capturing snapshots, cleanup operations, etc. The agent 292*a* may poll the control plane 201 for operations and/or commands, as discussed herein.

The control plane 201 may be in communication with a second database server 290*b*. The second database server 290*b* may include a second agent 292*b* of the control plane 201 running on the second database server 290*b*. The second database server 290*b* may communicate with the control plane 201 using a second control channel 295*b*. The control channel 295*b* may be a communication channel between the database server 292*b* and the control plane 201. The control channel 295*b* may be a dedicated communication channel between the database server 292*b* and the control plane 201. The second database server 290*b* may be associated with a different tenant than the database server 290*a*. The second database server 290*b* may publish messages from the control plane 201 on the request topic 282 and receive messages from the control plane on an operations topic and a commands topic associated with the second database server 290*b*. The messages from the database server 290*a* may include the tenant identifier of the tenant associated with the database server 290*a* and the messages from the second database server 290*b* may include a second tenant identifier associated with a second tenant associated with the database server 290*b*. The database server 290*a* and the second database server 290*b* may publish messages to the request topic 282. The connection manager 270 may route requests from the database server 290*a* and the second database server 290*b* based on the tenant identifiers. The control channel 295*a* and the second control channel 295*b* may each be separate TCP connections.

Although two database servers are shown, the control plane 201 may communicate with multiple database servers. Each database server of the multiple database servers may be on a public cloud, a private cloud, or an on-premises system. The control plane 201 may be agnostic to the deployment environment of the multiple database servers, as the multiple database servers communicate with the control plane 201 using the messaging cluster 280. The control plane 201 may be deployed across multiple availability zones of a public cloud, private cloud, on-premises system, or hybrid system. The control plane 201 may be deployed in multiple regions based on a tolerable network latency between the control plane 201 and the multiple database servers. In some embodiments, the control plane is deployed across multiple regions of a public cloud, private cloud, on-premises system, or hybrid system. The databases on the multiple database servers may be configured with multiple read replicas for high availability. For example, multiple clones of a database may be hosted on a single database server or across two or more database servers of the multiple database servers.

Figure 3:
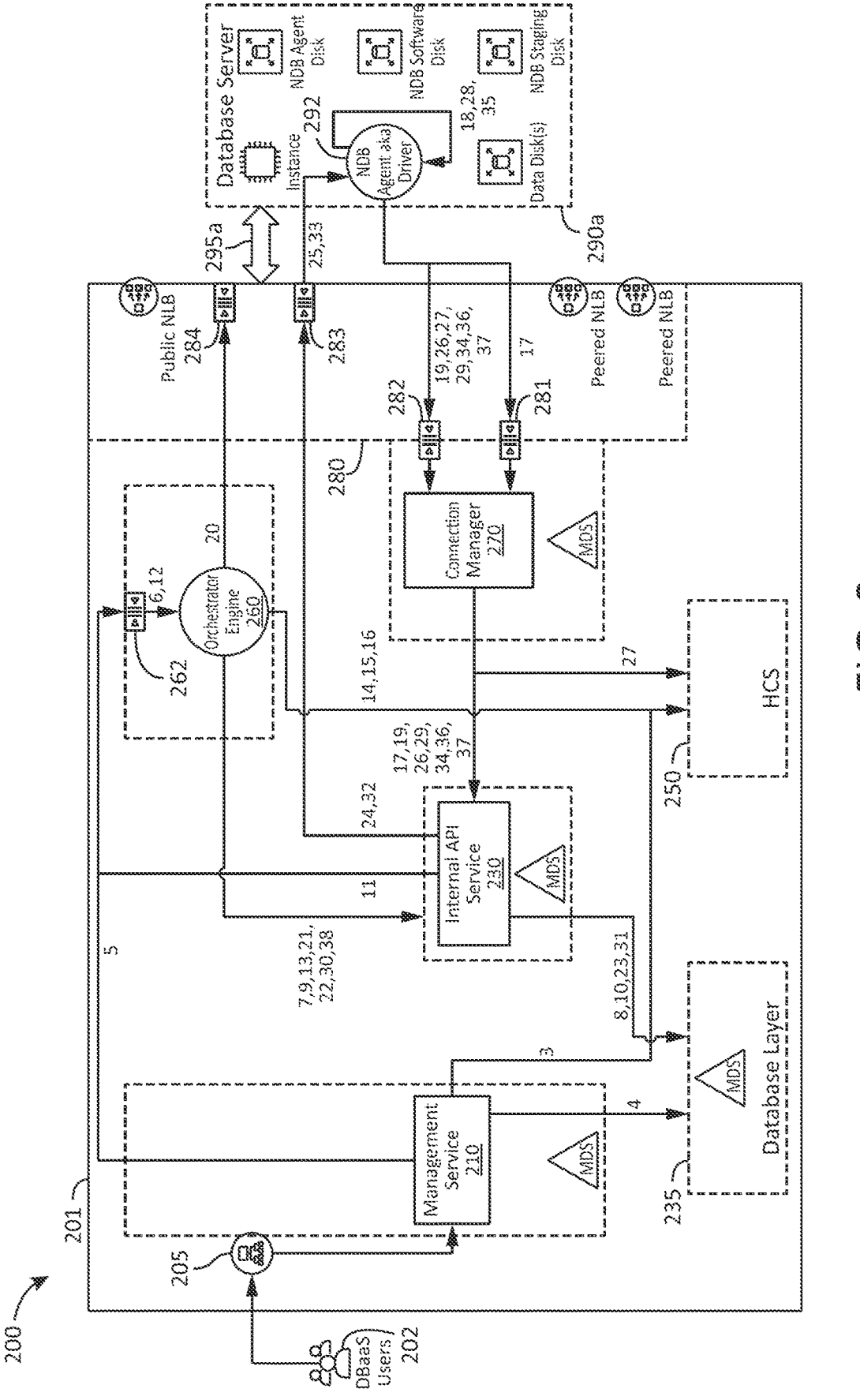
FIG. 3 is an example block diagram illustrating example operations for provisioning a database on a database server of FIG. 2 by the control plane of FIG. 2, in accordance with some embodiments of the present disclosure.

FIG. 3 is an example block diagram illustrating operations performed by the control plane 201 and the database server 290*a* of FIG. 2 for provisioning a database on the database server. The database on the database server may be a user database which stores user data. The database server may include a plurality of user databases. Provisioning a database may include creating a new database on the database server. The process may include additional, fewer, or different operations than shown here. The operations may be performed in the order shown, in a different order, or concurrently. In FIG. 3, only components of the control plane 201 which perform specific operations in the example process are illustrated. Nonetheless, the control plane 201 may include additional components, such as the components shown in FIG. 2.

At operation 1, a user sends a provisioning request to the control plane 201. The provisioning request may be an API call. The user may make the provisioning request at the user interface 203 of the control plane 201. The provisioning request may be a request to provision a database on the database server 290a. At operation 2, the request is routed to the management plane 210. The request may be routed to the management plane 210 by a load balancer 205. At operation 3, the management plane 210 validates the request at the HCS 250. The management plane 210 sends the request to the HCS 250 and the HCS 250 validates user credentials of the user. The HCS 250 sends a message of validation to the management plane 210. At operation 4, upon validation of the request, the management plane 210 sends an instruction to the database layer 235 to generate metadata entries for the database server 290a. The metadata entries may include an identifier of the database server 290a. In some embodiments, the identifier may be a temporary identifier to be replaced by a new identifier when the provisioning request is completed. The temporary identifier may be activation credentials, as discussed herein. The database layer 235 may generate an entity corresponding to the database server 290a in one or more databases of the database layer 235. The management plane 210 may send an instruction to the database layer 235 to create an operations entry for the database server 290a. The operations entry may include a provisioning operation. The provisioning operation may include the provisioning request, an identifier of the user who submitted the provisioning request, and/or a time the provisioning request was submitted. At operation 5, the management plane 210 pushes the provisioning request to the operations queue 262 of the orchestration system 260. The provisioning request may be an operation. The management plane 210 may translate the provisioning request into the operation. For example, the management plane 210 may translate the API call made by the user to an internal API call compatible with the components of the control plane 201 and send the internal API call to the orchestration queue 262 of the orchestration system 260.

At operation 6, the orchestration system 260 fetches the operation from the orchestration queue 262 and begins executing the operation. At operation 7, the orchestration system 260 makes one or more API calls to the internal API service 230. The one or more API calls include, but are not limited to, an operation status update, a profile information request, driver-level input validation information, and object information. At operation 8, the internal API service 230 contacts the database layer 235 to receive and/or update information based on the one or more API calls. At operation 9, the orchestration system 260 generates a sub-operation to create a VM of the database server 290a. The orchestration system 260 may make various sub-operation API calls to the internal API service 230. The one or more sub-operation API calls include, but are not limited to, an operation status update, a profile information request, driver-level input validation information, and object information. At operation 10, the internal API service 230 sends an instruction to the database layer 235 to generate metadata entries for the VM of the database server 290a. The database layer 235 may generate an entity corresponding to the VM of the database server 290a in one or more databases of the database layer 235. The internal API service 230 may send an instruction to the database layer 235 to create a VM operations entry for the VM of the database server 290a. The VM operations entry may be based on the operations entry for the database server 290a.

At operation 11, the internal API service 230 pushes the VM sub-operation to the orchestration queue 262. At operation 12, the orchestration system 260 fetches the VM sub-operation from the orchestration queue 262 and begins execution of the VM sub-operation. At operation 13, the orchestration system 260 makes API calls to update a status of the VM sub-operation and fetch additional information. In some embodiments, at operation 14, the orchestration system instructs the HCS 250 to request usage of a processing resource of a public cloud. At operation 15, the orchestration system 260 instructs the HCS 250 to make one or more API calls to a cloud associated with the database server 290a to create the VM.

At operation 16, the orchestration system instructs the HCS 250 to make one or more API calls to the cloud associated with the database server 290a to register the VM of the database server 290a, as discussed herein. Operations for registering the VM of the database server 290a are discussed in conjunction with FIGS. 30-37. At operation 17, the database server 290a publishes a registration API call to the registration topic 281 of the messaging cluster 280 using registration credentials generated for the database server 290a by the control plane 201, as discussed herein. At operation 18, the agent 292a on the database server 290a may configure services and configurations on the database server 290a. At operation 19, the connection manager 270 fetches the registration API call from the registration topic 281 and routes the registration API call to the internal API service 230 to update a status of the database server 290a to "UP." The status "UP" may indicate that the VM of the database server 290a is running and is healthy. In some embodiments, the internal API service 230 may route the registration API call to the database layer 235 to update the status of the database server 290a in one or more databases of the database layer 235. In other embodiments, the internal API service 230 may instruct the database layer 235 to update the status of the database server 290a in one or more databases of the database layer 235. At operation 20, the orchestration system 260 sends a command, using the database server command topic 284 of the messaging cluster 280, to the database server 290a to attach software disks to the VM of the database server 290a. In some embodiments, the agent 292a may execute bash commands on the database server 290a to attach the software disks to the VM of the database server 290a.

At operation 21, the orchestration system 260 completes the sub-operation to create the VM of the database server 290a. In some embodiments, the orchestration system 260 sends an API call to the internal API service 230 to complete sub-operation to create the VM of the database server 290a. At operation 22, the orchestration system 260 submits a sub-operation to configure a database on the database server 290a to the internal API service 230. At operation 23, the internal API service 230 routes the configuration sub-operation to the database layer 235, which creates an operations entry, in a database of the database layer 235, corresponding to the configuration sub-operation. At operation 24, the internal API service 230 pushes the configuration sub-operation to the database server operations topic 283. At operation 25, the database server 290*a* fetches the configuration sub-operation from the database server operations topic 283 and starts execution of the configuration sub-operation.

At operation 26, the agent 292*a* publishes messages including operation status updates and/or requests for additional information to the request topic 282 of the messaging cluster 280. The connection manger 270 may route the messages to the internal API service 230. At operation 27, the agent 292*a* may create and attach data disks to the VM of the database server 290*a*. At operation 28, the agent 292*a* creates and configures the database in the VM of the database server 290*a* using the attached data disks. At operation 29, the agent 292*a* may publish to the request topic 282 an indication that the configuration sub-operation is complete. The connection manager 270 may route the completion indication to the internal API service 230.

At operation 30, the orchestration system 260 submits a sub-operation to the internal API service 230 to register the database. At operation 31, the internal API service 230 routes the registration sub-operation to the database layer 235 to create a registration operation entry in one or more databases of the database layer 235. At operation 32, the internal API service 230 pushes the registration sub-operation to the database server operations topic 283. At operation 33, the database server 290*a* fetches the registration sub-operation from the database server operations topic 283 and starts executing the registration sub-operation. At operation 34, the agent 292*a* publishes messages including operation status updates and/or requests for additional information to the request topic 282 of the messaging cluster 280. The connection manger 270 may route the messages to the internal API service 230. At operation 35, the agent 292*a* may identify a layout of the database.

At operation 36, the agent 292*a* publishes a message including a register database API call to the request topic 282. The connection manager 270 may route the message to the internal API service 230. At operation 37, the internal API service 230 finishes the registration sub-operation API call by routing the register database API call to the orchestration system 260. At operation 38, the orchestration system 260 instructs the database layer 235, via the internal API service 230, to complete the provisioning operation. Completing the provisioning operation may include update the one or more databases of the database layer 235 with the database layout. As a result of operations 1-38, a new database server VM is provisioned and registered with the database management system 200, a new database is provisioned on the new database server VM and registered with the database management system, and a time machine is created on the database server. The time machine may take automated backups of the new database, create copies (e.g., clones) of the new database (e.g., from the backups) for various purposes like testing, staging, etc., as well as provide a way to manage the backups and copies with ease. A time machine may be created for each new database. The time machine may automatically take a first backup of the new database.

The database management system 200 may create a snapshot of the database on the database server when the database is registered with the control plane 201 and the database server is available to the control plane 201.

In some embodiments, the snapshot is requested by the user. The user may request the snapshot in an API call to the management plane 210. The user may request the snapshot using the user interface 203. The management plane 210 may validate the API call. The management plane 210 may validate the request at the HCS 250. The management plane 210 may instruct the database layer 235 to create a snapshot operation entry in metadata associated with the database server 290*a*. The management plane 210 may push the snapshot operation to the database server operations topic 283. The management plane 210 may send the snapshot operation to the internal API service 230 which may push the snapshot operation to the database server operations topic 283.

In other embodiments, the snapshot is automatically requested. The SLA event scheduler 221 may trigger a snapshot creation event based on an SLA associated with the database. The SLA event scheduler 221 may send the snapshot creation event to the workflow system 240. The workflow system 240 may validate the event. The workflow system 240 may create a snapshot creation operation entry in the database layer 235. The workflow system 240 may generate a snapshot creation operation and send the snapshot creation operation to the database server operations topic 283.

The agent 292*a* may fetch the snapshot creation operation from the database server operations topic 283. The agent 292*a* may prepare the database to take a snapshot by executing commands from the snapshot creation operation on the database server 290*a*. The agent 292*a* may request a snapshot generation by publishing a snapshot request message on the request topic 282 of the messaging cluster 280. The connection manager 270 may route the snapshot request message to the HCS 250 and the internal API service 230. The HCS 250 may process the request and send a response to the database server 290*a*. Processing the request may include making an API call to the cloud associated with the database server 290*a* to generate the snapshot. The response may include the snapshot. The response may include an indication that a snapshot was generated. The snapshot may be stored locally or in a cloud account associated with the control plane 201. For example, the snapshot may be stored in an S3 bucket. The internal API service 230 may route the snapshot request message to the database layer 235 to update the metadata associated with the database server 290*a*. The internal API service 230 may send a response to the database server 290*a* that the metadata is updated. The agent 292*a* may cause the database server 290*a* to revert to an original state if the database server 290*a* was interrupted to generate the snapshot. The agent 292*a* may send, to the control plane 201, a message to update the status of the database server 290*a*. In some embodiments, the message instructs the control plane 201 to update the status of the database server 290*a* to "UP."

Once the generate snapshot operation is completed, the snapshot is be stored in a location accessible to the control plane 201 and/or the database server 290*a*, a snapshot entry is stored in the database layer 235 of the control plane 201, and the snapshot is indicated in the user interface 203.

The database management system 200 may deregister the database server 290*a* when the VM of the database server 290*a* is healthy and available, and when all the databases in the VM have been deregistered from the database management system 200. Deregistering the database server 290*a* may include deleting metadata on the control plane 201 associated with the database server 290*a* and closing the control channel 295*a* between the control plane 201 and the database server 290*a* such that the control plane 201 no longer manages databases on the database server 290*a*.

The user may request deregistration of the database server 290*a* by making an API call. The user may request the deregistration of the database server 290*a* using the user interface 203. The management plane 210 may receive the deregistration request and validate the deregistration request. In some embodiments, validating the deregistration request includes validating the deregistration request using the HCS 250. The management plane 210 may create an operation entry in the database layer 235. The operation entry may be created in metadata associated with the database server 290a. The management plane 210 may generate a deregistration operation based on the deregistration request and push the deregistration operation to the orchestration queue 262 of the orchestration system 260.

The orchestration system 260 may execute the deregistration operation. The orchestration system 260 may make an API call to the internal API service 230 to update an operation status of the database server 290a in the database layer 235. The operation status may be updated to deregister the operation status from the control plane 201. The orchestration system 260 may push a cleanup command to the command topic 284 of the messaging cluster 280. The agent 292a may pull the cleanup command from the command topic 284 and execute the cleanup command. Executing the cleanup command may include uninstalling the agent 292a, cleaning up a footprint of the agent 292a, and/or deleting a customer user generated during registration for interacting with the control plane 201. The orchestration system 260 may instruct the HCS 250 to make API calls to the cloud associated with the database server 290a to delete from the cloud one or more entities associated with the control plane 201. In some implementations, the orchestration system 260 may instruct the HCS 250 to make API calls to detach and delete a volume from the cloud associated with the database server 290a, such as an EBS volume from AWS. The orchestration system 260 may make an API call to the internal API service 230 to delete the VM of the database server 290a and other related entities from the metadata of the database server 290a on the control plane 201. The internal API service 230 may instruct the database layer 235 to deleted the metadata of the database server 290a.

When the database server 290a has been deregistered from the control plane 201, the VM of the database server 290a remains available on the database server 290a. The user may use the VM of the database server 290a using a cloud account associated with the database server 290a. The database server 290a, the VM of the database server, and other related entities are not present in metadata in the database layer 235 of the control plane 201. In some embodiments, the deregistration operation includes deleting the VM of the database server 290a, in which case the VM is not available on the database server 290a after deregistration.

Figure 4:
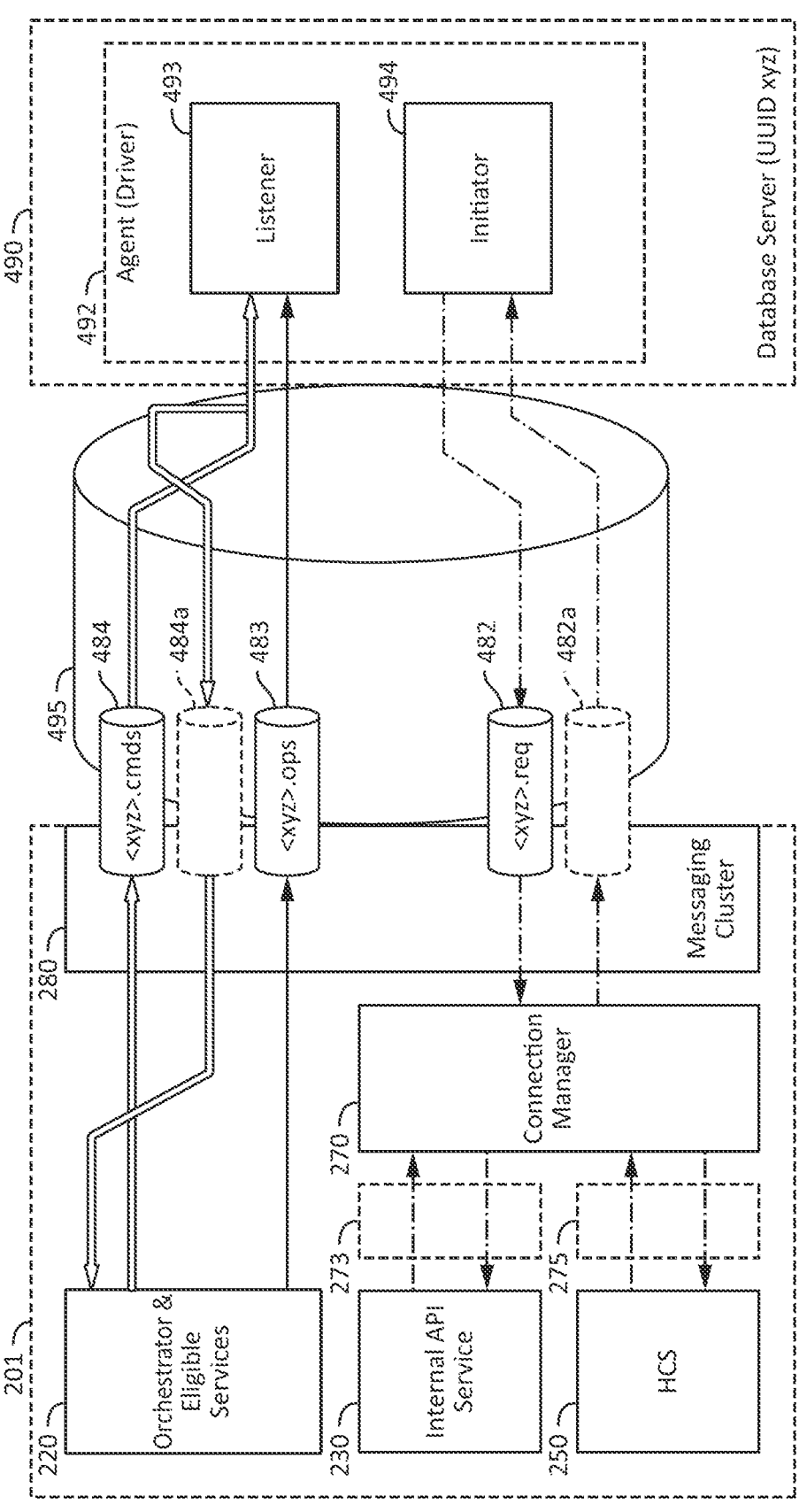
FIG. 4 is an example block diagram illustrating communication between a database server and the control plane of FIG. 2, in accordance with some embodiments of the present disclosure.

FIG. 4 is an example block diagram illustrating communication between a database server 490 and the control plane of FIG. 2, in accordance with some embodiments of the present disclosure. 201 In some embodiments, the database server 490 may be the database server 290a or 290b of FIG. 2. The database server 490 and the control plane 201 may communicate using a control channel 495. The control channel 495 may be similar to the control channel 295a and control channel 295b of FIG. 2.

The control channel 495 may be a single Hypertext Transfer Protocol Secure (HTTPS) channel on a single TCP channel. The control plane 201 may communicate with multiple processes running on the database server 490 through the single control channel 495. This reduces the number of connections the control plane 201 needs with database servers to one connection per database server. The control channel 495 may be initiated by the database server 490. Agent 492 on the database server 490 may request authentication, or registration, by the control plane 201, as discussed herein. The control plane 201 may indicate to the agent 492 that the database server 490 is authenticated, or registered with the control plane 201, as discussed herein. The control plane 201 may generate data stream topics in a messaging cluster 280 of the control plane 201. Topics on the messaging cluster 280 may define data streams as messages are exchanged between the control plane 201 and the database server 490 across the topics. The data streams may be the flow a messages over the topics. The data stream topics are associated with the database server 490. Each respective database server in communication with the control plane 201 may have topics unique to the respective database server on the messaging cluster 280. In some implementations, the data stream topics carry a UUID of the database server 490 such that only the database server 490 can communicate with the control plane 201 using the data stream topics. In some embodiments, the control plane 201 may use the UUID as an identifier of the database server 490 on the control plane 201. In other embodiments, the control plane 201 may use another identifier as the identifier of the database server 490 on the control plane 201, such as database server credentials. The control plane 201 may communicate with multiple database servers, where the control plane 201 communicates with each respective database server through a control channel including data streams unique to the respective database server. The agent 492 may subscribe to the data streams associated with the database server 490. The data streams may include a requests data stream 482, an operations data stream 483, and a commands data stream 484.

The requests data stream 482 may include messages transmitted over a request-reply subject between the database server 490 and the control plane 201. The database server 490 may publish messages to the requests data stream 482 and a connection manager 270 of the control plane 201 may subscribe to the requests data stream 482. In some embodiments, the connection manager 270 may authenticate the messages based on the messages being received on the requests data stream 482 before taking any further action on the messages. In response to successfully authenticating the message received on the requests data stream 482, the connection manager 270 may perform one or more operations to complete the operations requested in the message. In some embodiments, the message may include a request for information on the control plane 201 or a request for an operation to be send to the database server 490. The control plane 201 responds by publishing a response to the requests datastream 482 or the operations data stream 483, as discussed herein. In some implementations, the request may be an API request in JSON format.

The connection manager 270 may receive the request and, upon authentication if used, make a second request to the internal API service 230 of the control plane 201. The second request may be generated based on the request, as discussed herein. The connection manager 270 may format the second request based on a recipient of the second request. The connection manager 270 may parse a payload of the request to determine that the second request is to be sent to the internal API service 230. In some implementations, the connection manager 270 may query a service registry of the control plane 201 to determine an endpoint of the internal API service 230. The connection manager 270 may generate the second request to send to the internal API service 230. The connection manager 270 may insert a service security context 273 in the second request based on the internal API service 230 being the recipient of the second request. The security context 273 may include information required by the internal API service 230 such as tenant ID, database server ID, etc. The security context 273 may be in a format compatible with the internal API service 230. The connection manager 270 may generate the second request to be compatible with the internal API service 230. The internal API service 230 may send a response to the second request to the connection manager 270. The connection manager 270 may receive the response and publish the response to a transient reply topic 482a of the requests data stream 482. The transient reply topic 482a may be created each time a request is posted to the requests data stream 482 to receive a reply to the request. The transient reply topic 482a may be closed once the response is received.

The connection manager 270 may receive the request and make a second request to the HCS 250 of the control plane 201. The connection manager 270 may parse the request to determine that the second request is to be sent to the HCS 250. In some embodiments, the connection manager 270 determines that the second request is to be sent to the HCS based on the second request being a request for an action to be executed on a public cloud. In some implementations, the connection manager 270 may query a service registry of the control plane 201 to determine an endpoint, or network location, of the HCS 250. The connection manager 270 may generate the second request to send to the HCS 250. The connection manager 270 may insert a service security context 275 in the second request based on the HCS 250 being the recipient of the second request. The security context 275 may include information required by the HCS 250. The security context 275 may be in a format compatible with the HCS 250. The connection manager 270 may generate the second request to be compatible with the HCS 250. The HCS 250 may send a response to the second request to the connection manager 270. The connection manager 270 may receive the response and publish the response to the transient reply topic 482a of the requests data stream 482.

In some implementations, the agent 492 may include an initiator 494. The initiator 494 may be configured to initiate requests to the control plane 201. The initiator 494 may generate requests and publish them to the requests data stream 482.

The operations data stream 483 may be a stream subject on the messaging cluster 280. The stream subject may be a subject on the messaging cluster 280 configured as a stream. The stream may be a logical entity including a collection of subjects. The stream may provide temporal decoupling between a publisher (e.g., transmitter of a message) and a subscriber (e.g., receiver of the message), such that the subscriber has control of when the subscriber reads messages from the publisher and in what order the subscriber reads the messages. The operations data stream 483 may be a publish-subscribe topic such that a publisher sends a message on the topic and a subscriber listening on the topic receives the message. Services 220 of the control plane 201 may publish to the operations data stream 483. In some embodiments, the services 220 send events to an orchestration engine which generates operations based on the events and publishes the operations to the operations data stream 483, as discussed herein. The operations data stream 483 may include persistent storage such that messages published to the operations data stream 483 are stored until the subscriber acknowledges the messages. The subscriber of the operations data stream 483 may be the agent 492. The agent 492 may include a listener 493. In some implementations, the listener 493 may be a pull consumer. The listener

493 may pull a number of messages at a predetermined frequency published by the control plane 201 on the operations topic. The number of messages may depend on a number of processes spawned by the agent 492 to pull the messages.

The commands data stream 484 may include a request-reply subject on the messaging cluster 280. The services 220 may publish commands to the commands data stream 484. The commands may be commands for the agent 492 to execute on the database server 490. The agent 492 may subscribe to the commands data stream 484. The agent 492 may receive the commands on the commands data stream 484, execute the commands, and publish a reply on a transient reply topic 484a of the commands data stream 484. The control plane 201 may control a number of commands published to the commands data stream 484.

The commands data stream 484 and the requests data stream 482 may be separate to increase security. For the commands data stream, the database server 490 may be the receiver and the control plane 201 may be the publisher, while for the requests data stream 482, the database server 490 may be the publisher and the control plane 201 may be the receiver. This allows for configuring publish and subscribe permissions separately for the topics of the commands data stream 484 and the topics of the requests data stream 482. In some embodiments, the commands data stream 484 and the requests data stream 482 may be the same to streamline communications between the control plane 201 and the database server 490.

Figure 5:
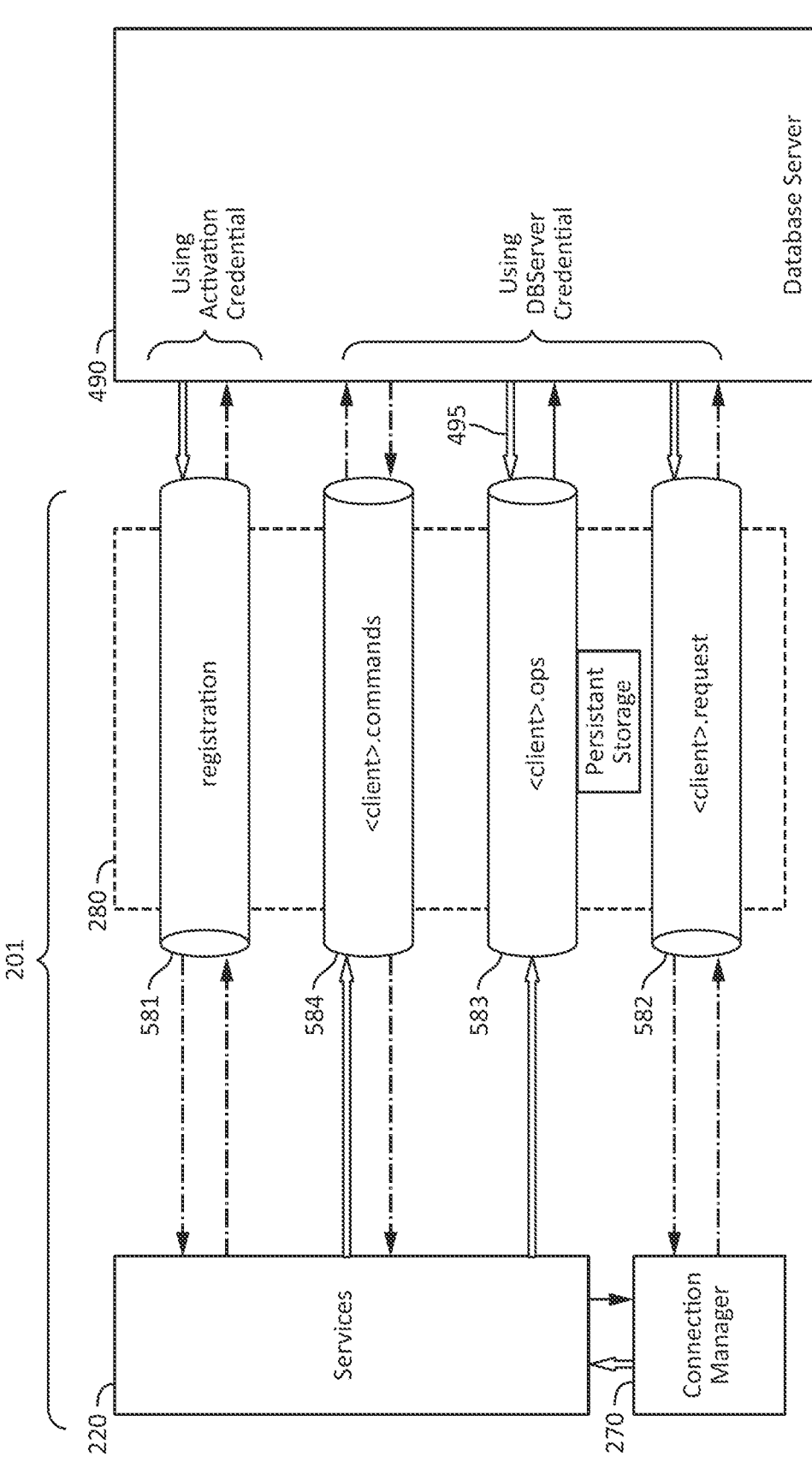
FIG. 5 is an example block diagram illustrating additional communication details between the database server of FIG. 4 and the control plane of FIG. 2, in accordance with some embodiments of the present disclosure.

FIG. 5 is an example block diagram illustrating additional communication details between the database server 490 of FIG. 4 and the control plane 201 of FIG. 2, in accordance with some embodiments of the present disclosure. 490201490201 The database server 490 and the control plane 201 may communicate using a commands stream 584, an operations data stream 583, and a requests data stream 582, each of which may include topics on a messaging cluster 280, as discussed herein. Messages on each of the commands stream 584, the operations data stream 583, and the requests data stream 582 may include a UUID or other credentials of the database server 490. The database server 490 may receive the credentials from the control plane 201. The control plane 201 may include services 220 of the control plane and the connection manager 270. The database server 490 may publish a registration message to a registration topic 581 of the messaging cluster 280. The registration topic 581 may be open to entities that are not registered with the control plane 201. The registration message may be used by all database servers to initiate a registration process. The registration message may include activation credentials, discussed herein. In some implementations, the activation credentials may be associated with a user registered with the control plane. The control plane 201 may receive the activation credentials on the registration topic 581 and generate unique credentials for the database server 490. These unique credentials may be used to uniquely identify the database server 490 to the control plane 201. In some implementations, the services 220 generate the unique credentials. The control plane 201 may send the unique credentials to the database server 490 over the registration topic 581. The control plane 201 may generate the requests data stream 582, the operations data stream 583, and the commands data stream 584 based on the unique credentials. In response to registration, the control plane 201 creates the requests data stream 582, the operations data stream 583, and the commands data stream 584 that may be accessed using the unique credentials obtained by the database server 490 during the registration process. The database server 490 may communicate with the control plane using the requests data stream 582, the operations data stream 583, and the commands data stream 584, using messages including the unique credentials. The control plane 201 may revoke the unique credentials such that the messages received over the requests data stream 582, the operations data stream 583, and the commands data stream 584 are rejected by the control plane 201. The control plane may close the requests data stream 582, the operations data stream 583, and the commands data stream 584 based on the unique credentials being revoked.

The control plane 201 may communicate with a plurality of database servers. Each respective database server of the plurality of database servers may have its own topics on the messaging cluster 280, where the topics are generated and associated with unique credentials of the respective database server. Each respective database server may publish and/or subscribe to only the topics associated with its unique credentials. The control plane 201 may publish and/or subscribe to all topics of the plurality of database servers.

Figure 6:
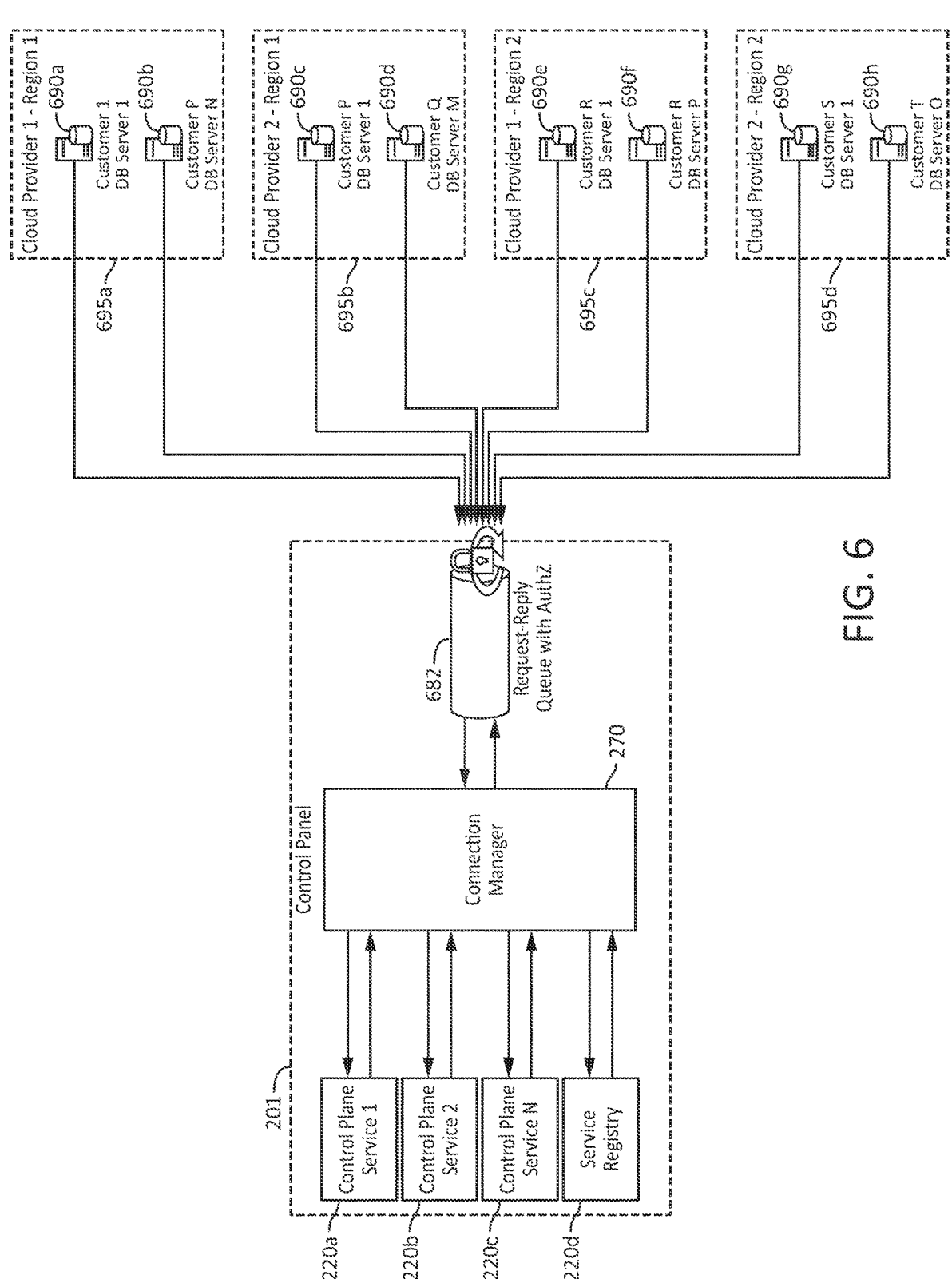
FIG. 6 is an example block diagram illustrating communication of the control plane of FIG. 2 with a plurality of database servers, in accordance with some embodiments of the present disclosure.

FIG. 6 is an example block diagram illustrating communication of the control plane 201 of FIG. 2 with a plurality of database servers 690a-690h (collectively referred to herein as the plurality of database servers 690), in accordance with some embodiments of the present disclosure. 201201 The control plane 201 includes a connection manager 270. The connection manager 270 routes messages from the plurality of database servers 690 received at a message queue 682 to services 220a-220d, (collectively referred to herein as the services 220) of the control plane 201. The connection manager 270 may receive the messages from the plurality of database servers 690 at the message queue 682. The message queue 682 may be a topic of a messaging cluster, as discussed herein. For example, the message queue 682 may be a requests topic, a commands topic, or an operations topic. The message queue 682 may be an aggregation of multiple topics of a messaging cluster. Each respective database server of the plurality of database server 690 may have multiple topics associated with the respective database server, where the respective database server can only subscribe and/or publish to the multiple topics associated with the respective database server. Each database server of the plurality of database servers 690 may have a single TCP connection with the control plane 201. Although the plurality of database servers 690 is shown here as including eight database servers, the plurality of database servers 690 may include any number of database servers, such as millions, billions, or trillions of database servers.

A first database server 690a may be located in a first region 695a of a first cloud provider. The first region 695a may include multiple availability zones. For example, the first region 695a may be a geographic region including multiple available zones and datacenters. The first database server may be associated with a first customer. A second database server 690b may be located in the first region 695a and be associated with a second customer. The plurality of database servers 690 may be located in regions 695a-695d (collectively referred to herein as the regions 695) of multiple cloud providers and/or on-premise systems. Different database servers of the plurality of database servers 690 may be associated with different customers. Each customer may be associated with multiple database servers of the plurality of database servers 690. The multiple database servers of the customer may be located in various regions and availability zones. Messages from the plurality of database servers 690 in the plurality of regions of the multiple cloud providers may be received at the message queue 682. The connection manager 270 may identify which database server of the plurality of database servers 690 sent each message based on contents of the messages, as discussed herein. The connection manager 270 may route the messages to the services 220 based on the contents of the messages and route replies from the services 220 to the plurality of database servers 690 such that each respective database server of the plurality of database servers 690 receives a reply to a messages sent by the respective database server.

Each respective database server of the plurality of database servers may have its own topics on the messaging cluster 280, where the topics are generated and associated with unique credentials of the respective database server. Each respective database server may publish and/or subscribe to only the topics associated with its unique credentials. The control plane 201 may publish and/or subscribe to all topics of the plurality of database servers.

Figure 7:
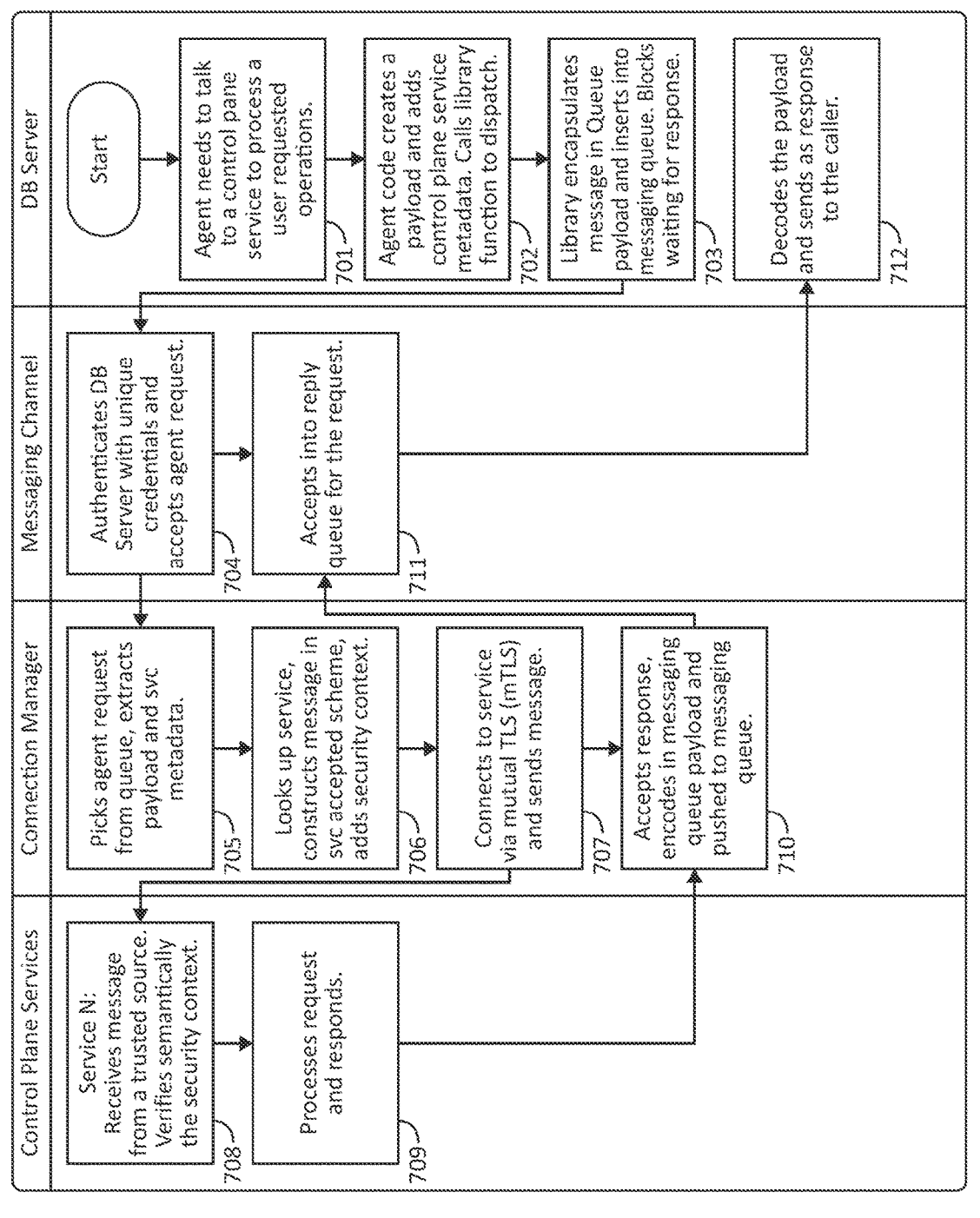
FIG. 7 is an example flow diagram illustrating operations for managing a request from an agent running on a database server by the control plane of FIG. 2, in accordance with some embodiments of the present disclosure.

FIG. 7 is an example flow diagram illustrating operations for managing a request from an agent running on a database server by the control plane of FIG. 2, in accordance with some embodiments of the present disclosure. The method may include more or fewer operations than shown. The operations may be performed in the order shown, in a different order, or concurrently.

At operation 701, the agent running on the database server receives a user request for operations and identifies a need to send a request to the control plane to complete the user request. At operation 702, the agent generates a message payload and adds metadata associated with a service of the control plane. The message payload may be a content of the message. The message payload may include the request. The agent calls a library function to send a message containing the message payload. At operation 703, the library function encapsulates the message and inserts the message in a messaging queue of a messaging cluster of the control plane. At operation 704, the messaging cluster receives the message and authenticates the message based on credentials in the message unique to the database server. In some embodiments, the database server credentials are included in the message payload. In other embodiments, the database server credentials are included in the encapsulation of the message. For example, the database server credentials may be included in a header of the message.

At operation 705, a connection manager of the control plane fetches the message from the messaging queue of the messaging cluster and extracts from the message the payload and metadata associated with the service of the control plane. The messaging cluster may publish the message to the messaging queue for the connection manager. At operation 706, the connection manager looks up the service based on the metadata. The connection manager generates a second message based on a format accepted by the service. The connection manager adds a security context to the second message. In some implementations, the security context may include a tenant ID of a tenant associated with the database server. At operation 707, the connection manager connects to the service using mutual transport layer security (mTLS) and sends the message to the service.

At operation 708, the service receives the message and verifies the message using the security context. The service may verify the message using semantic verification of the security context. At operation 709, the service processes the message and generates a response. The service sends the response to the connection manager. At operation 710, the connection manager accepts the response, encodes the response in a messaging queue payload and pushes the messaging queue payload to the messaging queue of the messaging cluster. At operation 711, the messaging cluster accepts the messaging queue payload into a reply queue. At operation 712, the agent fetches the messaging queue payload from the reply queue and decodes the messaging queue payload. The agent sends the decoded payload to the user as a response to the user's request.

Figure 8:
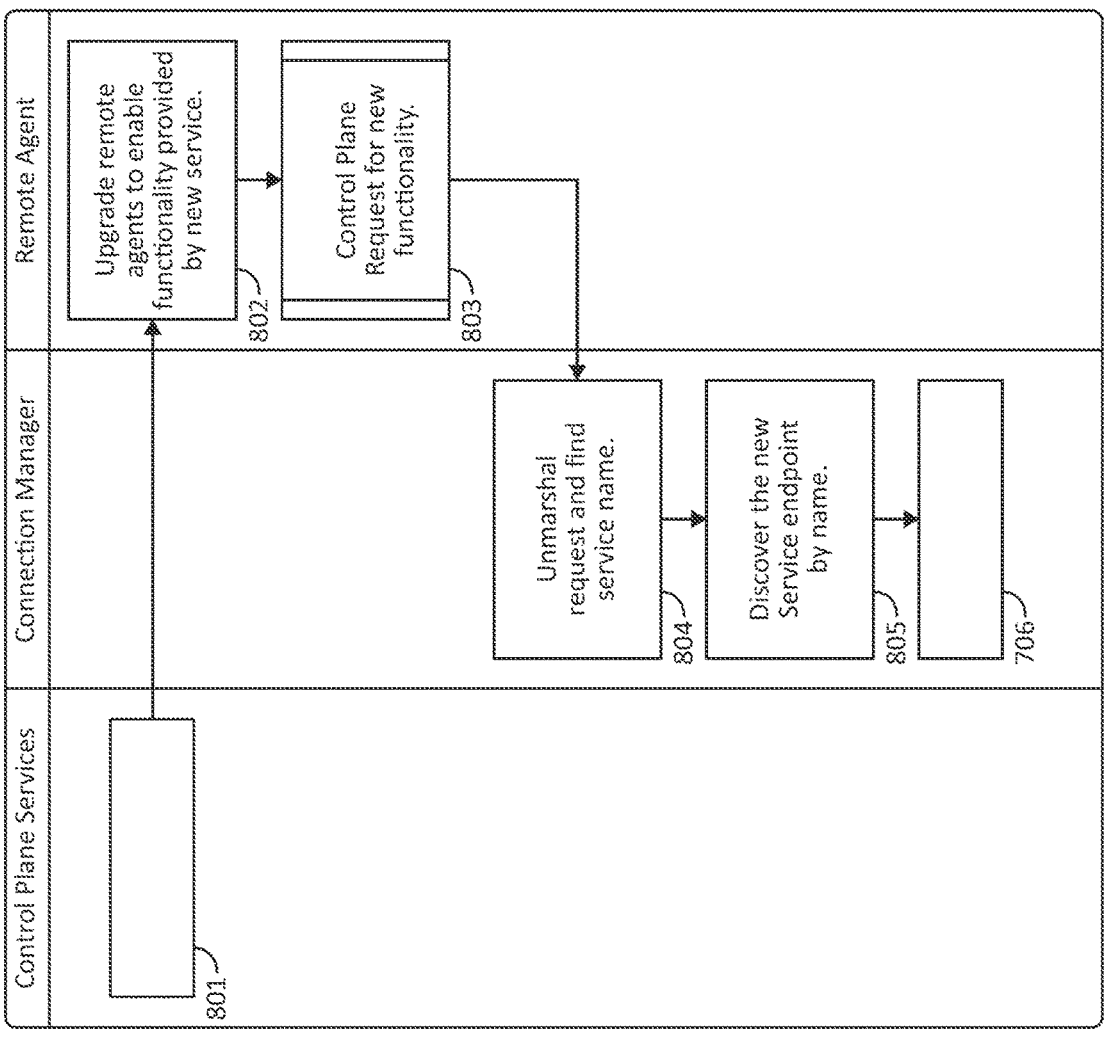
FIG. 8 is an example flow diagram illustrating operations of a method for adding a new service to the control plane of FIG. 2, in accordance with some embodiments of the present disclosure.

FIG. 8 is an example flow diagram illustrating operations of a method for adding a new service to the control plane 201 of FIG. 2, in accordance with some embodiments of the present disclosure. The method may include more or fewer operations than shown. The operations may be performed in the order shown, in a different order, or concurrently.

At operation 801, the control plane onboards the new service on the control plane by adding the new service to a service directory on the control plane 201 such that the new service is discoverable by name in the service directory. At operation 802, an agent running on a database server in communication with the control plane upgrades itself to enable a functionality provided by the new service. At operation 803, the agent sends a message to the control plane including a request for the functionality provided by the new service. At operation 804, a connection manager of the control plane un-marshals the message and identifies a name of the new service. In some implementations, unmarshalling the service includes extracting a payload of the message and metadata associated with the new service from the message. At operation 805, the connection manager determines an endpoint of the new service based on the name of the new service. The connection manager may determine the endpoint of the new service using the service directory. The actions of the connection manager allow the agent to request the functionality provided by the new service without knowing the endpoint of the new service or interacting directly with the new service. The method continues at operation 706 of FIG. 7.

Figure 9:
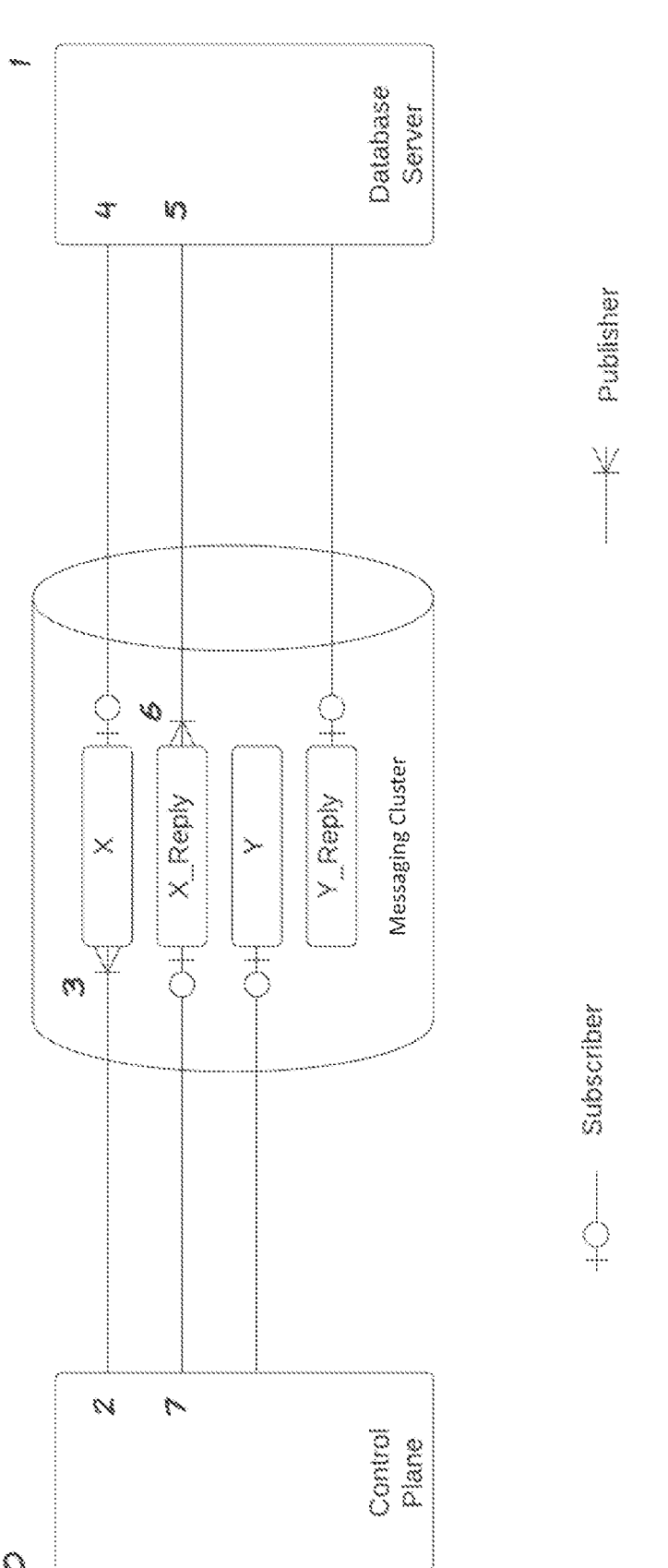
FIG. 9 is an example flow diagram illustrating operations of a method for the control plane of FIG. 2 to initiate communication with the database server of FIG. 2, in accordance with some embodiments of the present disclosure.

FIG. 9 is an example flow diagram illustrating operations of a method for the control plane of FIG. 2 to initiate communication with the database server of FIG. 2, in accordance with some embodiments of the present disclosure.

The method may include more or fewer operations than shown. The operations may be performed in the order shown, in a different order, or concurrently.

At operation 0, the control plane connects to a messaging cluster using a first token. In some embodiments, the messaging cluster is part of the control plane. The control plane subscribes to topics on the messaging cluster. The control plane may subscribe to topic "Y" and topic "X_Reply" on the messaging cluster. At operation 1, the database server connects to the messaging cluster using a second token. The database server subscribes to topics on the messaging cluster. The database server may subscribe to topic "X" and topic "Y_Reply" on the messaging cluster. At operation 2, the control plane initiates communication with the database server by publishing a message on the topic "X." At operation 3, the message is made available to the database server. In some embodiments, the message is placed in a queue of the topic "X" from which the database server can fetch the message. In other embodiments, the messaging cluster redirects the message to the database server. At operation 4, the database server receives the message and performs an action contained in the message. At operation 5, the database server sends an output of the performed action in a reply message published to the topic "X_Reply." At operation 6, the reply message is made available to the control plane. In some embodiments, the reply message is placed in a queue of the topic "Reply X" from which the control plane can fetch the message. In other embodiments, the messaging cluster redirects the message to the control plane. At operation 7, the control plane receives the reply message. The control plane may perform a second action in response to the reply message.

Figure 10:
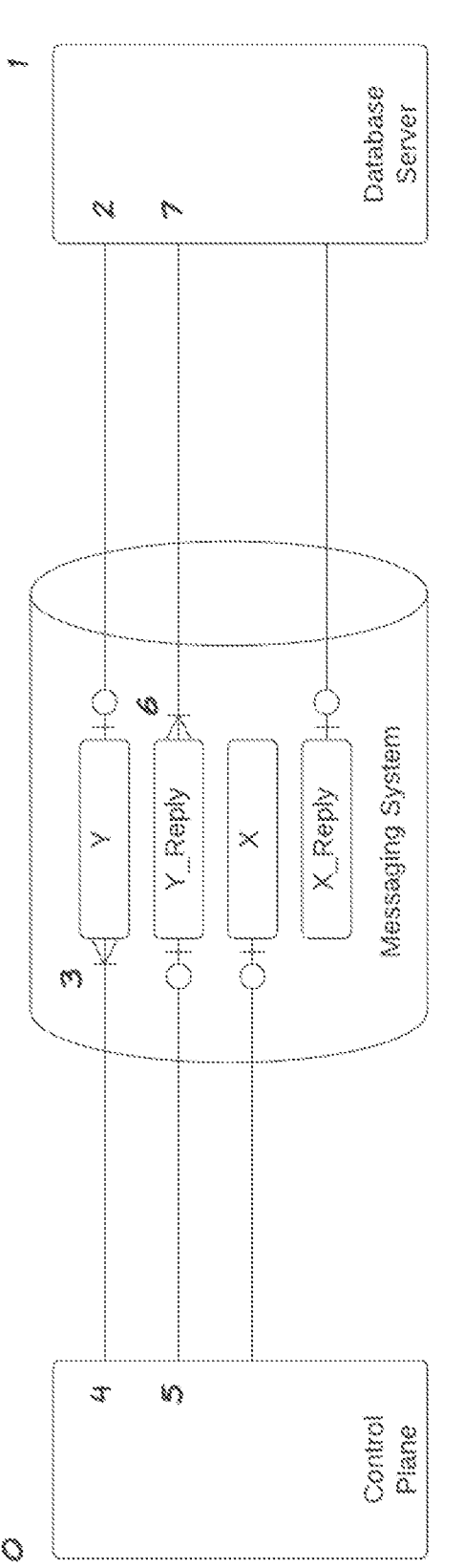
FIG. 10 is an example flow diagram illustrating operations of a method for the database server of FIG. 2 to initiate communication with the control plane of FIG. 2, in accordance with some embodiments of the present disclosure.

FIG. 10 is an example flow diagram illustrating operations of a method for the database server of FIG. 2 to initiate communication with the control plane of FIG. 2, in accordance with some embodiments of the present disclosure. The method may include more or fewer operations than shown. The operations may be performed in the order shown, in a different order, or concurrently.

At operation 0, the control plane connects to a messaging cluster using a first token. In some embodiments, the messaging cluster is part of the control plane. The control plane subscribes to topics on the messaging cluster. The control plane may subscribe to topic "Y" and topic "X_Reply" on the messaging cluster. At operation 1, the database server connects to the messaging cluster using a second token. The database server subscribes to topics on the messaging cluster. The database server may subscribe to topic "X" and topic "Y_Reply" on the messaging cluster. At operation 2, the database server initiates communication with the control plane by publishing a message on the topic "Y." At operation 3, the message is made available to the control plane. In some embodiments, the message is placed in a queue of the topic "Y" from which the control plane can fetch the message. In other embodiments, the messaging cluster redirects the message to the control plane. At operation 4, the control plane receives the message and performs an action contained in the message. At operation 5, the control plane sends an output of the performed action in a reply message published to the topic "Y_Reply." At operation 6, the reply message is made available to the database server. In some embodiments, the reply message is placed in a queue of the topic "Reply Y" from which the database server can fetch the message. In other embodiments, the messaging cluster redirects the message to the database server. At operation 7, the database server receives the reply message. The database server may perform a second action in response to the reply message.

Figure 11:
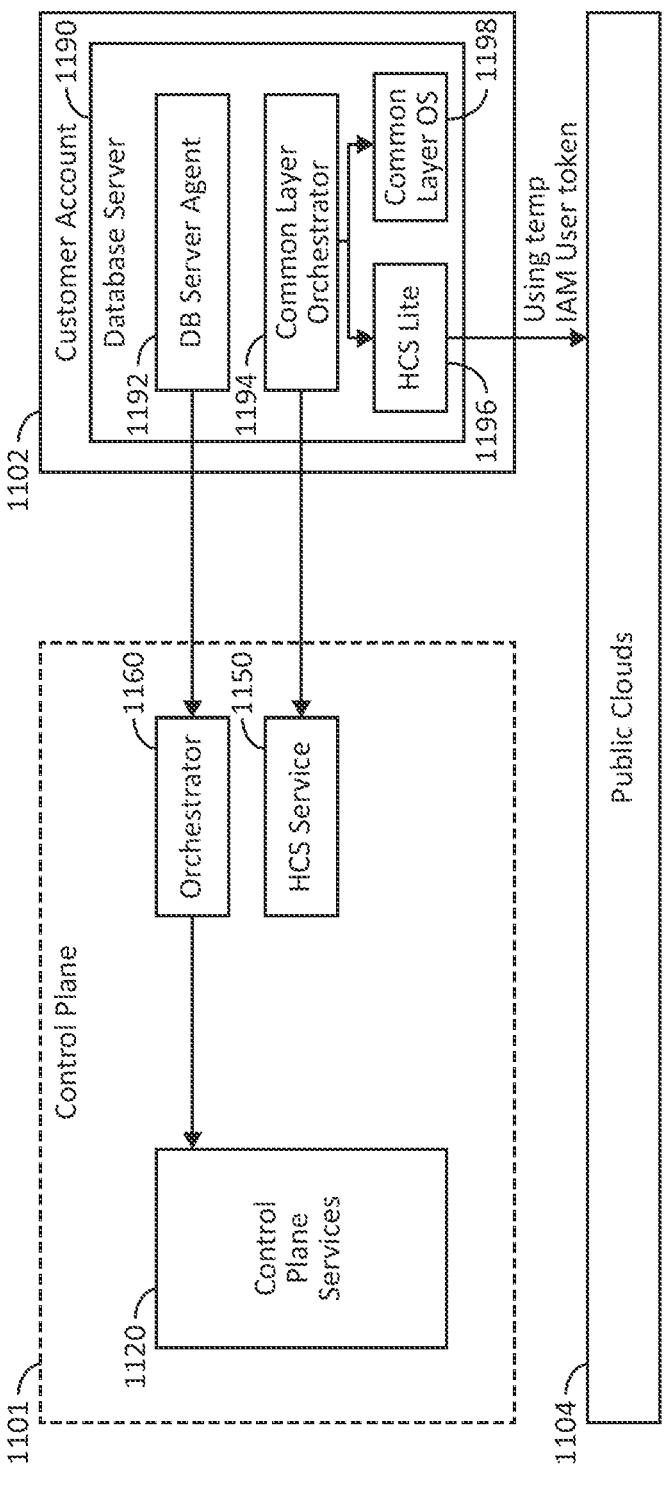
FIG. 11 is an example block diagram showing the HCS of the control plane of FIG. 2 in communication with one or more public clouds, in accordance with some embodiments of the present disclosure.

FIG. 11 is an example block diagram showing the HCS 250 of the control plane 201 of FIG. 2 in communication with one or more public clouds 1104, in accordance with some embodiments of the present disclosure. 250 201201 The control plane 201 includes control plane services 1120, an orchestrator 1160, and the HCS 250. The services 1120 may perform database management tasks. The services 1120 may generate events and send the events to the orchestrator 1160. 250 The orchestrator 1160 may receive the events from the services 1120 and generate operations based on the events. The orchestrator 1160 may send the operations to an agent 1192 of the control plane 201 running on a database server 1190. The database server 1190 may be associated with the customer account. The database server 1190 may include one or more databases managed by the control plane. The agent 1192 may execute the operations from the orchestrator 1160. The agent 1192 may make requests of the services 1120. The database server 1190 may include a common layer orchestrator 1194. The common layer orchestrator may communicate with the HCS service 250. The database server 1190 may include an HCS lite 1196 and a common layer OS 1198. The common layer orchestrator may communicate with the HCS lite 1196 and the common layer OS 1198. The public clouds 1104 may include one or more public clouds. In some embodiments, the customer account 1102 is a customer account on one of the public clouds 1104 and the database server 1190 is a database server 1190 on the public cloud associated with the customer account. The control plane 201 may manage databases on private clouds and the public clouds 1104.

The HCS 250 may provide a common interface for the database management system to interact with the public clouds 1104. For example, the HCS 250 may provide a common set of API calls to the services 1120 for requesting actions on AWS, AZURE, and GCP. In some embodiments, the HCS 250 is an abstraction layer which interacts with the public clouds 1104 and performs cloud-specific operations. In an example, the HCS 250 may receive an API call from the services 1120 to generate a clone of databases on first and second clouds of the public clouds 1104. In this example, the HCS 250 makes a first-cloud-specific API call to the first cloud to generate a clone of a database on the first cloud and a second-cloud-specific API call to the second cloud to generate a clone of a database on the second cloud. The HCS 250 may receive operations from the orchestrator 1160, connect to the public clouds 1104, initiate the operations on the public clouds 1104, and collect responses and/or results of the operations from the public clouds. The HCS 250 may be configured to generate API calls unique to each of the clouds of the public clouds 1104. The HCS 250 may be configured to receive requests and/or responses from the public clouds 1104 in formats unique to each of the clouds of the public clouds 1104. The HCS 250 may allow the services 1120 to make cloud-agnostic API calls the public clouds 1104 via the HCS 250. The HCS 250 may convert generic payloads of API calls from the services 1120 to cloud-specific payloads for the public clouds 1104. The HCS 250 may allow the agent 1192 to make cloud-agnostic API calls to the public clouds 1104. A connection manager may populate the cloud-agnostic API calls from the agent 1192 with cloud credentials associated with the cloud of the public clouds 1104 to which the HCS 250 make a cloud-specific API call. The HCS 250 may be configured to be extended to interact with additional clouds of the public clouds 1104.

HCS lite 1196 may be a lightweight version of the HCS 250. The HCS lite 1196 may be on the database server 1190. In some embodiments, the HCS lite 1196 may be part of the agent 1192. The HCS lite 1196 may execute API calls directly to the public clouds 1104 without needing to communicate with the HCS 250. The HCS lite 1196 may be used to make particular API calls based on a frequency of the particular API calls. For example, the HCS lite 1196 may be used to make frequently-made API calls. The HCS lite 1196 may copy data from the database server 1190. The HCS lite 1196 may receive a temporary token from the HCS 250 to copy data from the database server 1190 to the public clouds 1104. In some implementations, the HCS lite 1196 may copy log files from the database server 1190 to the public clouds using the temporary token. The HCS lite 1196 may make an API call to the public clouds 1104 to restore customer log data.

Figure 12:
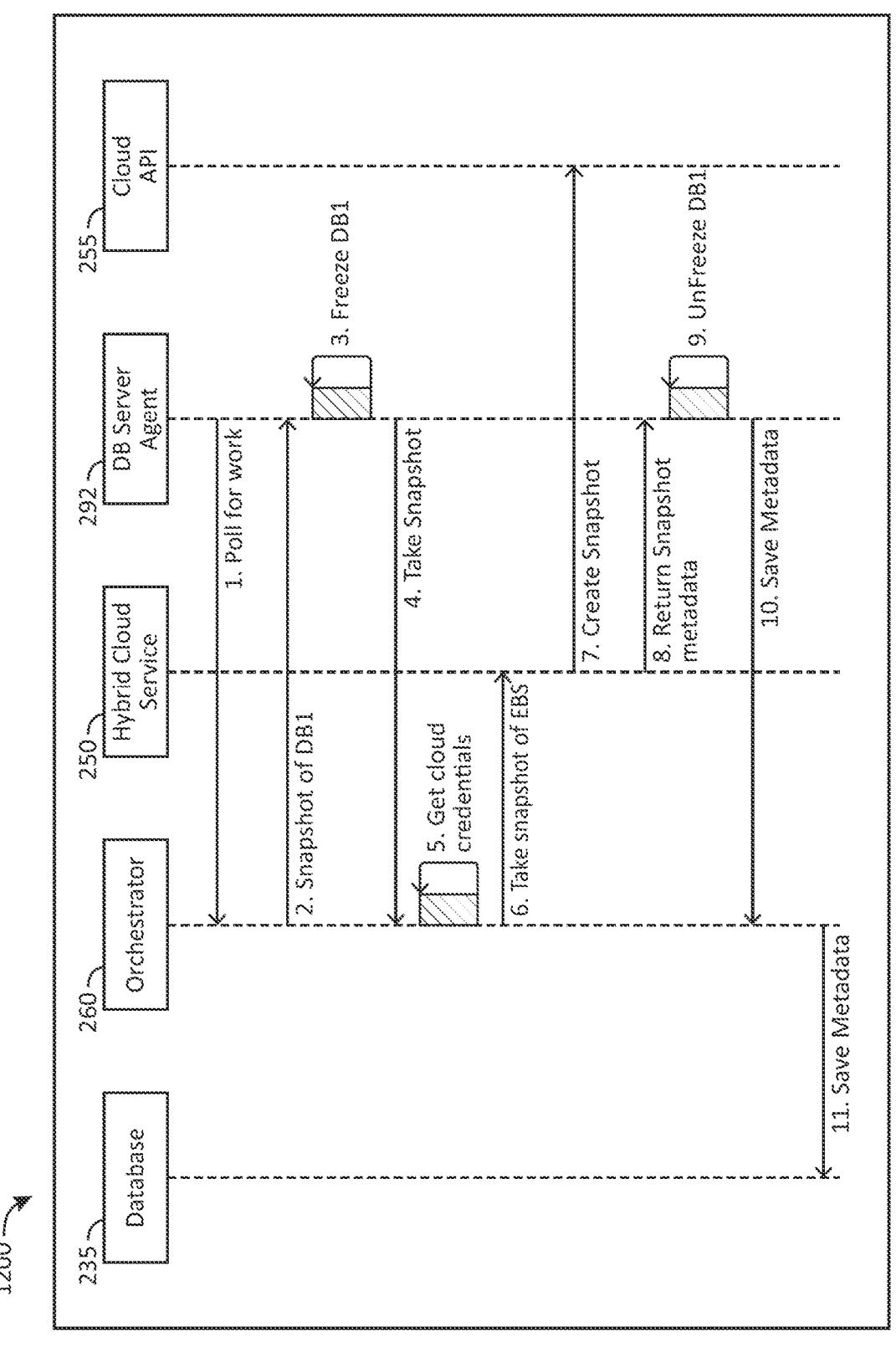
FIG. 12 is an example flowchart illustrating operations of a method for creating a snapshot of a database on a database server using the HCS of the control plane of FIG. 2, in accordance with some embodiments of the present disclosure.

FIG. 12 is an example flowchart illustrating operations of a method for creating a snapshot of a database on a database server using the HCS 250 of the control plane 201 of FIG. 2, in accordance with some embodiments of the present disclosure. The method 1200 may include more or fewer operations than shown. The operations may be performed in the order shown, in a different order, or concurrently.

At operation 1, the agent 292 running on a database server polls for work from the orchestrator system 260. At operation 2, the orchestrator system 260 sends a create snapshot operation to the agent 292 to create a snapshot of a first database associated with the agent 292. In some embodiments, the agent 292 is running on a database server which hosts the first database. At operation 3, the agent 292 freezes the first database. At operation 4, the agent 292 requests the HCS 250 to take a snapshot of the first database. In some embodiments, the agent 292 sends an API call to the HCS 250 to request the snapshot of the first database. In some embodiments, the agent 292 sends a cloud-agnostic API call to the HCS 250. In other embodiments, the agent sends a cloud-specific API call to the HCS 250. For example, the agent may send an API call to the HCS 250 to take a snapshot of EBS volumes on AWS. At operation 5, the HCS 250 may request cloud credentials from the orchestrator system 260. At operation 6, the orchestrator system sends a create snapshot operation including the cloud credentials to the HCS 250. In some embodiments, the HCS 250 receives the cloud credentials from a connection manager which populates the API call from the agent 292 with the cloud credentials before routing the API call to the HCS 250. At operation 7, the HCS 250 makes a cloud API call using a cloud API 255 to a public cloud using the cloud credentials to take a snapshot of the first database. The HCS 250 receives, from the public cloud, metadata of the snapshot of the first database. At operation 8, the HCS 250 sends a response including the metadata of the snapshot to the agent. At operation 9, the agent 292 unfreezes the first database. At operation 10, the agent 292 sends a message including the snapshot metadata to the orchestrator system 260. At operation 11, the orchestrator system 260 saves the snapshot metadata to a database of the control plane.

Figure 13:
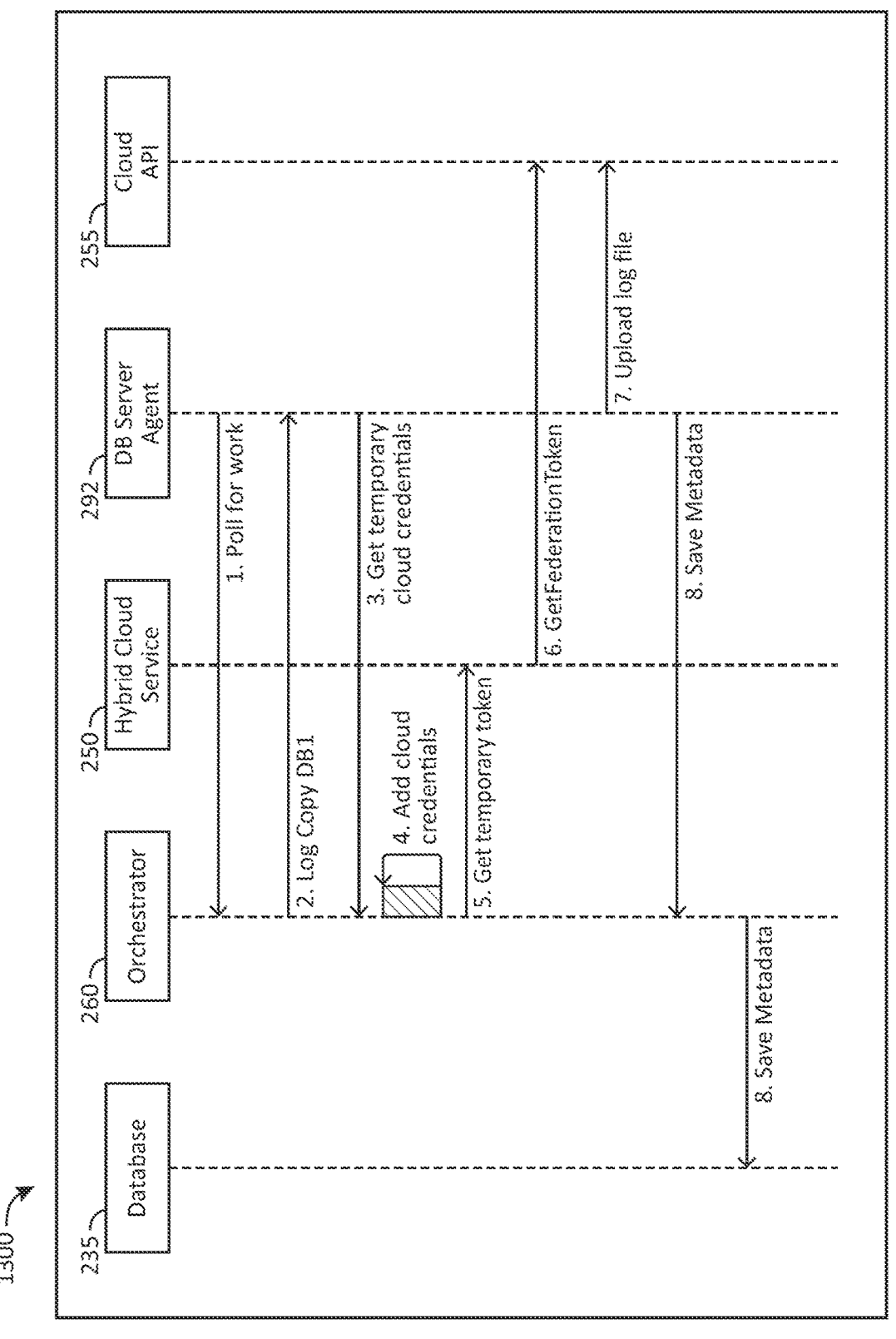
FIG. 13 is an example flowchart illustrating operations of a method for performing a log copy of a database on a database server using the HCS of the control plane of FIG. 2, in accordance with some embodiments of the present disclosure.

FIG. 13 is an example flowchart illustrating operations of a method for performing a log copy of a database on a database server using the HCS of the control plane of FIG. 2, in accordance with some embodiments of the present disclosure. The method 1300 may include more or fewer operations than shown. The operations may be performed in the order shown, in a different order, or concurrently. The log copy may be an operation where logs of the database which track database changes are copied. The logs of the database may be used to update the database to a point of failure after restoring the database.

At operation 1, the agent 292 running on a database server polls for work from the orchestrator system 260. At operation 2, the orchestrator system 260 sends a log copy operation to the agent 292 to copy logs of a first database associated with the agent 292. In some embodiments, the agent 292 is running on a database server which hosts the first database. The agent 292 copies the logs of the first database. At operation 3, the agent 292 requests temporary cloud credentials from the orchestrator system 260. The temporary cloud credentials may be associated with a cloud associated with the first database server. In some embodiments, the agent 292 includes an HCS lite which requests the temporary cloud credentials. At operation 4, the orchestrator system 260 receives the temporary cloud credentials. In some embodiments, a service on the orchestrator system 260 may receive the temporary cloud credentials from the cloud. At operation 5, the orchestrator system 260 instructs the HCS lite to request a temporary token from the cloud using the temporary cloud credentials. At operation 6, the HCS lite requests the temporary token from the cloud using the temporary cloud credentials. At operation 7, the HCS lite uploads the copied logs of the first database to the cloud using the temporary token. In some embodiments, the cloud on which the copied logs are stored is a different cloud from the cloud on which the first database is hosted. For example, the first database may be an AZURE database and the copied logs may be stored on AWS. At operation 8, the agent 292 sends metadata of the log copy to the orchestrator system 260. At operation 9, the orchestrator system 260 sends the metadata to a database 235 of the control plane 201. Advantages of the method 1300 include that the temporary cloud credentials are exposed to the agent 292 in a secure fashion and only the HCS lite is able to access the temporary cloud credentials. The temporary cloud credentials are temporary and expire after a predetermined time. Additionally, the security access provided of the temporary token to the agent 292 can be highly granular to allow access to very specific resources and actions. The method 1300 may further include copying the copied logs to a storage location using the HCS lite and then using an HCS on the orchestrator system 260 to copy the copied logs from the storage location to the cloud. In this way, the HCS 250 may copy the logs from the storage location to the cloud using API calls without receiving the copied logs at the orchestrator system 260.

Figure 14:
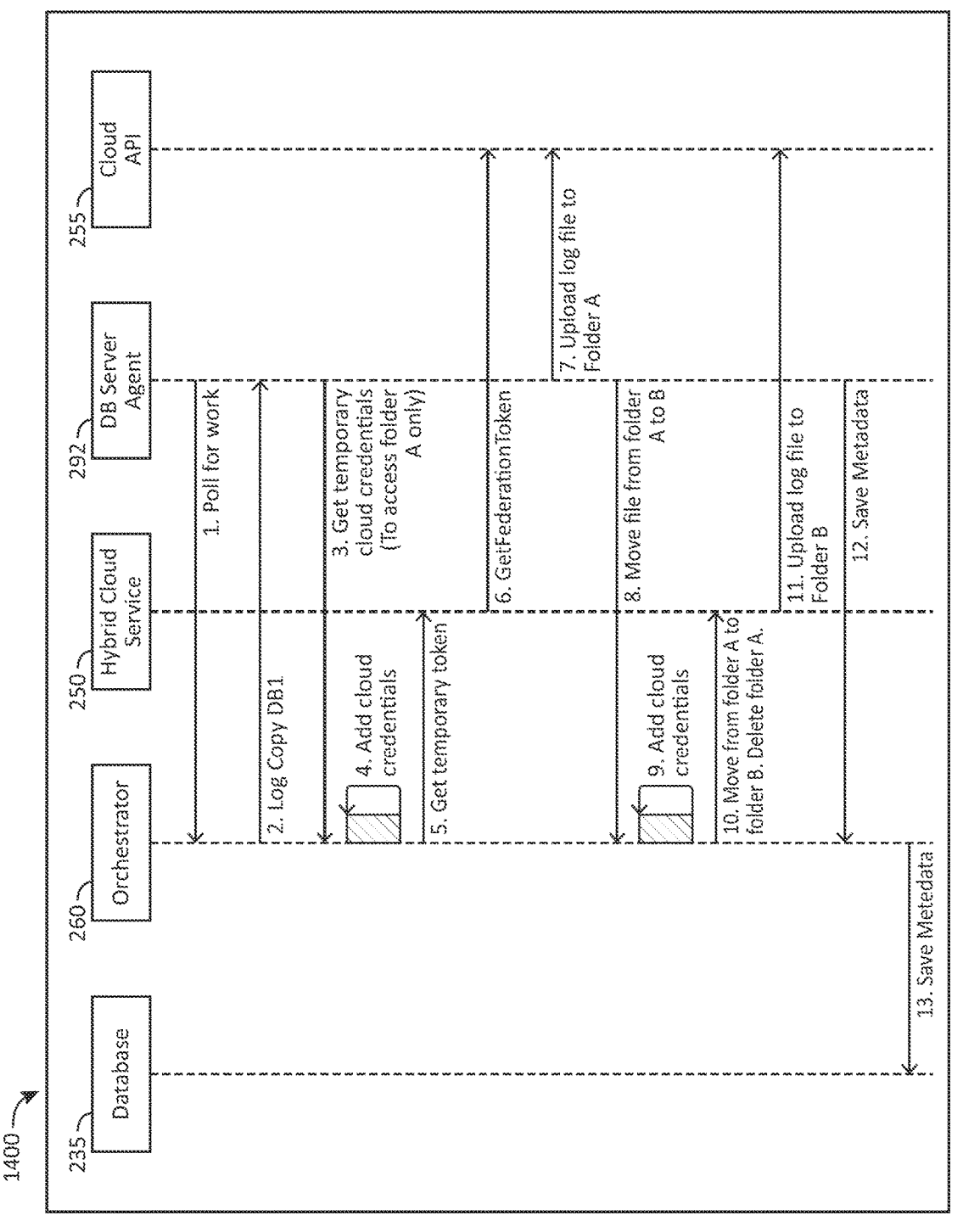
FIG. 14 is another example flowchart illustrating operations of a method for performing a log copy of a database on a database server using the HCS of the control plane of FIG. 2, in accordance with some embodiments of the present disclosure.

FIG. 14 is another example flowchart illustrating operations of a method for performing a log copy of a database on a database server using the HCS 250 of the control plane 201 of FIG. 2 to copy the logs of the database to a first location and store them in a second location, in accordance with some embodiments of the present disclosure. The method 1400 may include more or fewer operations than shown. The operations may be performed in the order shown, in a different order, or concurrently.

At operation 1, the agent 292 292 running on a database server polls for work from an orchestrator system 260 of a control plane. At operation 2, the orchestrator system 260 sends a copy logs operation to the agent 292 to copy logs of a first database associated with the agent 292. In some embodiments, the agent 292 is running on a database server which hosts the first database. The agent 292 copies the logs of the first database. At operation 3, the agent 292 requests from the orchestrator system 260 temporary cloud credentials to access a first storage location on a cloud associated with the first database server. In some embodiments, the agent 292 includes an HCS lite which requests the temporary cloud credentials. At operation 4, the orchestrator system 260 receives the temporary cloud credentials. In some embodiments, a service on the orchestrator system 260 may receive the temporary cloud credentials from the cloud. At operation 5, the orchestrator system 260 instructs the HCS lite to request a temporary token from the cloud using the temporary cloud credentials. At operation 6, the HCS lite requests the temporary token from the cloud using the temporary cloud credentials. At operation 7, the HCS lite uploads the copied logs of the first database to the first storage location on the cloud using the temporary token. In some embodiments, the cloud on which the copied logs are stored is a different cloud from the cloud on which the first database is hosted. For example, the first database may be an AZURE database and the copied logs may be stored on AWS. At operation 8, the agent 292 requests the orchestrator system 260 to move the copied logs from the first storage location to a second storage location. In some embodiments, the HCS lite requests the HCS 250 to move the copied logs from the first storage location to the second storage location. At operation 9, the orchestrator system 260 adds cloud credentials to the received request. In some embodiments, the HCS 250 adds the cloud credentials to the received request. At operation 10, the orchestrator instructs the HCS 250 to copy the copied logs from the first storage location to the second storage location. At operation 11, the HCS 250 copies the copied logs from the first storage location to the second location. The HCS 250 may delete the first storage location. At operation 12, the agent 292 sends metadata of the log copy to the orchestrator system 260. At operation 13, the orchestrator system 260 sends the metadata to a database 235 of the control plane 201. Advantages of the method 1400 include conserving resources of the database server on which the agent 292 is running, as the database server does not need to upload the log files to the second storage location. Additionally, only the HCS 250 is given access to the second storage location. For example, the second storage location may be a public cloud to which access is restricted to only the HCS 250.

Figure 15:
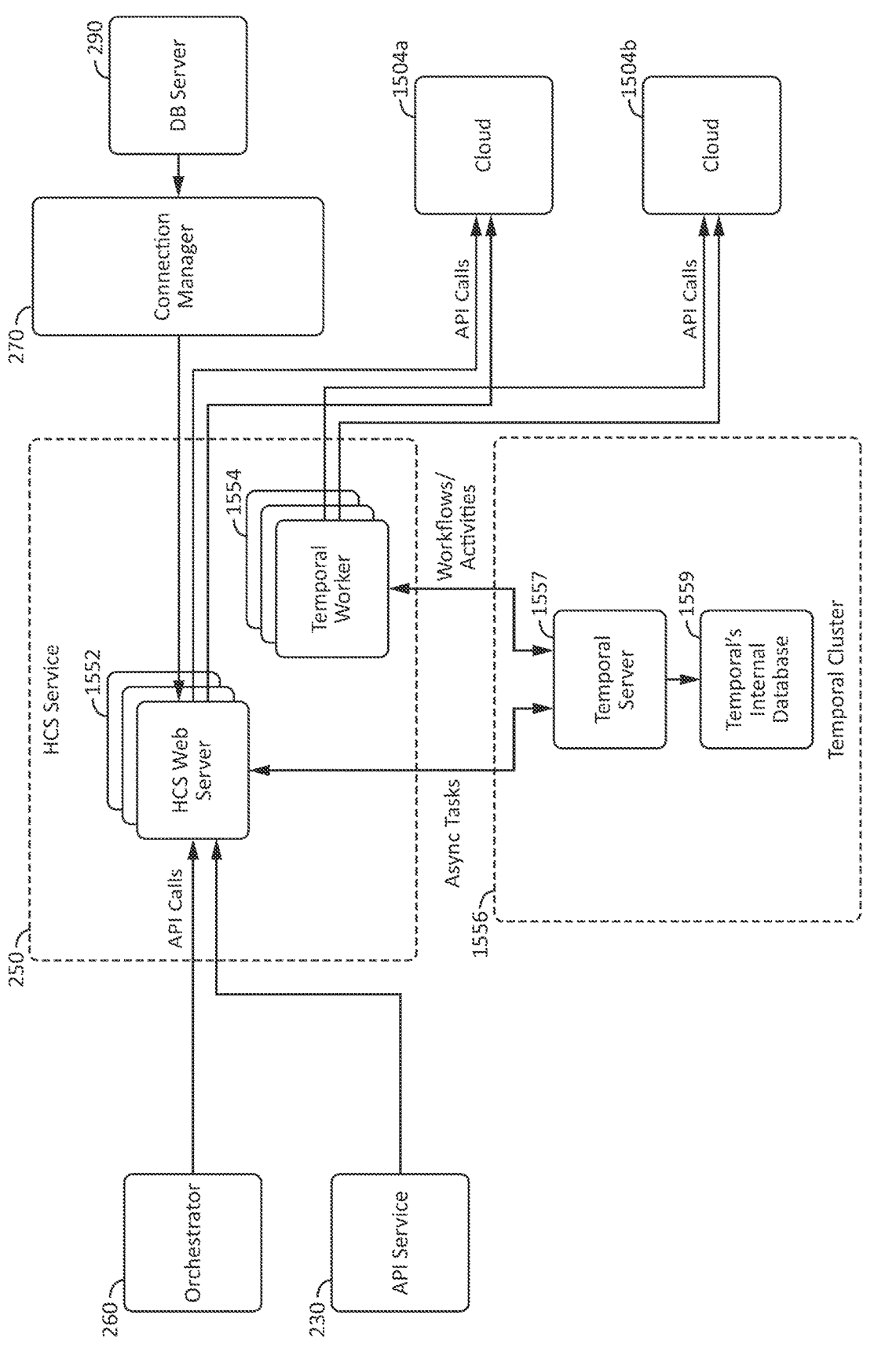
FIG. 15 is an example block diagram showing details of the HCS of the control plane of FIG. 2, in accordance with some embodiments of the present disclosure.

FIG. 15 is an example block diagram showing details of the HCS 250 of the control plane 201 of FIG. 2, in accordance with some embodiments of the present disclosure. 250 The HCS 250 may include an HCS server 1552. In some implementations, the HCS server 1552 may be a web server. In some embodiments, the HCS server 1552 may be a plurality of servers. The HCS 250 may include a temporal worker 1554. In some embodiments, the temporal worker 1554 may be a plurality of temporal workers. The temporal worker 1554 may execute workflows defined by the HCS 250. The HCS 250 may communicate with a temporal cluster 1556. The temporal cluster 1556 may be a service which provides orchestration management capabilities. The temporal cluster 1556 may provide task management, workflow creation, automatic retries, and crash recoverability capabilities. Task management may include assigning a TaskID to each workflow which can be used to fetch a status of the workflow. The temporal cluster 1556 may orchestrate workflows and store a state of each executing workflow. The temporal cluster 1556 may rebuild a workflow if the workflow is interrupted by rebuilding a state of the temporal worker 1554 such that the workflow resumes from the point of failure. If the temporal worker 1554 crashes while executing a workflow, the temporal cluster 1556 automatically retries the workflow. The temporal cluster 1556 may include a temporal server 1557. The temporal server 1557 may receive information on the workflows from the HCS web server 1552 and send instructions based on the information to the temporal worker 1554. The temporal cluster 1556 may include a temporal database 1559 which stores the states of the workflows.

The HCS 250 may communicate with the orchestration system 260. The orchestration system 260 may generate operations. The operations may include public cloud operations to be executed on public clouds. The orchestration system 260 may send public cloud operation s to the HCS 250. The HCS 250 may execute the public cloud operations by sending one or more API calls to public clouds 1504. A first public cloud 1504a of the public clouds 1504 may have different APIs than a second public cloud 1504b of the public clouds 1504. For example, the first public cloud 1504a may be AWS and the second public cloud 1504b may be AZURE, each with their own APIs. The public cloud operations sent by the orchestration system 260 may include cloud credentials specific to a public cloud of the public clouds 1504. The HCS 250 may make API calls specific to the first public cloud 1504a using cloud credentials specific to the first public cloud 1504a. The HCS 250 may make API calls specific to the second public cloud 1504b using cloud credentials specific to the second public cloud 1504b.

290 The database server 290 may send requests to the connection manager 270. The connection manager may validate the requests and append the requests with cloud credentials before routing the requests to the HCS 250. The connection manager 270 may determine a public cloud of the public clouds 1504 to which the request is intended, retrieve cloud credentials specific to the public cloud from a metadata store, and add the cloud credentials to the request to route the request to the HCS 250.

230 The internal API service 230 may send operations to the HCS 250. The operations sent by the internal API service 230 may include cloud-specific credentials. In some embodiments, the internal API service 230 receives the operations from the connection manager 270 and then sends the operations to the HCs 250.

Figure 16:
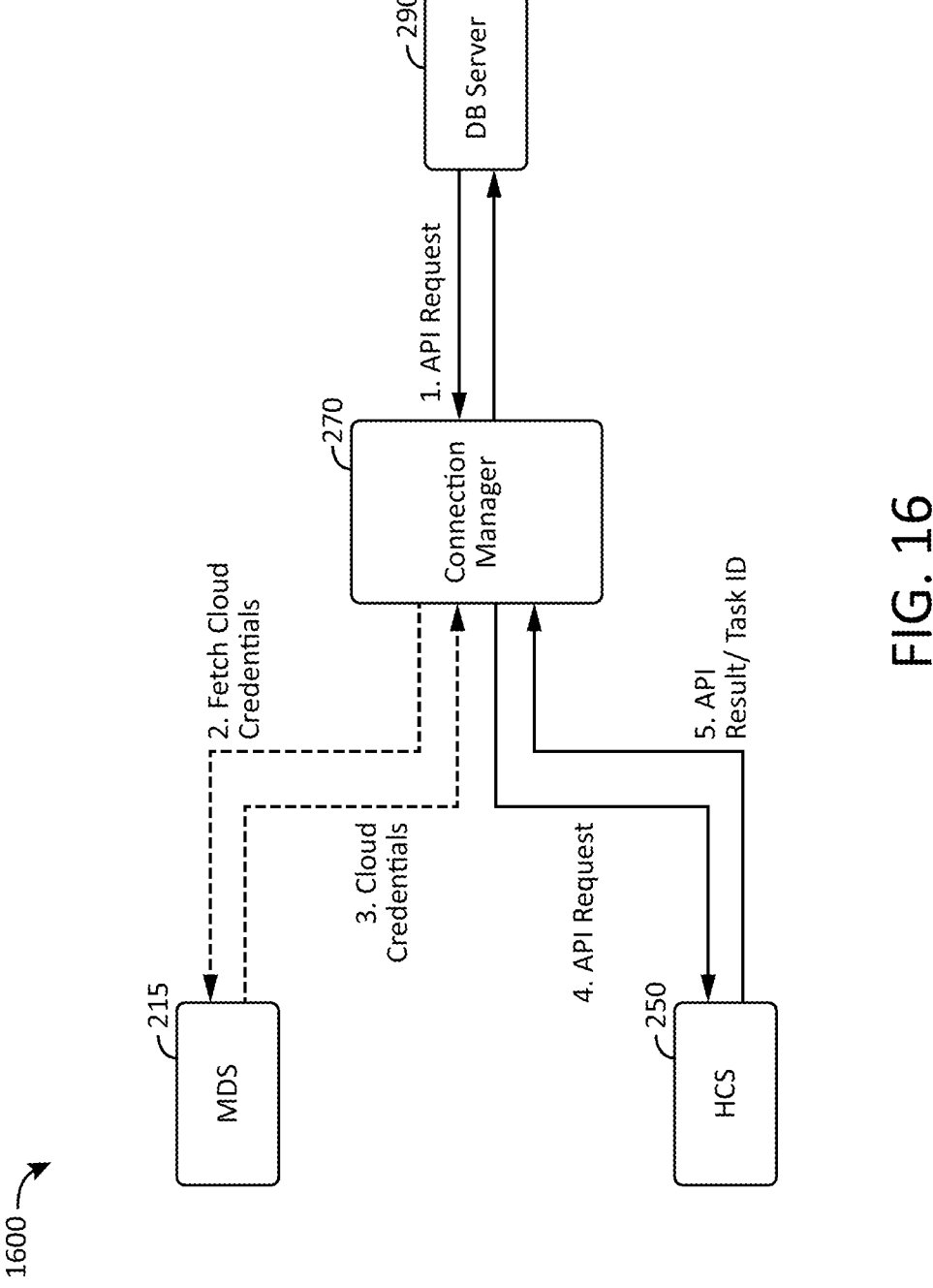
FIG. 16 is an example flowchart illustrating operations of a method for executing operations on a public cloud using the HCS of FIG. 2, in accordance with some embodiments of the present disclosure.

FIG. 16 is an example flowchart illustrating operations of a method for executing operations on a public cloud using the HCS 250 of FIG. 2, in accordance with some embodiments of the present disclosure. The method 1600 may include more or fewer operations than shown. The operations may be performed in the order shown, in a different order, or concurrently.

At operation 1, the database server 290 sends an API request to a connection manager 270. At operation 2, the connection manager 270 fetches cloud credentials from a metadata store 215 based on the API request. The cloud credentials may be associated with a cloud to which the API request will be made. At operation 3, the connection manager 270 receives the cloud credentials from the metadata store 215 and modifies the API request with the cloud credentials. In an example, the connection manager 270 appends the cloud credentials to the API request. At operation 4, the connection manager 270 sends the modified API request to the HCS 250. The HCS 250 makes the modified API request to the cloud and receives a result. At operation 5, the HCS 250 sends the result and a task ID of the API request to the connection manager 270 which routes the result to the database server.

Figure 17:
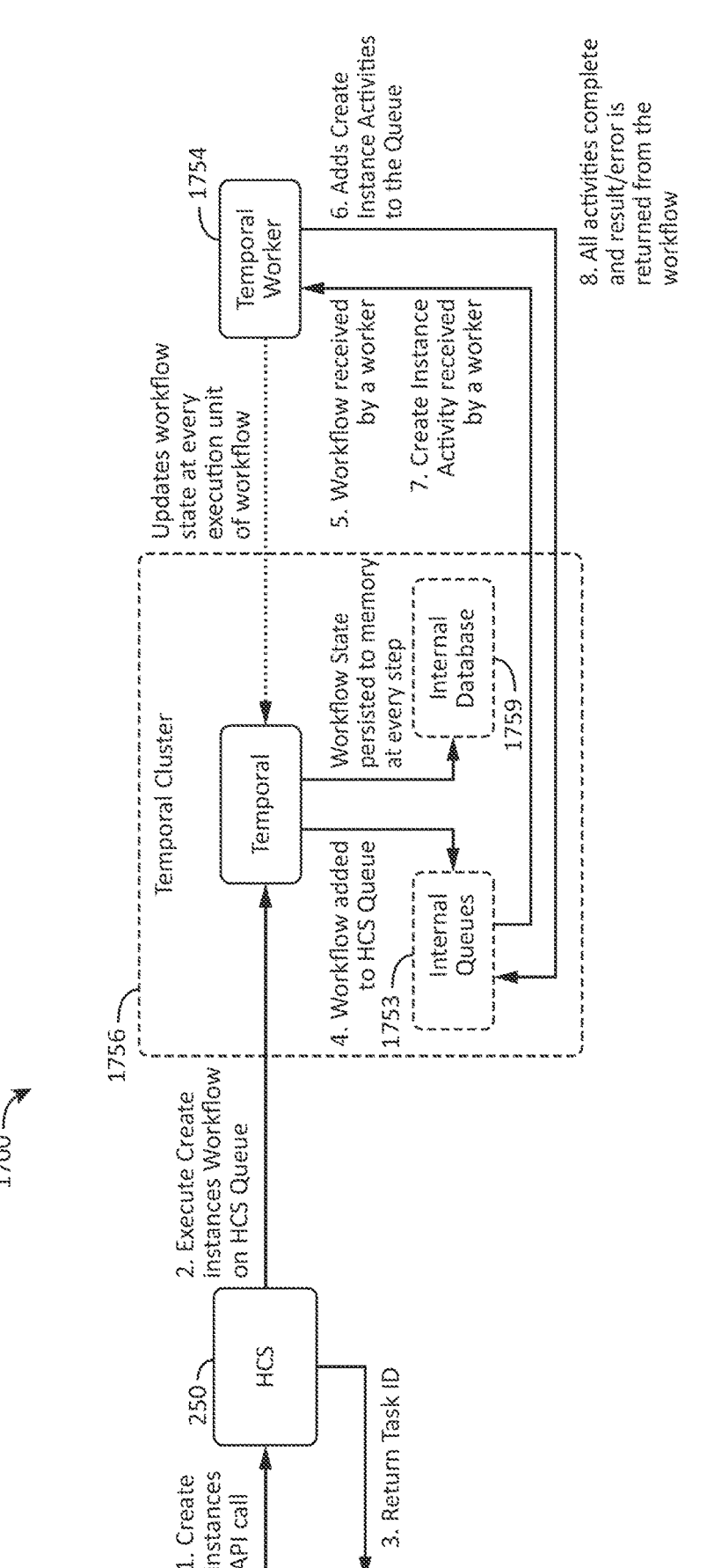
FIG. 17 is an example flowchart illustrating additional detail of certain operations of FIG. 16, in accordance with some embodiments of the present disclosure.

FIG. 17 is an example flowchart illustrating additional detail of certain operations of FIG. 16, in accordance with some embodiments of the present disclosure. The method 1700 may include more or fewer operations than shown. The operations may be performed in the order shown, in a different order, or concurrently.

In some embodiments, the method 1700 may be part of the method 1600 of FIG. 16. The method 1700 may take place between operations 4 and 5 of the method 1600.

At operation 1, the HCS 250 receives the modified API request containing cloud credentials associated with a public cloud. At operation 2, the HCS 250 invokes a workflow based on the modified API request. Invoking the workflow may include sending an instruction to a temporal cluster 1756 to execute the workflow. At operation 3, the HCS 250 returns a task ID of the workflow as a response to the API request. At operation 4, the temporal cluster 1756 adds the workflow to an internal queue 1753. The temporal cluster 1756 begins storing a state of the workflow in an internal database 1759. At operation 5, the temporal cluster 1756 sends the workflow to a temporal worker 1754 which executes the workflow. The workflow includes multiple activities, which are executed as asynchronous tasks from the workflow. At operation 6, the temporal worker 1754 adds the activities of the workflow to the internal queue 1753. At operation 7, the temporal worker 1754 executes the activities of the workflow. In some embodiments, multiple temporal workers execute the activities of the workflow. At operation 8, based on the activities of the workflow being executed, the temporal cluster 1756 returns a result of the workflow to the HCS 250. The HCS 250 sends the result to the connection manager 270 in operation 5 of FIG. 16.

Figure 18:
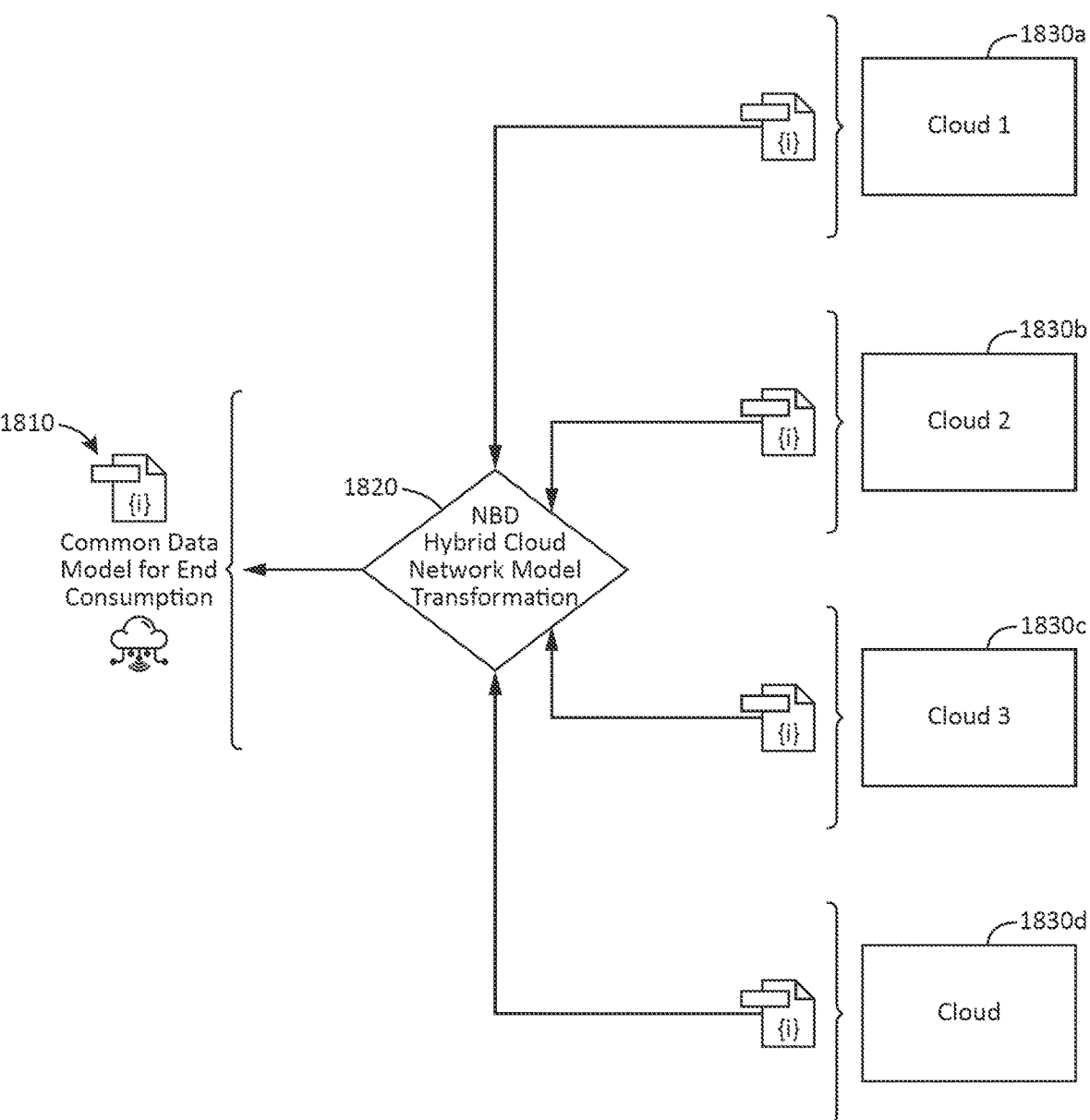
FIG. 18 illustrates a common data model for interfacing with multiple public clouds implemented by the control plane of FIG. 2, in accordance with some embodiments of the present disclosure.

FIG. 18 illustrates a common data model 1810 implemented by the control plane of FIG. 2 for interfacing with multiple public clouds 1830a, 1830b, 1830c, 1830d (referred to herein collectively as public clouds 1830), in accordance with some embodiments of the present disclosure. In some implementations, the HCS 250 of the control plane 201 of FIG. 2 uses the common data model 1810 to communicate with the public clouds 1830. Each of the public clouds 1830 may have a different network topology. The common data model 1810 provides an abstraction of various entities on the multiple public clouds such that similar entities on the public clouds 1830 are represented as a single entity in the common data model 1810. The common data model 1810 allows services to interact with the various entities on the multiple public clouds using cloud-agnostic operations. This allows an additional public cloud to be added to the public clouds 1830 without disrupting the operations of the services. The network entities of the additional public cloud are mapped to the entities of the common data model 1810, allowing the services to continue to use the cloud-agnostic operations. A Hybrid Cloud Network Model Transformation 1820 translates between the common data model 1810 and the public clouds 1830. The Hybrid Cloud Network Model Transformation 1820 may include a mapping between the entities of the common data model 1810 and the various network entities of the public clouds 1830. In some embodiments, the entities of the common data model 1810 are termed "data transfer objects."

The entities of the common data model 1810 include multiple levels. A first level of the multiple levels may include common attributes which are shared by all the various entities on the public clouds 1830c. A second level, nested within the first level, may include cloud-specific attributes. The entities of the common data model 1810 may include various numbers of levels, depending upon the attributes of the various entities of the public clouds 1830. In an example, virtual networks of the public clouds 1830 may include two levels. In this example, the first level includes attributes common to the virtual networks of the public clouds 1830 such as UUID, name, description, status, region, availability zones, CIDR blocks, and tags. In this example, the second level includes attributes specific to each of the public clouds 1830, such as DNS configurations, identification-related metadata (e.g., default, external, etc.), and security-related configurations. The second level may include groups of attributes specific to each public cloud of the public clouds 1830.

Figure 19:
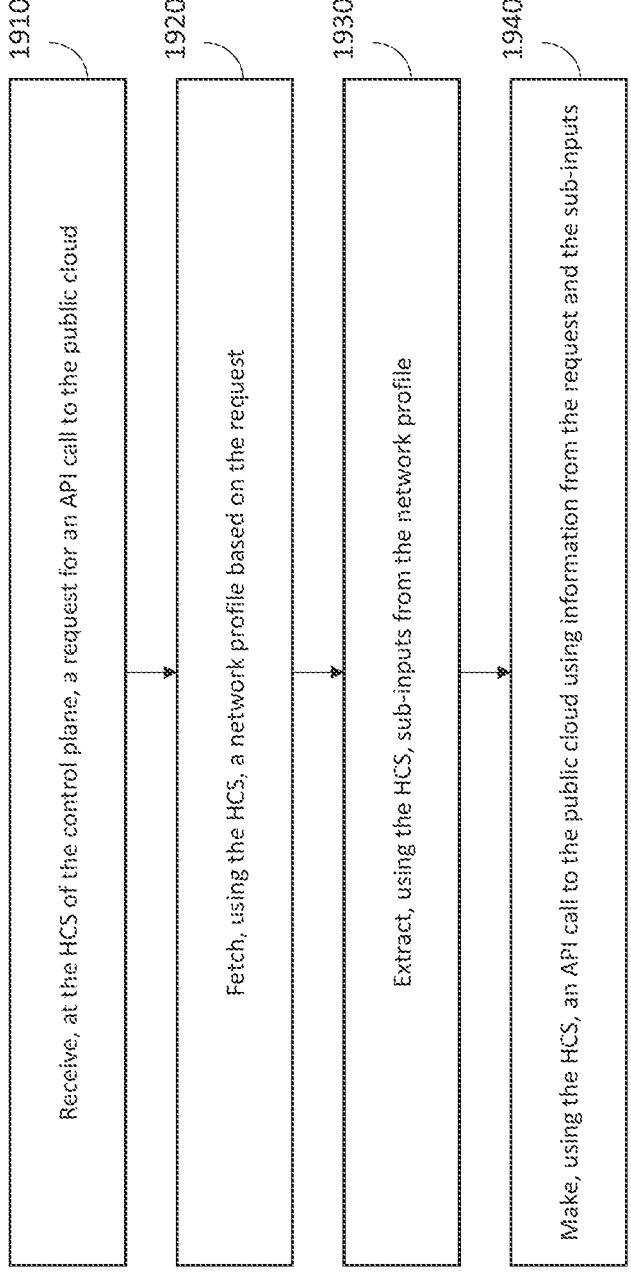
FIG. 19 is an example flowchart illustrating operations of a method for making an API call to a public cloud using the common data model of FIG. 18, in accordance with some embodiments of the present disclosure.

FIG. 19 is an example flowchart illustrating operations of a method for making an API call to a public cloud using the common data model of FIG. 18, in accordance with some embodiments of the present disclosure. The method 1900 may include more or fewer operations than shown. Operations of the method 1900 may be performed in the order shown, in a different order, or concurrently. In some implementations, the method 1900 may be performed by the control plane 201 of FIG. 2. In some implementations, the method 1900 may be performed by the HCS 250 of the control plane 201 of FIG. 2.

At operation 1910, an HCS may receive a request for an API call to the public cloud. The request may include network details for making the API call. The network details may include an identifier of a network profile. At operation 1920, the HCS may fetch the network profile based on the request. The network profile may include sub-inputs for making the API call to the public cloud. The sub-inputs may include the second level of the common data model of FIG. 18. At operation 1930, the HCS may extract the sub-inputs from the network profile. The HCS may generate the API call using information from the request and the sub-inputs. At operation 4, the HCS may make the API call to the public cloud.

FIG. 20 is an example flowchart illustrating operations of a method for making an API call to a public cloud using a grouped network profile, in accordance with some embodiments of the present disclosure. The method 1900 may include more or fewer operations than shown. Operations of the method 2000 may be performed in the order shown, in a different order, or concurrently.

At operation 2010, an HCS may receive a request for multiple related API calls to the public cloud. For example, the HCS may receive a request to create a multiple instance database with instances in multiple regions and/or availability zones of a public cloud. The request may include network details for making the API calls. The network details may include an identifier of a network profile. The network details may include an identifier of a grouped network profile including multiple network profiles. The grouped network profile may specify network configurations for multiple cloud provider regions and availability zones. Each network profile of the grouped network profile may include network details for a cloud provider, region, and availability zone. At operation 2020, the HCS may fetch the grouped network profile. In some embodiments, fetching the grouped network profile includes fetching the multiple network profiles of the grouped network profile. The multiple network profiles may include sub-inputs for making the API calls to the public cloud. The sub-inputs may include the second level of the common data model of FIG. 18. At operation 2030, the HCS may extract the sub-inputs from the multiple network profiles. The HCS may generate the API calls using information from the request and the sub-inputs of the multiple network profiles. At operation 2040, the HCS may make a first API call of the multiple API calls to the public cloud using the sub-inputs of a first network profile of the grouped network profile to the public cloud. At operation 2050, the HCS may make a second API call of the multiple API calls using the sub-inputs of a second network profile of the grouped network profile to the public cloud. At operation 2060, the HCS may make a third API call of the multiple API calls using the sub-inputs of a third network profile of the grouped network profile to the public cloud.

In some embodiments, the public cloud includes multiple public clouds. The multiple network profiles of the grouped network profile each include network details of a public cloud of the multiple public clouds. In an example, the first network profile includes network details of a first public cloud, the second network profile includes network details of a second public cloud, and the third network profile includes network details of a third public cloud. A user may input the network details for each network profile. The user may select the cloud provider, region, and availability zone for each network profile.

FIG. 21 is an example flowchart illustrating operations of a method for processing, by the control plane of the database management system of FIG. 2, a request from a database server, in accordance with some embodiments of the present disclosure. In some embodiments, the database server is the database server 290a of FIG. 2. The method 2100 may include more or fewer operations than shown. The operations may be performed in the order shown, in a different order, or concurrently.

At operation 2110, a control plane of the database management system receives, on a data stream of a messaging cluster, a message from the database server. The data stream may include a topic of the messaging cluster. The messaging cluster may include multiple topics. The multiple topics may include a commands topic, an operations topic, and a request topic. In an example, the data stream may include a request topic of the messaging cluster. The data stream may be associated with the database server such that only the database server can publish messages to or subscribe to the data stream. For example, the data stream may be associated with a tenant ID of a tenant of the database management system associated with the database server such that only database server associated with the tenant can publish messages to the data stream. In another example, the data stream is associated with a UUID of the database server such that only the database server can publish messages to and/or subscribe to the data stream. The message may be a request from the database server. For example, the request may be a request for an API call to a service on the control plane.

At operation 2120, a connection manager of the control plane routes the message to a service of the control plane. The connection manager may listen for the message on the messaging cluster and, in response to detecting the message, route the message to the service. The connection manager may determine, based on a content of the message, that the service is a recipient of the message. The connection manager may determine, based on a format of the message, that the service is a recipient of the message. For example, the connection manager may determine that an API request of the message is a request for an API call to the service. The connection manager may modify the message based on the service. The connection manager may modify the message to have a format compatible with the service. The connection manager may add information required by the service to the message. For example, the connection manager may determine a tenant ID and an owner ID based on one or more characteristics of the message and add the message based on the tenant ID and the owner ID. In some implementations, routing the message to the service includes making an API call contained in the message to the service.

The connection manager may further identify metadata from the request, store the metadata, and, based on the stored metadata, generate an alert. Generating the alert may include generating a notification to a user of the database management system at a user interface.

At operation 2130, the service generates a response to the message. Generating the response to the message may include generating an API response to an API request of the message. Generating the response to the message may include retrieving metadata associated with the database server. Generating the response to the message may include determining an identity of a cloud provider associated with the database server based on the request, modifying the request using cloud credentials associated with the cloud provider, and sending the modified request to the cloud provider. The modified request may be an API call to the cloud provider. In this way, the database server may request an API call to the cloud provider without having the cloud credentials associated with the cloud provider.

At operation 2140, the connection manager routes the response to the messaging cluster. Routing the response to the messaging cluster may include modifying the response based on one or more characteristics of the database server. For example, the connection manager may add a UUID of the database server to the response.

At operation 2150, the messaging cluster sends, on the data stream, the response to the database server. Sending the response to the database server may include publishing the response to a topic of the messaging cluster. For example, sending the response may include publishing the response to a transitory response topic of a requests topic of the messaging cluster.

The method 2500 may further include receiving a request for registering the database server through a registration data stream of the messaging cluster. The registration request may include activation credentials. The control plane may generate database server credentials using the activation credentials and send the database server credentials to the database server. The control plane may receive a message from the database server including the database server credentials to establish the TCP connection with the database server.

The method 2100 may further include sending, by the messaging cluster, an operations message to the database server. The messaging cluster may store the operations message. In response to not receiving an acknowledgement from the database server of the first message within a predetermined period of time, the messaging cluster may resend the operations message to the database server. In some embodiments, the messaging cluster may store the operations message for the predetermined period of time. In other embodiments, the messaging cluster may store the operations message until the messaging cluster receives the acknowledgement from the database server.

The method 2100 may further include receiving, through a second data stream, a call to provision a database across a first region of a cloud and a second region of the cloud, retrieving, by the control plane, a grouped network profile associated with the cloud, and determining, by the control plane, based on the grouped network profile, first network details associated with the first region and second network details associated with the second region. The method 2100 may further include provisioning, by the control plane, the database on a first node in the first region using the first network details and provisioning the database on a second node in the second region using the second network details.

Figure 22:
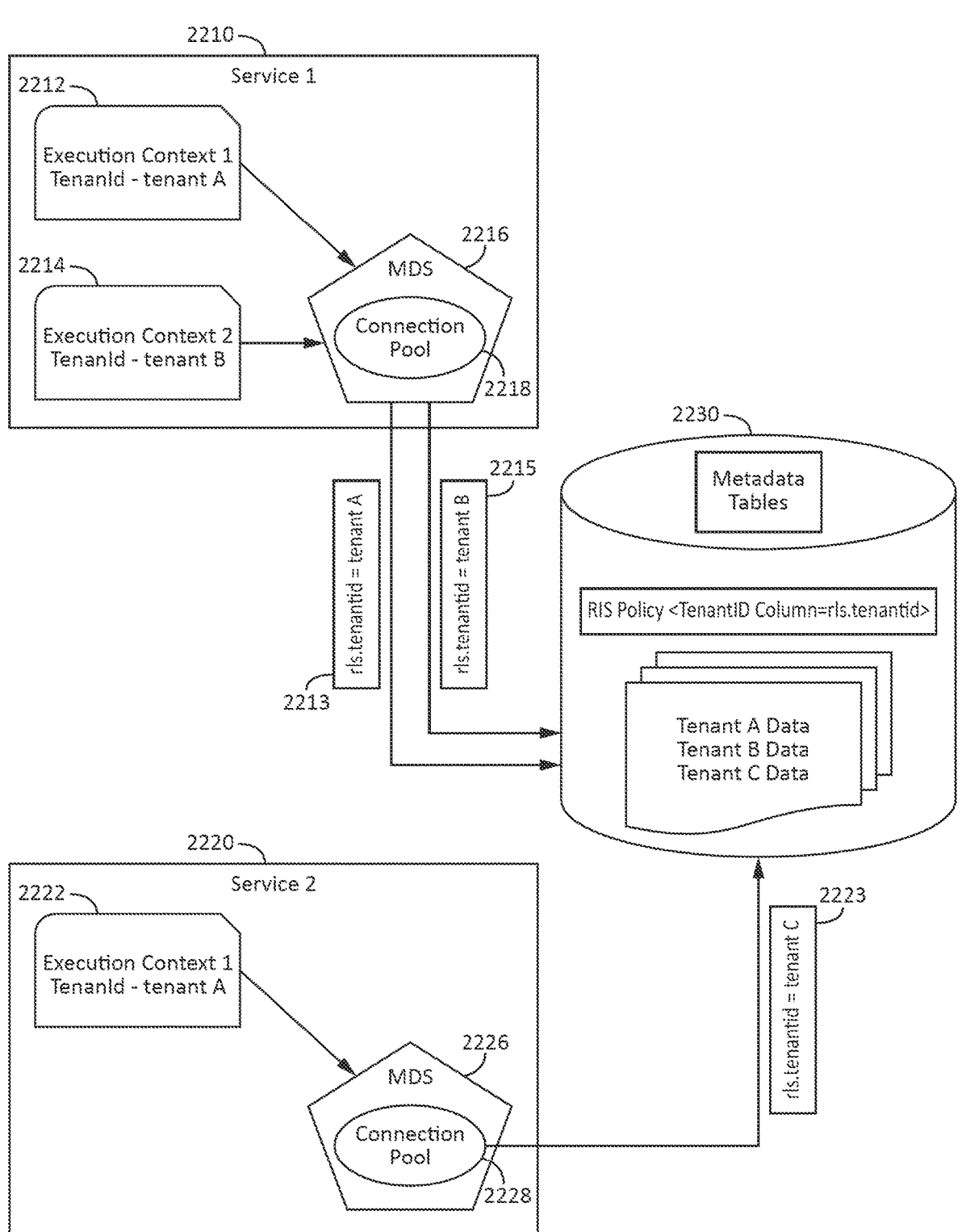
FIG. 22 is an example block diagram illustrating use of a row-level security (RLS) policy for accessing metadata from a metadata store in the control plane of FIG. 2, in accordance with some embodiments of the present disclosure.

FIG. 22 is an example block diagram illustrating use of a row-level security (RLS) policy for accessing metadata from a metadata store in the control plane of FIG. 2, in accordance with some embodiments of the present disclosure. The metadata store 2230 may receive metadata requests from a first service 2210 and a second service 2220. In some embodiments, the first service 2210 and the second service 2220 may be services of the core services 220 of FIG. 2. The metadata store 2230 may include one or more tables including pooled data associated with a plurality of tenants. The metadata store 2230 may be a PostgreSQL database. Although PostgreSQL is used as an example, the present disclosure is applicable to other types of database engines. The RLS policy restricts access within the one or more tables of the database store 2230 to rows associated with the tenant ID of the PostgreSQL user. The one or more tables of the database store 2230 may include a tenant ID column and may be indexed by tenant ID. In conventional systems, metadata requests are associated with a PostgreSQL user. Each PostgreSQL user is associated with a tenant ID.

The metadata requests may be associated with a single PostgreSQL user. Each respective metadata request includes a runtime session parameter including a tenant ID for the respective metadata request. The runtime session parameter may be an execution context of the metadata request. For example, the runtime session parameter may be a thread-level context. The thread-level context may be populated with the tenant ID of the metadata request with which the thread-level context is associated.

The first service 2210 may receive a first API call 2212. The first API call 2212 may include a first execution context including a first tenant ID. The first service 2210 may generate a first metadata request 2213 using the first execution context. The first service 2210 may send the first metadata request 2213 to the metadata store 2230 via a connection pool 2218 of a metadata store connection 2216 of the first service 2210. The metadata store 2230 applies the RLS policy using the first tenant ID. The RLS policy restricts the first metadata request 2213 to rows associated with the first tenant ID of the one or more metadata tables of the metadata store 2230. In an example, the first metadata request 2213 is a select query which returns rows where a value in the tenant ID column equals the first tenant ID based on the RLS policy. In another example, the first metadata request 2213 is a select query where the first tenant ID is undefined. In this example, the first metadata request returns no rows based on the RLS policy.

The first service 2210 may receive a second API call 2214. The second API call 2214 may include a second execution context including a second tenant ID. The first service 2210 may generate a second metadata request 2215 using the second execution context. The first service 2210 may send the second metadata request 2215 to the metadata store 2230 via the connection pool 2218 of the metadata store connection 2216. The metadata store 2230 applies the RLS policy using the second tenant ID. The RLS policy restricts the second metadata request 2215 to rows associated with the second tenant ID of the one or more metadata tables of the metadata store 2230. In an example, the second metadata request 2215 is an update request which updates rows where a value in the tenant ID column equals the second tenant ID based on the RLS policy. In another example, the second metadata request 2215 is an delete request which deletes rows where a value in the tenant ID column equals the second tenant ID based on the RLS policy.

The second service 2220 may receive a third API call 2222. The third API call 2222 may include a third execution context including a third tenant ID. The second service 2220 may generate a third metadata request 2223 using the third execution context. The second service 2220 may send the third metadata request 2223 to the metadata store 2230 via a connection pool 2228 of a metadata store connection 2226 of the second service 2220. The metadata store 2230 applies the RLS policy using the third tenant ID. The RLS policy restricts the third metadata request 2223 to rows associated with the third tenant ID of the one or more metadata tables of the metadata store 2230.

In some embodiments, the second service 2220 includes the third tenant ID in generating the third metadata request 2213. The second service 2220 sends the third metadata 2213 request to the metadata store 2230 and the metadata store 2230 reads the third tenant ID from the third metadata request 2213. In other embodiments, the second service 2220 does not include the third tenant ID in generating the third metadata request 2213. The metadata store 2230 includes a trigger to append the third tenant ID from the execution context of the third metadata request 2213. In an example, the third metadata request 2213 is an insert request which does not include the third tenant ID. The trigger causes the metadata store to add the third tenant ID to values to be inserted in the insert request.

In some embodiments, global metadata is not associated with any particular tenant, but may be required for all tenants to access. For example, metadata associated with out-of-the-box (00B) entities is not associated with any particular tenant but may be required by all tenants. In some embodiments, the global metadata is associated with a global tenant. The global tenant may be associated with a global tenant ID. The RLS policy may allow metadata requests to access rows including a tenant ID of the metadata request and rows including the global tenant ID. In an example, the first metadata request 2213 is a select query which returns rows associated with the first tenant ID and the global tenant ID. In other embodiments, the global metadata is repeated in the database store 2230 for each tenant ID in the database store 2230.

FIG. 23 is a flowchart illustrating operations in a method for the control plane of FIG. 2 to isolate messages across tenants of the database management system of FIG. 2, in accordance with some embodiments of the present disclosure. The method 2300 may include more or fewer operations than shown. The operations may be performed in the order shown, in a different order, or concurrently.

At operation 2310, a control plane of the database management system receives a request from a tenant of the database management system to update a portion of a database.

The tenant may isolate data associated with the tenant to users associated with the tenant. The tenant may isolate the data associated with the tenant using row-level security (RLS). Requests to access the portion of the database may trigger an RLS policy which returns only rows in the database associated with the tenant. The database may include a column containing tenant IDs. The portion of the database may be associated with the tenant in the database based on rows of the portion including a tenant ID of the tenant in the tenant ID column. The request may be from a user associated with the tenant. The first user may be authorized, by the control plane, to send the request to the control plane.

At operation 2320, the control plane determines an individual tenant identifier of the tenant. The control plane may determine the individual tenant identifier from an execution context of the request. The execution context may include the tenant identifier of the tenant. The control plane may fetch the individual tenant identifier from the execution context of the request. The tenant identifier may be added to the execution context from a header of the first request. The execution context may be a thread context. In some embodiments, the execution context is created using ThreadLocal. The execution context may be global in scope but visible only in the thread in the thread. In some embodiments, the request does not include the individual tenant identifier. The individual tenant identifier may be determined from the execution context.

In some embodiments, the portion of the database may include metadata of one or more entities on a database server associated with the tenant. The request to update the portion of the database may be triggered by an update to the one or more entities on the database server. In some embodiments, the request is automatically generated for the tenant on the control plane. For example, an object in a database server database of the database server expires, triggering a request for the tenant on the control plane to update metadata associated with the object on the control plane. The control plane may receive a message from the database server in a topic of a messaging cluster, wherein the topic is associated with the database server, and wherein the message includes the update to the one or more entities on the database server. The control plane may determine the tenant from the message based on one or more of an identifier of the tenant included the message and one or more characteristics of the topic. For example, the control plane may determine the tenant based on the topic of the messaging cluster being associated with the tenant. In this example, the control plane may read the individual tenant identifier from a name of the topic or may determine the individual tenant identifier based on a mapping between the name of the topic and the individual tenant identifier. The control plane may generate topics associated with the database server on the messaging cluster to communicate with the database server.

In some embodiments, the portion of the database includes metadata of one or more entities on a database server associated with the tenant, and the request to update the portion of the database may trigger an update to the one or more entities on the database server. In an example, the request is request to delete metadata from the database associated with an entity on the database server. In this example, deleting the metadata may trigger an operation where the control plane sends a message to the database server to delete the entity. To update the one or more entities on the database server, the control plane may publish an update command in a topic of the messaging cluster. An agent of the control plane running on the database server may subscribe to the topic. The control plane may generate topics associated with the database server on the messaging cluster to communicate with the database server.

At operation 2330, the control plane determines whether the portion of the database is associated with the individual tenant identifier or a global tenant identifier. Determining whether the portion of the database is associated with the individual tenant identifier or the global tenant identifier may be based on a tenant identifier column of the database, where the tenant identifier column includes a tenant identifier for each row in the database. In some embodiments, rows of the database include a different mechanism for determining which tenant a row is associated with, such as tags. Determining whether the portion of the database is associated with the individual tenant identifier or global tenant identifier may include applying a row-level-security policy to the request.

At operation 2340, the control plane allows the tenant to update the portion of the database in response to determining that the portion of the database is associated with the global tenant identifier or the individual tenant identifier or restricts the tenant from updating the portion of the database in response to determining that the portion of the database is associated with neither the global tenant identifier nor the individual tenant identifier. In some embodiments, each row of the database is associated with a tenant identifier such that if the portion of the database is associated with neither the global tenant identifier nor the individual tenant identifier, the portion is associated with a second individual tenant identifier of a second tenant.

The method 2300 may further include detecting, by the control plane, an attempt by the database server to publish or subscribe to a topic not associated with the tenant. The control plane may close a channel between the control plane and the database server. Closing the channel may include closing a TCP connection between the control plane and the database server.

The method 2300 may further include receiving a request to insert an object in a database server database of a database server in communication with the control plane. Inserting the object in the database may include transmitting the object to the database server and inserting metadata of the object, associated with the tenant identifier in the database. The metadata of the object is configured for access by requests having the execution context associated with the tenant identifier. Transmitting the object to the database server may include publishing the object in a topic of a messaging cluster, wherein the topic is associated with the database server. The control plane may further receive an acknowledgement that the object is stored in the database server database.

Figure 24:
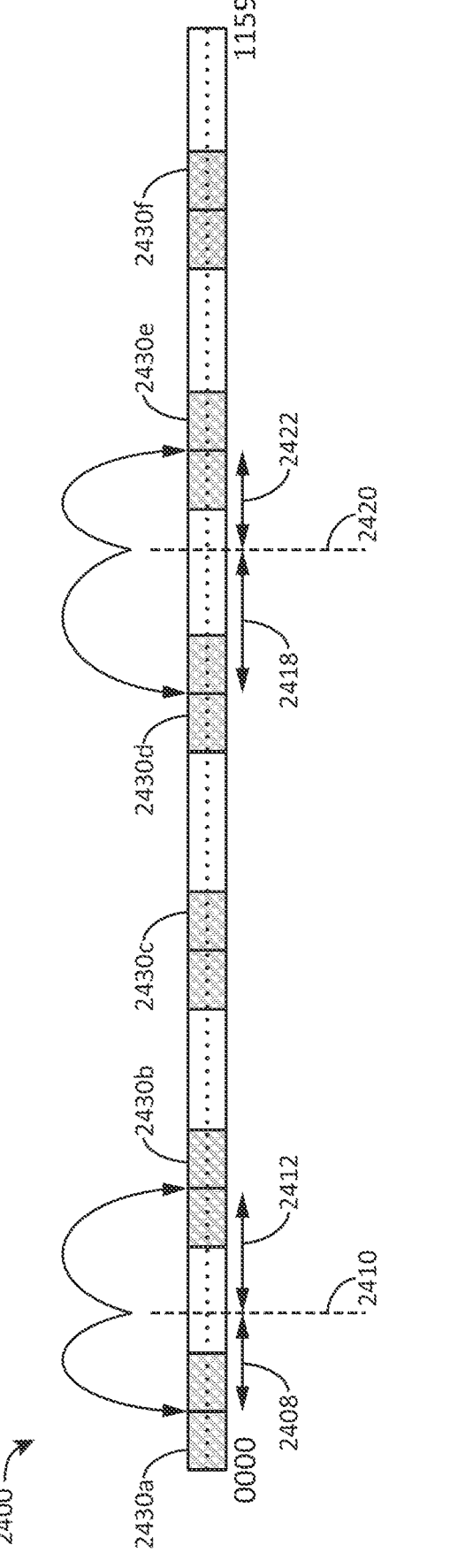
FIG. 24 is an example block diagram showing a timeline of scheduled events scheduled by the services of the control plane of FIG. 2, in accordance with some embodiments of the present disclosure.

FIG. 24 is an example block diagram showing a timeline of scheduled events scheduled by the services of the control plane of FIG. 2, in accordance with some embodiments of the present disclosure. The timeline 2400 may include a plurality of scheduled events. The plurality of scheduled events may be events scheduled by the core services 220 of the database management system 200 of FIG. 2. In some embodiments, the timeline 2400 includes a period of twelve hours, with each event of the plurality of scheduled events having a scheduled time TTTT between 0000 and 1159. The timeline 2400 may include any period of time. The plurality of scheduled events may include a first event 2410 and a second event 2220. The first event 2410 is scheduled at a first time and the second event 2220 is scheduled at a second time. A scheduler may execute the first event 2410 at the first time and the second event 2220 at the second time. The first event 2410 may be scheduled by a first entity and the second event 2220 may be scheduled by a second entity. The timeline 2400 may include a plurality of buckets 2230. In some implementations, the plurality of buckets 2230 may be regularly spaced. In some implementations, a number of the plurality of buckets 2230 may be based on a number of events of the plurality of events. For example, the plurality of buckets 2230 may include N*60*24 buckets, where N events are generated each minute in a 24 hour period.

A permissible delay may define a length of time by which events of the plurality of events may be delayed on the timeline 2400. A permissible advance may define a length of time by which events of the plurality of events may be advanced on the timeline 2400. Events of the plurality of events may be delayed and/or advanced to fall within the plurality of buckets 2230. In this manner, a number of execution events may be reduced, reducing overhead costs of the scheduler such as processing and memory costs. The number of the plurality of the buckets 2230 may be based on the permissible delay and/or the permissible advance. For example, the number of the plurality of buckets 2230 may be based on a permissible delay of three minutes and a permissible advance of two minutes such that 288 buckets are scheduled in a 24-hour period. The permissible delay and/or permissible advance may be defined by a user. The permissible delay and/or permissible advance may be defined by one or more entities which schedule the plurality of events. For example, a service of a database management system may define a permissible delay and/or a permissible advance for its scheduled events.

The first event 2410 may be delayed or advanced to be scheduled in a bucket. In some embodiments, the first event 2410 may be delayed by a delay 2412 such that the first event 2410 is scheduled in a second bucket 2230b of the plurality of buckets 2230. The scheduler may execute the first event 2410 at a time associated with the second bucket 2230b. Multiple events of the plurality of events may be delayed or advanced to be scheduled in the second bucket 2230b and executed at the time associated with the second bucket 2230b. Scheduling the first event 2410 in the second bucket 2230b does not prevent another event from being scheduled in the second bucket 2230b or cause another event to be scheduled in the second bucket 2230b. The delay 2412 may be less than or equal to the permissible delay. In other embodiments, the first event 2410 may be advanced by an advance 2408 such that the first event 2410 is scheduled in a first bucket 2230a of the plurality of buckets 2230. The scheduler may execute the first event 2410 at a time associated with the first bucket 2230b. Multiple events of the plurality of events may be delayed or advanced to be scheduled in the first bucket 2230a and executed at the time associated with the first bucket 2230a. Scheduling the first event 2410 in the first bucket 2230a does not prevent another event from being scheduled in the first bucket 2230a or cause another event to be scheduled in the first bucket 2230a. The advance 2408 may be less than or equal to the permissible advance.

The second event 2230 may be delayed or advanced to be scheduled in a bucket. In some embodiments, the second event 2220 may be advanced by an advance 2422 such that the second event 2220 is scheduled in a fourth bucket 2230d of the plurality of buckets 2230. The scheduler may execute the second event 2220 at a time associated with the fourth bucket 2230d. Multiple events of the plurality of events may be delayed or advanced to be scheduled in the fourth bucket 2230d and executed at the time associated with the fourth bucket 2230d. The advance 2422 may be less than or equal to the permissible advance. In some embodiments, the second event 2220 may be advanced by a delay 2418 such that the second event 2220 is scheduled in a fifth bucket 2230e of the plurality of buckets 2230. The scheduler may execute the second event 2220 at a time associated with the fifth bucket 2230e. Multiple events of the plurality of events may be delayed or advanced to be scheduled in the fifth bucket 2230e and executed at the time associated with the fifth bucket 2230e. The delay 2418 may be less than or equal to the permissible delay. Scheduling the second event 2220 in the fifth bucket 2230e does not prevent another event from being scheduled in the fifth bucket 2230e or cause another event to be scheduled in the fifth bucket 2230e.

Figure 25:
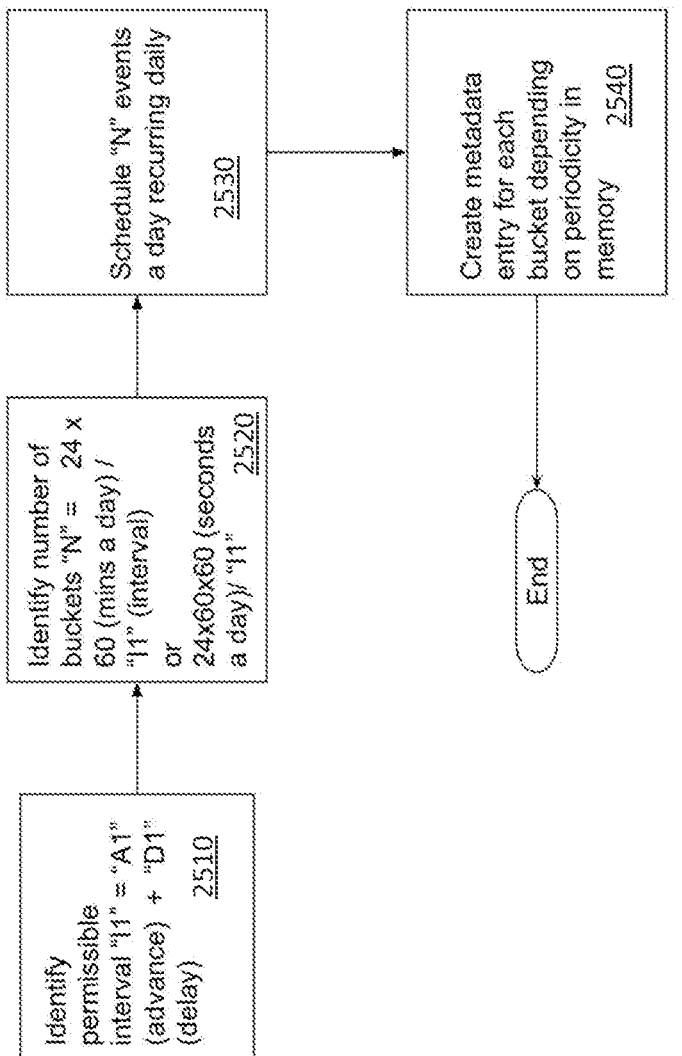
FIG. 25 is an example flowchart illustrating operations in a method for creating buckets in the timeline of scheduled events of FIG. 24, in accordance with some embodiments of the present disclosure.

FIG. 25 is an example flowchart illustrating operations in a method for creating buckets in the timeline of scheduled events of FIG. 24, in accordance with some embodiments of the present disclosure. The method 2500 may be performed by the control plane 201 of FIG. 2. The created buckets may be the plurality of buckets 2230 of FIG. 24. The method 2500 may include more or fewer operations than shown. The operations may be performed in the order shown, in a different order, or concurrently.

At operation 2510, a permissible interval is identified based on a permissible delay and a permissible advance. In some embodiments, the permissible interval may be a sum of the permissible delay and the permissible advance. At operation 2220, a number of buckets "N" is determined based on the permissible interval. In some embodiments, the number of buckets "N" is equal to a time period divided by the permissible period. For example, if the permissible period is 5 minutes and the time period is 24 hours, then the number of buckets "N" is 24 hours divided by 5 minutes, such that "N" is 288 buckets. At operation 2530, "N" buckets are scheduled, each including an execution event. At operation 2540, a metadata entry is created for each bucket. In some embodiments, the metadata entries are created depending on periodicity in memory. In an example, the buckets may be scheduled daily, weekly, monthly, yearly, or at any periodicity.

Figure 26:
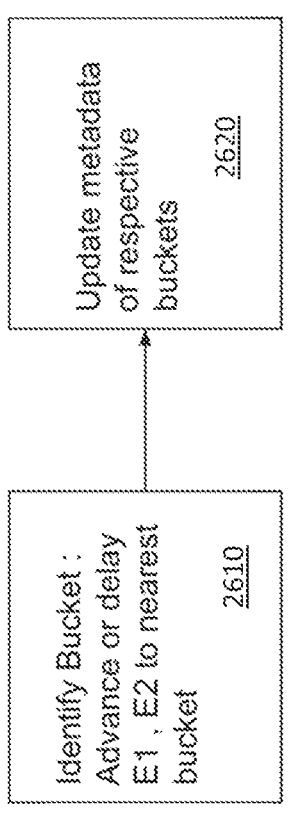
FIG. 26 is an example flowchart illustrating operations in a method for aggregating events in buckets in the timeline of scheduled events of FIG. 24, in accordance with some embodiments of the present disclosure.

FIG. 26 is an example flowchart illustrating operations in a method for aggregating events in buckets in the timeline of scheduled events of FIG. 24, in accordance with some embodiments of the present disclosure. The created buckets may be the plurality of buckets 2230 of FIG. 24. The method 2600 may include more or fewer operations than shown. The operations may be performed in the order shown, in a different order, or concurrently. In some embodiments, the method 2600 may be performed by the control plane 201 of FIG. 2.

A timeline of scheduled events may include a plurality of scheduled events, as discussed herein. The plurality of scheduled events may be scheduled by the services of the control plane 201 of FIG. 2. At operation 2610, a nearest bucket of a plurality of buckets is identified for each event of the plurality of events. The nearest bucket is a nearest bucket in time. The plurality of buckets may be scheduled such that each nearest bucket for each respective event is within a permissible delay and/or a permissible advance of the respective event. In some embodiments, identifying the nearest bucket includes identifying a nearest advance bucket and a nearest delay bucket, determining whether the nearest advance bucket is within a permissible advance, determining whether the nearest delay bucket is within a permissible delay, applying an advance weight to an advance distance to the nearest advance bucket, applying a delay weight to a delay distance to the nearest delay bucket, and comparing the weighted advance distance to the weighted delay distance. In an example, the advance distance is two minutes and the delay distance is four minutes, with a permissible delay of three minutes, so the nearest bucket is the nearest advance bucket. In another example, the advance distance is one minute and the delay distance is two minutes, with an advance weight of three and a delay weight of one, such that the weighted advance distance is three minutes and the weighted delay distance is two minutes, such that the nearest bucket is the nearest delay bucket.

At operation 2620, metadata of the buckets to which events were advanced or delayed are updated to include the events which were advanced or delayed. A scheduler may execute events in metadata of each respective bucket at a time associated with the respective bucket.

Figure 27:
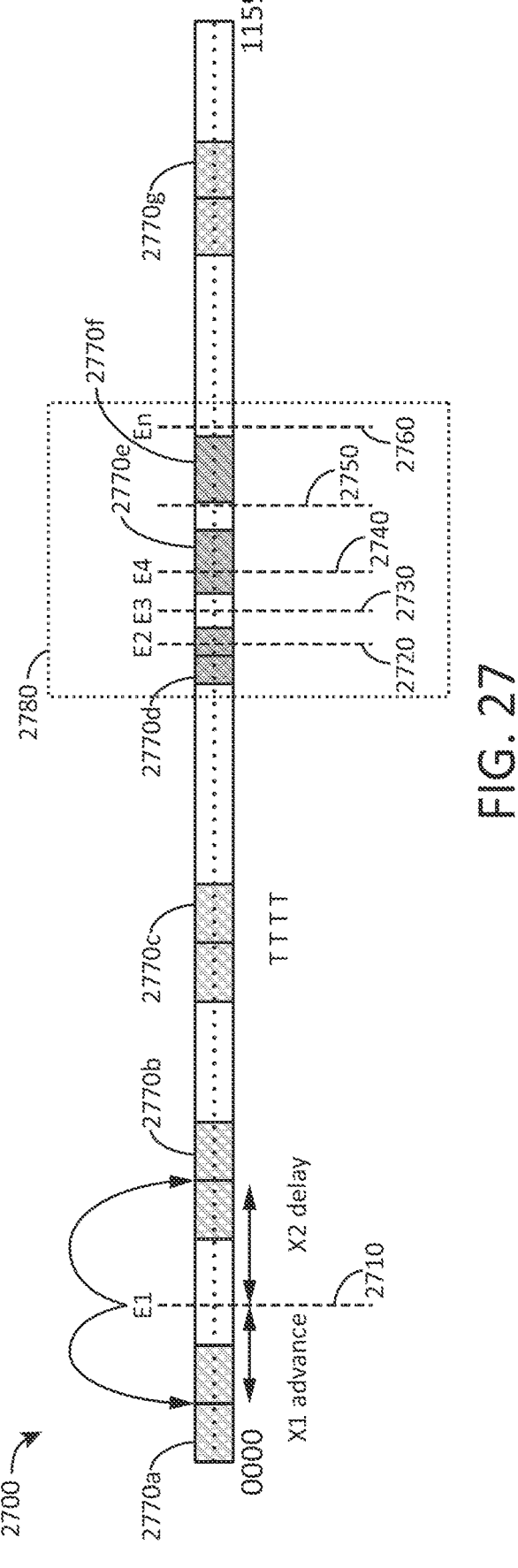
FIG. 27 is an example block diagram showing a timeline of scheduled events scheduled by the control plane of FIG. 2 including dynamic scheduling of buckets at a peak time, in accordance with some embodiments of the present disclosure.

FIG. 27 is an example block diagram showing a timeline of scheduled events scheduled by the control plane of FIG. 2 including dynamic scheduling of buckets at a peak time, in accordance with some embodiments of the present disclosure. The timeline 2700 may include a plurality of scheduled events, including a first event 2710, a second event 2720, a third events 2730, a fourth event 2740, a fifth event 2750, and a sixth event 2760. The second through sixth events 2720-2760 may be within the peak time 2780. The timeline 2700 may include a plurality of buckets 2770. The plurality of buckets 2770 may be regularly spaced on the timeline 2700, with additional buckets scheduled in the peak time 2780. The additional buckets may be scheduled in response to identifying the peak time 2780. The peak time 2780 may be identified based on a number of events within the peak time 2780. The additional buckets may be scheduled based on the number of events within the peak time 2780 exceeding a predetermined threshold. The additional buckets may be scheduled based on a bucket of the plurality of buckets 2770 having a number of events exceeding a predetermined threshold. The additional buckets may be scheduled based on a reduced permissible delay and/or a reduced permissible advance for the plurality of events.

In some embodiments, a bucket may be deleted, or unscheduled from the timeline 2700 based on a number of events in the bucket being below a predetermined threshold. In some embodiments, a bucket in a non-peak time is deleted. In other embodiments, a number of buckets in a time period is recalculated and new buckets are scheduled based on the recalculated number of buckets. Individual buckets may be dynamically deleted and/or added based on the number of events in each bucket and/or the number of events in peak times and/or non-peak times. The number of buckets may be dynamically deleted and/or added based on the number of events in each bucket and/or the number of events in peak times and/or non-peak times. In some embodiments, compute and/or memory resources define an upper threshold for a number of events per bucket. Horizontal scaling may be used when a number of buckets exceeding the number of events per bucket exceeds a predetermined threshold. In an example, horizontal scaling is used when more than 30% of buckets of the plurality of buckets 2770 exceed a predetermined threshold of a number of events per bucket.

FIG. 28A is an example flow chart illustrating operations in a method for aggregating scheduled events of the control plane of FIG. 2 in buckets, in accordance with some embodiments of the present disclosure. The method 2800 may be performed by the database management system 200 of FIG. 2. The method 2800 may include more or fewer operations than shown. The operations may be performed in the order shown, in a different order, or concurrently.

At operation 2810, a control plane of the database management system determines a plurality of scheduled events to be scheduled in a time period. The plurality of scheduled events may be scheduled by one or more services of the control plane. The plurality of scheduled events may be database management events. The plurality of scheduled events may be associated with a variety of tenants in a multi-tenant pooled database of the database management system.

At operation 2820, the control plane determines a number of buckets in the time period based on a predetermined permissible interval. The number of buckets may be based on a number of permissible intervals which make up the time period. For example, the number of buckets may be calculated based on how many latency periods fit in the time period. The permissible interval may define an amount of time a scheduled event of the plurality of scheduled events may be moved from an original scheduled time. In some embodiments, the permissible interval may be based on a permissible advance interval and/or a permissible delay interval. The permissible advance interval may define an amount of time by which a scheduled event of the plurality of scheduled events may be advanced from the original scheduled time. The permissible delay interval may define an amount of time by which a scheduled event of the plurality of scheduled events may be delayed from the original scheduled time.

At operation 2830, the control plane generates a plurality of buckets equal to the number of buckets in the time period. Generating the plurality of buckets may include associating each bucket of the plurality of buckets with a particular time in the time period. The particular time of each respective bucket may be mapped to a memory address containing metadata of the scheduled events in the respective bucket. In some embodiments, the plurality of buckets are scheduled at regular intervals in the time period.

At operation 2840, the control plane schedules each of the plurality of scheduled events in one of the plurality of buckets, wherein execution of each of the plurality of scheduled events is delayed or advanced from an original scheduled time based on the predetermined permissible interval. Execution of each of the plurality of scheduled events may be delayed or advanced from the original scheduled time by less than the permissible interval.

In some embodiments, scheduling each scheduled event of the plurality of scheduled events includes determining a delay time interval to a nearest delay bucket, applying a delay weight to the delay time interval, determining an advance time interval to a nearest advance bucket, and applying an advance weight to the advance time interval. The control plane may compare the weighted delay time interval to the weighted advance time interval, and, based on the comparison, determine whether the event is to be delayed by the delay time interval or advanced by the advance time interval.

The method 2800 may include executing, by a scheduler tool of the control plane, the scheduled events. The scheduler tool may send the scheduled events to an operations service of the control plane for execution. The method 2800 may further include applying a delay weight to the first amount of time, comparing the weighted first amount of time to a weighted advance amount of time, and determining that the event is to be delayed by the first amount of time. The method 2800 may further include determining that a number of events in a particular bucket exceeds an upper events number threshold, and in response to the number of events in the particular bucket exceeding the upper events number threshold, generating additional buckets adjacent the particular bucket. The control plane may determine a new permissible interval. The new permissible interval may be based on a new number of buckets in the time period or an amount by which the number of scheduled events in the particular bucket exceed the upper events number threshold. The method 2800 may further include determining that a number of events in a particular bucket is below a lower events number threshold, and in response to the number of events in the particular bucket being below the lower events number threshold, scheduling the scheduled events in the particular bucket to a second bucket, and deleting the particular bucket.

FIG. 28B is an example flow chart illustrating operations in a method for aggregating scheduled events of the control plane of FIG. 2 in buckets by advancing one or more of the scheduled events, in accordance with some embodiments of the present disclosure. The method 2802 may be performed by the database management system 200 of FIG. 2. The method 2802 may include more or fewer operations than shown. The operations may be performed in the order shown, in a different order, or concurrently.

At operation 2812, a control plane of the database management system obtains a plurality of scheduled events scheduled in a time period. The plurality of scheduled events may be scheduled by one or more services of the control plane. The plurality of scheduled events may be database management events. The plurality of scheduled events may be associated with a variety of tenants in a multi-tenant pooled database of the database management system.

At operation 2822, the control plane determines a number of buckets in the time period based on a predetermined advance threshold. The number of buckets may be based on a number of sub time periods which make up the time period, where a length of the sub time periods is based on the predetermined advance threshold. For example, a latency period may be defined based on the predetermined advance threshold and the number of buckets may be calculated based on how many latency periods fit in the time period.

At operation 2832, the control plane generates a plurality of buckets equal to the number of buckets in the time period. Generating the plurality of buckets may include associating each bucket of the plurality of buckets with a particular time in the time period. The particular time of each respective bucket may be mapped to a memory address containing metadata of the scheduled events in the respective bucket. In some embodiments, the plurality of buckets are evenly spaced in the time period.

At operation 2842, the control plane advances a first scheduled event of the plurality of scheduled events a first amount of time such that the first scheduled event is in a bucket of the plurality of buckets, where the first amount of time is less than the predetermined advance threshold.

The method 2802 may include executing, by a scheduler tool of the control plane, the scheduled events. The scheduler tool may send the scheduled events to an operations service of the control plane for execution. The method 2802 may further include applying an advance weight to the first amount of time, comparing the weighted first amount of time to a weighted delay amount of time, and determining that the event is to be advanced by the first amount of time. The method 2802 may further include determining that a number of events in a particular bucket exceeds an upper events number threshold, and in response to the number of events in the particular bucket exceeding the upper events number threshold, generating additional buckets adjacent the particular bucket. The method 2802 may further include determining that a number of events in a particular bucket is below a lower events number threshold, and in response to the number of events in the particular bucket being below the lower events number threshold, deleting the particular bucket.

Figure 29:
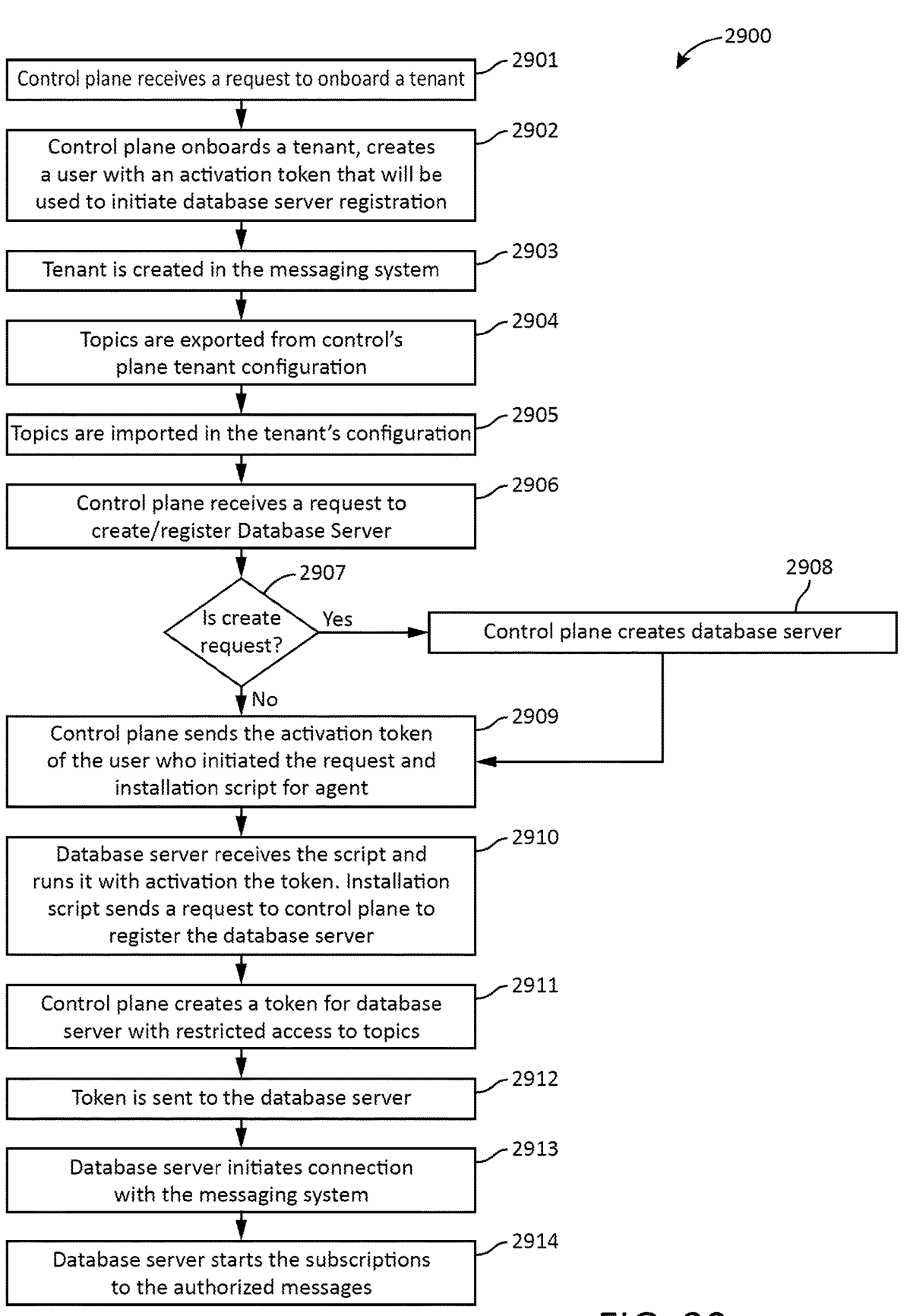
FIG. 29 is an example flow chart illustrating operations in a method for onboarding a tenant of the control plane of FIG. 2 and registering a database server associated with the tenant, in accordance with some embodiments of the present disclosure.

FIG. 29 is an example flow chart illustrating operations in a method for onboarding a tenant of the control plane of FIG. 2 and registering a database server associated with the tenant, in accordance with some embodiments of the present disclosure. The method 2900 may include more or fewer operations than shown. The operations may be performed in the order shown, in a different order, or concurrently.

At operation 2901, a control plane of a database management system receives a request to onboard a tenant. The control plane may receive the request from a new customer of the database management system. At operation 2902, the control plane onboards the tenant and creates a user associated with the tenant. The control plane communicates with a messaging cluster of the control plane to provide the created user with an activation token for initiating database server registration. The activation token may have restricted access to publish and/or subscribe to a registration topic on a messaging cluster of the control plane. The control plane may generate the activation token in response to the request to onboard the tenant. At operation 2903, the tenant is created in the messaging cluster of the control plane. In some embodiments, creating the tenant in the messaging cluster includes creating a messaging tenant associated with the tenant in the messaging cluster. At operation 2904, topics in the messaging cluster are exported from a control plane messaging tenant of the messaging cluster to the messaging tenant. At operation 2905, the topics exported from the control plane tenant are imported to the messaging tenant such that the topics can be used to carry messages from the control plane messaging tenant to the messaging tenant.

At operation 2906, the control plane receives a request to create or register a database server. The request may be associated with the tenant. At operation 2907, the control plane determines whether the request is to create the database server or register the database server. If the operation is to create the database server, the method 2900 proceeds to operation 2908, where the control plane creates the database server and then proceeds to operation 2909. In some embodiments, the control plane may make an API call to a public or private cloud to create the database server. If the operation is to register the database server, the method 2900 proceeds to operation 2909. At operation 2909, the control plane sends the activation token and an agent installation script to a user associated with the tenant. At operation 2910, the database server receives the installation script and the activation token. The database server runs the installation script with the activation token. The installation script sends a request to the control plane to register the database server. The installation script may install an agent of the control plane on the database server and the agent may connect to the messaging cluster using the activation token and send the registration request to the control plane via the dedicated topic created for database server registration. Sending the request to the control plane may include publishing the request, using the activation token, on the registration topic of the messaging cluster of the control plane. At operation 2911, the control plane generates a database token for the database server with restricted access to publish and/or subscribe to topics on the messaging cluster associated with the database server. The messaging cluster may generate one or more topics associated with the database server. At operation 2912, the control plane sends the database token to the database server. At operation 2913, the database server initiates a connection with the messaging cluster using the database token. At operation 2914, the database server subscribes to and/or publishes on the one or more topics associated with the database server. In some embodiments, the database server attempts to publish and/or subscribe to topics not associated with the database server and not authorized by the database token, and the messaging cluster closes the connection. In some embodiments, closing the connection includes closing the connection with the database server.

FIG. 30 is an example flow chart illustrating operations in a method for registering a database server with the control plane of FIG. 2, in accordance with some embodiments of the present disclosure. The method 3000 may include more or fewer operations than shown. The operations may be performed in the order shown, in a different order, or concurrently.

At operation 3001, database registration begins based on a request for registration received at a control plane of a database management system. The request for registration may be a request to register a database server. At operation 3002, the database server connects with a messaging cluster of the control plane using an activation credential generated by the control plane. Connecting with the messaging cluster may include establishing a TCP connection with the messaging cluster. At operation 3003, the database server publishes a registration request to a registration topic of the messaging cluster using the activation credential. At operation 3004, a connection manager of the control plane receives the registration request and redirects the registration request to a service of the control plane. At operation 3005, the service generates a database server token and sends the database server token to the connection manager. At operation 3006, the connection manager sends the database server token to the database server. At operation 3007, the database server closes the connection with the messaging cluster. Closing the connection may include closing the TCP connection. At operation 3008, the database server initializes a new connection with the messaging cluster using the database server token. Initializing the new connection may include establishing a new TCP connection with the messaging cluster. The new connection may include a requests topic, a commands topic, and an operations topic associated with the database server on the messaging cluster, as discussed herein.

Figure 31:
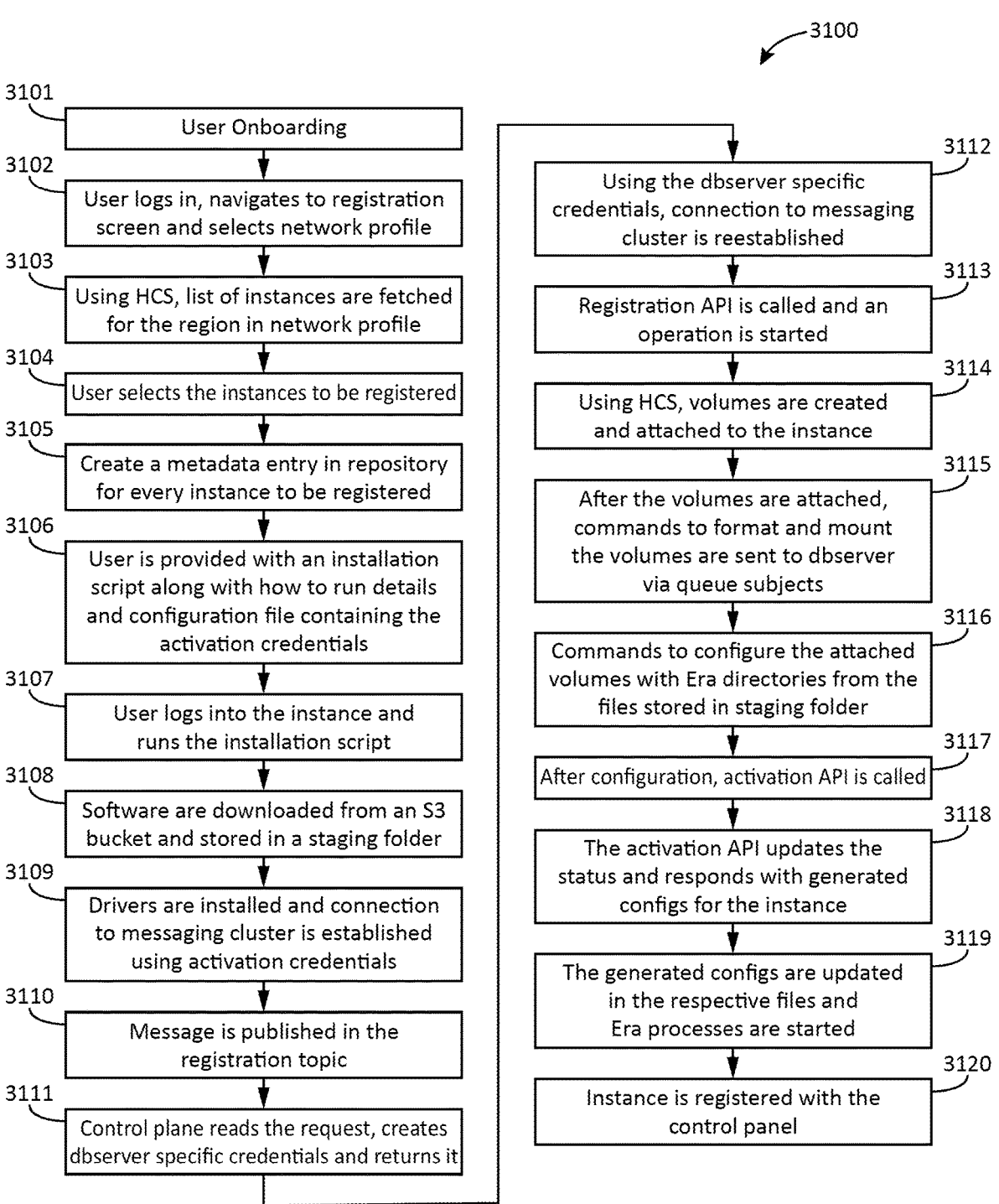
FIG. 31 is an example flow chart illustrating operations in a method for registering a database server with the control plane of FIG. 2 by providing an installation script, in accordance with some embodiments of the present disclosure.

FIG. 31 is an example flow chart illustrating operations in a method for registering a database server with the control plane of FIG. 2 by providing an installation script, in accordance with some embodiments of the present disclosure. The method 3100 may include more or fewer operations than shown. The operations may be performed in the order shown, in a different order, or concurrently.

At operation 3101, a user of the database management system is onboarded. Onboarding the user includes providing the user with an activation credential. At operation 3102, the user logs into the database management system, navigates to a registration screen, and selects a network profile for the database server. The user may select the network profile from a plurality of network profiles. At operation 3103, a control plane of the database management server fetches a list of instances for a region of the selected network profile. A hybrid cloud service (HCS) of the control plane may fetch the list of instances. At operation 3104, the user selects one or more instances from the list of instances to be registered. At operation 3105, the control plane creates a metadata entry in a metadata store of the control plane for each selected instance.

At operation 3106, the user is provided with an installation script, installation instructions, and a configuration file containing activation credentials. In some embodiments, the control plane provides the user with the installation script, the installation instructions, and the configuration file. At operation 3107, the user logs into an instance of the selected instances and runs the installation script. In an example, the user logs into an AWS account of the user and runs the installation script on an instance associated with the AWS account. At operation 3108, the instance, based on the installation script, downloads software associated with the database management system from an S3 bucket. In some embodiments, the instance downloads the software from the control plane using a tunneled connection, such as a virtual private cloud (VPC) endpoint. In some embodiments, instance downloads the softward from the control plane via the internet. In some embodiments, the instance downloads the software from a storage location associated with a cloud on which the instance is hosted. For example, instance may download the software from a blob storage of AZURE or a cloud storage of GCP. The downloaded software includes an agent of the control plane of the database management system. The instance, based on the installation script, stores the software in a staging folder. At operation 3109, the agent of the control plane is installed at the instance and establishes a connection with a messaging cluster of the control plane using the activation credentials. At operation 3110, the agent publishes a registration request on a registration topic of the messaging cluster over the connection. The registration topic may be a request-reply topic on the messaging cluster.

At operation 3111, the control plane reads the registration request and creates database server credentials specific to the instance. In some embodiments, a service of the control plane reads the registration request and creates the database server credentials. The control plane sends the database server credentials in a reply to the agent. At operation 3112, the agent reestablishes the connection with the messaging cluster using the database server credentials. The connection may include one or more topics on the messaging cluster which are restricted to the database server credentials. At operation 3113, the agent on the database server initiates a registration API call, triggering a registration operation on the control plane. The agent may initiate the registration API call via the request topic created for the database server on the messaging cluster to trigger the registration operation on the control plane. At operation 3114, based on the registration operation, the control plane creates EBS volumes and attaches them to the instance. In some embodiments, the HCS creates the EBS volumes and attaches them to the instance by making one or more API calls to the cloud on which the instance is hosted. In some implementations, the EBS volumes are mounted on a database server VM of the instance.

At operation 3115, the control plane sends one or more commands to the agent to format and mount the EBS volumes. In some embodiments, the control plane sends the one or more commands to the agent on a commands topic of the messaging cluster to which the agent is subscribed. At operation 3116, the control plane sends one or more commands to the agent to configure the attached volumes with directories associated with the database management system. The directories may be stored in the staging folder. At operation 3117, a service of the control plane makes an activation API call. The service may make the activation API call in response to an acknowledgement of an execution of the one or more commands to configure the attached volumes with the directories. At operation 3118, in response to the activation API call, a service of the control plane updates a status of the instance and generates configurations for the instance. At operation 3119, the generated configurations are updated in files on the database server. The generated configurations are used by an agent of the database server. The generated configurations may be updated in metadata files on the control plane associated with the instance. The control plane begins processes associated with the instance. For example, the control plane begins a periodic backup process for the instance based on an SLA associated with the instance. At operation 3120, the registration request is complete and the instance is registered with the database management system.

FIG. 32 is an example flow chart illustrating operations in a method 3200 for registering a database server with the control plane of FIG. 2 by providing software associated with the database management system in volumes which may be attached to the database server, in accordance with some embodiments of the present disclosure. The method 3200 may allow for one-click registration of database servers. The method 3200 may be performed on a variety of public clouds, private clouds, or on-premises systems. For example, on AWS, the software may be provided in EBS volumes, on AZURE, the software may be provided in AZURE storage volumes, and on GCP, the software may be provided in GOOGLE cloud storage. The method 3200 may be performed by the database management system 200 of FIG. 2. The method 3200 may include more or fewer operations than shown. The operations may be performed in the order shown, in a different order, or concurrently.

At operation 3201, a user of the database management system is onboarded. Onboarding the user includes providing the user with an activation credential. At operation 3202, snapshots including the software associated with the database management system are shared with a user account of the user. At operation 3203, the user logs into the database management system, navigates to a registration screen, and selects a network profile for the database server. The user may select the network profile from a plurality of network profiles. At operation 3204, a control plane of the database management server fetches a list of instances for a region of the selected network profile. In some embodiments, a hybrid cloud service (HCS) of the control plane fetches the list of instances. At operation 3205, the user selects one or more instances from the list of instances to be registered with the database management system. At operation 3206, the control plane creates a metadata entry in a metadata store of the control plane for each selected instance.

At operation 3207, the user is provided with an installation script, installation instructions, and a configuration file containing activation credentials. In some embodiments, the control plane provides the user with the installation script, the installation instructions, and the configuration file. At operation 3208, the user logs into an instance of the selected instances and runs the installation script. In an example, the user logs into an AWS account of the user and runs the installation script on an instance associated with the AWS account. At operation 3209, the instance, based on the installation script, downloads an agent of the control plane of the database management system. The agent is installed at the instance and establishes a connection with a messaging cluster of the control plane using the activation credentials. In some embodiments, the agent is present in the shared snapshot. Instead of downloading the agent, a new volume is created from the shared snapshot including the agent. At operation 3210, the agent publishes a registration request on a registration topic of the messaging cluster over the connection. The registration topic may be a request-reply topic on the messaging cluster.

At operation 3211, the control plane reads the registration request and creates database server credentials specific to the instance. In some embodiments, a service of the control plane reads the registration request and creates the database server credentials. The control plane sends the database server credentials in a reply to the agent. At operation 3212, the agent reestablishes the connection with the messaging cluster using the database server credentials. The connection may include one or more topics on the messaging cluster which are restricted to the database server credentials. At operation 3213, a service of the control plane makes a registration API call, triggering a registration operation on the control plane. At operation 3214, based on the registration operation, the control plane creates EBS volumes from the shared snapshots and attaches the EBS volumes to the instance. In some embodiments, the HCS creates the EBS volumes based on the shared snapshots and attaches them to the instance by making one or more API calls to the cloud on which the instance is hosted. In some implementations, the EBS volumes are mounted on a database server VM of the instance.

At operation 3215, the control plane sends one or more commands to the agent to mount the EBS volumes. In some embodiments, the control plane sends the one or more commands to the agent on a commands topic of the messaging cluster to which the agent is subscribed. At operation 3216, a service of the control plane makes an activation API call. The service may make the activation API call in response to an acknowledgement of an execution of the one or more commands to configure the attached volumes with the directories. At operation 3217, in response to the activation API call, a service of the control plane updates a status of the instance and generates configurations for the instance. At operation 3218, the generated configurations are updated in files on the database server. The generated configurations may be used by an agent of the database server. The generated configurations may be updated in metadata files on the control plane associated with the instance. The control plane begins processes associated with the instance. For example, the control plane begins a periodic backup process for the instance based on an SLA associated with the instance. At operation 3219, the registration request is complete and the instance is registered with the database management system.

Figure 33:
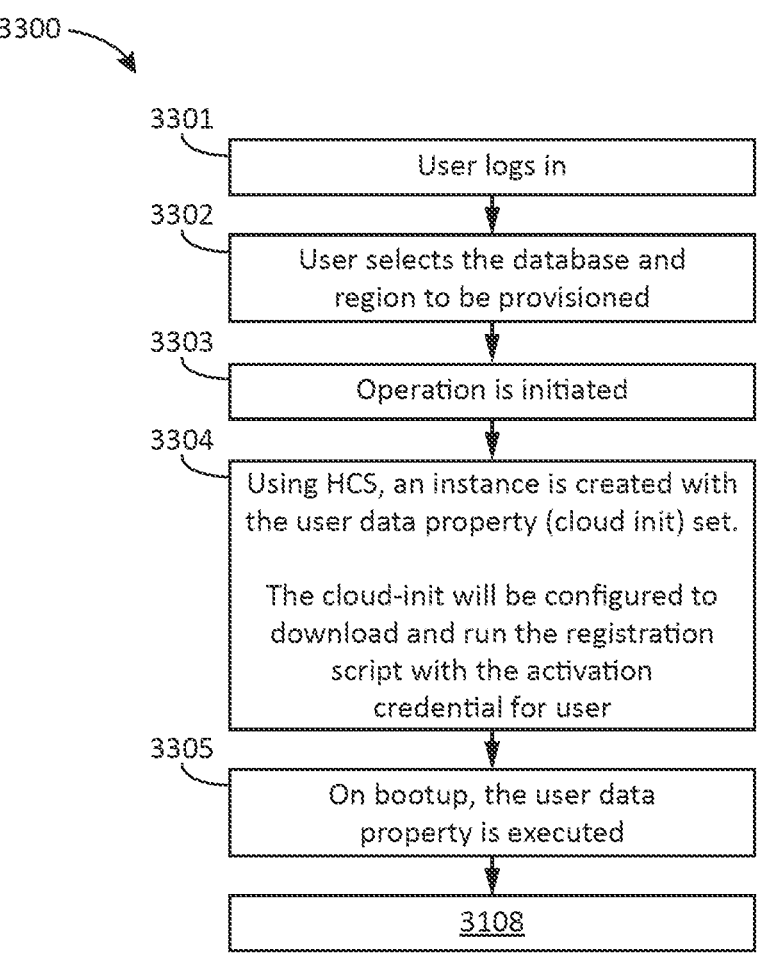
FIG. 33 is an example flow chart illustrating operations in a method for registering a database server with the control plane of FIG. 2 using a user data property, in accordance with some embodiments of the present disclosure.

FIG. 33 is an example flow chart illustrating operations in a method for creating and registering a database server with the control plane of FIG. 2 using a user data property, in accordance with some embodiments of the present disclosure. The method 3200 may allow for one-click registration of database servers. The method 3300 may include more or fewer operations than shown. The operations may be performed in the order shown, in a different order, or concurrently.

At operation 3301, the user logs into the database management system. At operation 3302, the user selects a region and a database to be provisioned. In some embodiments, the user selects a database engine for the database. At operation 3303, a create instance operation is initiated. At operation 3304, an HCS of a control plane of the database management system creates an instance with a user data property, such as an EC2 instance on AWS. The user data property is configured to download and run a registration script with an activation credential of the user. At 3305, the user data property is executed. The method 3300 proceeds from operation 3305 to operation 3108 of FIG. 31.

In some embodiments, an existing instance is registered. In these embodiments, at operation 3302, the user selects a region, the HCS fetches the existing instances for the region, and the user selects an instance from the instances for the region. An ansible playbook or bash scripts are executed to download and install software associated with the database management system. The method proceeds to operation 3108 of FIG. 31.

Figure 34:
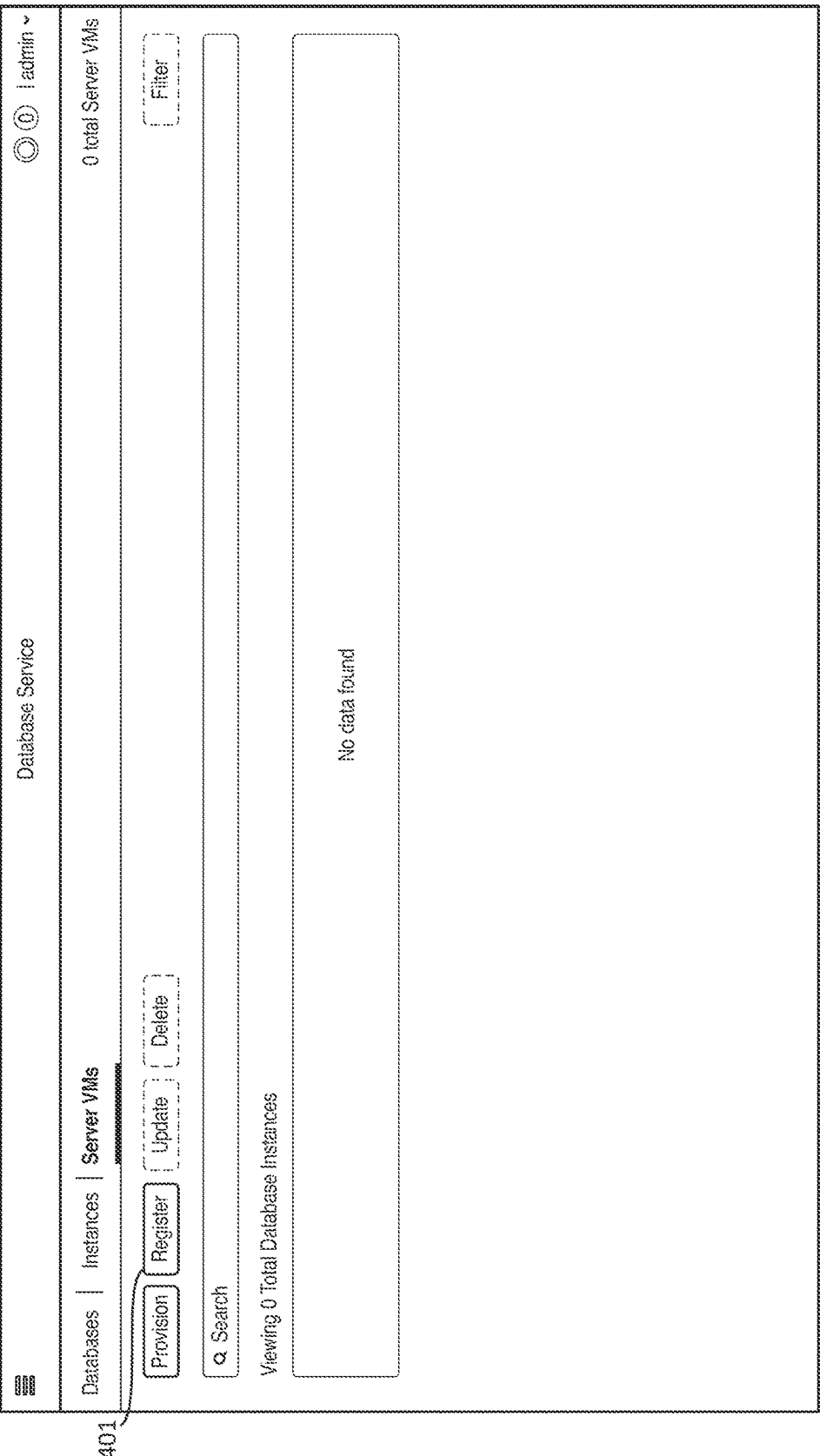
FIG. 34 illustrates an example user interface of a database management system for provisioning and/or registering a database server with the control plane of FIG. 2, in accordance with some embodiments of the present disclosure.

FIG. 34 illustrates an example user interface of a database management system for provisioning and/or registering a database server with the control plane of FIG. 2, in accordance with some embodiments of the present disclosure. The example user interface 3400 may be used for receiving user input in the method 3100 of FIG. 31, the method 3200 of FIG. 32, and/or the method 3300 of FIG. 33. For example, a "register" button 3201 of the example user interface 3400 may be used to register the database selected at operation 3104 of the method 3100 of FIG. 31.

Figure 35:
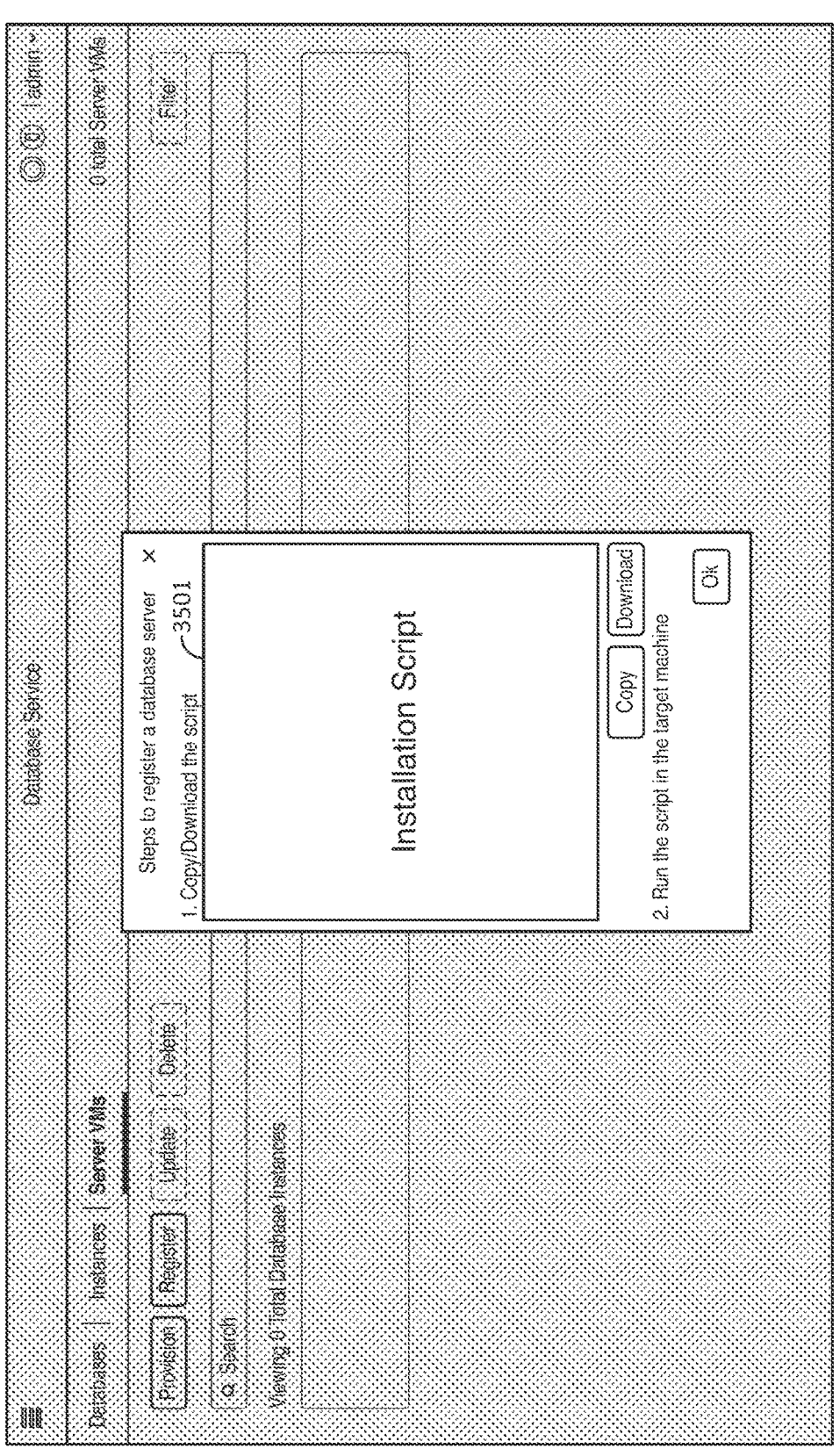
FIG. 35 illustrates an example user interface of a database management system for provisioning and/or registering a database server with the control plane of FIG. 2, in accordance with some embodiments of the present disclosure.

FIG. 35 illustrates an example user interface of a database management system for provisioning and/or registering a database server with the control plane of FIG. 2, in accordance with some embodiments of the present disclosure. The example user interface 3500 may be a variation of the example user interface 3400 of FIG. 34. For example, the example user interface 3500 may be presented to a user once the user selects a database to be registered and selects the "register" button 3201 of FIG. 34. The example user interface 3500 may include an installation script 3201 for installing an agent of a control plane of the database management system. The installation script 3201 may be the installation script discussed in the method 3100 of FIG. 31 and the method 3200 of FIG. 32.

FIG. 36 is an example flow chart illustrating operations in a method for registering a database server with the control plane of FIG. 2, in accordance with some embodiments of the present disclosure. The method 3600 may be performed by the database management system 200 of FIG. 2. The method 3600 may include more or fewer operations than shown. The operations may be performed in the order shown, in a different order, or concurrently.

At operation 3610, a control plane of the database receives, from the database server, over a first connection, a request for credentials. The first connection may be a TCP connection. The request for credentials may include activation credentials associated with a user of the database management system. The activation credentials may be unique to the user. The request for credentials may be published to a registration topic of a messaging cluster of the control plane. The registration topic may be open to allow unregistered database servers to publish requests to the registration topic. In some embodiments, the messaging cluster accepts only requests having valid activation credentials. In other embodiments, a connection manager of the control plane accepts only requests from the messaging cluster having valid activation credentials.

In some embodiments, the control plane provides, to the user, a list of databases associated with the user. The control plane may receive, from the user, a selection of the database server from the list of databases. In some embodiments, the user selects the database server on a user interface of the database management system. The control plane may create metadata entries for the database server in response to the selection. The control plane may create a metadata repository for the database server on the control plane in response to the selection. The database management system may provide an installation script in response to the selection of the database server. The installation script may include the activation credentials. In some embodiments, the installation script may include an agent of the control plane to be installed at the database server. In other embodiments, the installation script may cause the database server to download the agent of the control plane. In some embodiments, providing the installation script includes providing a network address of the installation script. For example, the database management system may provide the installation script to the user by providing the user with a network address of an S3 bucket containing the installation script.

At operation 3620, the control plane, in response to the request for credentials, generates credentials for the database server. In some embodiments, a service of the control plane generates the credentials for the database server. The credentials may be unique to the database server. In some implementations, the credentials include a UUID of the database server. In some implementations, the credentials include a tenant ID of a tenant associated with the user.

At operation 3630, the control plane transmits the credentials to the database server over the first connection. In some embodiments, the control plane publishes the credentials to the registration topic of the messaging cluster. The credentials may be included in a message. The message may include the activation credentials. In some embodiments, the control plane provides the credentials to the database server at the user interface of the database management system. In some embodiments, the database server destroys the first connection in response to receiving the credentials.

The database server may receive the credentials and the installation script. The database server may execute the installation script and download the agent of the control plane. The agent may send a request for registration to the control plane. The agent may establish a second TCP connection and send the request for registration to the control plane over the second TCP connection. The control plane may generate topics on the messaging cluster unique to the database server. The topics may be associated with the credentials such that only messages including the credentials can be published to the topics. The topics may include a commands topic, an operations topic, and a requests topic.

The database server may send the request for registration to the control plane on the requests topic associated with the database server.

At operation 3640, the control plane receives, over a second connection specific to the database server, from the database server, a request for registering the database server including the credentials. The request for registering the database server may be a request to register the database server with a database management system associated with the control plane. In some embodiments, the request for registering the database server may be a request to register an agent of the control plane running on the database server with the database management system. In some embodiments, the control plane receives, from the database server, a request to adjust a status of a the agent. For example, the control plane may receive, from the database server, a request to mark a status of the agent as "UP." The request for registering the database server may be received at the requests topic unique to the database server on the messaging cluster. In some embodiments, the messaging cluster may validate the request for registration based on the credentials. In some embodiments, the messaging cluster may validate the request for registration by comparing the request for registration with the credentials associated with the requests topic unique to the database server. In other embodiments, the connection manager of the control plane may validate the request for registration based on the credentials. The connection manager may route the request for registration to a service of the control plane which registers database servers.

At operation 3650, the control plane, in response to the request for registration, registers the database with the database management system associated with the control plane. The database server may be registered when the control plane includes information associated with the database server. In some embodiments, a service of the control plane registers the database server. In some embodiments, multiple services of the control plane register the database server. In some embodiments, the request for registration triggers a registration API call on the control plane. The registration API call may cause a registration operation to begin on the control plane. The registration operation may include mounting volumes on a database server VM of the database server and configuring the volumes with directories of the database management system. The registration operation may include making an activation API call on the control plane to update a status of the database server on the control plane. The activation API call may cause a configuration of the database server VM to be stored on the control plane.

Figure 37:
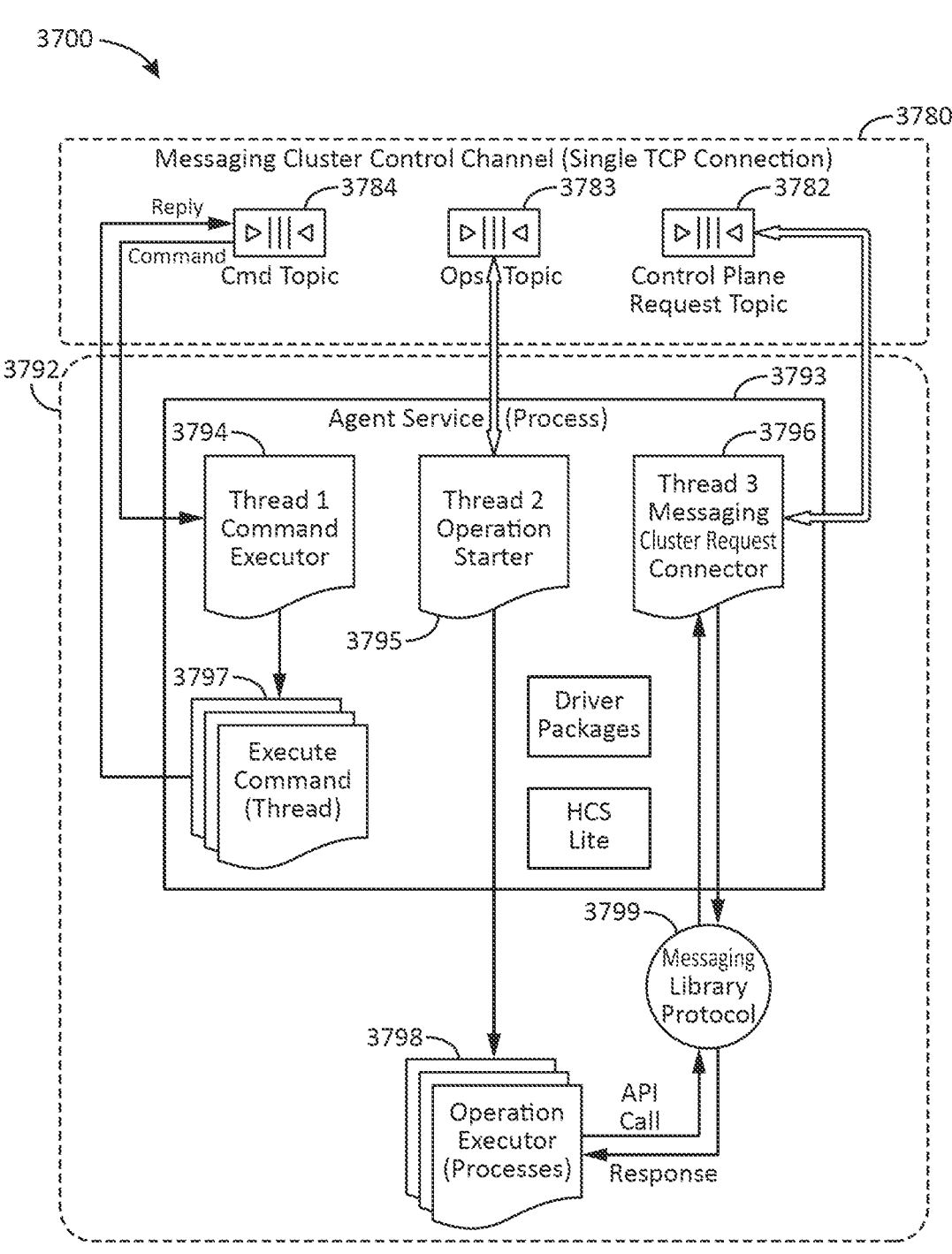
FIG. 37 is an example block diagram of an agent of the control plane of FIG. 2 on a database server, in accordance with some embodiments of the present disclosure.

FIG. 37 is an example block diagram of an agent of the control plane of FIG. 2 on a database server, in accordance with some embodiments of the present disclosure. In some embodiments, the agent 3792 is the agent 292 of the database management system 200 of FIG. 2. The agent 3792 may include an agent service 3793. The agent service 3793 may be a service of the agent 3792.

The agent service 3793 may include a command executor 3794. The command executor 3794 may be a daemon spawned by the agent service 3793. The command executor may read commands published to a commands topic 3784 of the messaging cluster 3780. The command executor 3794 may execute the commands published to the commands topic 3784. The command executor 3794 may spawn command threads 3797 to execute the commands. In some implementations, the command executor 3794 spawns a command thread of the command threads 3797 for each respective received command. The command thread which executes the respective command publishes a response to the command to the command topic 3784. The command executor 3794 may reject a command if a number of the command threads 3797 exceeds a predetermined threshold to avoid overburdening the agent 3792.

The agent service 3793 may include an operation starter 3795. The operation starter 3795 may be a daemon spawned by the agent service 3793. The operation starter 3795 may pull operations from an operation topic 3783 of the messaging cluster 3780. The operation starter 3795 may create operation executors 3798 for executing the operations. In some implementations, the operation starter 3795 may create a new operation executor of the operation executors 3798 for each received operation.

The agent 3792 may include a messaging library 3799. The messaging library 3799 may be an asynchronous messaging library. For example, the messaging library 3799 may be a ZEROMQ asynchronous messaging library.

The agent service 3793 may include a request connector 3796. The request connector 3796 may be a daemon spawned by the agent service 3793. The request connector 3796 may be an inter-process communication (IPC) handler. The request connector 3796 may listen for messages on the messaging library 3799 from the operation executors 3798. The request connector 3796 may publish API calls and/or API requests based on the messages to a request topic 3782 of the messaging cluster. The request connector 3796 may receive responses to the API calls and/or API requests and send the responses to the operation executors 3798 via the messaging library 3799.

Upon booting up, the agent 3792 may connect to the messaging cluster 3780 and initialize a TCP connection with the messaging cluster 3780. Upon booting up, the agent 3792 may fetch local metadata of a VM on which the agent 3792 is running and send the local metadata to the control plane. In some embodiments, the agent 3792 publishes the local metadata to the request topic 3782.

The agent 3792 may include an HCS lite for making API calls to a cloud on which the database server on which the agent 3792 is running is hosted, as discussed herein. The agent 3792 may include agent packages. The agent packages may be python packages.

In an example, the agent 3792 is upgraded. An upgrade operation is published to the operations topic 3783 and pulled by the operation starter 3795. The operation starter 3795 spawns an operation executor of the operation executors 3798 to execute the upgrade operation. The operation executor downloads upgrade components from an S3 end point. The operation executor stops the agent service 3793. The operation executor uninstalls the agent packages and installs new packages from the upgrade components. The operation executor adjusts configuration files of the agent service 3793 and starts the agent service 3793.

Figure 38:
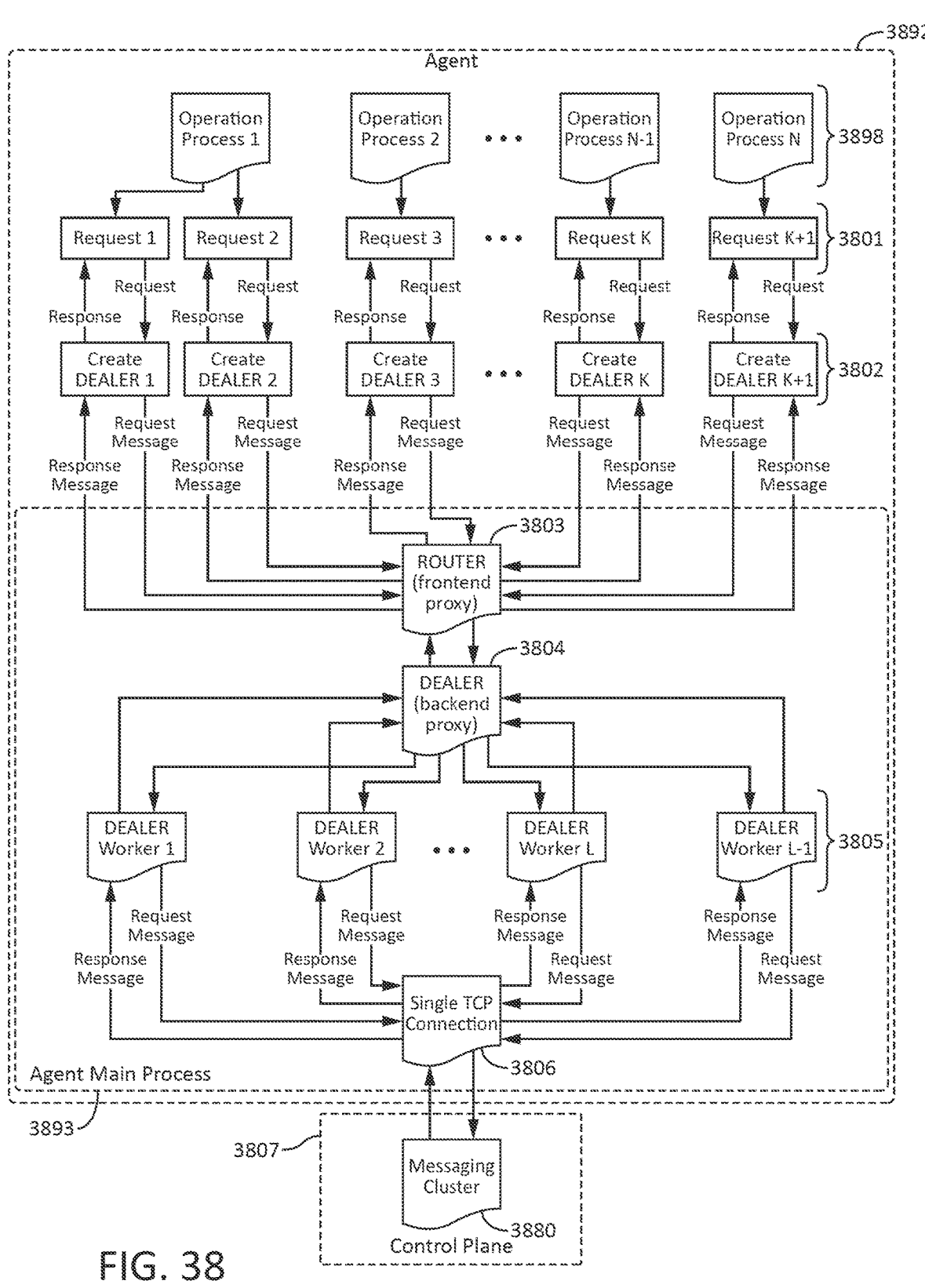
FIG. 38 is an example block diagram of processes of the agent of FIG. 37 showing details of how operations are handled by the agent, in accordance with some embodiments of the present disclosure.

FIG. 38 is an example block diagram of processes of the agent of FIG. 37 showing details of how operations are handled by the agent, in accordance with some embodiments of the present disclosure. The agent 3892 may be in communication with a messaging cluster 3880 of the control plane 3807 via a single TCP connection 3806. The connection 3806 may be between a main process 3893 of the agent 3892 and the messaging cluster 3880. The connection 3806 may be shared by all threads created from the main process 3893. The main process 3893 may include a frontend proxy router 3803. The router 3803 may be bound to an inter-process communication (IPC) socket for transferring messages between processes. The main process 3893 may include a backend proxy dealer 3804. The dealer 3804 may be bound to an in-process socket for transferring messages within the main process 3893. A plurality of dealer workers 3805 may be bound to the in-process socket to exchange messages with the dealer 3804. The plurality of dealer workers 3805 may use the connection 3806 with the messaging cluster 3880.

The agent 3892 may include a plurality of operation executors 3898. The plurality of operation executors 3898 may be spawned from the main process 3893 in response to operations received from the messaging cluster 3880, as discussed in conjunction with FIG. 37. The plurality of operation executors 3898 may be associated with a plurality of requests 3801. The plurality of requests 3801 may represent a plurality of REST API requests. The plurality of operation executors 3898 may exchange request and reply messages with a plurality of client dealers 3802. Each of the client dealers 3802 may have a unique identity. The plurality of operation executors 3898 may use the plurality of client dealers 3802 to put request messages on the IPC socket to which the router 3803 is bound. The router 3803 may add to each request message the unique identity of the client dealer of the plurality of client dealers 3802 which delivered the request message. The router 3803 may route the request messages to the dealer 3804. The dealer 3804 may use the in-process socket to send the request messages in round-robin fashion to the plurality of dealer workers 3805. The plurality of dealer workers 3805 may extract the unique identities of the client dealers. The plurality of dealer workers 3805 may use the connection 3806 to send the request messages to the messaging cluster 3880. The control plane 3807 may generate responses to the request messages and send response messages to the agent 3892 using the messaging cluster 3880. The plurality of dealer workers 3805 may receive the response messages using the connection 3806, add the extracted unique identities of the client dealers, and route the response messages to the dealer 3804 using the in-process socket. The dealer 3804 may forward the response messages to the router 3803. The router 3803 may extract the unique identities of the client dealers from the response messages and send the response messages, via the IPC socket, to the client dealers of the plurality of client dealers 3801 associated with the unique identities. The plurality of client dealers 3801 forward the response messages to the plurality of operation executors 3898. The plurality of operation executors 3898 extract responses from the response messages.

In an example, the agent 3892 receives an operation from the control plane 3807. The agent main process 3893 spawns an operation executor for executing the operation. The operation executor determines that the operation includes making an API request to the control plane 3807. The API request is a request for an API call on the control plane 3807. The operation executor spawns a client dealer having a client dealer UUID and sends a request message to the router 3803 on the IPC socket using the client dealer, where the request message is the request for the API call. The router 3803 prepends the request message with the client dealer UUID and sends the request message to the dealer 3804. The dealer 3804 sends the request message to a dealer worker using the in-process socket. The dealer worker extracts the client dealer UUID and sends the request message to the messaging cluster using the connection 3806. The control plane 3807 makes the API call and obtains a response to the API call. The control plane 3807 sends a response message containing the response to the agent 3892 over the connection 3806 using the messaging cluster 3880. The dealer receives the response message and prepends the response message with the extracted client dealer UUID. The dealer sends the response message to the dealer 3804 using the in-process socket. The dealer 3804 sends the response message to the router 3803. The router 3803 extracts the client dealer UUID and sends the response message to the client dealer using the IPC socket. The client dealer sends the response message to the operation executor. The operation executor extracts the API response from the response message.

FIG. 39 is an example flow chart illustrating operations in a method for communication between multiple processes of an agent of the control plane of FIG. 2 running on a database server and over a single connection, in accordance with some embodiments of the present disclosure. The method 3900 may be performed by the database management system 200 of FIG. 2 and/or the agent 3792 of FIG. 37. The method 3900 may include more or fewer operations than shown. The operations may be performed in the order shown, in a different order, or concurrently.

At operation 3910, a process of an agent running on a database server generates a request, wherein the request includes an identifier of the process. The database server may be managed by a database management system. The database management system may include a control plane. The agent may be a software agent of the control plane running on the database server. The agent may include a main process. The main process may create multiple processes for performing various tasks. Each of the multiple processes may be associated with an identifier. The identifiers may be used to associate requests and responses to the requests with the processes. The process may send the generated request to a dealer of the agent. In some embodiments, the process sends the request to a router of the agent which sends the request to the dealer. In some embodiments, the router adds the identifier to the request.

At operation 3920, the dealer extracts the identifier to generate a modified request. In some embodiments, the dealer extracts the identifier such that the modified request does not include the identifier. The dealer may store the identifier and associate the modified request with the identifier.

At operation 3930, the agent publishes, over the single TCP connection between the database server and the control plane, the modified request to a channel of a messaging cluster of the control plane, wherein the channel is associated with the agent, and wherein the messaging cluster includes a plurality of channels associated with a plurality of agents running on a plurality of database server. In some embodiments, the channel is the control channel 295 of FIG. 2. In some embodiments, each channel may include a single TCP connection between the control plane and a database server of the plurality of database servers. Each channel may include multiple topics on the messaging cluster.

The control plane may, in response to the modified request, generate a response to the modified request. At operation 3940, the agent receives, on the channel, over the single TCP connection, the response to the modified request from the database management system. The agent may receive the response from the control plane of the database management system.

At operation 3950, the agent modifies, by the dealer, the response using the extracted identifier. The dealer may add the extracted identifier to the response based on the modified request being associated with the identifier. At operation 3960, the agent routes, by a router of the agent, based on the extracted identifier, the modified response to the process. At operation 3970, the agent executes, by the process, based on the modified response, an operation on the database server. In some embodiments, executing the operation includes executing an activity of the operation. In some embodiments, multiple processes may each execute an activity of the operation.

FIG. 40 is an example flow chart illustrating operations in a method for communication between a database server and the control plane of FIG. 2 over a single connection, in accordance with some embodiments of the present disclosure. The method 4000 may include more or fewer operations than shown. The operations may be performed in the order shown, in a different order, or concurrently.

At operation 4010, a processor of a database server generates a request to a control plane for an operation to be performed on the database server, where the control plane is configured to communicate with a plurality of database servers having a plurality of agents running thereon, and where each of the plurality of agents has a dedicated communication connection with the control plane. The agent may be a software agent of the control plane running on the database server. The agent may include a main process. The main process may create multiple processes for performing various tasks. Each of the multiple processes may be associated with an identifier. The identifiers may be used to associate requests and responses to the requests with the processes. The process may send the generated request to a dealer of the agent. In some embodiments, the process sends the request to a router of the agent which sends the request to the dealer. In some embodiments, the router adds the identifier to the request.

At operation 4020, the processor publishes the request on the dedicated communication connection associated with the agent to send the request to the control plane. The dedicated communication connection may be a dedicated communication channel. In some embodiments, the processor, to publish the request to the dedicated communication channel, generates a modified request from the request by extracting an identifier of a process which generated the request. The processor may publish the modified request to a requests topic of the dedicated communication connection. The dedicated communication connection may include a plurality of topics. Each of the plurality of topics may be configured to send or receive information of a particular type. For example, the plurality of topics may include a commands topic for the database server to receive commands from the control plane, an operations topic for the database server to receive operations from the control plane, and a requests topic for the database server to submit requests to the control plane. In some embodiments, the agent of the control plane subscribes to the plurality of channels on the dedicated communication connection. The agent may publish the modified request to the requests topic of the dedicated communication connection. The processor may subscribe the agent to the plurality of channels and cause the agent to publish to the plurality of channels.

At operation 4030, the processor receives, on the dedicated communication connection, a response from the control plane, the response including a response to the request from a service of the control plane. In some embodiments, the processor modifies the response using the extracted identifier and routes the modified response to the process based on the extracted identifier.

At operation 4040, the processor executes the operation on the database server based on the response.

In some embodiments, the method 4000 further includes receiving, using the agent, a command from the control plane. The command may be received on a commands topic of the dedicated communication connection. The agent may execute the command. In some embodiments, the main process of the agent spawns a thread to execute the command. The agent may publish a result of the executed command on a reply topic of the commands topic. The reply topic of the commands topic may be a transitory reply topic of the commands topic. The agent may receive a second command from the control plane on the commands topic. The agent may, based on a number of commands being executed exceeding a predetermined threshold, reject the command. For example, if the main process of the agent is unable to spawn an additional thread to executed the second command, the agent may reject the command. The control plane may determine that the command was rejected based on not receiving a response to the second command and may resend the second command. In some embodiments, the method 4000 may further include receiving an operation from the control plane on an operations topic of the one or more topics. The agent may create a process, separate from the main process, to execute the operation. In some embodiments, the process may publish a request to a requests topic of the one or more topics to execute the operation. The control plane may respond to the request and the process may use the response to execute the operation. In some embodiments, publishing the request on the request topic of the dedicated communication connection includes sending, by a first process of the agent, the request to a messaging library associated with the process, collecting, by a second process of the agent, the request from the messaging library, and publishing, by the second process, the request on the requests topic. The agent may publish a result of the executed operation on a reply topic of the operations topic. The reply topic of the operations topic may be a transitory reply topic of the operations topic. In some embodiments, receiving the operation from the control plane on the operations topic includes polling the operations topic for operations at regular intervals. The agent may poll the operations topic for operations at regular intervals. In some embodiments, a thread of the main process polls the operations topic at regular intervals.

In an example, a database management system includes a control plane including a memory having computer-readable instructions stored thereon and processor that executes computer-readable instructions to execute one or more services running on the control plane, the control plane connected to a plurality of database servers, where each of the plurality of database servers is connected to the control plane via a communication channel, where the control plane includes a plurality of data streams, each of the plurality of data streams configured to communicate messages of a designated type, and where the control plane is configured to communicate with a database server of the plurality of database servers using the plurality of data streams and the communication channel associated with the database server and the control plane.

In the example database management system, to communicate with a database server of the plurality of database servers, the processor further executes computer-readable instructions to listen for a request from the database server on a first one of the plurality of data streams, identify a service from the one or more services for handling the request, transmit the request to the service, receive a response from the service, and transmit the response to the database server on a second one of the plurality of data streams.

In the example database management system the processor further executes computer-readable instructions to determine a tenant identifier based on one or more characteristics of the request, determine an owner identifier based on the one or more characteristics of the request, and modify the request based on the tenant identifier and the owner identifier. In the example database management system, identifying the service includes determining a format of the request.

In the example database management system, the processor further executes computer-readable instructions to determine an identity of a cloud provider associated with the database server based on the request, modify the request using cloud credentials associated with the cloud provider, and send the modified request to the cloud provider.

In the example database management system, the processor further executes computer-readable instructions to receive a request from the database server, identify metadata from the request, and generate an alert based on the metadata to generate a notification at a user interface.

In the example database management system, the control plane further includes a registration data stream, where the control plane receives a request for registering a new database server through the registration data stream.

In the example database management system, the plurality of data streams include at least one of a commands topic, an operations topic, and a requests topic.

In the example database management system, the processor further executes computer-readable instructions to store a first message of the messages sent to the database server for a first period of time, and in response to not receiving an acknowledgement from the database server of the first message within the first period of time, resend the first message to the database server.

In the example database management system, the processor further executes computer-readable instructions to receive, through a data stream of the plurality of data streams, a call to provision a database across a first region of a cloud and a second region of the cloud, retrieve a grouped network profile associated with the cloud, determine, based on the grouped network profile, first network details associated with the first region and second network details associated with the second region, and provision the database on a first node in the first region using the first network details and provision the database on a second node in the second region using the second network details.

In an example, a non-transitory, computer-readable media includes computer-readable instructions stored thereon that when executed by a processor of a control plane causes the processor to receive, on a data stream of a messaging cluster of the control plane, a message from a database server over a TCP connection, route the message to a service of the control plane, generate a response to the message, route the response to the messaging cluster, and send, by the messaging cluster, on the data stream, the response to the database server.

In this example, the instructions further cause the processor to listen for a request from the database server on a second data stream, identify a second service from one or more services of the control plane for handling the request, transmit the request to the second service, receive a response from the second service, and transmit the response to the database server on the second data stream.

In this example, the instructions further cause the processor to determine a tenant identifier based on one or more characteristics of the request, determine an owner identifier based on the one or more characteristics of the request, and modify the request based on the tenant identifier and the owner identifier.

In this example, identifying the second service includes identifying the second service based on a format of the request.

In this example, the instructions further cause the processor to identify metadata from the request, and generate an alert based on the metadata to generate a notification at a user interface.

In this example, the instructions further cause the processor to receive a request for registering a new database server through a registration data stream.

In this example, the request is one of a request, a reply to a command from the control plane, and a reply to an operation from the control plane.

In this example, the instructions further cause the processor to store a first message sent to the database server from the control plane for a first period of time, and in response to not receiving an acknowledgement, from the database server, of the first message within the first period of time, resend the first message to the database server.

In this example, the instructions further cause the processor to determine an identity of a cloud provider associated with the database server based on the message, modify the message using cloud credentials associated with the cloud provider, and send the modified message to the cloud provider.

In this example, the instructions further cause the processor to receive, through a second data stream, a call to provision a database across a first region of a cloud and a second region of the cloud, retrieve a grouped network profile associated with the cloud, determine, based on the grouped network profile, first network details associated with the first region and second network details associated with the second region, and provision the database on a first node in the first region using the first network details and provision the database on a second node in the second region using the second network details.

In an example, a method includes receiving, on a data stream of a messaging cluster of a control plane of a database management service, a message from a database server over a TCP connection, routing, by a connection manager of the control plane, the message to a service of the control plane, generating, by the service, a response to the message, routing, by the connection manager, the response to the messaging cluster, and sending, by the messaging cluster, on the data stream, the response to the database server.

In this example, the method includes listening for a request from the database server on a second data stream, identifying a second service from one or more services of the control plane for handling the request, transmitting the request to the second service, receiving a response from the second service, and transmitting the response to the database server on the second data stream.

In this example, the method includes determining a tenant identifier based on one or more characteristics of the request, determining an owner identifier based on the one or more characteristics of the request, and modifying the request based on the tenant identifier and the owner identifier.

In this example, identifying the second service includes identifying the second service based on a format of the request.

In this example, the method includes identifying metadata from the request, and generating an alert based on the metadata to generate a notification at a user interface.

In this example, the method includes receiving a request for registering a new database server through a registration data stream.

In this example, the request is one of a request, a reply to a command from the control plane, and a reply to an operation from the control plane.

In this example, the method includes storing a first message sent to the database server from the control plane for a first period of time, and in response to not receiving an acknowledgement, from the database server, of the first message within the first period of time, resending the first message to the database server.

In this example, the method includes determining an identity of a cloud provider associated with the database server based on the message, modifying the message using cloud credentials associated with the cloud provider, and sending the modified message to the cloud provider.

In this example, the method includes receiving, through a second data stream, a call to provision a database across a first region of a cloud and a second region of the cloud, retrieving a grouped network profile associated with the cloud, determining, based on the grouped network profile, first network details associated with the first region and second network details associated with the second region, and provisioning the database on a first node in the first region using the first network details and provision the database on a second node in the second region using the second network details.

In an example, a system includes a memory having computer-readable instructions stored thereon, and a processor of a control plane that executes the computer-readable instructions to receive a request from a tenant to update a portion of a database, determine an individual tenant identifier of the tenant, determine whether the portion of the database is associated with the individual tenant identifier or a global tenant identifier, and allow the tenant to update the portion of the database in response to determining that the portion of the database is associated with the global tenant identifier or the individual tenant identifier or restrict the tenant from updating the portion of the database in response to determining that the portion of the database is associated with neither the global tenant identifier nor the individual tenant identifier.

In this example system, the portion of the database includes one or more rows of the database, and where the processor further executes computer-readable instructions to apply a row-level-security policy to allow or restrict the tenant from updating rows of the portion.

In this example system, to determine the individual tenant identifier, the processor further executes computer-readable instructions to fetch the individual tenant identifier from an execution context of the request.

In this example system, the execution context is a thread context.

In this example system, the portion of the database includes metadata of one or more entities on a database server associated with the tenant, and where the request to update the portion of the database is triggered by an update to the one or more entities on the database server.

In this example system, the processor further executes computer-readable instructions to receive a message from the database server in a topic of a messaging cluster, where the topic is associated with the database server, and where the message includes the update to the one or more entities on the database server, and determine the tenant based on one or more of the individual tenant identifier or one or more characteristics of the topic.

In this example system, the portion of the database includes metadata of one or more entities on a database server associated with the tenant, and where the request to update the portion of the database triggers an update to the one or more entities on the database server.

In this example system, to update the one or more entities on the database server, the processor further executes computer-readable instructions to publish an update command in a topic of a messaging service, where an agent of the control plane running on the database server subscribes to the topic.

In this example system, the tenant is a tenant of a database management system, and where the database includes a database on the control plane including metadata of entities on a database server in communication with the control plane.

In this example system, to communicate with the database server, the processor further executes computer-readable instructions to generate topics associated with the database server on a messaging service, where the messaging service includes a plurality of topics associated with a plurality of database servers.

In an example, a non-transitory, computer-readable media includes computer-readable instructions stored thereon that when executed by a processor of a control plane cause the processor to receive a request from a tenant to update a portion of a database, determine an individual tenant identifier of the tenant, determine whether the portion of the database is associated with the individual tenant identifier or a global tenant identifier, and allow the tenant to update the portion of the database in response to determining that the portion of the database is associated with the global tenant identifier or the individual tenant identifier or restrict the tenant from updating the portion of the database in response to determining that the portion of the database is associated with neither the global tenant identifier nor the individual tenant identifier.

In this example, the portion of the database includes one or more rows of the database, and where the instructions further cause the processor to apply a row-level-security policy to allow or restrict the tenant from updating rows of the portion.

In this example, the instructions further cause the processor to determine the individual tenant identifier by fetching the individual tenant identifier from an execution context of the request.

In this example, the execution context is a thread context.

In this example, the portion of the database includes metadata of one or more entities on a database server associated with the tenant, and where the request to update the portion of the database is triggered by an update to the one or more entities on the database server.

In this example, the instructions further case the processor to receive a message from the database server in a topic of a messaging cluster, where the topic is associated with the database server, and where the message includes the update to the one or more entities on the database server, and determine the tenant based on one or more of an identifier of the tenant and one or more characteristics of the topic.

In this example, the portion of the database includes metadata of one or more entities on a database server associated with the tenant, and where the request to update the portion of the database triggers an update to the one or more entities on the database server.

In this example, to update the one or more entities on the database server, the instructions further cause the processor to publish an update command in a topic of a messaging cluster, where an agent of the control plane running on the database server subscribes to the topic.

In this example, the tenant is a tenant of a database management system, and where the database is a database on the control plane including metadata of entities on a database server in communication with the control plane.

In this example, to communicate with the database server, the instructions further cause the processor to generate topics associated with the database server on a messaging cluster, where the messaging cluster includes a plurality of topics associated with a plurality of database servers.

In an example, a method includes receiving, by a processor of a control plane, a request from a tenant to update a portion of a database, determining, by the processor, an individual tenant identifier of the tenant, determining, by the processor, whether the portion of the database is associated with the individual tenant identifier or a global tenant identifier, and allowing, by the processor, the tenant to update the portion of the database in response to determining that the portion of the database is associated with the global tenant identifier or the individual tenant identifier or restricting the tenant from updating the portion of the database in response to determining that the portion of the database is associated with neither the global tenant identifier nor the individual tenant identifier.

In this example, the portion of the database includes one or more rows of the database, and where the method further includes applying, by the processor, a row-level-security policy to allow or restrict the tenant from updating rows of the portion.

In this example, the method includes determining, by the processor, the individual tenant identifier by fetching the individual tenant identifier from an execution context of the request.

In this example, the execution context is a thread context.

In this example, the portion of the database includes metadata of one or more entities on a database server associated with the tenant, and where the request to update the portion of the database is triggered by an update to the one or more entities on the database server.

In this example, the method includes receiving, by the processor, a message from the database server in a topic of a messaging cluster, where the topic is associated with the database server, and where the message includes the update to the one or more entities on the database server, and determining, by the processor, the tenant based on one or more of an identifier of the tenant and one or more characteristics of the topic.

In this example, the portion of the database includes metadata of one or more entities on a database server associated with the tenant, and where the request to update the portion of the database triggers an update to the one or more entities on the database server.

In this example, the method includes publishing an update command in a topic of a messaging cluster to update the one or more entities on the database server, where an agent of the control plane running on the database server subscribes to the topic.

In this example, the tenant is a tenant of a database management system, and where the database is a database on the control plane including metadata of entities on a database server in communication with the control plane.

In this example, the method includes generating topics associated with the database server on a messaging cluster to communicate with the database server, where the messaging cluster includes a plurality of topics associated with a plurality of database servers.

In an example, a system includes a memory having computer-readable instructions stored thereon, and a processor that executes the computer-readable instructions to determine a plurality of scheduled events to be executed in a time period, determine a number of buckets in the time period based on a predetermined permissible interval, generate a plurality of buckets equal to the number of buckets in the time period, where each of the plurality of buckets is associated with a time interval, and schedule each of the plurality of scheduled events in one of the plurality of buckets, where execution of each of the plurality of scheduled events is delayed or advanced from an original scheduled time based on the predetermined permissible interval.

In this example, to generate the plurality of buckets, the processor further executes computer-readable instructions to map the time interval associated with each respective bucket of the plurality of buckets to a memory address containing metadata of the plurality of scheduled events to be executed in that respective bucket.

In this example, to generate the plurality of buckets, the processor further executes computer-readable instructions to schedule the plurality of buckets at regular intervals in the time period.

In this example, to determine the number of buckets, the processor further executes computer-readable instructions to divide the time period by the permissible interval.

In this example, to schedule each of the plurality of scheduled events, the processor further executes computer-readable instructions to, for each scheduled event determine a delay time interval to a nearest delay bucket, apply a delay weight to the delay time interval, determine an advance time interval to a nearest advance bucket, apply an advance weight to the advance time interval, compare the weighted delay time interval to the weighted advance time interval, and based on the comparison, determine whether the event is to be delayed by the delay time interval or advanced by the advance time interval.

In this example, the processor further executes computer-readable instructions to determine that a number of scheduled events in a particular bucket exceeds an upper events number threshold, and in response to the number of scheduled events in the particular bucket exceeding the upper events number threshold, generate additional buckets adjacent the particular bucket.

In this example, the processor further executes computer-readable instructions to determine a new permissible interval based on the number of scheduled events in a particular buckets exceeding the upper events number threshold.

In this example, the processor further executes computer-readable instructions to determine that a number of scheduled events in a particular bucket is below a lower events number threshold, in response to the number of scheduled events in the particular bucket being below the lower events number threshold, schedule the events in the particular bucket to a second bucket, and delete the particular bucket.

In this example, each of the plurality of scheduled events is associated with a tenant in a multi-tenant pooled database.

In this example, the processor further executes computer-readable instructions to determine the predetermined permissible interval based on a predetermined permissible delay interval and a predetermined permissible advance interval.

In an example, a non-transitory, computer-readable media includes computer-readable instructions stored thereon that when executed by a processor of a control plane cause the processor to determine a plurality of scheduled events to be executed in a time period, determine a number of buckets in the time period based on a predetermined permissible interval, generate a plurality of buckets equal to the number of buckets in the time period, where each of the plurality of buckets is associated with a time interval, and schedule each of the plurality of scheduled events in one of the plurality of buckets, where execution of each of the plurality of scheduled events is delayed or advanced from an original scheduled time based on the predetermined permissible interval.

In this example, to generate the plurality of buckets, the computer-readable instructions further cause the processor to map the time interval associated with each respective bucket of the plurality of buckets to a memory address containing metadata of the plurality of scheduled events to be executed in that respective bucket.

In this example, to generate the plurality of buckets, the computer-readable instructions further cause the processor to schedule the plurality of buckets at regular intervals in the time period.

In this example, to determine the number of buckets, the computer-readable instructions further cause the processor to divide the time period by the permissible interval.

In this example, to schedule each of the plurality of scheduled events, the computer-readable instructions further cause the processor to, for each scheduled event determine a delay time interval to a nearest delay bucket, apply a delay weight to the delay time interval, determine an advance time interval to a nearest advance bucket, apply an advance weight to the advance time interval, compare the weighted delay time interval to the weighted advance time interval, and based on the comparison, determine whether the event is to be delayed by the delay time interval or advanced by the advance time interval.

In this example, the computer-readable instructions further cause the processor to determine that a number of scheduled events in a particular bucket exceeds an upper events number threshold, and in response to the number of scheduled events in the particular bucket exceeding the upper events number threshold, generate additional buckets adjacent the particular bucket.

In this example, the computer-readable instructions further cause the processor to determine a new permissible interval based on the number of scheduled events in a particular buckets exceeding the upper events number threshold.

In this example, the computer-readable instructions further cause the processor to determine that a number of scheduled events in a particular bucket is below a lower events number threshold, in response to the number of scheduled events in the particular bucket being below the lower events number threshold, schedule the events in the particular bucket to a second bucket, and delete the particular bucket.

In this example, each of the plurality of scheduled events is associated with a tenant in a multi-tenant pooled database.

In this example, the computer-readable instructions further cause the processor to determine the predetermined permissible interval based on a predetermined permissible delay interval and a predetermined permissible advance interval.

In an example, a method includes determining a plurality of scheduled events to be executed in a time period, determining a number of buckets in the time period based on a predetermined permissible interval, generating a plurality of buckets equal to the number of buckets in the time period, where each of the plurality of buckets is associated with a time interval, and scheduling each of the plurality of scheduled events in one of the plurality of buckets, where execution of each of the plurality of scheduled events is delayed or advanced from an original scheduled time based on the predetermined permissible interval.

In this example, generating the plurality of buckets includes mapping the time interval associated with each respective bucket of the plurality of buckets to a memory address containing metadata of the plurality of scheduled events to be executed in that respective bucket.

In this example, generating the plurality of buckets includes scheduling the plurality of buckets at regular intervals in the time period.

In this example, determining the number of buckets includes dividing the time period by the permissible interval.

In this example, scheduling each of the plurality of scheduled events includes determining a delay time interval to a nearest delay bucket, applying a delay weight to the delay time interval, determining an advance time interval to a nearest advance bucket, applying an advance weight to the advance time interval, comparing the weighted delay time interval to the weighted advance time interval, and based on the comparison, determining whether the event is to be delayed by the delay time interval or advanced by the advance time interval.

In this example, the method includes determining that a number of scheduled events in a particular bucket exceeds an upper events number threshold, and in response to the number of scheduled events in the particular bucket exceeding the upper events number threshold, generating additional buckets adjacent the particular bucket.

In this example, the method includes determining a new permissible interval based on the number of scheduled events in a particular buckets exceeding the upper events number threshold.

In this example, the method includes determining that a number of scheduled events in a particular bucket is below a lower events number threshold, in response to the number of scheduled events in the particular bucket being below the lower events number threshold, scheduling the events in the particular bucket to a second bucket, and deleting the particular bucket.

In this example, each of the plurality of scheduled events is associated with a tenant in a multi-tenant pooled database.

In this example, the method includes determining the predetermined permissible interval based on a predetermined permissible delay interval and a predetermined permissible advance interval.

In an example, a system includes a memory having computer-readable instructions stored thereon, and a processor of a control plane that executes the computer-readable instructions to receive from a database server, over a first connection, a request for credentials, in response to the request for credentials, generate credentials for the database server, transmit the credentials to the database server over a second connection specific to the database server, receive, over the second connection, from the database server, a request for registering the database server, the request for registering the database server including the credentials, in response to the request for registering the database server, register the database server with a database management system associated with the control plane.

In this example, the processor further executes computer-readable instructions to receive the request for credentials over a first topic of the first connection configured to accept requests from unregistered database servers, and receive the second request for registering the database server over a second topic of the second connection configured to accept requests including the credentials.

In this example, the request for credentials includes activation credentials associated with a user of the database management system.

In this example, the processor further executes the computer-readable instructions to receive a selection of the database server prior to receiving the first request for credentials.

In this example, the processor further executes the computer-readable instructions to provide an installation script to the database server in response to the selection of the database server.

In this example, the installation script includes a network address to allow the database server to download, from the network address, an agent to the database server to communicate with the control plane.

In this example, to register the database server, the processor further executes the computer-readable instructions to send a database server configuration to the database server.

In this example, the database configuration includes one or more directories of the control plane.

In this example, to register the database server, the processor further executes the computer-readable instructions to generate a metadata repository configured to store metadata of entities in the database server.

In this example, to register the database server, the processor further executes the computer-readable instructions to provide a snapshot of a software agent of the control plane to the database server.

In an example, a non-transitory, computer-readable media includes computer-readable instructions stored thereon that when executed by a processor of a control plane cause the processor to receive from a database server, over a first connection, a request for credentials, in response to the request for credentials, generate credentials for the database server, transmit the credentials to the database server over a second connection specific to the database server, receive, over the second connection, from the database server, a request for registering the database server, the request for registering the database server including the credentials, in response to the request for registering the database server, register the database server with a database management system associated with the control plane.

In this example, the instructions further cause the processor to receive the request for credentials over a first topic of the first connection configured to accept requests from unregistered database servers, and receive the second request for registering the database server over a second topic of the second connection configured to accept requests including the credentials.

In this example, the request for credentials includes activation credentials associated with a user of the database management system.

In this example, the instructions further cause the processor to receive a selection of the database server prior to receiving the first request for credentials.

In this example, the instructions further cause the processor to provide an installation script to the database server in response to the selection of the database server.

In this example, the installation script includes a network address to allow the database server to download, from the network address, an agent to the database server to communicate with the control plane.

In this example, to register the database server the instructions further cause the processor to send a database server configuration to the database server.

In this example, the database configuration includes one or more directories of the control plane.

In this example, to register the database server, the instructions further cause the processor to generate a metadata repository configured to store metadata of entities in the database.

In this example, to register the database server, the instructions further cause the processor to provide a snapshot of a software agent of the control plane to the database server.

In an example, a method includes receiving, at a control plane, from a database server, over a first connection, a request for credentials, in response to the request for credentials, generating, at the control plane, credentials for the database server, transmitting, by the control plane, the credentials to the database server over a second connection specific to the database server, receiving, at the control plane, over the second connection, from the database server, a request for registering the database server, the request for registering the database server including the credentials, in response to the request for registering the database server, registering, by the control plane, the database server with a database management system associated with the control plane.

In this example, the method includes receiving, at the control plane, the request for credentials over a first topic of the first connection configured to accept requests from unregistered database servers, and receiving, at the control plane, the second request for registering database over a second topic of the second connection configured to accept requests including the credentials.

In this example, the request for credentials includes activation credentials associated with a user of the database management system.

In this example, the method includes receiving, at the control plane, a selection of the database server prior to receiving the first request for credentials.

In this example, the method includes providing an installation script to the database server in response to the selection of the database server.

In this example, the installation script includes a network address to allow the database server to download, from the network address, an agent to the database server to communicate with the control plane.

In this example, registering the database server includes sending a database configuration for the database server to the database server.

In this example, the database server configuration includes one or more directories of the control plane.

In this example, registering the database server includes generating a metadata repository configured to store metadata of entities in the database server.

In this example, registering the database server includes providing a snapshot of a software agent of the control plane to the database server.

In an example, a system includes a memory having computer-readable instructions stored thereon, and a processor of a database server, the processor executing the computer-readable instructions to generate a request to a control plane for an operation to be performed on the database server, where the control plane is configured to communicate with a plurality of database servers having a plurality of agents running thereon, and where each of the plurality of agents has a dedicated communication connection with the control plane, publish the request on the dedicated communication connection associated with the agent to send the request to the control plane, receive, on the dedicated communication connection, a response from the control plane, the response including a response to the request from a service of the control plane, and execute the operation on the database server based on the response.

In this example, to publish the request to the dedicated communication channel, the processor further executes computer-readable instructions to generate a modified request from the request by extracting an identifier of a process, where the process generates the request, and publish the modified request to a requests topic of the dedicated communication connection, where the dedicated communication connection includes a plurality of topics, each of the plurality of topics configured to send or receive information of a particular type.

In this example, the processor further executes computer-readable instructions to modify the response using the extracted identifier, and route, based on the extracted identifier, the modified response to the process.

In this example, the processor further executes computer-readable instructions to subscribe the agent to one or more topics of the dedicated communication connection for receiving commands from the control plane and sending requests to the control plane.

In this example, the processor further executes computer-readable instructions to receive a command from the control plane on a commands topic of the one or more topics, execute the command, and publish a result of the executed command on a reply topic of the commands topic.

In this example, the processor further executes computer-readable instructions to receive a command from the control plane on a commands topic of the one or more topics, and based on a number of commands being executed exceeding a predetermined threshold, reject the command.

In this example, the processor further executes computer-readable instructions to receive an operation from the control plane on an operations topic of the one or more topics, create a process to execute the operation, and publish a result of the executed operation on a reply topic of the operations topic.

In this example, to receive the operation from the control plane on the operations topic, the processor further executes computer-readable instructions to poll an operations topic of the one or more topics for operations at regular intervals, create a process to execute an operation, and publish a result of the executed operation on a reply topic of the operations topic.

In this example, to publish the request on the dedicated communication connection, the processor further executes computer-readable instructions to publish the request on a requests topic of the one or more topics.

In this example, to publish the request on the dedicated communication connection, the processor further executes computer-readable instructions to send, by a first process running on the processor, the request to a messaging library associated with the processor, and collect, by a second process running on the processor, the request from the messaging library, and publish, by the second process, the request on a requests topic of the one or more topics.

In an example, a non-transitory, computer-readable media includes computer-readable instructions stored thereon that when executed by a processor of a control plane cause the processor to generate a request to a control plane for an operation to be performed on the database server, where the control plane is configured to communicate with a plurality of database servers having a plurality of agents running thereon, and where each of the plurality of agents has a dedicated communication connection with the control plane, publish the request on the dedicated communication connection associated with the agent to send the request to the control plane, receive, on the dedicated communication connection a response from the control plane, the response including a response to the request from a service of the control plane, and execute the operation on the database server based on the response.

In this example, to publish the request to the dedicated communication channel, the instructions further cause the processor to generate a modified request from the request by extracting an identifier of a process, where the process generates the request, and publish the modified request to a requests topic of the dedicated communication connection, where the dedicated communication connection includes a plurality of topics, each of the plurality of topics configured to send or receive information of a particular type.

In this example, the instructions further cause the processor to modify the response using the extracted identifier, and route, based on the extracted identifier, the modified response to the process.

In this example, the instructions further cause the processor to subscribe the agent to one or more topics of the dedicated communication connection for receiving commands from the control plane and sending requests to the control plane.

In this example, the instructions further cause the processor to receive a command from the control plane on a commands topic of the one or more topics, execute the command, and publish a result of the executed command on a reply topic of the commands topic.

In this example, the instructions further cause the processor to receive a command from the control plane on a commands topic of the one or more topics, and based on a number of commands being executed exceeding a predetermined threshold, reject the command.

In this example, the instructions further cause the processor to receive an operation from the control plane on an operations topic of the one or more topics, create a process to execute the operation, and publish a result of the executed operation on a reply topic of the operations topic.

In this example, to receive the operation from the control plane on the operations topic, the instructions further cause the processor to poll an operations topic of the one or more topics for operations at regular intervals, create a process to execute an operation, and publish a result of the executed operation on a reply topic of the operations topic.

In this example, to publish the request on the dedicated communication connection, the instructions further cause the processor to publish the request on a requests topic of the one or more topics.

In this example, to publish the request on the dedicated communication connection, the instructions further cause the processor to send, by a first process running on the processor, the request to a messaging library associated with the processor, and collect, by a second process running on the processor, the request from the messaging library, and publish, by the second process, the request on a requests topic of the one or more topics.

In an example, a method includes generating, by a processor of a database server, a request to a control plane for an operation to be performed on the database server, where the control plane is configured to communicate with a plurality of database servers having a plurality of agents running thereon, and where each of the plurality of agents has a dedicated communication connection with the control plane, publishing, by the processor, the request on the dedicated communication connection associated with the agent to send the request to the control plane, receiving, by the processor, on the dedicated communication connection a response from the control plane, the response including a response to the request from a service of the control plane, and executing, by the processor, the operation on the database server based on the response.

In this example, publishing the request to the dedicated communication channel includes generating, by the processor, a modified request from the request by extracting an identifier of a process, where the process generates the request, and publishing, by the processor, the modified request to a requests topic of the dedicated communication connection, where the dedicated communication connection includes a plurality of topics, each of the plurality of topics configured to send or receive information of a particular type.

In this example, the method includes modifying, by the processor, the response using the extracted identifier, and routing, by the processor, based on the extracted identifier, the modified response to the process.

In this example, the method includes subscribing, by the processor, the agent to one or more topics of the dedicated communication connection for receiving commands from the control plane and sending requests to the control plane.

In this example, the method includes receiving, by the processor, a command from the control plane on a commands topic of the one or more topics, executing, by the processor, the command, and publishing, by the processor, a result of the executed command on a reply topic of the commands topic.

In this example, the method includes receiving, by the processor, a command from the control plane on a commands topic of the one or more topics, and based on a number of commands being executed exceeding a predetermined threshold, rejecting, by the processor, the command.

In this example, the method includes receiving, by the processor, an operation from the control plane on an operations topic of the one or more topics, creating, by the processor, a process to execute the operation, and publishing, by the processor, a result of the executed operation on a reply topic of the operations topic.

In this example, receiving the operation from the control plane on the operations topic includes polling, by the processor, an operations topic of the one or more topics for operations at regular intervals, creating a process to execute an operation, and publishing a result of the executed operation on a reply topic of the operations topic.

In this example, publishing the request on the dedicated communication connection includes publishing, by the processor, the request on a requests topic of the one or more topics.

In this example, publishing the request on the dedicated communication connection includes sending, by a first process running on the processor, the request to a messaging library associated with the processor, and collecting, by a second process running on the processor, the request from the messaging library, and publishing, by the second process, the request on a requests topic of the one or more topics.

It is to be understood that any examples used herein are simply for purposes of explanation and are not intended to be limiting in any way. It is also to be understood that any examples used herein are simply for purposes of explanation and are not intended to be limiting in any way. Further, although the present disclosure has been discussed with respect to memory usage, in other embodiments, the teachings of the present disclosure may be applied to adjust other resources, such as power, processing capacity, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system comprising:
a memory having computer-readable instructions stored thereon; and
a processor of a database server, the processor executing the computer-readable instructions to:
generate a request to a control plane for an operation to be performed on the database server, wherein the control plane is configured to communicate with a plurality of database servers having a plurality of agents running thereon, and wherein each of the plurality of agents has a communication connection with the control plane;
publish the request to a topic of the communication connection associated with the agent, wherein the communication connection comprises a bidirectional communication connection between the database server and the control plane, and wherein publishing the request causes the request to be routed to a service of the control plane;
receive, on the communication connection, a response from the service of the control plane in response to the published request; and
execute the operation on the database server based on the response.

2. The system of claim 1, wherein to publish the request to the communication connection, the processor further executes computer-readable instructions to:
generate a modified request from the request by extracting an identifier of a process running on the processor that generated the request, wherein extracting comprises removing the identifier from the request or copying the identifier and creating the modified request without the identifier; and
publish the modified request to a request topic of the communication connection, wherein the communication connection comprises a plurality of topics, each of the plurality of topics configured to send or receive information of a particular type.

3. The system of claim 2, wherein the processor further executes computer-readable instructions to modify the response using the extracted identifier; and
route, based on the extracted identifier, the modified response to the process.

4. The system of claim 1, wherein the processor further executes computer-readable instructions to subscribe the agent to one or more topics of the communication connection for receiving commands from the control plane and sending requests to the control plane.

5. The system of claim 4, wherein the processor further executes computer-readable instructions to:
receive a command from the control plane on a commands topic of the one or more topics;
execute the command; and
publish a result of the executed command on a reply topic of the commands topic.

6. The system of claim 4, wherein the processor further executes computer-readable instructions to:
receive a command from the control plane on a commands topic of the one or more topics; and
based on a number of commands being executed exceeding a predetermined threshold, reject the command.

7. The system of claim 4, wherein the processor further executes computer-readable instructions to:
receive an operation from the control plane on an operations topic of the one or more topics;
create a process to execute the operation; and
publish a result of the executed operation on a reply topic of the operations topic.

8. The system of claim 7 wherein to receive the operation from the control plane on the operations topic, the processor further executes computer-readable instructions to:
poll an operations topic of the one or more topics for operations at regular intervals;
create a process to execute an operation; and
publish a result of the executed operation on a reply topic of the operations topic.

9. The system of claim 4, wherein to publish the request on the communication connection, the processor further executes computer-readable instructions to:
publish the request on a requests topic of the one or more topics.

10. The system of claim 4, wherein to publish the request on the communication connection, the processor further executes computer-readable instructions to:
send, by a first process running on the processor, the request to a messaging library associated with the processor; and
collect, by a second process running on the processor, the request from the messaging library; and
publish, by the second process, the request on a requests topic of the one or more topics.

11. A non-transitory, computer-readable media comprising computer-readable instructions stored thereon that when executed by a processor of a control plane cause the processor to:
generate a request to a control plane for an operation to be performed on a database server, wherein the control plane is configured to communicate with a plurality of database servers having a plurality of agents running thereon, and wherein each of the plurality of agents has a communication connection with the control plane;
publish the request to a topic of the communication connection associated with the agent, wherein the communication connection comprises a bidirectional communication connection between the database server and the control plane, and wherein publishing the request causes the request to be routed to a service of the control plane via a messaging cluster;

receive, on the communication connection, a response from the service of the control plane in response to the published request; and execute the operation on the database server based on the response.

12. The non-transitory, computer-readable media of claim 11, wherein to publish the request to the communication connection, the instructions further cause the processor to:

generate a modified request from the request by extracting an identifier of a process running on the processor that generated the request, wherein extracting comprises removing the identifier from the request or copying the identifier and creating the modified request without the identifier; and publish the modified request to a request topic of the communication connection, wherein the communication connection comprises a plurality of topics, each of the plurality of topics configured to send or receive information of a particular type.

13. The non-transitory, computer-readable media of claim 12, wherein the instructions further cause the processor to modify the response using the extracted identifier; and route, based on the extracted identifier, the modified response to the process.

14. The non-transitory, computer-readable media of claim 11, wherein the instructions further cause the processor to subscribe the agent to one or more topics of the communication connection for receiving commands from the control plane and sending requests to the control plane.

15. The non-transitory, computer-readable media of claim 14, wherein the instructions further cause the processor to:

receive a command from the control plane on a commands topic of the one or more topics;

execute the command; and publish a result of the executed command on a reply topic of the commands topic.

16. The non-transitory, computer-readable media of claim 14, wherein the instructions further cause the processor to:

receive a command from the control plane on a commands topic of the one or more topics; and based on a number of commands being executed exceeding a predetermined threshold, reject the command.

17. The non-transitory, computer-readable media of claim 14, wherein the instructions further cause the processor to:

receive an operation from the control plane on an operations topic of the one or more topics;

create a process to execute the operation; and publish a result of the executed operation on a reply topic of the operations topic.

18. The non-transitory, computer-readable media of claim 17, wherein to receive the operation from the control plane on the operations topic, the instructions further cause the processor to:

poll an operations topic of the one or more topics for operations at regular intervals;

create a process to execute an operation; and publish a result of the executed operation on a reply topic of the operations topic.

19. The non-transitory, computer-readable media of claim 14, wherein to publish the request on the communication connection, the instructions further cause the processor to:

publish the request on a requests topic of the one or more topics.

20. The non-transitory, computer-readable media of claim 14, wherein to publish the request on the communication connection, the instructions further cause the processor to:

send, by a first process running on the processor, the request to a messaging library associated with the processor; and collect, by a second process running on the processor, the request from the messaging library; and publish, by the second process, the request on a requests topic of the one or more topics.

21. A method comprising:

generating, by a processor of a database server, a request to a control plane for an operation to be performed on the database server, wherein the control plane is configured to communicate with a plurality of database servers having a plurality of agents running thereon, and wherein each of the plurality of agents has a communication connection with the control plane;

publishing, by the processor, the request to a topic of the communication connection associated with the agent, wherein the communication connection comprises a bidirectional communication connection between the database server and the control plane, and wherein publishing the request causes the request to be routed to a service of the control plane via a messaging cluster;

receiving, by the processor, on the communication connection, a response from the service of the control plane in response to the published request; and executing, by the processor, the operation on the database server based on the response.

22. The method of claim 21, wherein publishing the request to the communication connection comprises:

generating, by the processor, a modified request from the request by extracting an identifier of a process running on the processor that generated the request, wherein extracting comprises removing the identifier from the request or copying the identifier and creating the modified request without the identifier; and publishing, by the processor, the modified request to a request topic of the communication connection, wherein the communication connection comprises a plurality of topics, each of the plurality of topics configured to send or receive information of a particular type.

23. The method of claim 22, further comprising modifying, by the processor, the response using the extracted identifier; and routing, by the processor, based on the extracted identifier, the modified response to the process.

24. The method of claim 21, further comprising subscribing, by the processor, the agent to one or more topics of the communication connection for receiving commands from the control plane and sending requests to the control plane.

25. The method of claim 24, further comprising:

receiving, by the processor, a command from the control plane on a commands topic of the one or more topics;

executing, by the processor, the command; and publishing, by the processor, a result of the executed command on a reply topic of the commands topic.

26. The method of claim 24, further comprising:

receiving, by the processor, a command from the control plane on a commands topic of the one or more topics; and based on a number of commands being executed exceeding a predetermined threshold, rejecting, by the processor, the command.

27. The method of claim 24, further comprising:

receiving, by the processor, an operation from the control plane on an operations topic of the one or more topics;

creating, by the processor, a process to execute the operation; and publishing, by the processor, a result of the executed operation on a reply topic of the operations topic.

28. The method of claim 27, wherein receiving the operation from the control plane on the operations topic comprises:

polling, by the processor, an operations topic of the one or more topics for operations at regular intervals;

creating a process to execute an operation; and publishing a result of the executed operation on a reply topic of the operations topic.

29. The method of claim 24, wherein publishing the request on the communication connection comprises:

publishing, by the processor, the request on a requests topic of the one or more topics.

30. The method of claim 24, wherein publishing the request on the communication connection comprises:

sending, by a first process running on the processor, the request to a messaging library associated with the processor; and collecting, by a second process running on the processor, the request from the messaging library; and publishing, by the second process, the request on a requests topic of the one or more topics.

\*  \*  \*  \*  \*